(12) United States Patent
Asada et al.

(10) Patent No.: US 12,509,424 B2
(45) Date of Patent: Dec. 30, 2025

(54) COMPOUND AND COMPOSITION AS PDGF RECEPTOR KINASE INHIBITOR

(71) Applicant: NIPPON SHINYAKU CO., LTD., Kyoto (JP)

(72) Inventors: Junshi Asada, Kyoto (JP); Yoshinari Haruta, Kyoto (JP); Hiroyuki Yakushiji, Kyoto (JP); Toru Tanaka, Kyoto (JP); Kazuya Kuramoto, Kyoto (JP); Keiji Kosugi, Kyoto (JP); Chiaki Fuchikami, Kyoto (JP)

(73) Assignee: NIPPON SHINYAKU CO., LTD., Kyoto (JP)

( * ) Notice: Subject to any disclaimer, the term of this patent is extended or adjusted under 35 U.S.C. 154(b) by 833 days.

(21) Appl. No.: 17/784,200

(22) PCT Filed: Dec. 11, 2020

(86) PCT No.: PCT/JP2020/046201
§ 371 (c)(1),
(2) Date: Jun. 10, 2022

(87) PCT Pub. No.: WO2021/117846
PCT Pub. Date: Jun. 17, 2021

(65) Prior Publication Data
US 2023/0101484 A1 Mar. 30, 2023

(30) Foreign Application Priority Data
Dec. 13, 2019 (JP) ................. 2019-224959

(51) Int. Cl.
| | |
|---|---|
| *C07D 213/82* | (2006.01) |
| *A61K 9/20* | (2006.01) |
| *A61P 11/00* | (2006.01) |
| *C07D 213/56* | (2006.01) |
| *C07D 213/81* | (2006.01) |
| *C07D 215/12* | (2006.01) |
| *C07D 239/84* | (2006.01) |
| *C07D 241/12* | (2006.01) |
| *C07D 241/20* | (2006.01) |
| *C07D 263/34* | (2006.01) |
| *C07D 277/56* | (2006.01) |
| *C07D 401/04* | (2006.01) |
| *C07D 401/12* | (2006.01) |
| *C07D 405/04* | (2006.01) |
| *C07D 413/04* | (2006.01) |
| *C07D 413/12* | (2006.01) |
| *C07D 471/04* | (2006.01) |
| *C07D 487/04* | (2006.01) |
| *C07D 495/04* | (2006.01) |
| *C07D 513/04* | (2006.01) |

(52) U.S. Cl.
CPC .......... *C07D 213/82* (2013.01); *A61K 9/2013* (2013.01); *A61K 9/2054* (2013.01); *A61K 9/2059* (2013.01); *A61P 11/00* (2018.01); *C07D 213/56* (2013.01); *C07D 213/81* (2013.01); *C07D 215/12* (2013.01); *C07D 239/84* (2013.01); *C07D 241/12* (2013.01); *C07D 241/20* (2013.01); *C07D 263/34* (2013.01); *C07D 277/56* (2013.01); *C07D 401/04* (2013.01); *C07D 401/12* (2013.01); *C07D 405/04* (2013.01); *C07D 413/04* (2013.01); *C07D 413/12* (2013.01); *C07D 471/04* (2013.01); *C07D 487/04* (2013.01); *C07D 495/04* (2013.01); *C07D 513/04* (2013.01)

(58) Field of Classification Search
CPC .................................................. C07D 213/82
See application file for complete search history.

(56) References Cited

FOREIGN PATENT DOCUMENTS

| CL | 200601128 | 1/2007 |
|---|---|---|
| CL | 200802478 | 5/2009 |

(Continued)

OTHER PUBLICATIONS

Intellectual Property India, "Examination Report," issued in Indian Patent Application No. 202247038569, which is a counterpart to U.S. Appl. No. 17/784,200, dispatched on May 23, 2025, 7 pages.

(Continued)

*Primary Examiner* — David K O'Dell

(57) ABSTRACT

An object of the present invention is to provide a compound having a PDGF receptor kinase inhibitory activity.
Examples of the present invention may include, for example, a compound represented by the following formula [I] or a pharmaceutically acceptable salt thereof, or a solvate thereof.

[Formula 1]

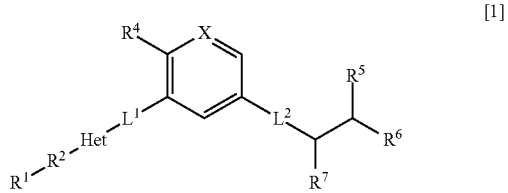

[I]

The compound of the present invention has an inhibitory activity against the PDGF receptor kinase. In addition, since the compound of the present invention has an inhibitory activity against the PDGF receptor kinase, it is useful as a therapeutic agent for respiratory diseases, cancers, smooth muscle proliferative diseases, vasoproliferative diseases, autoimmune/inflammatory diseases, metabolic diseases, vasoocclusive diseases, and the like.

6 Claims, No Drawings

(56) References Cited

FOREIGN PATENT DOCUMENTS

| CL | 201100295 | 7/2011 |
|---|---|---|
| CL | 201400492 | 10/2014 |
| WO | 2004/089286 A2 | 10/2004 |
| WO | 2005/019220 A2 | 3/2005 |
| WO | 2005/019220 A3 | 3/2005 |
| WO | 2005/080393 A1 | 9/2005 |
| WO | 2006/124462 A2 | 11/2006 |
| WO | 2009/026276 A1 | 2/2009 |
| WO | 2010/019540 A1 | 2/2010 |
| WO | 2011/090738 A2 | 7/2011 |
| WO | 2013/030802 A1 | 3/2013 |
| WO | 2013/033167 A1 | 3/2013 |
| WO | 2013/033620 A1 | 3/2013 |

OTHER PUBLICATIONS

Product information on "5-[(2-hydroxyethyl)amino]-N-2-thiazolyl-2-furancarboxamide" by EvitaChem, published Dec. 31, 2021.
China National Intellectual Property Administration, "First Office Action" and "Search Report", issued in Chinese Patent Application No. 202080086329.8, which is a counterpart to U.S. Appl. No. 17/784,200, on Sep. 22, 2023, 32 pages (16 pages of English translation of Office Action and Search Report, and 16 pages of original Office Action and Search Report).
Wei-Sheng Huang et al., "Discovery of 3-[2-(Imidazo[1,2-b]pyridazin-3-yl)ethynyl]-4-methyl-N-{4-[(4-methylpiperazin-1-yl)-methyl]-3-(trifluoromethyl)phenyl}benzamide (AP24534), a Potent, Orally Active Pan-Inhibitor of Breakpoint Cluster Region-Abelson (BCR-ABL) Kinase Including the T315I Gatekeeper Mutant," Journal of Medicinal Chemistry, 2010, vol. 53, No. 12, pp. 4701-4719.
Anna Czarna et al., "Novel Scaffolds for Dual Specificity Tyrosine-Phosphorylation-Regulated Kinase (DYRK1A) Inhibitors," Journal of Medicinal Chemistry, 2018, vol. 61, No. 17, pp. 7560-7572.
Instituto Nacional de Propiedad Industrial (INAPI), "Informe de Busqueda" (Search Report), issued in Chilean Patent Application No. 202201516, which is a counterpart to U.S. Appl. No. 17/784,200, on Dec. 12, 2023, 4 pages.
SR: Chemical Library, Supplier: Aurora Fine Chemicals, L1: Answer 1 of 1 Registry Copyright 2021 ACS on STN, RN: 2069836-28-6 Registry, ED: Entered STN: Feb. 13, 2017, CN: 2-Furancarboxamide, N-[5-[[(2-hydroxycyclohexyl)amino] carbonyl]-2-methylphenyl]- (CA Index Name), MF: C19 H22 N2 04, LC: STN Files CHEMCATS.
Patent Office at the Secretariat General for Cooperation Council, "Examination Report," issued in GCC Patent Application No. GC 2020-41111 on Sep. 11, 2021, 5 pages (3 pages of English translation of Examination Report and 2 pages of original Examination Report).
Beverly D. Smolich et al., "The antiangiogenic protein kinase inhibitors SU5416 and SU6668 inhibit the SCF receptor (c-kit) in a human myeloid leukemia cell line and in acute myeloid leukemia blasts," Blood, vol. 97, No. 5, pp. 1413-1421, Mar. 1, 2001.

COMPOUND AND COMPOSITION AS PDGF RECEPTOR KINASE INHIBITOR

CROSS REFERENCE TO RELATED APPLICATIONS

This patent application is a U.S. national stage application under 35 U.S.C. § 371 of International Patent Application No. PCT/JP2020/046201 filed on Dec. 11, 2020, which claims the benefit of foreign priority to Japanese Patent Application No. JP 2019-224959 filed on Dec. 13, 2019. The International Application was published in Japanese on Jun. 17, 2021, as International Publication No. WO 2021/117846 A1 under PCT Article 21 (2).

TECHNICAL FIELD

The present invention relates to a prophylactic and/or therapeutic agent for pulmonary hypertension comprising a novel heterocyclic derivative as an active ingredient.

BACKGROUND ART

With regard to pulmonary arterial hypertension (PAH), a large scale symposium on pulmonary hypertension is held every 5 years in the Western countries, and at the Dana Point Conference in 2008, pulmonary hypertension was defined as a mean value of the pulmonary arterial pressure (PAP) measured using a right heart catheter test at rest (mean PAP) being 25 mmHg or more, and this definition was continued at the Nice Conference in 2013. In the Dana Point classification, pulmonary hypertension is classified into five groups, that is, Group 1: PAH, Group 2: pulmonary hypertension caused by a left heart disease, Group 3: pulmonary hypertension caused by a pulmonary disease and/or hypoxemia, Group 4: chronic thromboembolic pulmonary hypertension (CTEPH) and Group 5: pulmonary hypertension caused by a multifactorial mechanism for which details are unknown. This basic structure has been maintained in the Revised Clinical Classification of Pulmonary Hypertension (Nice classification [2013]) (Non-patent Literature 1).

Furthermore, an updated definition of pulmonary hypertension was proposed at the 6th World Symposium on Pulmonary Hypertension (Nice Conference 2018). In that proposal, 24 mmHg≥mean pulmonary arterial pressure (mPAP)>20 mmHg is also defined to be included in the above pulmonary hypertension.

Platelet-Derived Growth Factors (PDGFs) can stimulate the migration of arterial smooth muscle cells from the inside of the artery to the intimal layer where muscle cells can proliferate. The cell proliferation induced by all isoforms of PDGFs is mediated by ligands that bind to the PDGF receptor.

The PDGF receptor belongs to the class III tyrosine kinase family and consists of two receptor subtypes, called type A (or type alpha) and type B (or type beta). Other members of the PDGF receptor family include the colony stimulating factor 1 receptor (CSF1R), KIT, and FLT3.

KIT is another receptor tyrosine kinase belonging to the PDGF receptor family and is usually expressed on hematopoietic progenitor cells, mast cells, and embryonic cells. The expression of KIT has been known to be involved in several cancers including mast cell leukemia, germ cell tumors, small cell lung carcinoma, gastrointestinal stromal tumor (GIST), acute myeloid leukemia (AMAL), neuroblastoma, melanoma, ovarian carcinoma, and breast carcinoma (Non-patent Literature 1).

Imatinib has an inhibitory action against the PDGF receptor kinase and exhibited effectiveness in a P3 study for pulmonary arterial hypertension. However, it was not well tolerated due to side effects such as bone marrow suppression and therefore did not reach approval.

Patent Literature 1 describes that a compound of a general formula [1] or a pharmaceutically acceptable salt thereof is an inhibitor of the PDGF receptor kinase or the PDGF receptor kinase and KIT.

However, up to now, the relationship between the myelosuppressive action and the inhibitory action against KIT, which is a receptor tyrosine kinase involved in bone marrow hematopoiesis, has not been known.

CITATION LIST

Patent Literature

PTL 8: WO 2013/033620

Non-Patent Literature

NPL 1: Smolich et al., Blood, 97, 1413-1421.

SUMMARY OF INVENTION

Technical Problem

The problem that the present invention seeks to solve is to provide a prophylactic and/or therapeutic agent for pulmonary arterial hypertension that has an excellent balance between effectiveness and safety.

Solution to Problem

The present inventors have found a relationship between the myelosuppressive action and the inhibitory action against KIT, which is a receptor tyrosine kinase involved in bone marrow hematopoiesis. That is, the present inventors have found that a compound represented by the following general formula [1] having a high inhibitory activity against the PDGF receptor kinase in the inhibitory activity against the KIT kinase, or a pharmaceutically acceptable salt thereof, or a solvate thereof (in the present specification, it may be referred to as a compound of the present invention) exhibits a suppression action against the proliferation of pulmonary arterial smooth muscle cells and also reduces the suppression action against the formation of erythroid colonies, thereby completing the present invention.

That is, disclosed herein are the following (Item 1) to (Item 8).
(Item 1)
A compound represented by the following formula [1]:

[Formula 1]

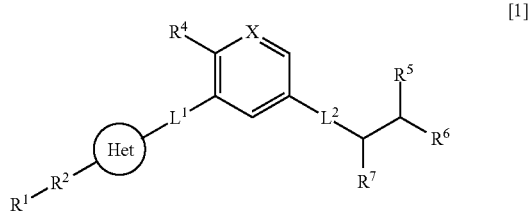

wherein
- $R^1$ is a hydrogen atom, a halogen atom, a $C_1$-$C_6$ alkyl, a $C_1$-$C_6$ haloalkyl, a $C_2$-$C_6$ alkenyl, a $C_2$-$C_6$ haloalkenyl, a $C_2$-$C_6$ alkynyl, a $C_2$-$C_6$ haloalkynyl, a $C_1$-$C_6$ alkoxy, hydroxy, carboxy, an alkylcarbonyloxy, amino, a monoalkylamino, a dialkylamino, an aminoalkyl, an alkylcarbonylamino, nitro, an optionally substituted $C_3$-$C_6$ cycloalkyl, an optionally substituted $C_3$-$C_6$ cycloalkenyl, an optionally substituted heterocycloalkyl, an optionally substituted aryl, or an optionally substituted heteroaryl;
- $R^2$ is a bonding hand, —$(CR^aR^b)_m$—$NR^c$—, —$NR^c$—$(CR^aR^b)_m$—, —$(CR^aR^b)_m$—O—, —O—$(CR^aR^b)_m$—, —$(CR^aR^b)_m$—, —$NR^c$—, —O—, —$NR^c$—CO—$NR^c$—, —$CR^a$=$CR^b$—, or —C≡C—, wherein
  - $R^a$ in $R^2$ is a hydrogen atom, a halogen atom, a $C_1$-$C_6$ alkyl, or a $C_1$-$C_6$ haloalkyl and
  - $R^b$ in $R^2$ is a hydrogen atom, a halogen atom, a $C_1$-$C_6$ alkyl, or a $C_1$-$C_6$ haloalkyl, or
  - $R^a$ and $R^b$ in $R^2$ are taken together with the carbon atom to which they are bonded to form C=O,
  - each $R^c$ in $R^2$ is independently a hydrogen atom, a $C_1$-$C_6$ alkyl, or a $C_1$-$C_6$ haloalkyl, and
  - m is an integer of 0 to 3;
- Het is a 5- to 10-membered heteroaryl;
- $L^1$ is a bonding hand, —$(CR^aR^b)_m$—$NR^c$—, —$NR^c$—$(CR^aR^b)_m$—, —$(CR^aR^b)_m$—O—, —O—$(CR^aR^b)_m$—r, —$(CR^aR^b)_m$—, —$NR^c$—, —O—, —$NR^c$—CO—$NR^c$—, —$CR^a$=$CR^b$—, or —C≡C—, wherein
  - $R^a$ in $L^1$ is a hydrogen atom, a halogen atom, a $C_1$-$C_6$ alkyl, or a $C_1$-$C_6$ haloalkyl and
  - $R^b$ in $L^1$ is a hydrogen atom, a halogen atom, a $C_1$-$C_6$ alkyl, or a $C_1$-$C_6$ haloalkyl, or
  - $R^a$ and $R^b$ in $L^1$ are taken together with the carbon atom to which they are bonded to form C=O,
  - each $R^c$ in $L^1$ is independently a hydrogen atom, a $C_1$-$C_6$ alkyl, or a $C_1$-$C_6$ haloalkyl, and
  - m in $L^1$ is an integer of 0 to 3;
- X is N or C—$R^3$, wherein
  - $R^3$ is a hydrogen atom, a halogen atom, a $C_1$-$C_6$ alkyl, or a $C_1$-$C_6$ haloalkyl;
- $R^4$ is a hydrogen atom, a halogen atom, or methyl;
- $L^2$ is a bonding hand, —$(CR^aR^b)_m$—$NR^c$—, —$NR^c$—$(CR^aR^b)_m$—, —$(CR^aR^b)_m$—O—, —O—$(CR^aR^b)_m$—, —$(CR^aR^b)_m$—, —$NR^c$—, —O—, —$NR^c$—CO—$NR^c$—, —$CR^a$=$CR^b$—, or —C≡C—, wherein
  - $R^a$ in $L^2$ is a hydrogen atom, a halogen atom, a $C_1$-$C_6$ alkyl, or a $C_1$-$C_6$ haloalkyl and
  - $R^b$ in $L^2$ is a hydrogen atom, a halogen atom, a $C_1$-$C_6$ alkyl, or a $C_1$-$C_6$ haloalkyl, or
  - $R^a$ and $R^b$ in $L^2$ are taken together with the carbon atom to which they are bonded to form C=O,
  - each $R^c$ in $L^2$ is independently a hydrogen atom, a $C_1$-$C_6$ alkyl, or a $C_1$-$C_6$ haloalkyl, and
  - m in $L^2$ is an integer of 0 to 3;
- $R^5$ is a hydrogen atom, a halogen atom, hydroxy, amino, a $C_1$-$C_6$ alkyl, a $C_1$-$C_6$ haloalkyl, a $C_1$-$C_6$ alkoxy, or a $C_1$-$C_6$ haloalkoxy; and
- $R^6$ is a hydrogen atom, a halogen atom, a $C_1$-$C_6$ alkyl, a $C_1$-$C_6$ haloalkyl, or an optionally substituted phenyl and
- $R^7$ is a hydrogen atom, a halogen atom, a $C_1$-$C_6$ alkyl, a $C_1$-$C_6$ haloalkyl, a hydroxyalkyl, an optionally substituted phenyl, or an optionally substituted $C_3$-$C_6$ cycloalkyl, or
- $R^6$ and $R^7$ are taken together with the carbon atoms to which they are bonded to form a $C_3$-$C_6$ cycloalkyl, an optionally substituted aryl, or an optionally substituted heteroaryl or a pharmaceutically acceptable salt thereof, or a solvate thereof.

(Item 2)

The compound according to Item 1, wherein:
- $R^1$ is a hydrogen atom, a halogen atom, a $C_1$-$C_6$ alkyl, a $C_2$-$C_6$ alkenyl, a $C_1$-$C_6$ alkoxy, amino, a monoalkylamino, a dialkylamino, an aminoalkyl, an alkylcarbonylamino, an optionally substituted $C_3$-$C_6$ cycloalkyl, an optionally substituted heterocycloalkyl, an optionally substituted aryl, or an optionally substituted heteroaryl;
- $R^2$ is a bonding hand, —$(CR^aR^b)_m$—$NR^c$—, —$(CR^aR^b)_m$O—, —$(CR^aR^b)_m$—, —$NR^c$—, —O—, —$NR^c$—CO—$NR^c$—, —$CR^a$=$CR^b$—, or —C≡C—;
- $L^1$ is a bonding hand, —$(CR^aR^b)_m$—$NR^c$—, —$NR^c$—$(CR^aR^b)_m$—, —$(CR^aR^b)_m$—O—, —O—$(CR^aR^b)_m$—, —$(CR^aR^b)_m$—, —$NR^c$—, —$CR^a$=$CR^b$—, or —C≡C—, wherein
  - $R^a$ in $L^1$ is a hydrogen atom, a halogen atom, or a $C_1$-$C_6$ alkyl and
  - $R^b$ in $L^1$ is a hydrogen atom, a halogen atom, or a $C_1$-$C_6$ alkyl, or
  - $R^a$ in $L^1$ and $R^b$ in $L^1$ are taken together with the carbon atom to which they are bonded to form C=O,
  - each $R^c$ in $L^1$ is independently a hydrogen atom, a $C_1$-$C_6$ alkyl, or a $C_1$-$C_6$ haloalkyl, and
  - m in $L^1$ is an integer of 0 to 2;
- X is N or C—$R^3$, wherein
  - $R^3$ is a hydrogen atom, a halogen atom, a $C_1$-$C_6$ alkyl, or a $C_1$-$C_6$ haloalkyl;
- $R^4$ is a hydrogen atom, a halogen atom, or methyl;
- $L^2$ is —$(CR^aR^b)_m$—$NR^c$— or —$NR^c$—CO—$NR^c$—, wherein
  - $R^a$ and $R^b$ in $L^2$ are taken together with the carbon atom to which they are bonded to form C=O,
  - each $R^c$ in $L^2$ is independently a hydrogen atom, and
  - m in $L^2$ is 1;
- $R^5$ is hydroxy; and
- $R^6$ is a hydrogen atom, a $C_1$-$C_6$ alkyl, or an optionally substituted phenyl and
- $R^7$ is a hydrogen atom, a $C_1$-$C_6$ alkyl, a hydroxyalkyl, or an optionally substituted phenyl, or
- $R^6$ and $R^7$ are taken together with the carbon atoms to which they are bonded to form a $C_3$-$C_6$ cycloalkyl or an optionally substituted aryl or a pharmaceutically acceptable salt thereof, or a solvate thereof.

(Item 3)

The compound according to Item 1, wherein:
- $R^1$ is a hydrogen atom, a $C_1$-$C_6$ alkoxy, amino, a monoalkylamino, an optionally substituted $C_3$-$C_6$ cycloalkyl, an optionally substituted heterocycloalkyl, an optionally substituted aryl, or an optionally substituted heteroaryl;
- $R^2$ is a bonding hand, —$(CR^aR^b)_m$—O—, —$(CR^aR^b)_m$—, or —$NR^c$—;
- $L^1$ is —$(CR^aR^b)_m$—$NR^c$—, —$NR^c$—$(CR^aR^b)_m$—, or —$CR^a$=$CR^b$—, wherein
  - $R^a$ in $L^1$ is a hydrogen atom or a halogen atom and
  - $R^b$ in $L^1$ is a hydrogen atom, or
  - $R^a$ and $R^b$ in $L^1$ are taken together with the carbon atom to which they are bonded to form C=O,
  - each $R^c$ in $L^1$ is independently a hydrogen atom, and
  - m in $L^1$ is 0 or 1;

X is N or C—R³, wherein
R³ is a hydrogen atom;
R⁴ is a halogen atom or methyl;
L² is —(CRᵃRᵇ)_m—NRᶜ—, wherein
Rᵃ and Rᵇ in L² are taken together with the carbon atom to which they are bonded to form C=O,
each Rᶜ in L² is independently a hydrogen atom, and m in L² is 1;
R⁵ is hydroxy; and
R⁶ and R⁷ are taken together with the carbon atoms to which they are bonded to form a C₃-C₆ cycloalkyl
or a pharmaceutically acceptable salt thereof, or a solvate thereof.

(Item 4)

The compound according to Item 1, selected from the group consisting of the following (1) to (207):

(1) 2-(cyclopropylamino)-N-(5-{[(1S,2S)-2-hydroxycyclohexyl]carbamoyl}-2-methylphenyl)-1,3-thiazole-5-carboxamide,
(2) N-(5-{[(1S,2S)-2-hydroxycyclohexyl]carbamoyl}-2-methylphenyl)-5-phenylpyridine-3-carboxamide,
(3) 2-(cyclopropylmethyl)-N-(5-{[(1S,2S)-2-hydroxycyclohexyl]carbamoyl}-2-methylphenyl)-1,3-thiazole-5-carboxamide,
(4) 5-(cyclopropylamino)-N-(5-{[(1S,2S)-2-hydroxycyclohexyl]carbamoyl}-2-methylphenyl)pyridine-3-carboxamide,
(5) N-(5-{[(1S,2S)-2-hydroxycyclohexyl]carbamoyl}-2-methylphenyl)-2-phenyl-1,3-oxazole-5-carboxamide,
(6) N-(5-{[(1S)-2-hydroxy-1-phenylethyl]carbamoyl}-2-methylphenyl)-5-phenylpyridine-3-carboxamide,
(7) N-(5-{[(1S,2S)-2-hydroxycyclohexyl]carbamoyl}-2-methylphenyl)-5-[(propan-2-yl)oxy]pyridine-3-carboxamide,
(8) 2-[(cyclopropylmethyl)amino]-N-(5-{[(1S,2S)-2-hydroxycyclohexyl]carbamoyl}-2-methylphenyl)-1,3-thiazole-5-carboxamide,
(9) 5-(4-chlorophenyl)-N-(5-{[(1S,2S)-2-hydroxycyclohexyl]carbamoyl}-2-methylphenyl)pyridine-3-carboxamide,
(10) N-(5-{[(1S,2S)-2-hydroxycyclohexyl]carbamoyl}-2-methylphenyl)-2-propyl-1,3-thiazole-5-carboxamide,
(11) 5-(3-chlorophenyl)-N-(5-{[(1S,2S)-2-hydroxycyclohexyl]carbamoyl}-2-methylphenyl)pyridine-3-carboxamide,
(12) N-(5-{[(1S,2S)-2-hydroxycyclohexyl]carbamoyl}-2-methylphenyl)-5-(2-methylphenyl)pyridine-3-carboxamide,
(13) 5-(2-chlorophenyl)-N-(5-{[(1S,2S)-2-hydroxycyclohexyl]carbamoyl}-2-methylphenyl)pyridine-3-carboxamide,
(14) N-(5-{[(2S)-1-hydroxypentan-2-yl]carbamoyl}-2-methylphenyl)-5-phenylpyridine-3-carboxamide,
(15) 5-[(E)-2-cyclopropylethenyl]-N-(5-{[(1S,2S)-2-hydroxycyclohexyl]carbamoyl}-2-methylphenyl)pyridine-3-carboxamide,
(16) 5-[(cyclopropylmethyl)amino]-N-(5-{[(1S,2S)-2-hydroxycyclohexyl]carbamoyl}-2-methylphenyl)pyridine-3-carboxamide,
(17) 5-[cyclopropyl(methyl)amino]-N-(5-{[(1S,2S)-2-hydroxycyclohexyl]carbamoyl}-2-methylphenyl)pyridine-3-carboxamide,
(18) N-(5-{[(1S,2S)-2-hydroxycyclohexyl]carbamoyl}-2-methylphenyl)-5-(4-methoxyphenyl)pyridine-3-carboxamide,
(19) 5-(4-fluorophenyl)-N-(5-{[(1S,2S)-2-hydroxycyclohexyl]carbamoyl}-2-methylphenyl)pyridine-3-carboxamide,
(20) 5-(3-fluorophenyl)-N-(5-{[(1S,2S)-2-hydroxycyclohexyl]carbamoyl}-2-methylphenyl)pyridine-3-carboxamide,
(21) N-(5-{[(1S,2S)-2-hydroxycyclohexyl]carbamoyl}-2-methylphenyl)-5-[4-(trifluoromethyl)phenyl]pyridine-3-carboxamide,
(22) N-(5-{[(1S,2S)-2-hydroxycyclohexyl]carbamoyl}-2-methylphenyl)-5-[3-(trifluoromethyl)phenyl]pyridine-3-carboxamide,
(23) N-(5-{[(1S,2S)-2-hydroxycyclohexyl]carbamoyl}-2-methylphenyl)-5-(2-methylprop-1-en-1-yl)pyridine-3-carboxamide,
(24) 5-(cyclopropylmethoxy)-N-(5-{[(1S,2S)-2-hydroxycyclohexyl]carbamoyl}-2-methylphenyl)pyridine-3-carboxamide,
(25) 2-[(3,3-difluorocyclobutyl)amino]-N-(5-{[(1S,2S)-2-hydroxycyclohexyl]carbamoyl}-2-methylphenyl)-1,3-thiazole-5-carboxamide,
(26) 2-[(2-cyclopropylethyl)amino]-N-(5-{[(1S,2S)-2-hydroxycyclohexyl]carbamoyl}-2-methylphenyl)-1,3-thiazole-5-carboxamide,
(27) N-(5-{[(1S,2S)-2-hydroxycyclohexyl]carbamoyl}-2-methylphenyl)-2-[(propan-2-yl)amino]-1,3-thiazole-5-carboxamide,
(28) 5-[(4,4-difluorocyclohexyl)oxy]-N-(5-{[(1S,2S)-2-hydroxycyclohexyl]carbamoyl}-2-methylphenyl)pyridine-3-carboxamide,
(29) 5-(2-fluorophenyl)-N-(5-{[(1S,2S)-2-hydroxycyclohexyl]carbamoyl}-2-methylphenyl)pyridine-3-carboxamide,
(30) 5-(2,3-difluorophenyl)-N-(5-{[(1S,2S)-2-hydroxycyclohexyl]carbamoyl}-2-methylphenyl)pyridine-3-carboxamide,
(31) 5-(2,4-difluorophenyl)-N-(5-{[(1S,2S)-2-hydroxycyclohexyl]carbamoyl}-2-methylphenyl)pyridine-3-carboxamide,
(32) 5-(3,5-difluorophenyl)-N-(5-{[(1S,2S)-2-hydroxycyclohexyl]carbamoyl}-2-methylphenyl)pyridine-3-carboxamide,
(33) 5-(2-fluoro-4-methoxyphenyl)-N-(5-{[(1S,2S)-2-hydroxycyclohexyl]carbamoyl}-2-methylphenyl)pyridine-3-carboxamide,
(34) N-(5-{[(1S,2S)-2-hydroxycyclohexyl]carbamoyl}-2-methylphenyl)-5-[3-(trifluoromethoxy)phenyl]pyridine-3-carboxamide,
(35) N-(5-{[(1S,2S)-2-hydroxycyclohexyl]carbamoyl}-2-methylphenyl)-5-[2-(trifluoromethoxy)phenyl]pyridine-3-carboxamide,
(36) 5-[2-fluoro-4-(trifluoromethyl)phenyl]-N-(5-{[(1S,2S)-2-hydroxycyclohexyl]carbamoyl}-2-methylphenyl)pyridine-3-carboxamide,
(37) 5-(2,6-difluorophenyl)-N-(5-{[(1S,2S)-2-hydroxycyclohexyl]carbamoyl}-2-methylphenyl)pyridine-3-carboxamide,
(38) 2-(tert-butylamino)-N-(5-{[(1S,2S)-2-hydroxycyclohexyl]carbamoyl}-2-methylphenyl)-1,3-thiazole-5-carboxamide,
(39) N-(5-{[(1S,2S)-2-hydroxycyclohexyl]carbamoyl}-2-methylphenyl)-2-[(1-methylcyclopropyl)amino]-1,3-thiazole-5-carboxamide,
(40) N-(5-{[(1S,2S)-2-hydroxycyclohexyl]carbamoyl}-2-methylphenyl)-2-[(1-methylcyclobutyl)amino]-1,3-thiazole-5-carboxamide,

(41) 2-[(2,2-dimethylpropyl)amino]-N-(5-{[(1S,2S)-2-hydroxycyclohexyl]carbamoyl}-2-methylphenyl)-1,3-thiazole-5-carboxamide,
(42) N-(5-{[(1S,2S)-2-hydroxycyclohexyl]carbamoyl}-2-methylphenyl)-5-(3,4,5-trifluorophenyl)pyridine-3-carboxamide,
(43) 5-(4-cyclopropylphenyl)-N-(5-{[(1S,2S)-2-hydroxycyclohexyl]carbamoyl}-2-methylphenyl)pyridine-3-carboxamide,
(44) N-(2-chloro-5-{[(1S,2S)-2-hydroxycyclohexyl]carbamoyl}phenyl)-5-(cyclopropylmethoxy)pyridine-3-carboxamide,
(45) N-(5-{[(1S,2S)-2-hydroxycyclohexyl]carbamoyl}-2-methylphenyl)imidazo[2,1-b][1,3]thiazole-5-carboxamide,
(46) 5-(cyclopropylmethoxy)-N-(3-fluoro-5-{[(1S,2S)-2-hydroxycyclohexyl]carbamoyl}-2-methylphenyl)pyridine-3-carboxamide,
(47) 5-[(3,3-difluorocyclobutyl)oxy]-N-(5-{[(1S,2S)-2-hydroxycyclohexyl]carbamoyl}-2-methylphenyl)pyridine-3-carboxamide,
(48) 2-(cyclopropylmethyl)-N-(3-fluoro-5-{[(1S,2S)-2-hydroxycyclohexyl]carbamoyl}-2-methylphenyl)-1,3-thiazole-5-carboxamide,
(49) N-(5-{[(1S,2S)-2-hydroxycyclohexyl]carbamoyl}-2-methylphenyl)-5-methoxypyridine-3-carboxamide,
(50) 5-ethoxy-N-(5-{[(1S,2S)-2-hydroxycyclohexyl]carbamoyl}-2-methylphenyl)pyridine-3-carboxamide,
(51) N-(5-{[(1S,2S)-2-hydroxycyclohexyl]carbamoyl}-2-methylphenyl)-5-[(pyridin-2-yl)oxy]pyridine-3-carboxamide,
(52) N-(5-{[(1S,2S)-2-hydroxycyclohexyl]carbamoyl}-2-methylphenyl)-5-[(pyrimidin-2-yl)oxy]pyridine-3-carboxamide,
(53) N-(5-{[(1S,2S)-2-hydroxycyclohexyl]carbamoyl}-2-methylphenyl)-5-[(1-methylcyclopropyl)methoxy]pyridine-3-carboxamide,
(54) 5-[(3,3-difluorocyclobutyl)methoxy]-N-(5-{[(1S,2S)-2-hydroxycyclohexyl]carbamoyl}-2-methylphenyl)pyridine-3-carboxamide,
(55) N-(2-chloro-5-{[(1S,2S)-2-hydroxycyclohexyl]carbamoyl}phenyl)-2-(cyclopropylmethyl)-1,3-thiazole-5-carboxamide,
(56) 5-(cyclopropylmethoxy)-N-(2-fluoro-5-{[(1S,2S)-2-hydroxycyclohexyl]carbamoyl}phenyl)pyridine-3-carboxamide,
(57) 3-[(5-bromopyridin-3-yl)ethynyl]-4-chloro-N-[(1S,2S)-2-hydroxycyclohexyl]benzamide,
(58) 4-chloro-N-[(1S,2S)-2-hydroxycyclohexyl]-3-[(5-phenylpyridin-3-yl)ethynyl]benzamide,
(59) N-[(1S,2S)-2-hydroxycyclohexyl]-4-methyl-3-[(5-methylpyridin-3-yl)ethynyl]benzamide,
(60) N-[(1S,2S)-2-hydroxycyclohexyl]-4-methyl-3-[(5-phenylpyridin-3-yl)ethynyl]benzamide,
(61) 3-[(5-bromopyridin-3-yl)ethynyl]-N-[(1S,2S)-2-hydroxycyclohexyl]-4-methylbenzamide,
(62) N-[(1S,2S)-2-hydroxycyclohexyl]-4-methyl-3-{[5-(pyrimidin-2-yl)pyridin-3-yl]ethynyl}benzamide,
(63) N-[(1S,2S)-2-hydroxycyclohexyl]-4-methyl-3-{[5-(pyrazin-2-yl)pyridin-3-yl]ethynyl}benzamide,
(64) 4-chloro-N-[(1S,2S)-2-hydroxycyclohexyl]-3-{[5-(pyrimidin-2-yl)pyridin-3-yl]ethynyl}benzamide,
(65) 3-[(6-aminopyridin-3-yl)ethynyl]-N-[(1S,2S)-2-hydroxycyclohexyl]-4-methylbenzamide,
(66) 3-[([2,3'-bipyridin]-5'-yl)ethynyl]-N-[(1S,2S)-2-hydroxycyclohexyl]-4-methylbenzamide,
(67) 3-[(5-cyclopropylpyridin-3-yl)ethynyl]-N-[(1S,2S)-2-hydroxycyclohexyl]-4-methylbenzamide,
(68) 3-[(6-cyclopropylpyrazin-2-yl)ethynyl]-N-[(1S,2S)-2-hydroxycyclohexyl]-4-methylbenzamide,
(69) 3-{[6-(2-fluorophenyl)pyrazin-2-yl]ethynyl}-N-[(1S,2S)-2-hydroxycyclohexyl]-4-methylbenzamide,
(70) 3-{[6-(3-fluorophenyl)pyrazin-2-yl]ethynyl}-N-[(1S,2S)-2-hydroxycyclohexyl]-4-methylbenzamide,
(71) 3-{[6-(4-fluorophenyl)pyrazin-2-yl]ethynyl}-N-[(1S,2S)-2-hydroxycyclohexyl]-4-methylbenzamide,
(72) 3-({6-[(cyclopropylmethyl)amino]pyrazin-2-yl}ethynyl)-N-[(1S,2S)-2-hydroxycyclohexyl]-4-methylbenzamide,
(73) 5-[(5-cyclopropylpyridin-3-yl)ethynyl]-N-[(1S,2S)-2-hydroxycyclohexyl]-6-methylpyridine-3-carboxamide,
(74) 3-[(6-bromopyrazin-2-yl)ethynyl]-N-[(1S,2S)-2-hydroxycyclohexyl]-4-methylbenzamide,
(75) N-[(1S,2S)-2-hydroxycyclohexyl]-4-methyl-3-[(6-phenylpyrazin-2-yl)ethynyl]benzamide,
(76) 3-[(5-bromopyridin-3-yl)ethynyl]-N-[(1S,2S)-1,3-dihydroxy-1-phenylpropan-2-yl]-4-methylbenzamide,
(77) N$^1$-[(1S,2S)-2-hydroxycyclohexyl]-4-methyl-N$^3$-(5-phenylpyridin-3-yl)benzene-1,3-dicarboxamide,
(78) N-[(1S,2S)-2-hydroxycyclohexyl]-4-methyl-3-{[2-(pyridin-3-yl)pyrimidin-4-yl]amino}benzamide,
(79) N-[(1S,2S)-2-hydroxycyclohexyl]-3-{[2-(isoquinolin-4-yl)pyrimidin-4-yl]amino}-4-methylbenzamide,
(80) N-[(1S,2S)-1,3-dihydroxy-1-phenylpropan-2-yl]-3-{[2-(isoquinolin-4-yl)pyrimidin-4-yl]amino}-4-methylbenzamide,
(81) 3-[([2,3'-bipyridin]-6-yl)amino]-5-fluoro-N-[(1S,2S)-2-hydroxycyclohexyl]-4-methylbenzamide,
(82) N-[(1S,2S)-2-hydroxycyclohexyl]-4-methyl-3-{[2-(methylamino)quinazolin-5-yl]amino}benzamide,
(83) 3-(2-amino-7,8-dihydropyrido[4,3-d]pyrimidin-6(5H)-yl)-N-[(1S,2S)-1,3-dihydroxy-1-phenylpropan-2-yl]-4-methylbenzamide,
(84) N-[(1S,2S)-2-hydroxycyclohexyl]-4-methyl-3-{[(1S)-1-(5-phenylpyridin-3-yl)ethyl]amino}benzamide,
(85) 3-{[(1S)-1-([3,3'-bipyridin]-5-yl)ethyl]amino}-N-[(1S,2S)-2-hydroxycyclohexyl]-4-methylbenzamide,
(86) N-[(1S,2S)-2-hydroxycyclohexyl]-4-methyl-3-({(1S)-1-[5-(phenylethynyl)pyridin-3-yl]ethyl}amino)benzamide,
(87) 3-{[(1S)-1-([3,4'-bipyridin]-5-yl)ethyl]amino}-N-[(1S,2S)-2-hydroxycyclohexyl]-4-methylbenzamide,
(88) N-[(1S,2S)-2-hydroxycyclohexyl]-4-methyl-3-({(1S)-1-[5-(pyrimidin-2-yl)pyridin-3-yl]ethyl}amino)benzamide,
(89) 3-{[(1S)-1-([2,3'-bipyridin]-5'-yl)ethyl]amino}-N-[(1S,2S)-2-hydroxycyclohexyl]-4-methylbenzamide,
(90) 3-{[(1S)-1-([3,3'-bipyridin]-5-yl)ethyl]amino}-4-chloro-N-[(1S,2S)-2-hydroxycyclohexyl]benzamide,
(91) 3-{[(5-bromopyridin-3-yl)methyl]amino}-N-[(1S,2S)-2-hydroxycyclohexyl]-4-methylbenzamide,
(92) N-[(1S,2S)-2-hydroxycyclohexyl]-4-methyl-3-{[(5-phenylpyridin-3-yl)methyl]amino}benzamide,
(93) 3-{[([3,3'-bipyridin]-5-yl)methyl]amino}-N-[(1S,2S)-2-hydroxycyclohexyl]-4-methylbenzamide,
(94) 3-({[5-(cyclopropylethynyl)pyridin-3-yl]methyl}amino)-N-[(1S,2S)-2-hydroxycyclohexyl]-4-methylbenzamide,
(95) N-[(1S,2S)-2-hydroxycyclohexyl]-4-methyl-3-({[5-(pyrimidin-2-yl)pyridin-3-yl]methyl}amino)benzamide,
(96) N-[(1S,2S)-2-hydroxycyclohexyl]-4-methyl-3-{[(quinolin-3-yl)methyl]amino}benzamide,

(97) N-[(1S,2S)-2-hydroxycyclohexyl]-3-[({5-[(1-hydroxy-cyclopropyl)ethynyl]pyridin-3-yl}methyl)amino]-4-methylbenzamide,
(98) 3-[({5-[4-(2-aminopropan-2-yl)phenyl]pyridin-3-yl}methyl)amino]-N-[(1S,2S)-2-hydroxycyclohexyl]-4-methylbenzamide,
(99) 3-({[5-(4-aminophenyl)pyridin-3-yl]methyl}amino)-N-[(1S,2S)-2-hydroxycyclohexyl]-4-methylbenzamide,
(100) 3-({[5-(3,5-difluorophenyl)pyridin-3-yl]methyl}amino)-N-[(1S,2S)-2-hydroxycyclohexyl]-4-methylbenzamide,
(101) N-[(1S,2S)-2-hydroxycyclohexyl]-4-methyl-3-{[(6-phenylpyrazin-2-yl)methyl]amino}benzamide,
(102) N-[(1S,2S)-2-hydroxycyclohexyl]-4-methyl-3-({[5-(thiophen-2-yl)pyridin-3-yl]methyl}amino)benzamide,
(103) N-[(1S,2S)-2-hydroxycyclohexyl]-4-methyl-3-({[5-(thiophen-3-yl)pyridin-3-yl]methyl}amino)benzamide,
(104) 4-chloro-N-[(1S,2S)-2-hydroxycyclohexyl]-3-({[5-(pyrimidin-2-yl)pyridin-3-yl]methyl}amino)benzamide,
(105) N-[(1S,2S)-2-hydroxycyclohexyl]-4-methyl-3-{[(pyrazolo[5,1-b][1,3]thiazol-7-yl)methyl]amino}benzamide,
(106) 3-fluoro-N-[(1S,2S)-2-hydroxycyclohexyl]-4-methyl-5-({[5-(pyrimidin-2-yl)pyridin-3-yl]methyl}amino)benzamide,
(107) 3-({[5-(5-fluoropyrimidin-2-yl)pyridin-3-yl]methyl}amino)-N-[(1S,2S)-2-hydroxycyclohexyl]-4-methylbenzamide,
(108) N-[(1S,2S)-2-hydroxycyclohexyl]-4-methyl-3-{[(thieno[3,2-b]pyridin-6-yl)methyl]amino}benzamide,
(109) N-[(1S,2S)-2-hydroxycyclohexyl]-4-methyl-3-{[(1H-pyrazolo[3,4-b]pyridin-5-yl)methyl]amino}benzamide,
(110) N-[(1S,2S)-2-hydroxycyclohexyl]-3-{[(imidazo[1,2-b]pyridazin-3-yl)methyl]amino}-4-methylbenzamide,
(111) N-[(1S,2S)-2-hydroxycyclohexyl]-3-({[5-(imidazo[1,2-a]pyrazin-6-yl)pyridin-3-yl]methyl}amino)-4-methylbenzamide,
(112) N-[(1S,2S)-2-hydroxycyclohexyl]-3-({[1-(pyridin-2-yl)-1H-pyrazol-4-yl]methyl}amino)benzamide,
(113) 3-{[(2-aminopyrimidin-5-yl)methyl]amino}-N-[(1S,2S)-2-hydroxycyclohexyl]-4-methylbenzamide,
(114) 3-({[2-(cyclopropylamino)pyrimidin-5-yl]methyl}amino)-N-[(1S,2S)-2-hydroxycyclohexyl]-4-methylbenzamide,
(115) N-[(1S,2S)-2-hydroxycyclohexyl]-4-methyl-3-({[5-(pyrazin-2-yl)pyridin-3-yl]methyl}amino)benzamide,
(116) 3-{[(6-acetamidopyridin-3-yl)methyl]amino}-N-[(1S,2S)-2-hydroxycyclohexyl]-4-methylbenzamide,
(117) 3-[({6-[(cyclopropylmethyl)amino]pyridin-3-yl}methyl)amino]-N-[(1S,2S)-2-hydroxycyclohexyl]-4-methylbenzamide,
(118) 3-{[([2,2'-bipyridin]-5-yl)methyl]amino}-N-[(1S,2S)-2-hydroxycyclohexyl]-4-methylbenzamide,
(119) N-[(1S,2S)-2-hydroxycyclohexyl]-4-methyl-3-{[(pyrazolo[1,5-a]pyrimidin-3-yl)methyl]amino}benzamide,
(120) 3-[({6-[(cyclopropanecarbonyl)amino]pyridin-3-yl}methyl)amino]-N-[(1S,2S)-2-hydroxycyclohexyl]-4-methylbenzamide,
(121) N-[(1S,2S)-2-hydroxycyclohexyl]-4-methyl-3-{[(2-phenylpyrimidin-5-yl)methyl]amino}benzamide,
(122) N-[(1S,2S)-2-hydroxycyclohexyl]-4-methyl-3-({[6-(1H-pyrazol-1-yl)pyridin-3-yl]methyl}amino)benzamide,
(123) N-[(1S,2S)-2-hydroxycyclohexyl]-6-methyl-5-{[(pyrazolo[1,5-a]pyridin-3-yl)methyl]amino}pyridine-3-carboxamide,
(124) methyl {5-[(5-{[(1S,2S)-2-hydroxycyclohexyl]carbamoyl}-2-methylanilino)methyl]pyridin-2-yl}carbamate,
(125) N-[(1S,2S)-2-hydroxycyclohexyl]-4-methyl-3-[({6-[(oxan-4-yl)amino]pyridin-3-yl}methyl)amino]benzamide,
(126) N-[(1S,2S)-2-hydroxycyclohexyl]-4-methyl-3-[({2-[(pyridin-2-yl)amino]pyrimidin-5-yl}methyl)amino]benzamide,
(127) N-{5-[(5-{[(1S,2S)-2-hydroxycyclohexyl]carbamoyl}-2-methylanilino)methyl]pyridin-2-yl}morpholine-4-carboxamide,
(128) N-[(1S,2S)-2-hydroxycyclohexyl]-3-({[2-(4-methoxyphenyl)pyrimidin-5-yl]methyl}amino)-4-methylbenzamide,
(129) N-[(1S,2S)-2-hydroxycyclohexyl]-4-methyl-3-{[(6-{[(pyridin-3-yl)carbamoyl]amino}pyridin-3-yl)methyl]amino}benzamide,
(130) 3-({[6-(cyclobutylamino)pyridin-3-yl]methyl}amino)-N-[(1S,2S)-2-hydroxycyclohexyl]-4-methylbenzamide
(131) 3-{[(5-aminopyrazin-2-yl)methyl]amino}-N-[(1S,2S)-2-hydroxycyclohexyl]-4-methylbenzamide,
(132) N-[(1S,2S)-2-hydroxycyclohexyl]-4-methyl-3-[({2-[(oxan-4-yl)amino]pyrimidin-5-yl}methyl)amino]benzamide,
(133) 3-{[(6-{[cyclopropyl(methyl)carbamoyl]amino}pyridin-3-yl)methyl]amino}-N-[(1S,2S)-2-hydroxycyclohexyl]-4-methylbenzamide,
(134) N-[(1S,2S)-2-hydroxycyclohexyl]-4-methyl-3-[({6-[(propan-2-yl)amino]pyridin-3-yl}methyl)amino]benzamide,
(135) N-[(1S,2S)-2-hydroxycyclohexyl]-4-methyl-3-{[(2-{[(3R)-oxolan-3-yl]amino}pyrimidin-5-yl)methyl]amino}benzamide,
(136) N-[(1S,2S)-2-hydroxycyclohexyl]-4-methyl-3-{[(2-{[(3S)-oxolan-3-yl]amino}pyrimidin-5-yl)methyl]amino}benzamide
(137) N-{5-[(5-{[(1S,2S)-2-hydroxycyclohexyl]carbamoyl}-2-methylanilino)methyl]pyridin-2-yl}oxane-4-carboxamide,
(138) N-[(1S,2S)-2-hydroxycyclohexyl]-3-{[(6-{[(1r,3r)-3-methoxycyclobutane-1-carbonyl]amino}pyridin-3-yl)methyl]amino}-4-methylbenzamide,
(139) N-{5-[(5-{[(1S,2S)-2-hydroxycyclohexyl]carbamoyl}-2-methylanilino)methyl]pyridin-2-yl}oxolane-3-carboxamide,
(140) N-[(1S,2S)-2-hydroxycyclohexyl]-4-methyl-3-({[6-(1H-1,2,3-triazol-1-yl)pyridin-3-yl]methyl}amino)benzamide,
(141) N-[(1S,2S)-2-hydroxycyclohexyl]-4-methyl-3-[({6-[(oxetan-3-yl)amino]pyridin-3-yl}methyl)amino]benzamide,
(142) 3-{[(2-aminopyrimidin-5-yl)methyl]amino}-4-chloro-N-[(1S,2S)-2-hydroxycyclohexyl]benzamide,
(143) 3-{[(2-aminopyrimidin-5-yl)methyl]amino}-5-fluoro-N-[(1S,2S)-2-hydroxycyclohexyl]-4-methylbenzamide,
(144) 3-{[(3,4-dihydro-2H-pyrido[3,2-b][1,4]oxazin-7-yl)methyl]amino}-N-[(1S,2S)-2-hydroxycyclohexyl]-4-methylbenzamide,
(145) N-[(1S,2S)-2-hydroxycyclohexyl]-4-methyl-3-({[5-(2H-1,2,3-triazol-2-yl)pyridin-3-yl]methyl}amino)benzamide,
(146) 3-{[([3,3'-bipyridin]-5-yl)amino]methyl}-N-[(1S,2S)-2-hydroxycyclohexyl]-4-methylbenzamide,
(147) N-[(1S,2S)-2-hydroxycyclohexyl]-4-methyl-3-({[5-(pyrimidin-2-yl)pyridin-3-yl]amino}methyl)benzamide, (148) 3-{[([2,3'-bipyridin]-5'-yl)amino]methyl}-N-[(1S,2S)-2-hydroxycyclohexyl]-4-methylbenzamide,
(149) N-[(1R,2R)-2-hydroxycyclohexyl]-4-methyl-3-({[5-(pyrimidin-2-yl)pyridin-3-yl]amino}methyl)benzamide,
(150) N-[(1S,2S)-2-hydroxycyclohexyl]-3-({[5-(pyrimidin-2-yl)pyridin-3-yl]amino}methyl)benzamide,
(151) 4-fluoro-N-[(1S,2S)-2-hydroxycyclohexyl]-3-({[5-(pyrimidin-2-yl)pyridin-3-yl]amino}methyl)benzamide,
(152) 3-{[(5-bromopyridin-3-yl)amino]methyl}-N-[(1S,2S)-1,3-dihydroxy-1-phenylpropan-2-yl]-4-methylbenzamide,
(153) N-[(1S,2S)-1,3-dihydroxy-1-phenylpropan-2-yl]-4-methyl-3-{[(5-phenylpyridin-3-yl)amino]methyl}benzamide,
(154) 3-{[(5-cyclopropylpyridin-3-yl)amino]methyl}-N-[(1S,2S)-1,3-dihydroxy-1-phenylpropan-2-yl]-4-methylbenzamide,
(155) 3-{[([2,3'-bipyridin]-5'-yl)amino]methyl}-N-[(1S,2S)-1,3-dihydroxy-1-phenylpropan-2-yl]-4-methylbenzamide,
(156) N-[(1S,2S)-1,3-dihydroxy-1-phenylpropan-2-yl]-4-methyl-3-{[(6-phenylpyrazin-2-yl)amino]methyl}benzamide,
(157) 5-({[5-(cyclopropylethynyl)pyridin-3-yl]amino}methyl)-N-[(1S,2S)-2-hydroxycyclohexyl]-6-methylpyridine-3-carboxamide,
(158) N-[3-({[6-(3,4-dimethoxyphenyl)pyrazin-2-yl]amino}methyl)phenyl]-N'-[(1R,2S)-2-hydroxycyclohexyl]urea,
(159) N-[(1R,2S)-2-hydroxycyclohexyl]-N'-[3-({[5-(pyrimidin-2-yl)pyridin-3-yl]amino}methyl)phenyl]urea,
(160) N-[2-fluoro-5-({[5-(pyrimidin-2-yl)pyridin-3-yl]amino}methyl)phenyl]-N'-[(1R,2S)-2-hydroxycyclohexyl]urea,
(161) N-[4-fluoro-3-({[5-(pyrimidin-2-yl)pyridin-3-yl]amino}methyl)phenyl]-N'-[(1R,2S)-2-hydroxycyclohexyl]urea,
(162) N-[(1R,2S)-2-hydroxycyclohexyl]-N'-[4-methyl-3-({[5-(pyrimidin-2-yl)pyridin-3-yl]amino}methyl)phenyl]urea,
(163) N-[(1R,2S)-2-hydroxycyclohexyl]-N'-[2-methyl-5-({[5-(pyrimidin-2-yl)pyridin-3-yl]amino}methyl)phenyl]urea,
(164) N-[(1S,2S)-2-hydroxycyclohexyl]-4-methyl-3-{1-[(6-phenylpyrazin-2-yl)amino]ethyl}benzamide,
(165) 3-[([3,3'-bipyridin]-5-yl)methoxy]-N-[(1S,2S)-2-hydroxycyclohexyl]-4-methylbenzamide,
(166) N-[(1S,2S)-2-hydroxycyclohexyl]-4-methyl-3-{[5-(pyrimidin-2-yl)pyridin-3-yl]methoxy}benzamide,
(167) 4-chloro-N-[(1S,2S)-2-hydroxycyclohexyl]-3-{[5-(pyrimidin-2-yl)pyridin-3-yl]methoxy}benzamide,
(168) 3-{[([3,3'-bipyridin]-5-yl)oxy]methyl}-N-[(1S,2S)-2-hydroxycyclohexyl]-4-methylbenzamide,
(169) N-[(1S,2S)-2-hydroxycyclohexyl]-4-methyl-3-({[5-(pyrimidin-2-yl)pyridin-3-yl]oxy}methyl)benzamide,
(170) 4-chloro-N-[(1S,2S)-2-hydroxycyclohexyl]-3-({[5-(pyrimidin-2-yl)pyridin-3-yl]oxy}methyl)benzamide,
(171) N-[(1S,2S)-2-hydroxycyclohexyl]-4-methyl-3-{1-[5-(pyrimidin-2-yl)pyridin-3-yl]ethoxy}benzamide,
(172) N-[(1S,2S)-2-hydroxycyclohexyl]-4-methyl-3-[1-(5-phenylpyridin-3-yl)ethoxy]benzamide,
(173) N-[(1S,2S)-2-hydroxycyclohexyl]-4-methyl-3-[(E)-2-(5-phenylpyridin-3-yl)ethenyl]benzamide,
(174) N-[(1S,2S)-2-hydroxycyclohexyl]-4-methyl-3-[2-(5-phenylpyridin-3-yl)ethyl]benzamide,
(175) N-[(1S,2S)-2-hydroxycyclohexyl]-4-methyl-3-{[methyl(5-phenylpyridin-3-yl)amino]methyl}benzamide,
(176) 3-{[ethyl(5-phenylpyridin-3-yl)amino]methyl}-N-[(1S,2S)-2-hydroxycyclohexyl]-4-methylbenzamide,
(177) 3-[(Z)-2-([2,3'-bipyridin]-5'-yl)-2-fluoroethenyl]-4-fluoro-N-[(1S,2S)-2-hydroxycyclohexyl]benzamide,
(178) 4-fluoro-3-{(Z)-2-fluoro-2-[5-(pyrimidin-2-yl)pyridin-3-yl]ethenyl}-N-[(1S,2S)-2-hydroxycyclohexyl]benzamide,
(179) 3-[(Z)-2-fluoro-2-(imidazo[1,2-b]pyridazin-3-yl)ethenyl]-N-[(1S,2S)-2-hydroxycyclohexyl]-4-methylbenzamide,
(180) 5-[(Z)-2-([2,3'-bipyridin]-5'-yl)-2-fluoroethenyl]-N-[(1S,2S)-2-hydroxycyclohexyl]-6-methylpyridine-3-carboxamide,
(181) 3-[(Z)-2-fluoro-2-{5-[(4-methylpiperazin-1-yl)methyl]pyridin-3-yl}ethenyl]-N-[(1S,2S)-2-hydroxycyclohexyl]-4-methylbenzamide,
(182) 3-[(Z)-2-fluoro-2-{5-[(morpholin-4-yl)methyl]pyridin-3-yl}ethenyl]-N-[(1S,2S)-2-hydroxycyclohexyl]-4-methylbenzamide,
(183) 3-[(Z)-2-{6-[(cyclopropylmethyl)amino]pyridin-3-yl}-2-fluoroethenyl]-N-[(1S,2S)-2-hydroxycyclohexyl]-4-methylbenzamide,
(184) 4-fluoro-3-{(Z)-2-fluoro-2-[5-(morpholin-4-yl)pyridin-3-yl]ethenyl}-N-[(1S,2S)-2-hydroxycyclohexyl]benzamide,
(185) 4-fluoro-3-[(Z)-2-fluoro-2-{5-[(oxan-4-yl)amino]pyridin-3-yl}ethenyl]-N-[(1S,2S)-2-hydroxycyclohexyl]benzamide,
(186) 4-fluoro-3-[(Z)-2-fluoro-2-{5-[(4-methylpiperazin-1-yl)methyl]pyridin-3-yl}ethenyl]-N-[(1S,2S)-2-hydroxycyclohexyl]benzamide,
(187) 5-{(Z)-2-[5-(cyclopropylmethoxy)pyridin-3-yl]-2-fluoroethenyl}-N-[(1S,2S)-2-hydroxycyclohexyl]-6-methylpyridine-3-carboxamide,
(188) 5-{(Z)-2-fluoro-2-[5-(morpholin-4-yl)pyridin-3-yl]ethenyl}-N-[(1S,2S)-2-hydroxycyclohexyl]-6-methylpyridine-3-carboxamide,
(189) 5-[(Z)-2-(6-aminopyridin-3-yl)-2-fluoroethenyl]-N-[(1S,2S)-2-hydroxycyclohexyl]-6-methylpyridine-3-carboxamide,
(190) 5-[(Z)-2-(2-aminopyrimidin-5-yl)-2-fluoroethenyl]-N-[(1S,2S)-2-hydroxycyclohexyl]-6-methylpyridine-3-carboxamide,
(191) 3-[(Z)-2-(6-aminopyridin-3-yl)-2-fluoroethenyl]-4-fluoro-N-[(1S,2S)-2-hydroxycyclohexyl]benzamide,
(192) 3-[(Z)-2-(2-aminopyrimidin-5-yl)-2-fluoroethenyl]-4-fluoro-N-[(1S,2S)-2-hydroxycyclohexyl]benzamide,
(193) 3-[(Z)-2-fluoro-2-{5-[(1-methylpiperidin-4-yl)amino]pyridin-3-yl}ethenyl]-N-[(1S,2S)-2-hydroxycyclohexyl]-4-methylbenzamide,
(194) 3-[(Z)-2-{5-[(4-ethylpiperazin-1-yl)methyl]pyridin-3-yl}-2-fluoroethenyl]-N-[(1S,2S)-2-hydroxycyclohexyl]-4-methylbenzamide,
(195) 5-[(Z)-2-fluoro-2-{5-[(oxetan-3-yl)amino]pyridin-3-yl}ethenyl]-N-[(1S,2S)-2-hydroxycyclohexyl]-6-methylpyridine-3-carboxamide,
(196) 4-fluoro-3-[(Z)-2-fluoro-2-{5-[(oxetan-3-yl)amino]pyridin-3-yl}ethenyl]-N-[(1S,2S)-2-hydroxycyclohexyl]benzamide,
(197) 3-[(Z)-2-(6-{[2-(dimethylamino)ethyl]amino}pyridin-3-yl)-2-fluoroethenyl]-N-[(1S,2S)-2-hydroxycyclohexyl]-4-methylbenzamide,
(198) 3-[(Z)-2-(5-{[2-(dimethylamino)ethyl]amino}pyridin-3-yl)-2-fluoroethenyl]-N-[(1S,2S)-2-hydroxycyclohexyl]-4-methylbenzamide, (199) 5-[(Z)-2-{6-[(cyclopropylmethyl)amino]pyridin-3-yl}-2-fluoroethenyl]-N-[(1S,2S)-2-hydroxycyclohexyl]-6-methylpyridine-3-carboxamide,
(200) 3-[(Z)-2-fluoro-2-{5-[(4-methylpiperazin-1-yl)methyl]pyridin-3-yl}ethenyl]-N-[(1S,2S)-2-hydroxy-2,3-dihydro-1H-inden-1-yl]-4-methylbenzamide,
(201) 3-[(Z)-2-fluoro-2-{5-[(4-methylpiperazin-1-yl)methyl]pyridin-3-yl}ethenyl]-N-(2-hydroxy-3,3-dimethylbutyl)-4-methylbenzamide,
(202) 3-[(Z)-2-{2-[(cyclopropylmethyl)amino]pyrimidin-5-yl}-2-fluoroethenyl]-4-fluoro-N-[(1S,2S)-2-hydroxycyclohexyl]benzamide,
(203) 3-{(Z)-2-[2-(cyclopropylamino)pyrimidin-5-yl]-2-fluoroethenyl}-4-fluoro-N-[(1S,2S)-2-hydroxycyclohexyl]benzamide,
(204) 3-[(Z)-2-(2-amino-4-methylpyrimidin-5-yl)-2-fluoroethenyl]-4-fluoro-N-[(1S,2S)-2-hydroxycyclohexyl]benzamide,
(205) 4-fluoro-3-{(Z)-2-fluoro-2-[2-(methylamino)pyrimidin-5-yl]ethenyl}-N-[(1S,2S)-2-hydroxycyclohexyl]benzamide,
(206) 3-[(Z)-2-(5-aminopyrazin-2-yl)-2-fluoroethenyl]-N-[(1S,2S)-2-hydroxycyclohexyl]-4-methylbenzamide, and
(207) 4-fluoro-3-[(Z)-2-fluoro-2-(5-fluoropyridin-3-yl)ethenyl]-N-[(1S,2S)-2-hydroxycyclohexyl]benzamide or a pharmaceutically acceptable salt thereof, or a solvate thereof.

(Item 5)
The compound according to Item 1, selected from the group consisting of the following (1) to (15):
(1) 2-(cyclopropylmethyl)-N-(5-{[(1S,2S)-2-hydroxycyclohexyl]carbamoyl}-2-methylphenyl)-1,3-thiazole-5-carboxamide,
(2) 5-[cyclopropyl(methyl)amino]-N-(5-{[(1S,2S)-2-hydroxycyclohexyl]carbamoyl}-2-methylphenyl)pyridine-3-carboxamide,
(3) 5-(3-fluorophenyl)-N-(5-{[(1S,2S)-2-hydroxycyclohexyl]carbamoyl}-2-methylphenyl)pyridine-3-carboxamide,
(4) 5-(cyclopropylmethoxy)-N-(5-{[(1S,2S)-2-hydroxycyclohexyl]carbamoyl}-2-methylphenyl)pyridine-3-carboxamide,
(5) 5-ethoxy-N-(5-{[(1S,2S)-2-hydroxycyclohexyl]carbamoyl}-2-methylphenyl)pyridine-3-carboxamide,
(6) 3-{[(2-aminopyrimidin-5-yl)methyl]amino}-N-[(1S,2S)-2-hydroxycyclohexyl]-4-methylbenzamide,
(7) N-[(1S,2S)-2-hydroxycyclohexyl]-4-methyl-3-{[(pyrazolo[1,5-a]pyrimidin-3-yl)methyl]amino}benzamide,
(8) N-[(1S,2S)-2-hydroxycyclohexyl]-4-methyl-3-[({2-[(oxan-4-yl)amino]pyrimidin-5-yl}methyl)amino]benzamide,
(9) N-[(1S,2S)-2-hydroxycyclohexyl]-4-methyl-3-({[6-(1H-1,2,3-triazol-1-yl)pyridin-3-yl]methyl}amino)benzamide,
(10) 3-{[([2,3'-bipyridin]-5'-yl)amino]methyl}-N-[(1S,2S)-2-hydroxycyclohexyl]-4-methylbenzamide,
(11) 5-[(Z)-2-(6-aminopyridin-3-yl)-2-fluoroethenyl]-N-[(1S,2S)-2-hydroxycyclohexyl]-6-methylpyridine-3-carboxamide,
(12) 3-[(Z)-2-{5-[(4-ethylpiperazin-1-yl)methyl]pyridin-3-yl}-2-fluoroethenyl]-N-[(1S,2S)-2-hydroxycyclohexyl]-4-methylbenzamide,
(13) 4-fluoro-3-{(Z)-2-fluoro-2-[2-(methylamino)pyrimidin-5-yl]ethenyl}-N-[(1S,2S)-2-hydroxycyclohexyl]benzamide,
(14) 3-[(Z)-2-(5-aminopyrazin-2-yl)-2-fluoroethenyl]-N-[(1S,2S)-2-hydroxycyclohexyl]-4-methylbenzamide, and
(15) 4-fluoro-3-[(Z)-2-fluoro-2-(5-fluoropyridin-3-yl)ethenyl]-N-[(1S,2S)-2-hydroxycyclohexyl]benzamide
or a pharmaceutically acceptable salt thereof, or a solvate thereof.

(Item 6)
A pharmaceutical composition comprising the compound according to any one of Items 1 to 5 or a pharmaceutically acceptable salt thereof, or a solvate thereof, as an active ingredient.

(Item 7)
A PDGF receptor kinase inhibitor comprising the compound according to any one of Items 1 to 5 or a pharmaceutically acceptable salt thereof, or a solvate thereof, as an active ingredient.

(Item 8)
A therapeutic agent for pulmonary hypertension, scleroderma, asthma, bronchiolitis obliterans, pulmonary fibrosis, acute myelogenous leukemia (AML), hypereosinophilic syndrome, T-lymphoblastic leukemia, chronic myelomonocytic leukemia (CMML), chronic myelogenous leukemia (CML), chronic eosinophilic leukemia, dermatofibrosarcoma protuberans, glioma, ovarian cancer, vascular restenosis, atherosclerosis/arteriosclerosis obliterans, moyamoya disease (idiopathic occlusion of the circle of Willis), leiomyoma, lymphangioleiomyomatosis, or age-related macular degeneration (AMD), in which a PDGF receptor kinase is involved, the therapeutic agent comprising the compound according to any one of Items 1 to 5 or a pharmaceutically acceptable salt thereof, or a solvate thereof, as an active ingredient.

Advantageous Effects of Invention

Since the compound of the present invention inhibits the PDGF receptor kinase, it is useful as a therapeutic agent for diseases in which the PDGF receptor kinase is involved (for example, respiratory diseases, cancers, smooth muscle proliferative diseases, vasoproliferative diseases, autoimmune/inflammatory diseases, metabolic diseases, vasoocclusive diseases, and the like).

DESCRIPTION OF EMBODIMENTS

Hereinafter, the meaning of each term used in the present specification will be described. Each term is used in the same sense, whether used alone or used in combination with other terms, unless otherwise noted.

The term "halogen atom" refers to a fluorine atom, a chlorine atom, a bromine atom, or an iodine atom.

Examples of "alkyl" may include, for example, a straight or branched alkyl having 1 to 6 carbon atoms, preferably 1 to 4 carbon atoms, and more preferably 1 to 3 carbon atoms. Specific examples thereof may include methyl, ethyl, n-propyl, isopropyl, n-butyl, isobutyl, sec-butyl, tert-butyl, n-pentyl, sec-pentyl, 1-ethylpropyl, 1,2-dimethylpropyl, tert-pentyl, 2-methylbutyl, isopentyl, neopentyl, n-hexyl, sec-hexyl, 1-ethylbutyl, isohexyl, neohexyl, 1,1-dimethylbutyl, 2-ethylbutyl, 1,2,2-trimethylpropyl, 2,2-dimethylbutyl, and the like.

As the alkyl moiety in "monoalkylamino", "alkylcarbonyloxy", "monoalkylamino", "dialkylamino", "alkylcarbonylamino", "alkylsulfonyl", "aminoalkyl", and "alkylcarbonyl", mention may be made of the same "alkyl" as described above.

The term "alkenyl" refers to a straight or branched hydrocarbon group having one or more double bonds at an arbitrary position and having 2 to 10 carbon atoms, preferably 2 to 8 carbon atoms, more preferably 2 to 6 carbon atoms, and further preferably 2 to 4 carbon atoms. Specific examples thereof may include vinyl, allyl, 2-methylpropenyl, propenyl, isopropenyl, butenyl, isobutenyl, prenyl, butadienyl, pentenyl, isopentenyl, pentadienyl, hexenyl, isohexenyl, hexadienyl, and the like.

The term "amino" refers to —NH$_2$.

The term "aminoalkyl" refers to a group in which a hydrogen atom bonded to a carbon atom in the "alkyl" described above is substituted with an amino group. Specific examples thereof may include, for example, aminomethyl, 1-aminoethyl, 2-aminoethyl, 1-aminopropyl, 2-aminopropyl, 2-aminopropan-2-yl, 3-aminopropyl, and the like.

The term "monoalkylamino" refers to a group in which one hydrogen atom bonded to the nitrogen atom in an amino group is substituted with the "alkyl" described above. Specific examples may include methylamino, ethylamino, isopropylamino, and the like.

The term "hydroxyalkyl" refers to a group in which a hydrogen atom bonded to a carbon atom in the "alkyl" described above is substituted with a hydroxy group. Specific examples thereof may include, for example, hydroxymethyl, 1-hydroxyethyl, 2-hydroxyethyl, 1-hydroxypropyl, 2-hydroxypropyl, and the like.

The term "alkylcarbonyl" refers to a group in which the "alkyl" described above is bonded to a carbonyl group. Examples thereof may include, for example, methylcarbonyl, ethylcarbonyl, propylcarbonyl, isopropylcarbonyl, tert-butylcarbonyl, isobutylcarbonyl, sec-butylcarbonyl, pentylcarbonyl, isopentylcarbonyl, hexylcarbonyl, and the like.

The term "haloalkyl" refers to a group in which a hydrogen atom in the "alkyl" described above is substituted with the "halogen atom" described above. Specific examples thereof may include, for example, fluoromethyl, chloromethyl, fluoroethyl, difluoromethyl, dichloromethyl, difluoroethyl, trifluoromethyl, trichloromethyl, trifluoroethyl, and the like.

The term "alkoxy" refers to a group in which the "alkyl" described above is bonded to an oxygen atom. Examples thereof may include, for example, a straight or branched alkoxy having 1 to 6 carbon atoms, preferably 1 to 4 carbon atoms. Specific examples thereof may include, for example, methoxy, ethoxy, n-propoxy, isopropoxy, n-butoxy, isobutoxy, sec-butoxy, tert-butoxy, n-pentyloxy, n-hexyloxy, and the like.

As the alkoxy moiety in "haloalkoxy", mention may be made of the same "alkoxy" as described above.

Examples of "aryl" may include, for example, a monocyclic to tricyclic, aromatic hydrocarbon group having 6 to 14 carbon atoms. Specific examples thereof may include phenyl, 1-naphthyl, 2-naphthyl, 1-anthryl, 2-anthryl, 9-anthryl, 1-phenanthryl, 2-phenanthryl, 3-phenanthryl, 4-phenanthryl, 10-phenanthryl, and the like. Among the above, phenyl is preferable.

Examples of "cycloalkyl" may include a monocyclic to tricyclic, cyclic non-aromatic hydrocarbon group. Specific examples thereof include cyclopropyl, cyclobutyl, cyclopentyl, cyclohexyl, cycloheptyl, and cyclooctyl.

The "non-aromatic carbocyclic group" described above may be a bridged hydrocarbon group. Examples of such a bridged hydrocarbon group may include, for example, the following:

bicyclo[2.2.1]heptanyl (for example, bicyclo[2.2.1]heptan-1-yl, bicyclo[2.2.1]heptan-2-yl, and bicyclo[2.2.1]heptan-7-yl);
bicyclo[1.1.1]pentanyl (for example, bicyclo[1.1.1]pentan-1-yl and bicyclo[1.1.1]pentan-2-yl);
bicyclo[4.1.0]heptanyl (for example, bicyclo[4.1.0]heptan-1-yl, bicyclo[4.1.0]heptan-2-yl, bicyclo[4.1.0]heptan-3-yl, and bicyclo[4.1.0]heptan-7-yl);
bicyclo[2.2.2]octanyl (for example, bicyclo[2.2.2]octan-1-yl and bicyclo[2.2.2]octan-2-yl);
bicyclo[3.1.1]heptanyl (for example, bicyclo[3.1.1]heptan-1-yl, bicyclo[3.1.1]heptan-2-yl, bicyclo[3.1.1]heptan-3-yl, and bicyclo[3.1.1]heptan-6-yl); and
cuban-1-yl.

The "non-aromatic carbocyclic group" described above may be a spirocyclic group. Examples of such a spirocyclic group may include, for example, the following:

spiro[3.3]heptanyl (for example, spiro[3.3]heptan-1-yl and spiro[3.3]heptan-2-yl);
spiro[4.4]nonanyl (for example, spiro[4.4]nonan-1-yl and spiro[4.4]nonan-2-yl);
spiro[5.5]undecanyl (for example, spiro[5.5]undecan-1-yl, spiro[5.5]undecan-2-yl, and spiro[5.5]undecan-3-yl); and
spiro[2.5]octanyl (for example, spiro[2.5]octan-1-yl, spiro[2.5]octan-4-yl, spiro[2.5]octan-5-yl, and spiro[2.5]octan-6-yl).

Examples of "heteroaryl" may include, for example, a monocyclic to tricyclic aromatic ring having 6 to 14 carbon atoms and having 1 to 3 heteroatoms selected from the group consisting of a nitrogen atom, an oxygen atom, and a sulfur atom as the constituent atoms. Specific examples thereof may include, for example, the following:

furyl (for example, 2-furyl and 3-furyl);
thienyl (for example, 2-thienyl and 3-thienyl);
pyrrolyl (for example, 1-pyrrolyl, 2-pyrrolyl, and 3-pyrrolyl);
imidazolyl (for example, 1-imidazolyl, 2-imidazolyl, and 4-imidazolyl);
pyrazolyl (for example, 1-pyrazolyl, 3-pyrazolyl, and 4-pyrazolyl);
triazolyl (for example, 1,2,4-triazol-1-yl, 1,2,4-triazol-3-yl, and 1,2,4-triazol-4-yl);
tetrazolyl (for example, 1-tetrazolyl, 2-tetrazolyl, and 5-tetrazolyl);
oxazolyl (for example, 2-oxazolyl, 4-oxazolyl, and 5-oxazolyl);
isoxazolyl (for example, 3-isoxazolyl, 4-isoxazolyl, and 5-isoxazolyl);
oxadiazolyl (for example, 1,3,4-oxadiazol-2-yl);
thiazolyl (for example, 2-thiazolyl, 4-thiazolyl, and 5-thiazolyl);
thiadiazolyl (for example, 1,3,4-thiadiazolyl, 1,2,4-thiadiazolyl, and 1,2,3-thiadiazolyl);
isothiazolyl (for example, 3-isothiazolyl, 4-isothiazolyl, and 5-isothiazolyl);
pyridyl (for example, 2-pyridyl, 3-pyridyl, and 4-pyridyl);
pyridazinyl (for example, 3-pyridazinyl, and 4-pyridazinyl);
pyrimidinyl (for example, 2-pyrimidinyl, 4-pyrimidinyl, and 5-pyrimidinyl);
pyrazinyl (for example, 2-pyrazinyl);
benzothiadiazolyl (for example, 1,2,3-benzothiadiazol-4-yl, 1,2,3-benzothiadiazol-5-yl, 2,1,3-benzothiadiazol-4-yl, and 2,1,3-benzothiadiazol-5-yl);
benzothiazolyl (for example, benzothiazol-2-yl, benzothiazol-4-yl, benzothiazol-5-yl, benzothiazol-6-yl, and benzothiazol-7-yl);
indolyl (for example, indol-3-yl, indol-4-yl, indol-5-yl, indol-6-yl, and indol-7-yl);

benzothiophenyl (for example, 1-benzothiophen-2-yl, 1-benzothiophen-3-yl, 1-benzothiophen-4-yl, 1-benzothiophen-5-yl, 1-benzothiophen-6-yl, and 1-benzothiophen-7-yl);

1,1-dioxo-1-benzothiophenyl (for example, 1,1-dioxo-1-benzothiophen-2-yl, 1,1-dioxo-1-benzothiophen-3-yl, 1,1-dioxo-1-benzothiophen-4-yl, 1,1-dioxo-1-benzothiophen-5-yl, 1,1-dioxo-1-benzothiophen-6-yl, and 1,1-dioxo-1-benzothiophen-7-yl);

quinolyl (quinolin-2-yl, quinolin-3-yl, quinolin-4-yl, quinolin-5-yl, quinolin-6-yl, quinolin-7-yl, and quinolin-8-yl); and 1,3-benzoxazol-2-yl.

Examples of "heterocycloalkyl" may include a cyclic non-aromatic heterocyclic group having one ring or two or more rings and having one or more heteroatoms selected from a nitrogen atom, an oxygen atom, and a sulfur atom in the ring, which may be the same as or different from each other. Specific examples thereof may include, for example, the following:

oxetanyl (for example, 2-oxetanyl and 3-oxetanyl);

azetidinyl (for example, 2-azetidinyl and 3-azetidinyl);

tetrahydropyranyl (for example, 2-tetrahydropyranyl, 3-tetrahydropyranyl, and 4-tetrahydropyranyl);

1,4-dioxanyl (for example, 1,4-dioxan-2-yl);

1,3-dioxanyl (for example, 1,3-dioxan-2-yl, 1,3-dioxan-4-yl, and 1,3-dioxan-5-yl);

pyrrolidinyl (for example, 1-pyrrolidinyl, 2-pyrrolidinyl, and 3-pyrrolidinyl);

piperidinyl (for example, 1-piperidinyl, 2-piperidinyl, 3-piperidinyl, and 4-piperidinyl);

piperazinyl (for example, 1-piperazinyl, 2-piperazinyl, and 3-piperazinyl);

azepanyl (for example, 1-azepanyl, 2-azepanyl, 3-azepanyl, and 4-azepanyl);

azocanyl (for example, 1-azocanyl, 2-azocanyl, 3-azocanyl, 4-azocanyl, and 5-azocanyl);

homopiperidinyl (for example, 2-homopiperidinyl, 3-homopiperidinyl, and 4-homopiperidinyl);

morpholinyl (for example, 2-morpholinyl, 3-morpholinyl, and 4-morpholinyl);

thiomorpholinyl (for example, 2-thiomorpholinyl, 3-thiomorpholinyl, and 4-thiomorpholinyl); and tetrahydrofuryl (2-tetrahydrofuryl and 3-tetrahydrofuryl).

The "heterocycloalkyl" described above may be a bridged cyclic group. Examples of such a bridged cyclic group may include, for example, the following:

3-azabicyclo[3.2.1]octanyl (for example, 3-azabicyclo[3.2.1]octan-1-yl, 3-azabicyclo[3.2.1]octan-2-yl, 3-azabicyclo[3.2.1]octan-3-yl, 3-azabicyclo[3.2.1]octan-6-yl, and 3-azabicyclo[3.2.1]octan-8-yl);

quinuclidinyl (for example, quinuclidin-2-yl, quinuclidin-3-yl, and quinuclidin-4-yl); and 6-oxa-3-azabicyclo[3.1.1]heptanyl (for example, 6-oxa-3-azabicyclo[3.1.1]heptan-1-yl, 6-oxa-3-azabicyclo[3.1.1]heptan-2-yl, 6-oxa-3-azabicyclo[3.1.1]heptan-3-yl, and 6-oxa-3-azabicyclo[3.1.1]heptan-7-yl).

The "heterocycloalkyl" described above may be a spirocyclic group. Examples of such a spirocyclic group may include, for example, the following:

6-azaspiro[2.5]octan-1-yl (for example, 6-azaspiro[2.5]octan-1-yl, 6-azaspiro[2.5]octan-4-yl, and 6-azaspiro[2.5]octan-5-yl);

3,9-diazaspiro[5.5]undecan-1-yl (for example, 3,9-diazaspiro[5.5]undecan-1-yl, 3,9-diazaspiro[5.5]undecan-2-yl, and 3,9-diazaspiro[5.5]undecan-3-yl);

2,7-diazaspiro[3.5]nonan-1-yl (for example, 2,7-diazaspiro[3.5]nonan-1-yl, 2,7-diazaspiro[3.5]nonan-2-yl, 2,7-diazaspiro[3.5]nonan-5-yl, 2,7-diazaspiro[3.5]nonan-6-yl, and 2,7-diazaspiro[3.5]nonan-7-yl);

7-azaspiro[3.5]nonanyl, (7-azaspiro[3.5]nonan-1-yl, 7-azaspiro[3.5]nonan-2-yl, 7-azaspiro[3.5]nonan-5-yl, and 7-azaspiro[3.5]nonan-6-yl); and 2,5-diazabicyclo[2.2.1]heptanyl (2,5-diazabicyclo[2.2.1]heptan-1-yl, 2,5-diazabicyclo[2.2.1]heptan-2-yl, 2,5-diazabicyclo[2.2.1]heptan-3-yl, and 2,5-diazabicyclo[2.2.1]heptan-7-yl).

Hereinafter, each symbol in the formula [1] will be described.

$R^1$ in the formula [1] is a hydrogen atom, a halogen atom, a $C_1$-$C_6$ alkyl, a $C_1$-$C_6$ haloalkyl, a $C_2$-$C_6$ alkenyl, a $C_2$-$C_6$ haloalkenyl, a $C_2$-$C_6$ alkynyl, a $C_2$-$C_6$ haloalkynyl, a $C_1$-$C_6$ alkoxy, hydroxy, carboxy, an alkylcarbonyloxy, amino, a monoalkylamino, a dialkylamino, an alkylcarbonylamino, nitro, an optionally substituted $C_3$-$C_6$ cycloalkyl, an optionally substituted $C_3$-$C_6$ cycloalkenyl, an optionally substituted heterocycloalkyl, an optionally substituted aryl, or an optionally substituted heteroaryl.

It is preferably a hydrogen atom, a halogen atom, a $C_1$-$C_6$ alkyl, a $C_2$-$C_6$ alkenyl, amino, a monoalkylamino, a dialkylamino, an alkylcarbonylamino, an optionally substituted $C_3$-$C_0$cycloalkyl, an optionally substituted heterocycloalkyl, an optionally substituted aryl, or an optionally substituted heteroaryl.

It is more preferably an optionally substituted heterocycloalkyl, an optionally substituted aryl, or an optionally substituted heteroaryl.

It is further preferably oxetanyl, tetrahydrofuranyl, tetrahydropyranyl, morpholinyl, piperidinyl, piperazinyl, phenyl, pyridyl, pyrimidinyl, pyrazinyl, isoquinolinyl, thienyl, pyrazolyl, imidazo[1,2-a]pyrazinyl, 1,2,3-triazolyl, or imidazo[1,2-b]pyridazinyl.

$R^2$ is a bonding hand, —$(CR^aR^b)_m$—$NR^c$—, —$NR^c$—$(CR^aR^b)_m$—, —$(CR^aR^b)_m$—O—, —O—$(CR^aR^b)_m$—, —$(CR^aR^b)_m$—, —$NR^c$—, —O—, —$NR^c$—CO—$NR^c$—, —$CR^a$=$CR^b$—, or —C≡C—.

It is preferably a bonding hand, —$(CR^aR^b)_m$—$NR^c$—, —$(CR^aR^b)_m$—O—, —$(CR^aR^b)_m$—, —$NR^c$—, —O—, —$NR^c$—CO—$NR^c$—, —$CR^a$=$CR^b$—, or —C≡C—.

It is more preferably a bonding hand, —$(CR^aR^b)_m$—$NR^c$—, or —$NR^c$—.

$R^a$ in $R^2$ is a hydrogen atom, a halogen atom, a $C_1$-$C_6$ alkyl, or a $C_1$-$C_6$ haloalkyl.

It is preferably a hydrogen atom, or is taken together with the carbon atom to which $R^a$ and $R^b$ are bonded to form C=O.

$R^b$ in $R^2$ is a hydrogen atom, a halogen atom, a $C_1$-$C_6$ alkyl, or a $C_1$-$C_6$ haloalkyl.

It is preferably a hydrogen atom, or is taken together with the carbon atom to which $R^a$ and $R^b$ are bonded to form C=O.

Each $R^c$ in $R^2$ is independently a hydrogen atom, a $C_1$-$C_6$ alkyl, or a $C_1$-$C_6$ haloalkyl.

It is preferably a hydrogen atom.

Het is a 5- to 10-membered heteroaryl.

It is preferably thiazolyl, pyridyl, oxazolyl, pyrazinyl, pyrimidinyl, pyrazolyl, imidazothiazolyl, quinazolynyl, quinolinyl, 7,8-dihydropyrido[4,3-d]pyrimidin-6(5H)-yl, thieno[3,2-b]pyridinyl, imidazo[1,2-b]pyridazinyl, imidazo[1,2-a]pyrazinyl, pyrazolo[1,5-a]pyrimidinyl, 3,4-dihydro-2H-pyrido[3,2-b][1,4]oxazinyl, pyrazolo[5,1-b]thiazolyl, pyrazolo[3,4-b]pyridyl, or pyrazolo[1,5-a]pyridyl.

It is more preferably thiazolyl, pyridyl, or pyrimidinyl.

$L^1$ is a bonding hand, $-(CR^aR^b)_m-$, $-NR^c-$, $-NR^c-(CR^aR^b)_m-$, $-(CR^aR^b)_m-O-$, $-O-(CR^aR^b)_m-$, $-(CR^aR^b)_m-$, $-NR^c-$, $-O-$, $-NR^c-CO-NR^c-$, $-CR^a=CR^b-$, or $-C\equiv C-$.

It is preferably a bonding hand, $-(CR^aR^b)_m-NR^c-$, $-NR^c-(CR^aR^b)_m-$, $-(CR^aR^b)_m-O-$, $-O-(CR^aR^b)_m-$, $-(CR^aR^b)_m-$, $-NR^c-$, $-CR^a=CR^b-$, or $-C\equiv C-$.

It is further preferably $-(CR^aR^b)_m-NR^c-$, $-NR^c-(CR^aR^b)_m-$, $-NR^c-$, $-CR^a=CR^b-$, or $-C\equiv C-$.

$R^a$ in $L^1$ is a hydrogen atom, a halogen atom, a $C_1$-$C_6$ alkyl, or a $C_1$-$C_6$ haloalkyl, or is taken together with the carbon atom to which $R^a$ and $R^b$ are bonded to form C=O.

It is preferably a hydrogen atom, a halogen atom, or a $C_1$-$C_6$ alkyl, or is taken together with the carbon atom to which $R^a$ and $R^b$ are bonded to form C=O.

$R^b$ in $L^1$ is a hydrogen atom, a halogen atom, a $C_1$-$C_6$ alkyl, or a $C_1$-$C_6$ haloalkyl, or is taken together with the carbon atom to which $R^a$ and $R^b$ are bonded to form C=O.

It is preferably a hydrogen atom, or is taken together with the carbon atom to which $R^a$ and $R^b$ are bonded to form C=O.

Each $R^c$ in $L^1$ is independently a hydrogen atom, a $C_1$-$C_6$ alkyl, or a $C_1$-$C_6$ haloalkyl.

It is preferably a hydrogen atom or a $C_1$-$C_6$ alkyl.

It is more preferably a hydrogen atom.

$L^2$ is $-(CR^aR^b)_m-NR^c-$, $-NR^c-(CR^aR^b)_m-$, $-(CR^aR^b)_m-O-$, $-O-(CR^aR^b)_m-$, $-(CR^aR^b)_m-$, $-NR^c-$, $-O-$, $-NR^c-CO-NR^c-$, $-CR^a=CR^b-$, or $-C\equiv C-$.

It is preferably a bonding hand, $-(CR^aR^b)_m-NR^c-$, or $-NR^c-CO-NR^c-$.

It is more preferably a bonding hand or $-(CR^aR^b)_m-NR^c-$.

$R^a$ in $L^2$ is a hydrogen atom, a halogen atom, a $C_1$-$C_6$ alkyl, or a $C_1$-$C_6$ haloalkyl, or is taken together with $R^b$ and the carbon atom to which they are bonded to form C=O.

$R^a$ in $L^2$ is preferably taken together with $R^b$ and the carbon atom to which they are bonded to form C=O.

$R^b$ in $L^2$ is a hydrogen atom, a halogen atom, a $C_1$-$C_6$ alkyl, or a $C_1$-$C_6$ haloalkyl, or is taken together with $R^a$ and the carbon atom to which they are bonded to form C=O.

$R^b$ in $L^2$ is preferably taken together with $R^a$ and the carbon atom to which they are bonded to form C=O.

$R^c$ in $L^2$ is a hydrogen atom, a $C_1$-$C_6$ alkyl, or a $C_1$-$C_6$ haloalkyl.

Preferably, each $R^c$ in $L^2$ is independently a hydrogen atom.

$R^4$ is a hydrogen atom, a halogen atom, or methyl.

It is preferably a halogen atom or methyl.

$R^5$ is a hydrogen atom, a halogen atom, hydroxy, amino, a $C_1$-$C_6$ alkyl, a $C_1$-$C_6$ haloalkyl, a $C_1$-$C_6$ alkoxy, or a $C_1$-$C_6$ haloalkoxy.

It is preferably hydroxy.

$R^6$ is a hydrogen atom, a halogen atom, a $C_1$-$C_6$ alkyl, a $C_1$-$C_6$ haloalkyl, or an optionally substituted phenyl.

$R^7$ is a hydrogen atom, a halogen atom, a $C_1$-$C_6$ alkyl, a $C_1$-$C_6$ haloalkyl, a hydroxyalkyl, an optionally substituted phenyl, or a $C_3$-$C_6$ cycloalkyl.

Alternatively, $R^6$ and $R^7$ are taken together with the carbon atoms to which they are bonded to form a $C_3$-$C_6$ cycloalkyl, an optionally substituted aryl, or an optionally substituted heteroaryl.

$R^6$ is preferably a hydrogen atom, a $C_1$-$C_6$ alkyl, or an optionally substituted phenyl.

$R^7$ is preferably a $C_1$-$C_6$ alkyl, a hydroxyalkyl, or an optionally substituted phenyl.

Alternatively, $R^6$ and $R^7$ are preferably taken together with the carbon atoms to which they are bonded to form a $C_3$-$C_6$ cycloalkyl or an optionally substituted aryl.

$R^6$ and $R^7$ are further preferably taken together with the carbon atoms to which they are bonded to form a $C_3$-$C_6$ cycloalkyl.

More specifically, the compound of the present invention encompasses the compounds shown in the following Table 1 depending on the type of $L^1$.

TABLE 1

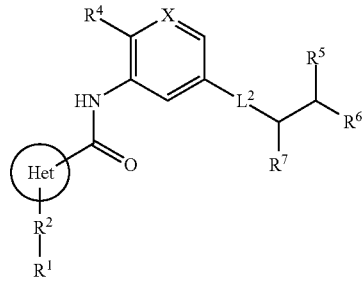

1-A

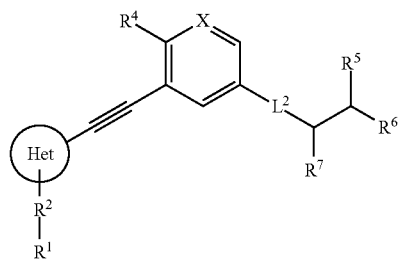

1-B

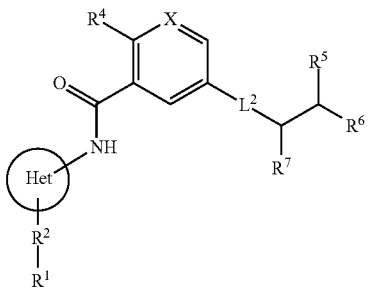

1-C

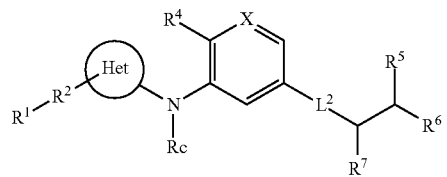

1-D

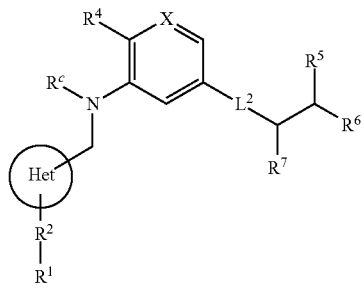

1-E

TABLE 1-continued

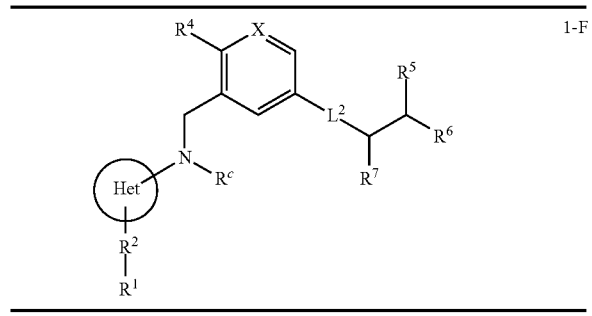

1-F (In the table, $R^1$, $R^2$, $R^1$, $R^5$, $R^6$, $R^7$, $R^c$, $L^1$, $L^2$, and Het are as defined above.)

1-A: Compound [1], wherein $L^1$ is $—(CR^aR^b)_m—NR^c—$, m is 1, and $R^a$ and $R^b$ are taken together with the carbon atom to which they are bonded to form C=O.

1-B: Compound [1], wherein $L^1$ is $—C≡C—$.

1-C: Compound [1], wherein $L^1$ is $—NR^c—(CR^aR^b)_m—$, m is 1, and $R^a$ and $R^b$ are taken together with the carbon atom to which they are bonded to form O=O.

1-D: Compound [1], wherein $L^1$ is $—NR^c—$.

1-E: Compound [1], wherein $L^1$ is $—(CR^aR^b)_m—NR^c—$, m is 1, and $R^a$ and $R^b$ are each a hydrogen atom.

1-F: Compound [1], wherein $L^1$ is $—NR^c(CR^aR^b)_m—$, m is 1, and $R^a$ and $R^b$ are each a hydrogen atom.

TABLE 2

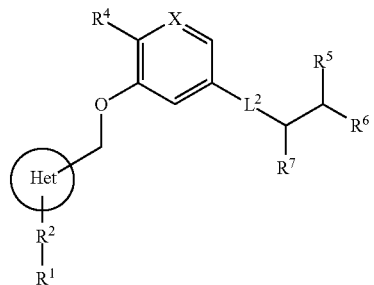

1-G

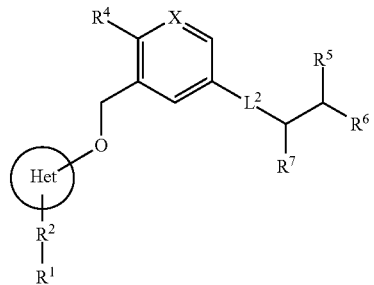

1-H

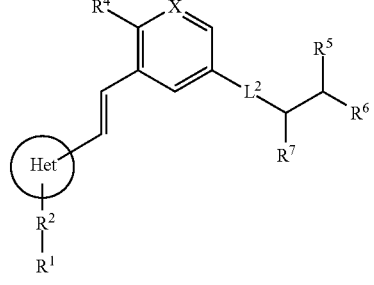

1-I

TABLE 2-continued

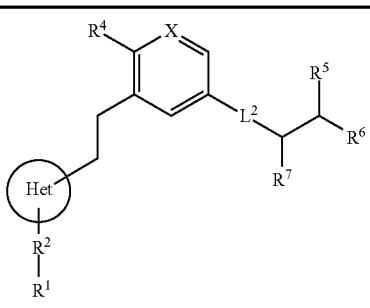

1-J

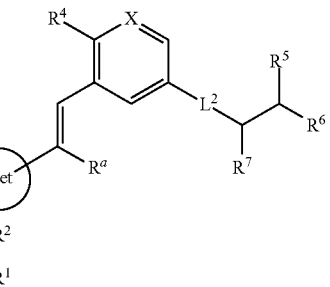

1-K (In the table, $R^1$, $R^2$, $R^1$, $R^5$, $R^6$, $R^7$, $R^c$, $L^1$, $L^2$, and Het are as defined above.)

1-G: Compound [1], wherein $L^1$ is $—(CR^aR^b)_m—O—$, m is 1, and $R^a$ and $R^b$ are each a hydrogen atom.

1-H: Compound [1], wherein $L^1$ is $—O—(CR^aR^b)_m—$, m is 1, and $R^a$ and $R^b$ are each a hydrogen atom.

1-I: Compound [1], wherein $L^1$ is $—CR^a=CR^b—$ and $R^a$ and $R^b$ are each H.

1-J: Compound [1], wherein $L^1$ is $—(CR^aR^b)_m—$, m is 2, and $R^a$ and $R^b$ are each H.

1-K: Compound [1], wherein $L^1$ is $—CR^a=CR^b—$, $R^a$ is a halogen atom, and $R^b$ is H.

$R^1$ in the compound 1-A is preferably H, a halogen atom, a $C_1$-$C_6$ alkyl, a $C_2$-$C_6$ alkenyl, a $C_1$-$C_6$ alkoxy, amino, an alkylcarbonylamino, an optionally substituted $C_3$-$C_6$ cycloalkyl, an optionally substituted heterocycloalkyl, an optionally substituted aryl, or an optionally substituted heteroaryl, and is more preferably a $C_1$-$C_6$ alkyl, a $C_1$-$C_6$ alkoxy, an optionally substituted $C_3$-$C_6$ cycloalkyl, an optionally substituted heterocycloalkyl, an optionally substituted aryl, or an optionally substituted heteroaryl.

$R^2$ in the compound 1-A is preferably a bonding hand, $—(CR^aR^b)_m—NR^c—$, $—(CR^aR^b)_mO—$, $—(CR^aR^b)_m—$, $—NR^c—$, $—O—$, or $—CR^a=CR^b—$, and is more preferably a bonding hand, $—(CR^aR^b)_m—NR^c—$, $—(CR^aR^b)_m—O—$, $—(CR^aR^b)_m—$, $—NR^c—$, or $—O—$.

m of $R^2$ in the compound 1-A is preferably 0, 1, or 2, and is more preferably 0 or 1.

Het in the compound 1-A is preferably thiazolyl, pyridyl, oxazolyl, or imidazothiazolyl, and is more preferably thiazolyl or pyridyl.

$R^4$ in the compound 1-A is preferably a halogen atom or methyl, and is more preferably methyl.

$L^2$ in the compound 1-A is preferably $—(CR^aR^b)_m—NR^c—$.

m of $L^2$ in the compound 1-A is preferably 1.

$R^5$ in the compound 1-A is preferably hydroxy.

$R^6$ in the compound 1-A is preferably H or a $C_1$-$C_6$ alkyl, or is taken together with $R^7$ and the carbon atoms to which they are bonded to form a $C_3$-$C_6$ cycloalkyl, and is more preferably taken together with $R^7$ and the carbon atoms to which they are bonded to form a $C_3$-$C_6$ cycloalkyl.

$R^7$ in the compound 1-A is preferably a $C_1$-$C_6$ alkyl or an optionally substituted phenyl, or is taken together with $R^6$ and the carbon atoms to which they are bonded to form a $C_3$-$C_6$ cycloalkyl, and is more preferably taken together with $R^6$ and the carbon atoms to which they are bonded to form a $C_3$-$C_6$ cycloalkyl.

$R^1$ in the compound 1-B is preferably H, a halogen atom, a $C_1$-$C_6$ alkyl, amino, an optionally substituted $C_3$-$C_6$ cycloalkyl, an optionally substituted aryl, or an optionally substituted heteroaryl, and is more preferably a halogen atom, an optionally substituted $C_3$-$C_6$ cycloalkyl, an optionally substituted aryl, or an optionally substituted heteroaryl.

$R^2$ in the compound 1-B is preferably a bonding hand or —$(CR^aR^b)_m$—$NR^c$—, and is more preferably a bonding hand.

m of $R^2$ in the compound 1-B is preferably 0 or 1.

Het in the compound 1-B is preferably pyridyl or pyrazinyl.

$R^4$ in the compound 1-B is preferably a halogen atom or methyl, and is more preferably methyl.

$L^2$ in the compound 1-B is preferably —$(CR^aR^b)_m$—$NR^c$—.

m of $L^2$ in the compound 1-B is preferably 1.

$R^5$ in the compound 1-B is preferably hydroxy.

$R^6$ in the compound 1-B is preferably an optionally substituted phenyl, or is taken together with $R^7$ and the carbon atoms to which they are bonded to form a $C_3$-$C_6$ cycloalkyl, and is more preferably taken together with $R^7$ and the carbon atoms to which they are bonded to form a $C_3$-$C_6$ cycloalkyl.

$R^7$ in the compound 1-B is preferably a hydroxyalkyl, or is taken together with $R^6$ and the carbon atoms to which they are bonded to form a $C_3$-$C_6$ cycloalkyl, and is more preferably taken together with $R^6$ and the carbon atoms to which they are bonded to form a $C_3$-$C_6$ cycloalkyl.

$R^1$ in the compound 1-C is preferably H, a halogen atom, a $C_1$-$C_6$ alkyl, a $C_2$-$C_6$ alkenyl, a $C_1$-$C_6$ alkoxy, amino, an alkylcarbonylamino, an optionally substituted $C_3$-$C_6$ cycloalkyl, an optionally substituted heterocycloalkyl, an optionally substituted aryl, or an optionally substituted heteroaryl, and is more preferably an optionally substituted aryl.

$R^2$ in the compound 1-C is preferably a bonding hand, —$(CR^aR^b)_m$—$NR^c$—, —$(CR^aR^b)_m$—O—, —$(CR^aR^b)_m$—, —$NR^c$—, —O—, or —$CR^a$=$CR^b$—, and is more preferably a bonding hand.

Het in the compound 1-C is preferably thiazolyl, pyridyl, oxazolyl, or imidazothiazolyl, and is more preferably pyridyl.

$R^4$ in the compound 1-C is preferably a halogen atom or methyl, and is more preferably methyl.

$R^5$ in the compound 1-C is preferably hydroxy.

$R^6$ in the compound 1-C is preferably H or a $C_1$-$C_6$ alkyl, or is taken together with $R^7$ and the carbon atoms to which they are bonded to form a $C_3$-$C_6$ cycloalkyl, and is more preferably taken together with $R^7$ and the carbon atoms to which they are bonded to form a $C_3$-$C_6$ cycloalkyl.

$R^7$ in the compound 1-C is preferably a $C_1$-$C_6$ alkyl or an optionally substituted phenyl, or is taken together with $R^6$ and the carbon atoms to which they are bonded to form a $C_3$-$C_6$ cycloalkyl, and is more preferably taken together with $R^6$ and the carbon atoms to which they are bonded to form a $C_3$-$C_6$ cycloalkyl.

$R^1$ in the compound 1-D is preferably H, a halogen atom, a $C_1$-$C_6$ alkyl, a $C_2$-$C_6$ alkenyl, a $C_1$-$C_6$ alkoxy, a monoalkylamino, an optionally substituted $C_3$-$C_6$ cycloalkyl, an optionally substituted heterocycloalkyl, an optionally substituted aryl, or an optionally substituted heteroaryl, and is more preferably a monoalkylamino or an optionally substituted heteroaryl.

$R^2$ in the compound 1-D is preferably a bonding hand, —$(CR^aR^b)_m$—$NR^c$—, —$(CR^aR^b)_m$—O—, —$(CR^aR^b)_m$—, —$NR^c$—, —O—, or —$CR^a$=$CR^b$—, and is more preferably a bonding hand.

Het in the compound 1-D is preferably pyrimidinyl, pyridyl, or quinazolyl, and is more preferably pyrimidinyl.

$R^4$ in the compound 1-D is preferably a halogen atom or methyl, and is more preferably methyl.

$R^5$ in the compound 1-D is preferably hydroxy.

$R^6$ in the compound 1-D is preferably an optionally substituted aryl, or is taken together with $R^7$ and the carbon atoms to which they are bonded to form a $C_3$-$C_6$ cycloalkyl, and is more preferably taken together with $R^7$ and the carbon atoms to which they are bonded to form a $C_3$-$C_6$ cycloalkyl.

$R^7$ in the compound 1-D is preferably a hydroxyalkyl or an optionally substituted phenyl, or is taken together with $R^6$ and the carbon atoms to which they are bonded to form a $C_3$-$C_6$ cycloalkyl, and is more preferably taken together with $R^6$ and the carbon atoms to which they are bonded to form a $C_3$-$C_6$ cycloalkyl.

$R^1$ in the compound 1-E is preferably H, a halogen atom, a $C_1$-$C_6$ alkyl, a $C_1$-$C_6$ haloalkyl, a $C_2$-$C_6$ alkenyl, a $C_2$-$C_6$ haloalkenyl, a $C_2$-$C_6$ alkynyl, a $C_2$-$C_6$ haloalkynyl, a $C_1$-$C_6$ alkoxy, hydroxy, carboxy, an alkylcarbonyloxy, amino, an aminoalkyl, a monoalkylamino, a dialkylamino, an alkylcarbonylamino, nitro, an optionally substituted $C_3$-$C_6$ cycloalkyl, an optionally substituted $C_3$-$C_6$ cycloalkenyl, an optionally substituted heterocycloalkyl, an optionally substituted aryl, or an optionally substituted heteroaryl, and is more preferably H, amino, an optionally substituted $C_3$-$C_6$ cycloalkyl, an optionally substituted heterocycloalkyl, an optionally substituted aryl, or an optionally substituted heteroaryl.

$R^2$ in the compound 1-E is preferably a bonding hand, —$(CR^aR^b)_m$—$NR^c$—, —$NR^c$—, —$NR^c$—CO—$NR^c$—, or —C≡C—, and is more preferably a bonding hand, —$(CR^aR^b)_m$—$NR^c$—, or —$NR^c$—.

m of $R^2$ in the compound 1-E is preferably 0 or 1.

Het in the compound 1-E is preferably thiazolyl, pyridyl, oxazolyl, pyrazinyl, pyrimidinyl, pyrazolyl, imidazothiazolyl, quinazolynyl, quinolinyl, 7,8-dihydropyrido[4,3-d]pyrimidin-6(5H)-yl, thieno[3,2-b]pyridinyl, 1H-pyrrolo[2,3-b]pyridinyl, imidazo[1,2-b]pyridazinyl, imidazo[1,2-a]pyrazinyl, pyrazolo[1,5-a]pyrimidinyl, 3,4-dihydro-2H-pyrido[3,2-b][1,4]oxazinyl, pyrazolo[5,1-b]thiazolyl, pyrazolo[3,4-b]pyridyl, or pyrazolo[1,5-a]pyridyl, and is more preferably pyridyl, pyrazinyl, pyrimidinyl, or pyrazolo[1,5-a]pyrimidinyl.

$R^4$ in the compound 1-E is preferably H, a halogen atom, or methyl, and is more preferably a halogen atom or methyl.

$L^2$ in the compound 1-E is preferably —$(CR^aR^b)_m$—$NR^c$—.

m of $L^2$ in the compound 1-E is preferably 1.

$R^5$ in the compound 1-E is preferably hydroxy.

$R^6$ in the compound 1-E is more preferably taken together with $R^7$ and the carbon atoms to which they are bonded to form a $C_3$-$C_6$ cycloalkyl.

$R^7$ in the compound 1-E is more preferably taken together with $R^6$ and the carbon atoms to which they are bonded to form a $C_3$-$C_6$ cycloalkyl.

$R^1$ in the compound 1-F is preferably a halogen atom, an optionally substituted $C_3$-$C_6$ cycloalkyl, an optionally substituted aryl, or an optionally substituted heteroaryl, and is more preferably an optionally substituted $C_3$-$C_6$ cycloalkyl, an optionally substituted aryl, or an optionally substituted heteroaryl.

$R^2$ in the compound 1-F is preferably a bonding hand or —C≡C—, and is preferably a bonding hand.

Het in the compound 1-F is preferably pyridyl or pyrazinyl, and is more preferably pyridyl.

$R^4$ in the compound 1-F is preferably H, a halogen atom, or methyl, and is more preferably H or methyl.

$L^2$ in the compound 1-F is preferably —$(CR^aR^b)_m$—$NR^c$— or —$NR^c$—CO—$NR^c$—.

m of $L^2$ in the compound 1-F is preferably 1.

$R^5$ in the compound 1-F is preferably hydroxy.

$R^6$ in the compound 1-F is preferably an optionally substituted phenyl, or is taken together with $R^7$ and the carbon atoms to which they are bonded to form a $C_3$-$C_6$ cycloalkyl, and is more preferably taken together with $R^7$ and the carbon atoms to which they are bonded to form a $C_3$-$C_6$ cycloalkyl.

$R^7$ in the compound 1-F is preferably a hydroxyalkyl, or is taken together with $R^6$ and the carbon atoms to which they are bonded to form a $C_3$-$C_6$ cycloalkyl, and is more preferably taken together with $R^6$ and the carbon atoms to which they are bonded to form a $C_3$-$C_6$ cycloalkyl.

$R^1$ in the compound 1-G is preferably an optionally substituted aryl or an optionally substituted heteroaryl, and is more preferably an optionally substituted heteroaryl.

$R^2$ in the compound 1-G is preferably a bonding hand.

Het in the compound 1-G is preferably pyridyl.

$R^4$ in the compound 1-G is preferably H, a halogen atom, or methyl, and is more preferably a halogen atom or methyl.

$R^5$ in the compound 1-G is preferably hydroxy.

$R^6$ in the compound 1-G is preferably taken together with $R^7$ and the carbon atoms to which they are bonded to form a $C_3$-$C_6$ cycloalkyl.

$R^7$ in the compound 1-G is preferably taken together with $R^6$ and the carbon atoms to which they are bonded to form a $C_3$-$C_6$ cycloalkyl.

$R^1$ in the compound 1-H is preferably an optionally substituted heteroaryl.

$R^2$ in the compound 1-H is preferably a bonding hand.

Het in the compound 1-H is preferably pyridyl.

$R^4$ in the compound 1-H is preferably a halogen atom or methyl, and is more preferably methyl.

$R^5$ in the compound 1-H is preferably hydroxy.

$R^6$ in the compound 1-H is preferably taken together with $R^7$ and the carbon atoms to which they are bonded to form a $C_3$-$C_6$ cycloalkyl.

$R^7$ in the compound 1-H is preferably taken together with $R^6$ and the carbon atoms to which they are bonded to form a $C_3$-$C_6$ cycloalkyl.

$R^1$ in the compound 1-I is preferably an optionally substituted aryl.

$R^2$ in the compound 1-I is preferably a bonding hand.

Het in the compound 1-I is preferably pyridyl.

$R^4$ in the compound 1-I is preferably methyl.

$R^5$ in the compound 1-I is preferably hydroxy.

$R^6$ in the compound 1-I is preferably taken together with $R^7$ and the carbon atoms to which they are bonded to form a $C_3$-$C_6$ cycloalkyl.

$R^7$ in the compound 1-I is preferably taken together with $R^6$ and the carbon atoms to which they are bonded to form a $C_3$-$C_6$ cycloalkyl.

$R^1$ in the compound 1-J is preferably an optionally substituted aryl.

$R^2$ in the compound 1-J is preferably a bonding hand.

Het in the compound 1-J is preferably pyridyl.

$R^4$ in the compound 1-J is preferably methyl.

$R^5$ in the compound 1-J is preferably hydroxy.

$R^6$ in the compound 1-J is preferably taken together with $R^7$ and the carbon atoms to which they are bonded to form a $C_3$-$C_6$ cycloalkyl.

$R^7$ in the compound 1-J is preferably taken together with $R^6$ and the carbon atoms to which they are bonded to form a $C_3$-$C_6$ cycloalkyl.

$R^1$ in the compound 1-K is preferably H, a halogen atom, amino, a monoalkylamino, a dialkylamino, an optionally substituted cycloalkyl, an optionally substituted heterocycloalkyl, or an optionally substituted heteroaryl, and is more preferably a halogen atom, amino, an optionally substituted cycloalkyl, an optionally substituted heterocycloalkyl, or an optionally substituted heteroaryl.

$R^2$ in the compound 1-K is preferably a bonding hand, —$(CR^aR^b)_m$—$NR^c$—, —$(CR^aR^b)_m$—O—, —$(CR^aR^b)_m$—, or —$NR^c$—, and is more preferably a bonding hand, —$(CR^aR^b)_m$—$NR^c$—, —$(CR^aR^b)_m$—, or —$NR^c$—.

Het in the compound 1-K is preferably pyridyl, pyrimidinyl, pyrazinyl, or imidazo[1,2-b]pyridazinyl, and is more preferably pyridyl, pyrimidinyl, or pyrazinyl.

$R^4$ in the compound 1-K is preferably a halogen atom or methyl.

$L^2$ in the compound 1-K is preferably —$(CR^aR^b)_m$—$NR^c$—.

m of $L^2$ in the compound 1-K is preferably 1.

$R^5$ in the compound 1-K is preferably hydroxy.

$R^6$ in the compound 1-K is preferably a $C_1$-$C_6$ alkyl, or is taken together with $R^7$ and the carbon atoms to which they are bonded to form a $C_3$-$C_6$ cycloalkyl or an optionally substituted aryl, and is more preferably taken together with $R^7$ and the carbon atoms to which they are bonded to form a $C_3$-$C_6$ cycloalkyl.

$R^7$ in the compound 1-K is preferably a $C_1$-$C_6$ alkyl, or is taken together with $R^6$ and the carbon atoms to which they are bonded to form a $C_3$-$C_6$ cycloalkyl or an optionally substituted aryl, and is more preferably taken together with $R^6$ and the carbon atoms to which they are bonded to form a $C_3$-$C_6$ cycloalkyl.

The compound of the present invention can be, for example, produced from a publicly known compound or an intermediate that can be readily synthesized, according to the following method, Examples, which will be mentioned later, or a publicly known method. In the production of the compound of the present invention, in the case where a raw material has a substituent that influences the reaction, it is general to carry out the reaction after protecting the raw material with an appropriate protective group in advance by a publicly known method. The protective group can be removed after the reaction by a publicly known method.

The compound represented by the formula [1] may be used as it is as a medicament, but can also be made into the form of a pharmaceutically acceptable salt, solvate, or salt of the solvate for use according to a publicly known method. Examples of the pharmaceutically acceptable salt include, for example, salts with mineral acids such as hydrochloric acid, hydrobromic acid, sulfuric acid, and phosphoric acid; salts with organic acids such as acetic acid, malic acid, lactic acid, citric acid, tartaric acid, maleic acid, succinic acid, fumaric acid, p-toluenesulfonic acid, benzenesulfonic acid, and methanesulfonic acid; salts with alkali metals such as lithium, potassium, and sodium; salts with alkaline earth metals such as magnesium and calcium; and salts with organic bases such as ammonium salts. These salts can be formed by a method that is normally practiced.

For example, when the compound of the present invention is a hydrochloride salt, it can be obtained by dissolving the compound represented by the formula [1] in a solution of hydrogen chloride in an alcohol, a solution of hydrogen chloride in ethyl acetate, a solution of hydrogen chloride in 1,4-dioxane, a solution of hydrogen chloride in cyclopentyl methyl ether, or a solution of hydrogen chloride in diethyl ether.

Among the compound of the present invention, for those having an asymmetric carbon, the respective stereoisomers and a mixture thereof are all encompassed in the present invention. Stereoisomers can be produced, for example, by optically resolving them utilizing the basicity thereof from the racemate according to a publicly known method using an optically active acid (tartaric acid, dibenzoyltartaric acid, mandelic acid, 10-camphor sulfonic acid, and the like), or by using an optically active compound prepared in advance as a raw material. In addition, stereoisomers can also be produced by optical resolution using a chiral column or by asymmetric synthesis.

The compound of the present invention is not limited to a specific isomer, but encompasses all possible isomers and racemate.

(Method for Producing the Compound of the Present Invention)

The compound of the present invention can be, for example, produced from a compound that is publicly known per se or an intermediate that can be readily prepared from the publicly known compound, according to the following method, Examples, which will be mentioned later, or a publicly known method.

If the solvents, reagents, and raw materials used in each step in the following production methods are commercially available, such commercially available products can be used as they are. Also, the compounds obtained and the raw materials used in each step in the following production methods may form a salt and can be converted into another type of salt or a free form by a publicly known method. Alternatively, when the compounds obtained or the raw materials used in each step in the following production methods is in a free form, they can be converted into a desired salt by a publicly known method. Examples of such a salt may include those similar to the salts to be used in the compound of the present invention, which are mentioned above.

The compound of the present invention represented by the formula [1] or a pharmaceutically acceptable salt thereof may form a solvate (for example, a hydrate or the like) and/or a crystalline polymorph, and the present invention also encompasses such various types of solvates and crystalline polymorphs. For the "solvate", the compound represented by the formula [1] may be coordinated with any number of solvent molecules (for example, water molecules or the like). By leaving the compound represented by the formula [1] or a pharmaceutically acceptable salt thereof to stand in the atmosphere, it absorbs water, and adsorbed water may adhere thereto or a hydrate may be formed. Also, by recrystallizing the compound represented by the formula [1] or a pharmaceutically acceptable salt thereof, a crystalline polymorph thereof may be formed.

In the production of the compound of the present invention, in the case where a raw material has a substituent that may influence the reaction, a protecting group may be introduced to that substituent in advance by a publicly known method, and by removing the protecting group after the reaction as necessary, the target compound can be obtained. For introduction of such a protecting group and removal of the protecting group, the conditions may be selected as appropriate for use that are shown in, for example, Wuts and Greene, "Greene's Protective Groups in Organic Synthesis", 4th edition, John Wiley & Sons Inc., 2006; or P. J. Kocienski, "Protecting Groups", 3rd edition, Thieme, 2005.

The compounds obtained in each step of the following production methods can be isolated or purified according to a conventional method such as solvent extraction, concentration, distillation, sublimation, recrystallization, reprecipitation, and chromatography. Alternatively, the compounds may be used in the subsequent step as a reaction mixture or a crude product.

Unless otherwise specified, the reaction in each step in the following production methods is carried out according to publicly known methods as described in, for example, R. C. Larock, "Comprehensive Organic Transformations: A Guide to Functional Group Preparations", 2nd edition, John Wiley & Sons, Inc., 1999; The Chemical Society of Japan, "Experimental Chemistry", 4th edition, Maruzen, 1992; L. Kuerti and B. Czako, "Strategic Applications of Named Reactions in Organic Synthesis", translated by Kiyoshi Tomioka, Kagaku-Dojin Publishing Company, Inc., 2006; G. S. Zweifel and M. H. Nantz, "Modern Organic Synthesis: An Introduction", translated by Tamejiro Hiyama, Kagaku-Dojin Publishing Company, Inc., 2009, or methods in the similar manner as described in the Examples, with modified or combined as appropriate.

The compound of the present invention mentioned above
(1-A: a compound wherein $L^1$ is $-(CR^aR^b)_m-NR^c-$, and $R^a$ and $R^b$ are taken together with the carbon atom to which they are bonded to form C=O;
1-B: a compound wherein $L^1$ is $-C\equiv C-$;
1-C: a compound wherein $L^1$ is $-NR^c-(CR^aR^b)_m-$, and $R^a$ and $R^b$ are taken together with the carbon atom to which they are bonded to form C=O;
1-D: a compound wherein $L^1$ is $-NR^c-$;
1-E: a compound wherein $L^1$ is $-(CR^aR^b)_m-NR^c-$, and $R^a$ and $R^b$ are each independently H, a halogen atom, a $C_1$-$C_6$ alkyl, or a $C_1$-$C_6$ haloalkyl;
1-F: a compound wherein $L^1$ is $NR^c-(CR^aR^b)_m-$, and $R^a$ and $R^b$ are each independently H, a halogen atom, a $C_1$-$C_6$ alkyl, or a $C_1$-$C_6$ haloalkyl;
1-G: a compound wherein $L^1$ is $-(CR^aR^b)_m-O-$, and $R^a$ and $R^b$ are each independently H, a halogen atom, a $C_1$-$C_6$ alkyl, or a $C_1$-$C_6$ haloalkyl;
1-H: a compound wherein $L^1$ is $-O-(CR^aR^b)_m-$, and $R^a$ and $R^b$ are each independently H, a halogen atom, a $C_1$-$C_6$ alkyl, or a $C_1$-$C_6$ haloalkyl;
1-I: a compound wherein $L^1$ is $-CR^a=CR^b-$, and $R^a$ and $R^b$ are each H;
1-J: a compound wherein $L^1$ is $-(CR^aR^b)_m-$, and $R^a$ and $R^b$ are each H; and
1-K: a compound wherein $L^1$ is $-CR^a=CR^b-$, $R^a$ is a halogen atom, and $R^b$ is H)
can be produced by, for example, a general synthetic method, which will be shown below. For extraction, purification, and the like, treatments that are carried out in normal organic chemistry experiments may be carried out.

Method for producing compound [1-A]

[Formula 2]

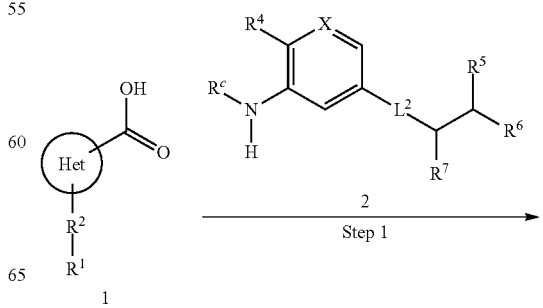

-continued

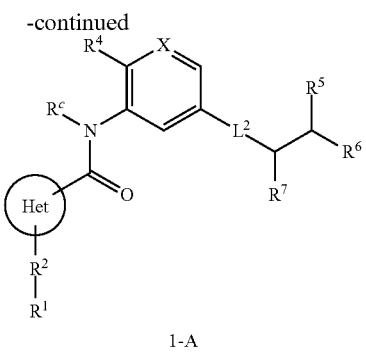

1-A (In the formula, $R^1$, $R^2$, $R^4$, $R^5$, $R^6$, $R^7$, $R^c$, Het, and X are as defined above.)

Step 1

The present step is a step of obtaining a compound 1-A by condensing a compound 1 or a reactive compound thereof and an amine compound 2 in the presence of a condensing agent.

Examples of the reactive compound of the compound 1 may include, for example, those normally used in an amide condensation reaction, such as acid halides (for example, acid chloride and acid bromide), mixed acid anhydrides, imidazolides, and active amides.

It is appropriate that the amounts to be used of the condensing agent and the amine compound 2 to be used in the present step should both be within the range of 1 molar equivalent to 3 molar equivalents with respect to the compound 1.

Examples of the condensing agent to be used in the present step include, for example, 1,1'-carbonyldiimidazole (hereinafter, referred to as "CDI"), 1-ethyl-3-(3-dimethylaminopropyl)carbodiimide (hereinafter, referred to as "EDCI"), diisopropylcarbodiimide (hereinafter, referred to as "DIC"), diethyl cyanophosphonate, 0-(benzotriazol-1-yl)-N,N,N',N'-tetramethyluronium hexafluorophosphate (hereinafter, referred to as "HBTU"), O-(7-azabenzotriazol-1-yl)-N,N,N',N'-tetramethyluronium hexafluorophosphate (hereinafter, referred to as "HATU"), and the like.

In the present step, a base can be used as necessary. Examples of the base that can be used may include, for example, organic bases such as TEA, DIPEA, N,N-dimethylaniline, and DBU.

It is appropriate that the amount of such a base to be used should be within the range of 1 molar equivalent to 10 molar equivalents with respect to the compound 1.

In the present step, an additive, such as 1-hydroxybenzotriazole (hereinafter, referred to as "HOBt"), N-hydroxysuccinimide, and 1-hydroxy-7-azabenzotriazole (hereinafter, referred to as "HOAt"), may also be added, as necessary.

When the additive described above is used in the present step, it is appropriate that the amount of such an additive to be used should be within the range of 0.1 molar equivalents to 3 molar equivalents with respect to the compound 1.

Although the solvent to be used is not particularly limited as long as it is not involved in the reaction, examples thereof may include, for example, hydrocarbons such as toluene and xylene; ethers such as 1,4-dioxane, THF, and DME; amides such as DMF and DMA; halogenated hydrocarbons such as dichloromethane and chloroform; nitriles such as acetonitrile and propionitrile; and a mixed solvent thereof.

It is appropriate that the reaction temperature should be normally within the range of $-20°$ C. to $150°$ C. although it varies depending on the types of raw materials and reagents to be used. Also, a microwave reaction apparatus may be used as necessary.

It is appropriate that the reaction time should be normally within the range of 0.1 hours to 72 hours although it varies depending on the types of raw materials to be used and the reaction temperature.

Moreover, the compound [1] wherein $L^2$ is $-(CR^aR^b)_m-NR^c-$ wherein $R^a$ and $R^b$ are taken together with the carbon atom to which they are bonded to form C=O, and m and $R^c$ are as defined above (compound 1-AA) can also be produced by the following method.

Method for Producing Compound [1-AA]

[Formula 3]

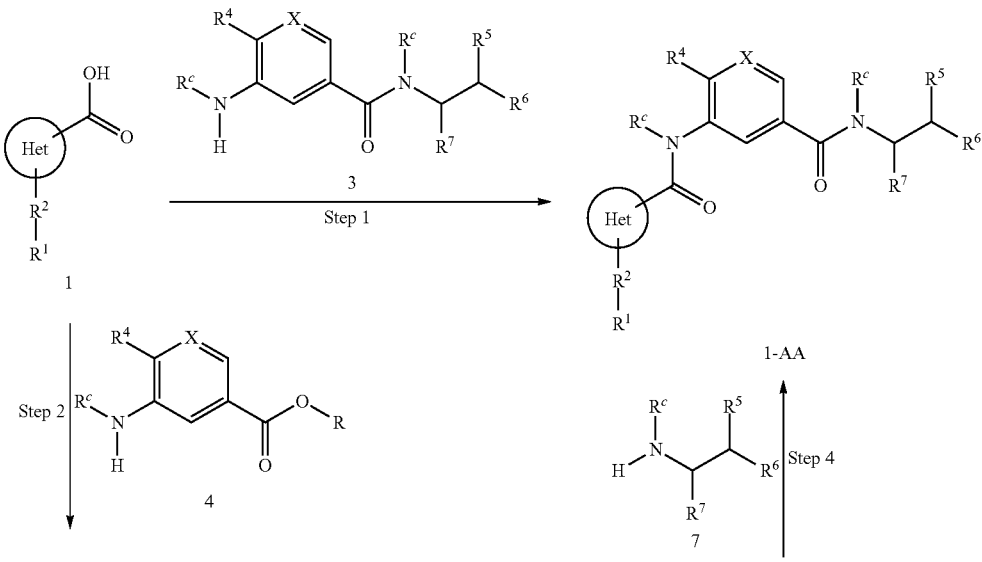

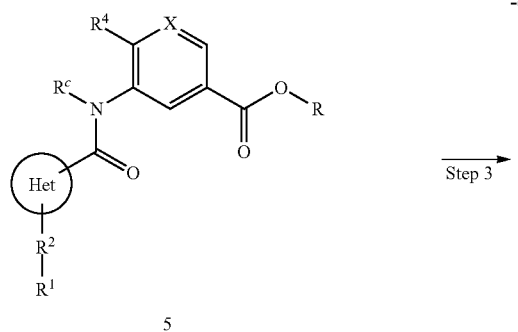 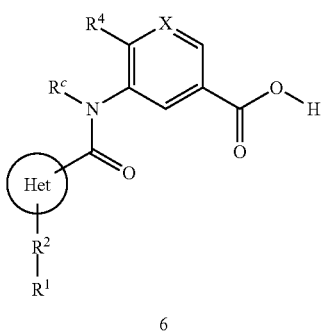

5 → Step 3 → 6

(In the formula, $R^1$, $R^2$, $R^4$, $R^1$, $R^6$, $R^7$, $R^c$, Het, and X are as defined above. R is an alkyl, and examples thereof may include, for example, methyl, ethyl, and n-butyl.)

Step 1

The present step is a step of obtaining a compound 1-AA by condensing a compound 1 or a reactive compound thereof and an amine compound 3 in the presence of a condensing agent. The compound 1-AA can be produced by the same method as in Step 1 of the method for producing the compound 1-A described above.

Step 2

The present step is a step of obtaining a compound 5 by condensing a compound 1 or a reactive compound thereof and an amine compound 4 in the presence of a condensing agent. The compound 5 can be produced by the same method as in Step 1 of the method for producing the compound 1-A described above.

Step 3

The present step is a step of obtaining a compound 6 by hydrolyzing the ester moiety of the compound 5 described above in the presence of an appropriate acid or base in an appropriate solvent.

Examples of the acid to be used in the present step may include inorganic acids such as hydrochloric acid and sulfuric acid; and organic acids such as trifluoroacetic acid (hereinafter, referred to as "TFA"), methanesulfonic acid, and toluenesulfonic acid. Examples of the base may include inorganic bases such as sodium hydroxide, potassium hydroxide, and lithium hydroxide.

It is appropriate that the amount of the acid or the base to be used in the present step should be within the range of 1 molar equivalent to 10 molar equivalents with respect to the compound 5. If necessary, an excess amount of the acid or the base may be used with respect to the compound 5.

Although the solvent to be used is not limited as long as it is not involved in the reaction, examples thereof may include, for example, alcohols such as methanol, ethanol, and 2-propanol; ethers such as THF, diethyl ether, 1,4-dioxane, and DME; nitriles such as acetonitrile and propionitrile; ketones such as acetone; water; and a mixed solvent thereof.

Although the reaction temperature varies depending on the types of raw materials and reagents to be used, the reaction can be normally carried out within the range of 20° C. to 200° C., preferably 20° C. to 100° C. Also, a microwave reaction apparatus may be used as necessary.

It is appropriate that the reaction time should be normally within the range of 0.5 hours to 4 days although it varies depending on the types of raw materials to be used and the reaction temperature.

Step 4

The present step is a step of obtaining a compound 1-AA by condensing a compound 6 or a reactive compound thereof and an amine compound 7 in the presence of a condensing agent, and the compound 1-AA can be produced by the same method as in Step 1 of the method for producing the compound 1-A described above.

Method for Producing Compound [1-B]

[Formula 4]

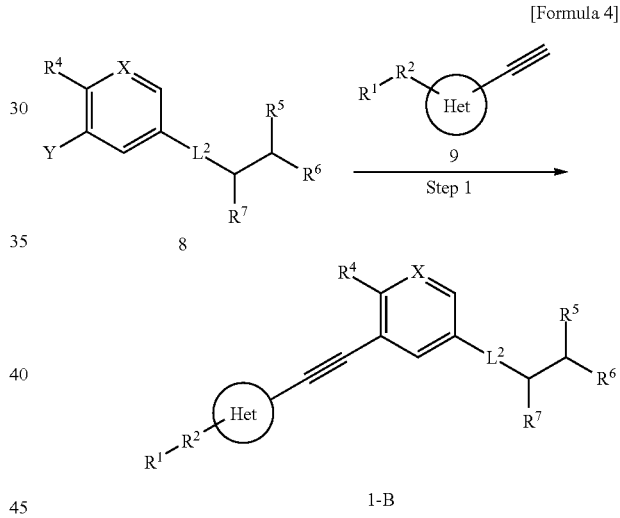

(In the formula, $R^1$, $R^2$, $R^4$, $R^5$, $R^6$, $R^7$, $R^c$, Het, X, and $L^2$ are as defined above. Y is a leaving group, and examples thereof may include, for example, a bromine atom, an iodine atom, methanesulfonate, and trifluoromethanesulfonate.)

Step 1

The present step is a step of obtaining a compound 1-B by subjecting a compound 8 and a compound 9 to a coupling reaction in the presence of a transition metal such as palladium.

For the present reaction, conditions normally used in a coupling reaction using a transition metal, specifically the Sonogashira coupling reaction, can be applied, and it can be carried out by methods described in literatures such as Sonogashira et al., J, Organomet. Chem. 2002, 653, 46-49; and Negishi et al., Chem. Rev. 2003, 103, 1979-2017.

It is appropriate that the amount of the compound 9 to be used should be within the range of 0.5 molar equivalents to 3 molar equivalents with respect to the compound 8.

The organometallic catalyst to be used in the present reaction is not particularly limited. Preferable examples of the organometallic catalyst may include metal catalysts such as tris(dibenzylideneacetone)bispalladium-chloroform adduct (hereinafter, referred to as "Pd$_2$(dba)$_3$·CHCl$_3$"), tris (dibenzylideneacetone)bispalladium (hereinafter, referred to as "Pd$_2$(dba)$_3$"), tetrakistriphenylphosphinepalladium (hereinafter, referred to as "Pd(PPh$_3$)$_4$"), [1,1'-bis(diphenylphosphino)ferrocene]-dichloropalladium(II)-dichloromethane adduct (hereinafter, referred to as "Pd(dppf)Cl$_2$·CH$_2$Cl$_2$"), bis(triphenylphosphine) palladium (II) dichloride (hereinafter, referred to as "PdCl$_2$(PPh$_3$)$_2$"), [1,1'-bis(di-tert-butylphosphino)ferrocene]-dichloropalladium(II) (hereinafter, referred to as "Pd(dtbpf)Cl$_2$), bis(tricyclohexylphosphine)palladium(II) dichloride (hereinafter, referred to as "PdCl$_2$(PCy$_3$)$_2$"), palladium(II) acetate (hereinafter, referred to as "Pd(OAc)$_2$"), and [1,3-bis(diphenylphosphino)propane]nickel(II), and a mixture of these metal catalysts.

It is appropriate that the amount of the transition metal to be used should be, for example, within the range of 0.01 molar equivalents to 0.3 molar equivalents with respect to the compound 8.

In the present step, a base or a salt may be used as necessary. Examples of the base or the salt to be used may include, for example, bases or salts such as potassium carbonate, cesium carbonate, sodium carbonate, sodium bicarbonate, sodium acetate, potassium acetate, trisodium phosphate, tripotassium phosphate, and solutions thereof; as well as triethylamine (hereinafter, referred to as "TEA"), N,N-diisopropylethylamine (hereinafter, referred to as "DIPEA"), lithium chloride, and copper(I) iodide.

It is appropriate that the amount of the base to be used should be, for example, within the range of 1 molar equivalent to 4 molar equivalents with respect to the compound 8.

In the present step, an appropriate ligand may be used as necessary. Examples of the ligand that can be used may include, for example, 1,1'-bis(diphenylphosphino)ferrocene (hereinafter, referred to as "dppf"), 4,5-bis(diphenylphosphino)-9,9-dimethylxanthene (hereinafter, referred to as "Xantphos"), 2-dicyclohexylphosphino-2',4',6'-triisopropylbiphenyl (hereinafter, referred to as "XPhos"), 2,2'-bis(diphenylphosphino)-1,1'-binaphthyl (hereinafter, referred to as "BINAP"), 2-dicyclohexylphosphino-2',6'-diisopropylbiphenyl (hereinafter, referred to as "RuPhos"), triphenylphosphine (hereinafter, referred to as "PPh$_3$"), tricyclohexylphosphine (hereinafter, referred to as "PCy$_3$"), and the like.

It is appropriate that the amount of the ligand to be used should be, for example, within the range of 1 molar equivalent to 5 molar equivalents with respect to the transition metal to be used.

Although the solvent to be used in the present step is not particularly limited as long as it is not involved in the reaction, examples thereof may include, for example, hydrocarbons such as toluene and xylene; ethers such as 1,4-dioxane, tetrahydrofuran (hereinafter, referred to as "THF"), and dimethoxyethane (hereinafter, referred to as "DME"); amides such as N,N-dimethylformamide (hereinafter, referred to as "DMF"), N,N-dimethylacetamide (hereinafter, referred to as "DMA"), and N-methylpyrrolidone (hereinafter, referred to as "NMP"); alcohols such as ethanol, 2-propanol, and tert-butanol; water; and a mixed solvent thereof.

It is appropriate that the reaction temperature should be normally within the range of 20° C. to 200° C. although it varies depending on the types of raw materials and reagents to be used. Also, a microwave reaction apparatus may be used as necessary.

It is appropriate that the reaction time should be normally within the range of 0.1 hours to 24 hours although it varies depending on the types of raw materials to be used and the reaction temperature.

A compound wherein L$^2$ is —(CR$^a$R$^b$)$_m$—NR$^c$— wherein R$^a$ and R$^b$ are taken together with the carbon atom to which they are bonded to form C═O (compound 1-BB) can also be produced as follows.

Method for Producing Compound [1-BB]

[Formula 5]

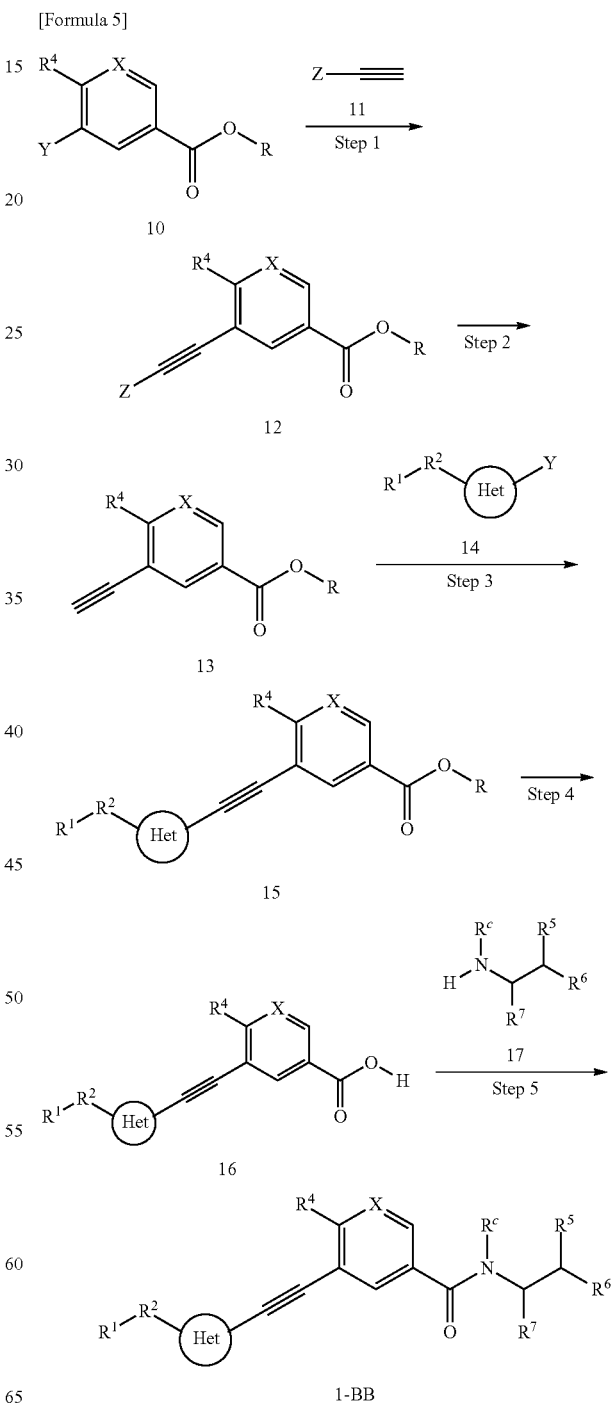

(In the formula, $R^1$, $R^2$, $R^4$, $R^5$, $R^6$, $R^7$, $R^c$, Het, X, Y, and R are as defined above. Z is a leaving group, and examples thereof may include, for example, trimethylsilyl and triethylsilyl.)

Step 1

The present step is a step of obtaining an alkyne compound 12 by subjecting a compound 10 and a compound 11 to coupling in the presence of a transition metal such as palladium, and the alkyne compound 12 can be produced by the same method as in Step 1 of the method for producing the compound 1-B.

Step 2

The present step is a step of deprotecting Z to obtain a compound 13, and can be carried out with reference to, for example, Wuts and Greene, "Greene's Protective Groups in Organic Synthesis", 4th edition, John Wiley & Sons Inc., 2006; or P. J. Kocienski, "Protecting Groups", 3rd edition, Thieme, 2005.

Step 3

The present step is a step of obtaining a compound 15 by subjecting a compound 13 and a compound 14 to coupling in the presence of a transition metal such as palladium, and the compound 15 can be produced by the same method as in Step 1 of the method for producing the compound 1-B.

Step 4

The present step is a step of obtaining a compound 16 by hydrolyzing the ester moiety of the compound 15 in the presence of an appropriate acid or base in an appropriate solvent, and the compound 16 can be produced by the same method as in Step 3 of the method for producing the compound 1-AA.

Step 5

The present step is a step of obtaining a compound 1-BB by condensing a compound 16 or a reactive compound thereof and an amine compound 17 in the presence of a condensing agent, and the compound 1-BB can be produced by the same method as in Step 1 of the method for producing the compound 1-A described above.

Method for Producing Compound [1-C]

[Formula 6]

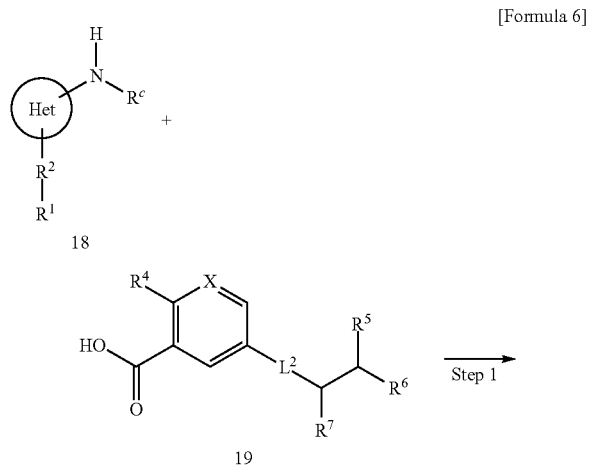

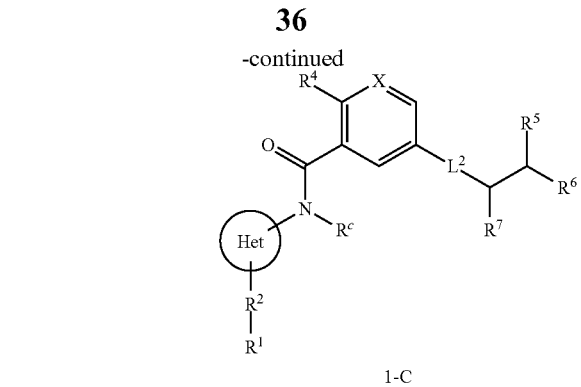

1-C (In the formula, $R^1$, $R^2$, $R^4$, $R^1$, $R^6$, $R^7$, $R^c$, Het, and X are as defined above.)

Step 1

The present step is a step of obtaining a compound 1-C by condensing a compound 19 or a reactive compound thereof and an amine compound 18 in the presence of a condensing agent, and the compound 1-C can be produced by the same method as in Step 1 of the method for producing the compound 1-A described above.

Method for Producing Compound [1-D]

[Formula 7]

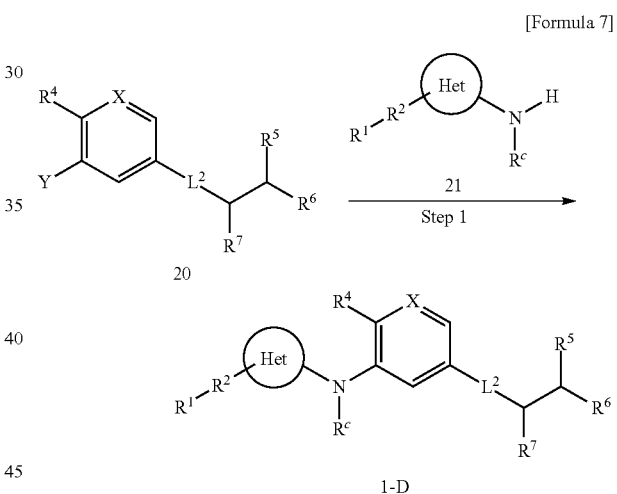

1-D (In the formula, $R^1$, $R^2$, $R^4$, $R^5$, $R^6$, $R^7$, $R^c$, $L^2$, Het, and X are as defined above. Y is a leaving group, and examples thereof may include, for example, a bromine atom, an iodine atom, and trifluoromethanesulfonate.)

Step 1

The present step is a step of obtaining a compound 1-D by subjecting a compound 20 and a compound 21 to a coupling reaction in the presence of a transition metal such as palladium.

For the present reaction, conditions normally used in a coupling reaction using a transition metal, specifically the coupling reaction of Buchwald and others, can be applied, and it can be carried out by methods described in literatures such as Buchwald et al., J. Am. Chem. Soc. 1994, 116, 7901-7902; Buchwald et al., Org. Synth. 2002, 78, 23-28; and Hartwig et al., Acc. Chem. Res. 2008, 41, 1534-1544.

It is appropriate that the amount of the compound 21 to be used should be within the range of 0.5 molar equivalents to 3 molar equivalents with respect to the compound 20.

The organometallic catalyst to be used in the present reaction is not particularly limited. Preferable examples of the organometallic catalyst may include metal catalysts such as tris(dibenzylideneacetone)bispalladium-chloroform adduct (hereinafter, referred to as "Pd$_2$(dba)$_3$·CHCl$_3$"), tris (dibenzylideneacetone)bispalladium (hereinafter, referred to as "Pd$_2$(dba)$_3$"), tetrakistriphenylphosphinepalladium (hereinafter, referred to as "Pd(PPh$_3$)$_4$"), [1,1'-bis(diphenylphosphino)ferrocene]-dichloropalladium(II)-dichloromethane adduct (hereinafter, referred to as "Pd(dppf)Cl$_2$·CH$_2$Cl$_2$"), bis(triphenylphosphine) palladium (II) dichloride (hereinafter, referred to as "PdCl$_2$(PPh$_3$)$_2$"), [1,1'-bis(di-tert-butylphosphino)ferrocene]-dichloropalladium(II) (hereinafter, referred to as "Pd(dtbpf)Cl$_2$), bis (tricyclohexylphosphine)palladium(II) dichloride (hereinafter, referred to as "PdCl$_2$(PCy$_3$)$_2$"), palladium(II) acetate (hereinafter, referred to as "Pd(OAc)$_2$"), and [1,3-bis(diphenylphosphino)propane]nickel(II), and a mixture of these metal catalysts.

It is appropriate that the amount of the transition metal to be used should be, for example, within the range of 0.01 molar equivalents to 0.3 molar equivalents with respect to the compound 20.

In the present step, a base or a salt may be used as necessary. Examples of the base or the salt to be used may include, for example, bases or salts such as potassium carbonate, cesium carbonate, sodium carbonate, sodium bicarbonate, sodium acetate, potassium acetate, trisodium phosphate, tripotassium phosphate, and solutions thereof; as well as triethylamine (hereinafter, referred to as "TEA"), N,N-diisopropylethylamine (hereinafter, referred to as "DIPEA"), lithium chloride, and copper(I) iodide.

It is appropriate that the amount of the base to be used should be, for example, within the range of 1 molar equivalent to 4 molar equivalents with respect to the compound 20.

In the present step, an appropriate ligand may be used as necessary. Examples of the ligand that can be used may include, for example, 1,1'-bis(diphenylphosphino)ferrocene (hereinafter, referred to as "dppf"), 4,5-bis(diphenylphosphino)-9,9-dimethylxanthene (hereinafter, referred to as "Xantphos"), 2-dicyclohexylphosphino-2',4',6'-triisopropylbiphenyl (hereinafter, referred to as "XPhos"), 2,2'-bis(diphenylphosphino)-1,1'-binaphthyl (hereinafter, referred to as "BINAP"), 2-dicyclohexylphosphino-2',6'-diisopropylbiphenyl (hereinafter, referred to as "RuPhos"), triphenylphosphine (hereinafter, referred to as "PPh$_3$"), tricyclohexylphosphine (hereinafter, referred to as "PCy$_3$"), and the like.

It is appropriate that the amount of the ligand to be used should be, for example, within the range of 1 molar equivalent to 5 molar equivalents with respect to the transition metal to be used.

Although the solvent to be used in the present step is not particularly limited as long as it is not involved in the reaction, examples thereof may include, for example, hydrocarbons such as toluene and xylene; ethers such as 1,4-dioxane, tetrahydrofuran (hereinafter, referred to as "THF"), and dimethoxyethane (hereinafter, referred to as "DME"); amides such as N,N-dimethylformamide (hereinafter, referred to as "DMF"), N,N-dimethylacetamide (hereinafter, referred to as "DMA"), and N-methylpyrrolidone (hereinafter, referred to as "NMP"); alcohols such as ethanol, 2-propanol, and tert-butanol; water; and a mixed solvent thereof.

It is appropriate that the reaction temperature should be normally within the range of 20° C. to 200° C. although it varies depending on the types of raw materials and reagents to be used. Also, a microwave reaction apparatus may be used as necessary.

It is appropriate that the reaction time should be normally within the range of 0.1 hours to 24 hours although it varies depending on the types of raw materials to be used and the reaction temperature.

Method for Producing Compound [1-E]

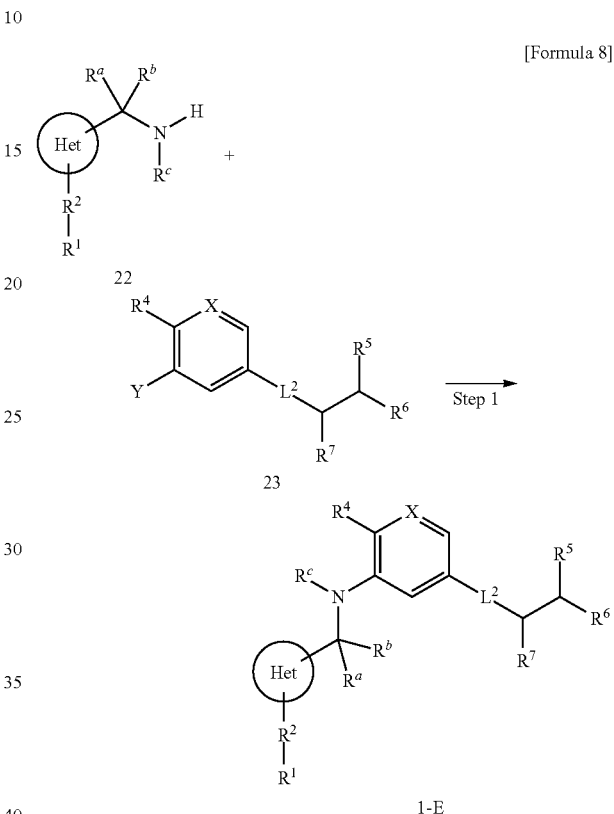

[Formula 8]

(In the formula, R$^1$, R$^2$, R$^4$, R$^5$, R$^6$, R$^7$, R$^a$, R$^b$, R$^1$, L$^2$, Het, X, and Y are as defined above.)

Step 1

The present step is a step of obtaining a compound 1-E by subjecting a compound 22 and a compound 23 to a coupling reaction in the presence of a transition metal such as palladium, and the compound 1-E can be produced by the same method as in Step 1 of the method for producing the compound 1-D described above.

A compound wherein L$^1$ is —(CR$^a$R$^b$)$_m$—NR$^c$— and R$^a$ and R$^b$ are each H can also be produced as follows.

Method for Producing Compound [1-EE]

[Formula 9]

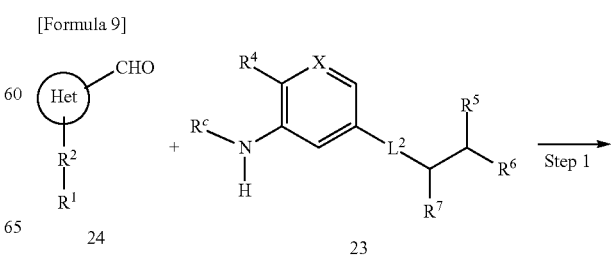

-continued

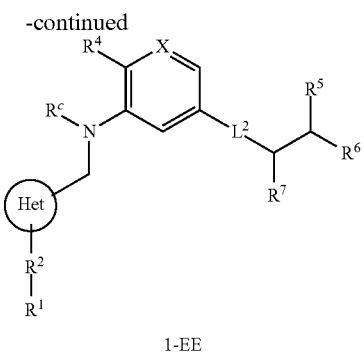

1-EE (In the formula, $R^1$, $R^2$, $R^4$, $R^5$, $R^6$, $R^7$, $R^c$, $L^2$, Het, and X are as defined above.)

Step 1

The present step is a step of obtaining a compound 1-EE by a reductive amination reaction of a compound 24 and a compound 23, and can be carried out according to a method that is publicly known as a reductive amination reaction. In the present step, imine formation (first step) and reduction of the imine moiety (second step) may be carried out sequentially.

It is appropriate that the amount of the compound 23 to be used should be within the range of 1 molar equivalent to 2.5 molar equivalents with respect to the compound 24.

In the present step, an acid or an appropriate Lewis acid may be used as necessary. Examples of the acid that can be used in the reaction may include, for example, acetic acid and the like, and examples of the Lewis acid that can be used may include, for example, tetraisopropyl orthotitanate.

When the acid is used in the present step, it is appropriate that the amount of the acid to be used should be within the range of 2 molar equivalents to 3 molar equivalents with respect to the amount of the compound 24.

When the Lewis acid is used in the present step, it is appropriate that the amount of the Lewis acid to be used should be within the range of 1.5 molar equivalents to 2 molar equivalents with respect to the amount of the compound 24.

Although the solvent to be used in the present step is not particularly limited as long as it is not involved in the reaction, examples thereof may include, for example, hydrocarbons such as toluene and xylene; ethers such as 1,4-dioxane, THF, and DME; halogenated hydrocarbons such as dichloromethane; and a mixed solvent thereof.

In the present step, it is appropriate that the reaction temperature should be normally within the range of 0° C. to 100° C. although it varies depending on the types of raw materials and reagents to be used.

In the present step, it is appropriate that the reaction time should be normally within the range of 0.1 hours to 48 hours although it varies depending on the types of raw materials to be used and the reaction temperature.

Examples of the reducing agent to be used in the present step may include, for example, sodium triacetoxyborohydride, sodium cyanoborohydride, and the like.

It is appropriate that the amount of the reducing agent to be used in the present step should be within the range of 1 molar equivalent to 2 molar equivalents with respect to the compound 24.

Although the solvent to be used in the present step is not particularly limited as long as it is not involved in the reaction, examples thereof may include, for example, hydrocarbons such as toluene and xylene; ethers such as 1,4-dioxane, THF, and DME; halogenated hydrocarbons such as dichloromethane; and a mixed solvent thereof.

Method for Producing Compound [1-F]

[Formula 10]

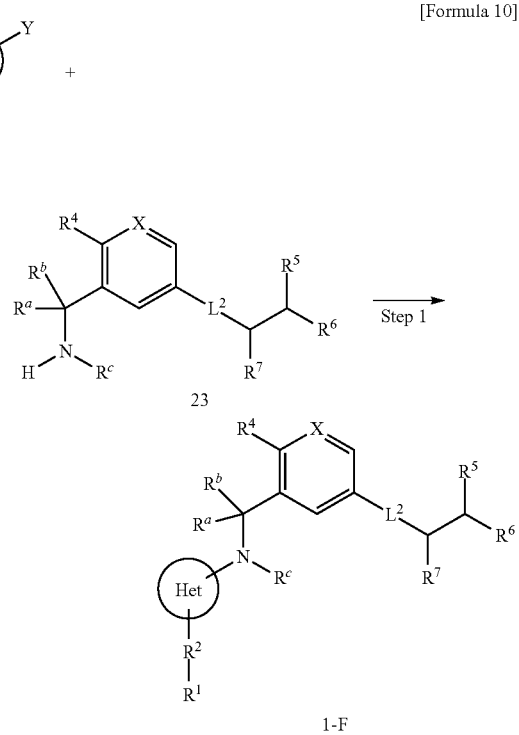

1-F (In the formula, $R^1$, $R^2$, $R^4$, $R^1$, $R^6$, $R^7$, $R^a$, $R^b$, $R^c$, $L^2$, Het, X, and Y are as defined above.)

Step 1

The present step is a step of obtaining a compound 1-F by allowing a compound 25 to react with a compound 26 in the presence of a base.

It is appropriate that the amount of the compound 26 to be used should be within the range of 0.5 molar equivalents to 3 molar equivalents with respect to the compound 25.

Examples of the base to be used in the present reaction may include pyridine, TEA, DIPEA, potassium carbonate, and sodium bicarbonate.

It is appropriate that the amount of the base to be used should be within the range of 1 molar equivalent to 10 molar equivalents with respect to the compound 25.

Although the solvent to be used is not particularly limited as long as it is not involved in the reaction, examples thereof may include, for example, alcohols such as isopropanol, 1-butanol, and 2-methoxyethanol; ethers such as THF and 1,4-dioxane; amides such as DMF, DMA, and NMP; hydrocarbons such as benzene and toluene; dimethyl sulfoxide (hereinafter, referred to as "DMSO"); acetonitrile; and a mixed solvent thereof.

In the present step, it is appropriate that the reaction temperature should be normally within the range of 20° C. to 200° C. although it varies depending on the types of raw materials and reagents to be used. Also, a microwave reaction apparatus may be used as necessary.

It is appropriate that the reaction time should be normally within the range of 1 hour to 24 hours although it varies depending on the types of raw materials to be used and the reaction temperature.

A compound wherein $L^1$ is —$NR^c$—$(CR^aR^b)_m$— and $R^a$ and $R^b$ are each H can also be produced as follows.

Method for Producing Compound [1-FF]

[Formula 11]

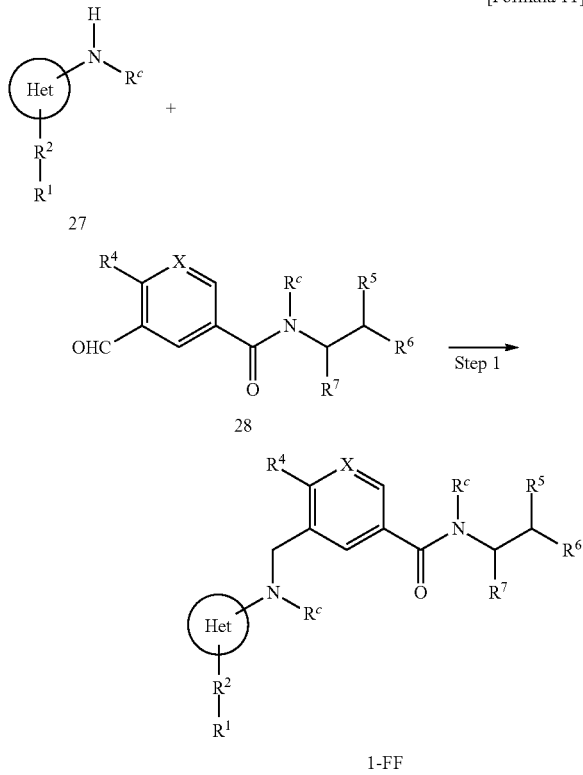

1-FF (In the formula, $R^1$, $R^2$, $R^4$, $R^5$, $R^6$, $R^7$, $R^c$, $L^2$, Het, and X are as defined above.)

Step 1

The present step is a step of obtaining a compound 1-FF by a reductive amination reaction of a compound 27 and a compound 28, and the compound 1-FF can be produced by the same method as in Step 1 of the method for producing the compound 1-EE described above.

Method for Producing Compound [1-G]

[Formula 12]

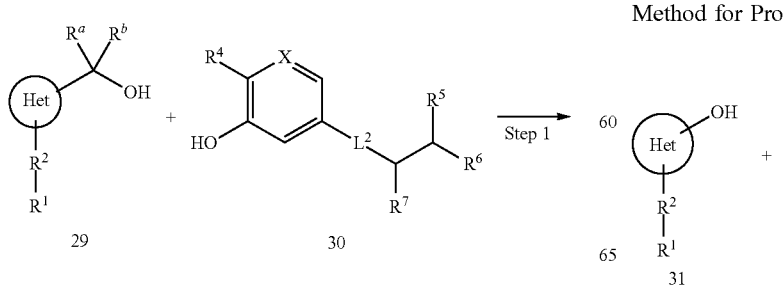

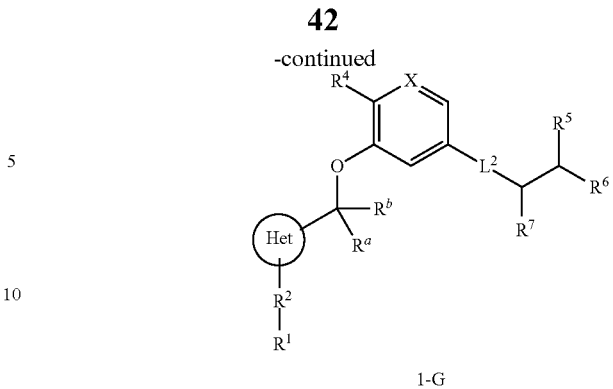

1-G (In the formula, $R^1$, $R^2$, $R^4$, $R^5$, $R^6$, $R^7$, $R^c$, $L^2$, Het, and X are as defined above.)

Step 1

The present step is a step of obtaining an ether compound 1-G by the Mitsunobu reaction of an alcohol compound 29 and an alcohol compound 30, and can be carried out according to a publicly known method.

The present step is normally carried out in an appropriate solvent in the presence of an azodicarboxylic acid ester reagent and a phosphine reagent.

It is appropriate that the amount of the compound 29 to be used should be within the range of 0.5 molar equivalents to 1.5 molar equivalents with respect to the compound 30.

Examples of the azodicarboxylic acid ester reagent to be used may include, for example, diethyl azodicarboxylate (hereinafter, referred to as "DEAD"), diisopropyl azodicarboxylate (hereinafter, referred to as "DIAD"), bis(2-methoxyethyl) azodicarboxylate (hereinafter, referred to as "DMEAD"), and the like.

Examples of the phosphine reagent to be used may include, for example, triphenylphosphine, tributylphosphine, and the like.

It is appropriate that the amount of the azodicarboxylic acid ester reagent to be used should be within the range of 1 molar equivalent to 2 molar equivalents with respect to the compound 29.

It is appropriate that the amount of the phosphine reagent to be used should be within the range of 1 molar equivalent to 2 molar equivalents with respect to the compound 29.

Although the solvent to be used is not particularly limited as long as it is not involved in the reaction, examples thereof may include, for example, hydrocarbons such as toluene and xylene; ethers such as 1,4-dioxane, THF, and DME; and a mixed solvent thereof.

In the present step, it is appropriate that the reaction temperature should be normally within the range of 0° C. to 100° C. although it varies depending on the types of raw materials and reagents to be used.

It is appropriate that the reaction time should be normally within the range of 0.5 hours to 24 hours although it varies depending on the types of raw materials to be used and the reaction temperature.

Method for Producing Compound [1-H]

[Formula 13]

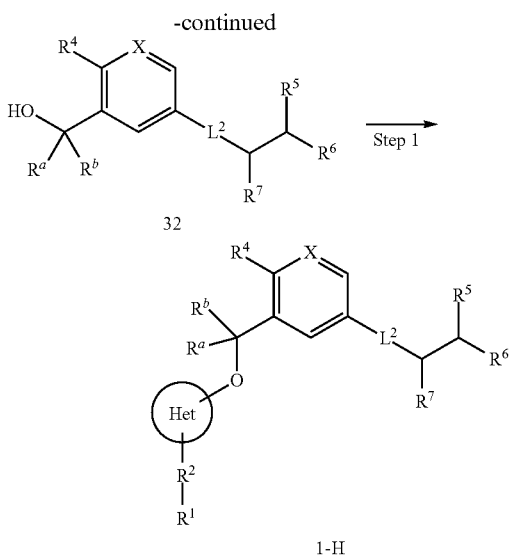

32

1-H (In the formula, $R^1$, $R^2$, $R^4$, $R^1$, $R^6$, $R^7$, $R^c$, $L^2$, Het, and X are as defined above.)

Step 1

The present step is a step of obtaining an ether compound 1-H by the Mitsunobu reaction of an alcohol compound 31 and an alcohol compound 32, and the compound 1-H can be produced by the same method as in Step 1 of the method for producing the compound 1-G described above.

Method for Producing Compound [1-I]

[Formula 14]

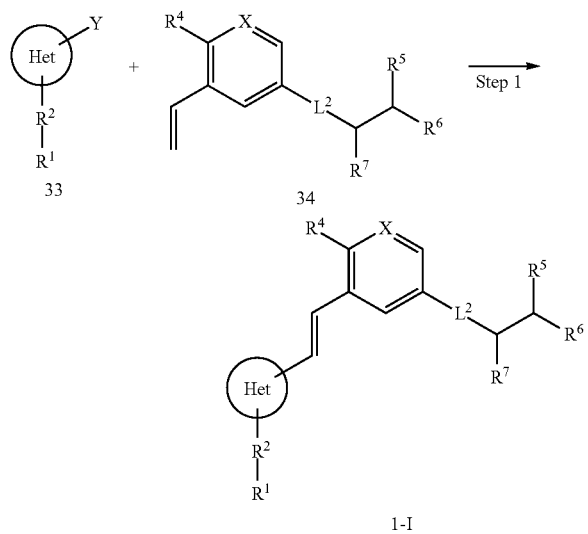

33    34

1-I (In the formula, $R^1$, $R^2$, $R^4$, $R^5$, $R^6$, $R^7$, $R^c$, $L^2$, Het, and X are as defined above. Y is a leaving group, and examples thereof may include, for example, a bromine atom, an iodine atom, and trifluoromethanesulfonate.)

Step 1

The present step is a step of obtaining a compound 1-I by subjecting a compound 33 and a compound 34 to a coupling reaction in the presence of a transition metal such as palladium.

For the present reaction, conditions normally used in a coupling reaction using a transition metal, specifically the Heck reaction, can be applied, and it can be carried out by methods described in literatures such as Org. Synth. 2005, 81, 63-76; Heck et al., J. Org. Chem. 1972, 37, 2320-2322; and Beletskaya et al., Chem. Rev. 2000, 100, 3009-3066.

It is appropriate that the amount of the compound 33 to be used should be within the range of 0.5 molar equivalents to 3 molar equivalents with respect to the compound 34.

The organometallic catalyst to be used in the present reaction is not particularly limited. Preferable examples of the organometallic catalyst may include metal catalysts such as tris(dibenzylideneacetone)bispalladium-chloroform adduct (hereinafter, referred to as "$Pd_2(dba)_3 \cdot CHCl_3$"), tris(dibenzylideneacetone)bispalladium (hereinafter, referred to as "$Pd_2(dba)_3$"), tetrakistriphenylphosphinepalladium (hereinafter, referred to as "$Pd(PPh_3)_4$"), [1,1'-bis(diphenylphosphino)ferrocene]-dichloropalladium(II)-dichloromethane adduct (hereinafter, referred to as "$Pd(dppf)Cl_2 \cdot CH_2Cl_2$"), bis(triphenylphosphine) palladium (II) dichloride (hereinafter, referred to as "$PdCl_2(PPh_3)_2$"), [1,1'-bis(di-tert-butylphosphino)ferrocene]-dichloropalladium(II) (hereinafter, referred to as "$Pd(dtbpf)Cl_2$), bis(tricyclohexylphosphine)palladium(II) dichloride (hereinafter, referred to as "$PdCl_2(PCy_3)_2$"), palladium(II) acetate (hereinafter, referred to as "$Pd(OAc)_2$"), and [1,3-bis(diphenylphosphino)propane]nickel(II), and a mixture of these metal catalysts.

It is appropriate that the amount of the transition metal to be used should be, for example, within the range of 0.01 molar equivalents to 0.3 molar equivalents with respect to the compound 33.

In the present step, a base or a salt may be used as necessary. Examples of the base or the salt to be used may include, for example, bases or salts such as potassium carbonate, cesium carbonate, sodium carbonate, sodium bicarbonate, sodium acetate, potassium acetate, trisodium phosphate, tripotassium phosphate, and solutions thereof; as well as triethylamine (hereinafter, referred to as "TEA"), N,N-diisopropylethylamine (hereinafter, referred to as "DIPEA"), lithium chloride, and copper(I) iodide.

It is appropriate that the amount of the base to be used should be, for example, within the range of 1 molar equivalent to 4 molar equivalents with respect to the compound 33.

In the present step, an appropriate ligand may be used as necessary. Examples of the ligand that can be used may include, for example, 1,1'-bis(diphenylphosphino)ferrocene (hereinafter, referred to as "dppf"), 4,5-bis(diphenylphosphino)-9,9-dimethylxanthene (hereinafter, referred to as "Xantphos"), 2-dicyclohexylphosphino-2',4',6'-triisopropylbiphenyl (hereinafter, referred to as "XPhos"), 2,2'-bis(diphenylphosphino)-1,1'-binaphthyl (hereinafter, referred to as "BINAP"), 2-dicyclohexylphosphino-2',6'-diisopropylbiphenyl (hereinafter, referred to as "RuPhos"), triphenylphosphine (hereinafter, referred to as "$PPh_3$"), tricyclohexylphosphine (hereinafter, referred to as "$PCy_3$"), and the like.

It is appropriate that the amount of the ligand to be used should be, for example, within the range of 1 molar equivalent to 5 molar equivalents with respect to the transition metal to be used.

Although the solvent to be used in the present step is not particularly limited as long as it is not involved in the reaction, examples thereof may include, for example, hydrocarbons such as toluene and xylene; ethers such as 1,4-dioxane, tetrahydrofuran (hereinafter, referred to as "THF"), and dimethoxyethane (hereinafter, referred to as "DME"); amides such as N,N-dimethylformamide (hereinafter, referred to as "DMF"), N,N-dimethylacetamide (hereinafter, referred to as "DMA"), and N-methylpyrrolidone (hereinafter, referred to as "NMP"); alcohols such as ethanol, 2-propanol, and tert-butanol; water; and a mixed solvent thereof.

It is appropriate that the reaction temperature should be normally within the range of 20° C. to 200° C. although it varies depending on the types of raw materials and reagents to be used. Also, a microwave reaction apparatus may be used as necessary.

It is appropriate that the reaction time should be normally within the range of 0.1 hours to 24 hours although it varies depending on the types of raw materials to be used and the reaction temperature.

Method for Producing Compound [1-K]

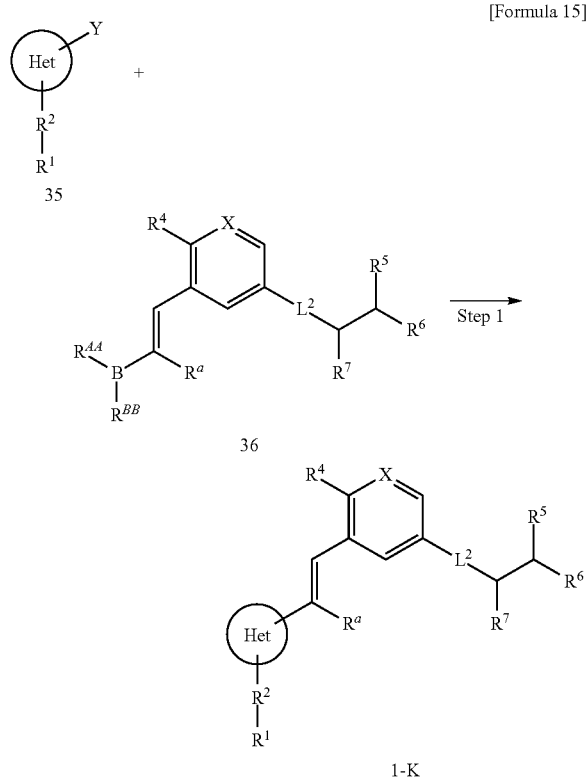

[Formula 15]

(In the formula, $R^1$, $R^2$, $R^4$, $R^5$, $R^6$, $R^7$, $R^a$, $L^2$, Het, and X are as defined above. Y is a leaving group, and examples thereof may include, for example, a bromine atom, an iodine atom, and trifluoromethanesulfonate. $R^{AA}$ and $R^{BB}$ each represent a hydroxy group, or $R^{AA}$ and $R^{BB}$ are taken together to be —O—C(CH$_3$)$_2$—C(CH$_3$)$_2$—O—, —O—(CH$_2$)$_3$—O—, or O—CH$_2$—C(CH$_3$)$_2$—CH$_2$—O—.)

Step 1

The present step is a step of obtaining a compound 1-K by subjecting a compound 35 and a compound 36 to a coupling reaction in the presence of a transition metal such as palladium.

For the present reaction, conditions normally used in a coupling reaction using a transition metal, specifically the Suzuki-Miyaura coupling reaction, can be applied, and it can be carried out by methods described in literatures such as Suzuki et al., Chem. Rev., 1995, 95, 2457-2483.

It is appropriate that the amount of the compound 36 to be used should be within the range of 0.5 molar equivalents to 3 molar equivalents with respect to the compound 35.

The organometallic catalyst to be used in the present reaction is not particularly limited. Preferable examples of the organometallic catalyst may include metal catalysts such as tris(dibenzylideneacetone)bispalladium-chloroform adduct (hereinafter, referred to as "Pd$_2$(dba)$_3$·CHCl$_3$"), tris (dibenzylideneacetone)bispalladium (hereinafter, referred to as "Pd$_2$(dba)$_3$"), tetrakistriphenylphosphinepalladium (hereinafter, referred to as "Pd(PPh$_3$)$_4$"), [1,1'-bis(diphenylphosphino)ferrocene]-dichloropalladium(II)-dichloromethane adduct (hereinafter, referred to as "Pd(dppf)Cl$_2$·CH$_2$Cl$_2$"), bis(triphenylphosphine) palladium (II) dichloride (hereinafter, referred to as "PdCl$_2$(PPh$_3$)$_2$"), [1,1'-bis(di-tert-butylphosphino)ferrocene]-dichloropalladium(II) (hereinafter, referred to as "Pd(dtbpf)Cl$_2$), bis(tricyclohexylphosphine)palladium(II) dichloride (hereinafter, referred to as "PdCl$_2$(PCy$_3$)$_2$"), palladium(II) acetate (hereinafter, referred to as "Pd(OAc)$_2$"), and [1,3-bis(diphenylphosphino)propane]nickel(II), and a mixture of these metal catalysts.

It is appropriate that the amount of the transition metal to be used should be, for example, within the range of 0.01 molar equivalents to 0.3 molar equivalents with respect to the compound 35.

In the present step, a base or a salt may be used as necessary. Examples of the base or the salt to be used may include, for example, bases or salts such as potassium carbonate, cesium carbonate, sodium carbonate, sodium bicarbonate, sodium acetate, potassium acetate, trisodium phosphate, tripotassium phosphate, and solutions thereof; as well as triethylamine (hereinafter, referred to as "TEA"), N,N-diisopropylethylamine (hereinafter, referred to as "DIPEA"), lithium chloride, and copper(I) iodide.

It is appropriate that the amount of the base to be used should be, for example, within the range of 1 molar equivalent to 4 molar equivalents with respect to the compound 35.

In the present step, an appropriate ligand may be used as necessary. Examples of the ligand that can be used may include, for example, 1,1'-bis(diphenylphosphino)ferrocene (hereinafter, referred to as "dppf"), 4,5-bis(diphenylphosphino)-9,9-dimethylxanthene (hereinafter, referred to as "Xantphos"), 2-dicyclohexylphosphino-2',4',6'-triisopropylbiphenyl (hereinafter, referred to as "XPhos"), 2,2'-bis(diphenylphosphino)-1,1'-binaphthyl (hereinafter, referred to as "BINAP"), 2-dicyclohexylphosphino-2',6'-diisopropylbiphenyl (hereinafter, referred to as "RuPhos"), triphenylphosphine (hereinafter, referred to as "PPh$_3$"), tricyclohexylphosphine (hereinafter, referred to as "PCy$_3$"), and the like.

It is appropriate that the amount of the ligand to be used should be, for example, within the range of 1 molar equivalent to 5 molar equivalents with respect to the transition metal to be used.

Although the solvent to be used in the present step is not particularly limited as long as it is not involved in the reaction, examples thereof may include, for example, hydrocarbons such as toluene and xylene; ethers such as 1,4-dioxane, tetrahydrofuran (hereinafter, referred to as "THF"), and dimethoxyethane (hereinafter, referred to as "DME"); amides such as N,N-dimethylformamide (hereinafter, referred to as "DMF"), N,N-dimethylacetamide (hereinafter, referred to as "DMA"), and N-methylpyrrolidone (hereinafter, referred to as "NMP"); alcohols such as ethanol, 2-propanol, and tert-butanol; water; and a mixed solvent thereof.

It is appropriate that the reaction temperature should be normally within the range of 20° C. to 200° C. although it varies depending on the types of raw materials and reagents to be used. Also, a microwave reaction apparatus may be used as necessary.

It is appropriate that the reaction time should be normally within the range of 0.1 hours to 24 hours although it varies depending on the types of raw materials to be used and the reaction temperature.

The compound of the present invention has an inhibitory activity against the PDGF receptor kinase, as demonstrated in Test Examples mentioned below. In addition, since the compound of the present invention has an inhibitory activity against the PDGF receptor kinase, it is effective for respiratory diseases, cancers, smooth muscle proliferative diseases, vasoproliferative diseases, autoimmune/inflammatory diseases, metabolic diseases, and vasoocclusive diseases.

Moreover, the inhibitory activity against the PDGF receptor kinase of the compound of the present invention has high selectivity for the inhibitory activity against the KIT kinase, as demonstrated in Test Examples mentioned below, and therefore, it can be expected that the compound of the present invention provides a PDGF receptor kinase inhibitor with suppressed undesirable actions, such as bone marrow suppression.

As such, the compound of the present invention or a pharmaceutically acceptable salt thereof can be used as, for example, a preventive or therapeutic agent for diseases in which the PDGF receptor kinase is involved.

Examples of the respiratory disease to which the compound of the present invention or a pharmaceutically acceptable salt thereof can be applied may include pulmonary diseases and pulmonary hypertension. Above all, pulmonary hypertension is classified as follows depending on the etiology and pathology.

pulmonary arterial hypertension (PAH);
pulmonary hypertension caused by the following left heart diseases
left heart failure with a maintained ejection fraction,
left heart failure with a reduced ejection fraction,
valvulopathy, and
congenital/acquired cardiovascular conditions leading to post-capillary PH;
pulmonary hypertension due to pulmonary diseases and/or hypoxemia caused by the diseases shown below
chronic obstructive pulmonary disease (COPD),
interstitial (restrictive) pulmonary disease,
other pulmonary diseases involving a mixed disorder of restrictive and obstructive ones,
hypoxic condition caused by a pulmonary disease, and developmental disorder;
the following pulmonary hypertensions caused by the occlusion of pulmonary artery
chronic thromboembolic pulmonary hypertension (CTEPH), and
pulmonary hypertension owing to the following diseases (sarcoma, angiosarcoma, malignant tumor, non-malignant tumor, vasculitis caused by a connective tissue disease, congenital pulmonary artery stenosis, parasite or the like, and pulmonary tumor thrombotic microangiopathy (PTTM)); and
pulmonary hypertension caused by a multifactorial mechanism for which details are unknown, caused by the diseases shown below
blood diseases (chronic hemolytic anemia, myeloproliferative disease, and the like),
systemic and metabolic diseases (for example, pulmonary Langerhans cell histiocytosis, Gaucher's disease, glycogen storage disease, neurofibroma, sarcoidosis, and the like),
others (for example, chronic renal failure with/without dialysis, fibrosing mediastinitis, and the like), and complex congenital heart malformation.

For example, the pulmonary arterial hypertension (PAH) described above encompasses the followings:
idiopathic PAH;
hereditary PAH (in particular, with abnormality in BMPR2, TBX4, ACVRL1, ENG, SMAD9, KCNK3, SMAD1, CAV1, SMAD4, ATP13A3, SOX17, AQP1, GDF2, or unknown gene);
drug- and toxicant-induced PAH;
PAH caused by diseases (Here, the "diseases" include, for example, a connective tissue disease, HIV infection, portal hypertension, congenital shunt heart disease, and schistosomiasis);
PAH long-term responders to calcium channel blockers, pulmonary veno-occlusive disease/pulmonary capillary hemangiomatosis (PVOD/PCH) (including PVOD/PCH with EIF2AK4 mutation); and
persistent pulmonary hypertension of the newborn (PPHN).

Examples of the inflammatory disease and autoimmune disease to which the compound of the present invention or a pharmaceutically acceptable salt thereof can be applied may include scleroderma, asthma, bronchiolitis obliterans, pulmonary fibrosis, systemic lupus erythematosus (SLE), mixed connective tissue disease (MCTD), Sjogren's syndrome, polymyositis/dermatomyositis, Crohn's disease, ulcerative colitis, cytopenia, irritable bowel syndrome (IBS), inflammatory bowel disease (IBD), allergic rhinitis, allergic sinusitis, interstitial pulmonary disease, idiopathic interstitial pneumonia, chronic obstructive pulmonary disease (COPD), combined pulmonary fibrosis and emphysema (CPFE), adult respiratory distress syndrome (ARDS), psoriasis, rheumatoid arthritis, mastocytosis, anaphylactic syndrome, angioedema, erythema nodosum, erythema multiforme, cutaneous vasculitis, skin inflammation/diseases, urticaria, and allergic contact dermatitis.

Examples of the cancer to which the compound of the present invention or a pharmaceutically acceptable salt thereof can be applied may include acute myelogenous leukemia (AML), hypereosinophilic syndrome, T-lymphoblastic leukemia, chronic myelomonocytic leukemia (CMML), chronic myelogenous leukemia (CML), chronic eosinophilic leukemia, bone marrow fibrosis, dermatofibrosarcoma protuberans, glioma, ovarian cancer, endometrial tumor, hepatocellular cancer, thyroid cancer, small cell lung cancer, non-small cell lung cancer, renal cancer, soft tissue sarcoma, neuroendocrine tumor, skin cancer, mesothelioma, bile duct cancer, head and neck squamous cell cancer, large bowel cancer, mesenchymoma, adenocarcinoma, pancreatic cancer, mastocytosis, and gastrointestinal stromal tumor (GIST).

Examples of the smooth muscle proliferative disease to which the compound of the present invention or a pharmaceutically acceptable salt thereof can be applied may include vascular restenosis, atherosclerosis/arteriosclerosis obliterans, moyamoya disease (idiopathic occlusion of the circle of Willis), leiomyoma, lymphangioleiomyomatosis, Williams' syndrome, tuberous sclerosis, angina pectoris, myocardial infarction, peripheral arterial disease, hypertrophic/dilated cardiomyopathy cardiomyopathy, and constrictive/diastolic cardiomyopathy.

Examples of the vasoproliferative disease to which the compound of the present invention or a pharmaceutically acceptable salt thereof can be applied may include age-related macular degeneration (AMD), Osler's disease (hereditary hemorrhagic telangiectasia), hemangioma, tumor angiogenesis, and arteriovenous fistula.

Examples of the metabolic disease to which the compound of the present invention or a pharmaceutically acceptable salt thereof can be applied may include diabetes mellitus (type 1 diabetes mellitus or type 2 diabetes mellitus).

The compound of the present invention can be used as a therapeutic agent for a variety of diseases as described above in mammals such as human, mouse, rat, rabbit, dog, cat, cow, horse, pig, and monkey, as it is or as a pharmaceutical composition containing the same at, for example, 0.001% to 99.5%, preferably 0.1% to 90%, obtained by mixing the compound with a pharmacologically acceptable carrier or the like.

Although it is desirable to adjust the dose as a medicament in consideration of the conditions of the patient such as age, weight, and type and severity of disease, administration route, type of the compound of the present invention, whether it is a salt or not, and the type of the salt, normally, it is appropriate that the effective amount of the compound of the present invention or a pharmaceutically acceptable salt thereof for adults, in the case of oral administration, should be within the range of 0.01 mg to 5 g/adult, preferably within the range of 1 mg to 500 mg/adult, per day. In some cases, a smaller amount may be sufficient or a larger amount may be required. Normally, the dosage can be administered once a day or can be divided and administered several times a day, or in the case of intravenous administration, the dosage can be administered rapidly or persistently within 24 hours.

One or more hydrogen, carbon, and/or other atoms in the compound of the present invention may each be replaced with an isotope of hydrogen, carbon, and/or other atoms. Examples of such an isotope include $^2$H, $^3$H, $^{11}$C, $^{13}$C, $^{14}$C, $^{15}$N, $^{18}$O, $^{17}$O, $^{31}$P, $^{32}$P, $^{35}$S, $^{18}$F, $^{123}$I, and $^{36}$Cl, that is, hydrogen, carbon, nitrogen, oxygen, phosphorus, sulfur, fluorine, iodine and chlorine. The compound substituted with such an isotope is also useful as a medical product and the present invention encompasses all radiolabeled products of the compound of the present invention.

Hereinafter, the present invention will be described in further detail with reference to Comparative Examples, Examples, and Test Examples; however, the present invention is not limited to those examples.

EXAMPLES

In Examples, the following abbreviations will be used.
TFA: Trifluoroacetic acid
Pd—C: Palladium-carbon
Pd$_2$(dba)$_3$: Tris(dibenzylideneacetone)bispalladium
Pd(PPh$_3$)$_4$: Tetrakistriphenylphosphinepalladium
PdCl$_2$ (PPh$_3$)$_2$: Bis(triphenylphosphine) palladium (II) dichloride
Pd(OAc)$_2$: Palladium(II) acetate
Xantphos: 4,5-Bis(diphenylphosphino)-9,9-dimethylxanthene
BINAP: 2,2'-Bis(diphenylphosphino)-1,1'-binaphthyl
PPh$_3$: Triphenylphosphine
Boc$_2$O: Di-tert-butyl dicarbonate
HATU: O-(7-Azabenzotriazol-1-yl)-N,N,N',N'-tetramethyluronium hexafluorophosphate
HBTU: O-(Benzotriazol-1-yl)-N,N,N',N'-tetramethyluronium hexafluorophosphate
THF: Tetrahydrofuran
DME: Dimethoxyethane
DMF: Dimethylformamide
DMSO: Dimethylsulfoxide
NMP: N-Methylpyrrolidone
DIPEA: N,N-Diisopropylethylamine
TEA: Triethylamine
BH$_3$-THF: Borane-tetrahydrofuran complex
CDCl$_3$: Deuterated chloroform
TLC: Thin layer chromatography
MS: Mass spectrometry
LCMS: High performance liquid chromatography-mass spectrometry
ESI: Electron Spray Ionization
M: Molar concentration (mol/L)

MS was measured with LCMS. ESI was used as a method for ionization. Observed values of the mass spectrometry are expressed as m/z.

The measurement conditions for LCMS were as follows:
Analytical instrument: ACQUITY UPLC MS/PDA system (manufactured by Waters Corporation);
Mass spectrometer: Waters 3100 MS detector;
Photodiode array detector: ACQUITY PDA detector (UV detection wavelength: 210 to 400 nm);
Column: Acquity BEH C18, 1.7 µm, 2.1×50 mm;
Flow rate: 0.5 mL/min;
Colum temperature: 40° C.;
Solvent;
solution A: 0.1% formic acid/H$_2$O (v/v; the same hereinafter)
solution B: 0.1% formic acid/acetonitrile.

The $^1$H NMR spectrum was measured by using JNM-ECS400 Nuclear Magnetic Resonance Spectrometer (manufactured by JEOL RESONANCE Inc.). The observed peaks were expressed as chemical shift values δ (ppm) (s=singlet, d=doublet, t=triplet, q=quartet, brs=broad singlet, m=multiplet, dd=double doublet, ddd=double double doublet, and dt=double triplet).

In the microwave experiment, Initiator 60 (manufactured by Biotage AB) was used. This can achieve a temperature of 40 to 250° C. and can reach a pressure up to 20 bar.

The names of compounds in the present specification are given by using a naming software, ACD/NAME (registered trademark, Advanced Chemistry Development Inc.) conforming to the rules of IUPAC, by using ChemBioDraw (version 14.0, manufactured by Cambridge Soft Corporation), or in accordance with the rules of IUPAC nomenclature.

In the names of compounds, the descriptors "r" and "s" (lower case) refer to the stereochemistry of pseudoasymmetric carbon atom according the IUPAC rules.

Reference Example 1: 5-[(Cyclopropylmethyl)amino]pyridine-3-carboxylic acid

[Step 1] Production of methyl 5-[(cyclopropylmethyl)amino]pyridine-3-carboxylate To methyl 5-bromopyridine-3-carboxylate (15.0 g), 1-cyclopropylmethanamine (9.9 g), BINAP (8.6 g), cesium carbonate (45.2 g), and Pd(OAc)$_2$ (1.6 g), 1,4-dioxane (139 mL) was added. After degassing, the reaction mixture was stirred under argon atmosphere at 80° C. overnight. Insolubles were filtered off using Celite® and the solvent was then distilled off under reduced pressure. The residue was purified by silica gel column chromatography to afford the title compound (8.4 g). MS (m/z): 207.2 [M+H]+

[Step 2] Production of 5-[(cyclopropylmethyl)amino]pyridine-3-carboxylic acid

To a solution of methyl 5-[(cyclopropylmethyl)amino]pyridine-3-carboxylate (8.4 g) obtained in Step 1 in THF (81 mL) and methanol (81 mL), lithium hydroxide monohydrate (3.4 g) and water (81 mL) were added, and the reaction mixture was stirred at room temperature overnight. The solvent was distilled off under reduced pressure. The reaction mixture was diluted with water and then neutralized by adding 1M hydrochloric acid. The precipitated deposits were collected by filtration to afford the title compound (6.8 g). MS (m/z): 193.2 [M+H]+

Reference Example 2: 5-[Cyclopropyl(methyl)amino]pyridine-3-carboxylic acid

[Step 1] Production of methyl 5-[cyclopropyl(methyl)amino]pyridine-3-carboxylate By using N-methylcyclopropanamine (9.9 g) instead of 1-cyclopropylmethanamine, the title compound (6.6 g) was obtained by the method as described in Step 1 of Reference Example 1. MS (m/z): 207.4 [M+H]+

[Step 2] Production of 5-[cyclopropyl(methyl)amino]pyridine-3-carboxylic acid

By using methyl 5-[cyclopropyl(methyl)amino]pyridine-3-carboxylate (6.6 g) obtained in Step 1 instead of methyl 5-[(cyclopropylmethyl)amino]pyridine-3-carboxylate, the title compound (4.3 g) was obtained by the method as described in Step 2 of Reference Example 1. MS (m/z): 193.4 [M+H]+

Reference Example 3: 5-[(3,3-Difluorocyclobutyl)oxy]pyridine-3-carboxylic acid

[Step 1] Production of methyl 5-[(3,3-difluorocyclobutyl)oxy]pyridine-3-carboxylate To a solution of methyl 5-hydroxypyridine-3-carboxylate (250 mg), 3,3-difluorocyclobutan-1-ol (212 mg), and PPh3 (599 mg) in THF (4.1 mL), diisopropyl azodicarboxylate (40% solution in toluene, 1.12 mL) was added, and the reaction mixture was stirred at 60° C. for 2 hours. The reaction solution was concentrated under reduced pressure, and the obtained residue was purified by silica gel column chromatography to afford the title compound (170 mg). MS (m/z): 244.4 [M+H]+

[Step 2] Production of 5-[(3,3-difluorocyclobutyl)oxy]pyridine-3-carboxylic acid By using methyl 5-[(3,3-difluorocyclobutyl)oxy]pyridine-3-carboxylate (170 mg) obtained in Step 1 instead of methyl 5-[(cyclopropylmethyl)amino]pyridine-3-carboxylate, the title compound (84 mg) was obtained by the method as described in Step 2 of Reference Example 1.

Reference Example 4: 5-[(4,4-Difluorocyclohexyl)oxy]pyridine-3-carboxylic acid

[Step 1] Production of methyl 5-[(4,4-difluorocyclohexyl)oxy]pyridine-3-carboxylate By using 4,4-difluorocyclohexan-1-ol instead of 3,3-difluorocyclobutan-1-ol, the title compound (450 mg) was obtained by the method as described in Step 1 of Reference Example 3. MS (m/z): 272.2 [M+H]+

[Step 2] Production of 5-[(4,4-difluorocyclohexyl)oxy]pyridine-3-carboxylic acid By using methyl 5-[(4,4-difluorocyclohexyl)oxy]pyridine-3-carboxylate (450 mg) obtained in Step 1 instead of methyl 5-[(cyclopropylmethyl)amino]pyridine-3-carboxylate, the title compound (350 mg) was obtained by the method as described in Step 2 of Reference Example 1. MS (m/z): 258.2 [M+H]+

Reference Example 5: 5-[(1-Methylcyclopropyl)methoxy]pyridine-3-carboxylic acid

[Step 1] Production of methyl 5-[(1-methylcyclopropyl)methoxy]pyridine-3-carboxylate By using (1-methylcyclopropyl)methanol (500 mg) instead of 3,3-difluorocyclobutan-1-ol, the title compound (540 mg) was obtained by the method as described in Step 1 of Reference Example 3. MS (m/z): 222.1 [M+H]+

[Step 2] Production of 5-[(1-methylcyclopropyl)methoxy]pyridine-3-carboxylic acid By using methyl 5-[(1-methylcyclopropyl)methoxy]pyridine-3-carboxylate (540 mg) obtained in Step 1 instead of methyl 5-[(cyclopropylmethyl)amino]pyridine-3-carboxylate, the title compound (340 mg) was obtained by the method as described in Step 2 of Reference Example 1. MS (m/z): 208.2 [M+H]+

Reference Example 6: 5-[(3,3-Difluorocyclobutyl)methoxy]pyridine-3-carboxylic acid

[Step 1] Production of methyl 5-[(3,3-difluorocyclobutyl)methoxy]pyridine-3-carboxylate By using (3,3-difluorocyclobutyl)methanol (500 mg) instead of 3,3-difluorocyclobutan-1-ol, the title compound (1.10 g) was obtained by the method as described in Step 1 of Reference Example 3. MS (m/z): 258.1 [M+H]+

[Step 2] Production of 5-[(3,3-difluorocyclobutyl)methoxy]pyridine-3-carboxylic acid By using methyl 5-[(3,3-difluorocyclobutyl)methoxy]pyridine-3-carboxylate (1.10 g) obtained in Step 1 instead of methyl 5-[(cyclopropylmethyl)amino]pyridine-3-carboxylate, the title compound (580 mg) was obtained by the method as described in Step 2 of Reference Example 1. MS (m/z): 244.2 [M+H]+

Reference Example 7: 3-Amino-N-[(1S,2S)-2-hydroxycyclohexyl]-4-methylbenzamide

To a suspension of 3-amino-4-methylbenzoic acid (5.00 g), (1S,2S)-2-aminocyclohexan-1-ol hydrochloride (5.52 g), and HBTU (15.1 g) in THF (165 mL), DIPEA (17.2 mL) was added, and the reaction mixture was stirred at room temperature for 2 hours. The reaction solution was diluted with ethyl acetate, and the organic layer was washed with saturated aqueous sodium bicarbonate solution and saturated saline solution. The organic layer was dried over anhydrous magnesium sulfate, and the solvent was then distilled off under reduced pressure. Ethyl acetate was added to the obtained residue to suspend it, and the deposits were collected by filtration to afford the title compound (6.10 g). MS (m/z): 249.2 [M+H]$^+$ Reference Example 8: Methyl 4-chloro-3-ethynylbenzoate

[Step 1] Production of methyl 4-chloro-3-[(trimethylsilyl)ethynyl]benzoate

To methyl 4-chloro-3-iodobenzoate (8.15 g), ethynyl(trimethyl)silane (2.78 g), copper iodide (570 mg), Pd(PPh$_3$)$_4$ (3.18 g), and TEA (55 mL), THF (27.5 mL) was added. After degassing, the reaction mixture was stirred under argon atmosphere at 45° C. overnight. Insolubles were filtered off using Celite® and the solvent was then distilled off under reduced pressure. The residue was purified by silica gel column chromatography to afford the title compound (6.8 g).

[Step 2] Production of methyl 4-chloro-3-ethynylbenzoate

Methyl 4-chloro-3-[(trimethylsilyl)ethynyl]benzoate (6.8 g) obtained in Step 1 was dissolved in THF (85 mL), TBAF (1M THF solution, 31 mL) was added thereto, and the reaction mixture was stirred at room temperature for 30 minutes. The reaction solution was concentrated under reduced pressure, and the obtained residue was purified by silica gel column chromatography to afford the title compound (2.6 g).

Reference Example 9: 3-Ethynyl-N-[(1S,2S)-2-hydroxycyclohexyl]-4-methylbenzamide By using 3-ethynyl-4-methylbenzoic acid (500 mg) instead of 3-amino-4-methylbenzoic acid, the title compound (570 mg) was obtained by the method as described in Reference Example 7. MS (m/z): 258.2 [M+H]$^+$ Reference Example 10: 2-(5-Ethynylpyridin-3-yl)pyrimidine

[Step 1] Production of 2-[5-(methoxymethoxy)pyridin-3-yl]pyrimidine

To 3-bromo-5-(methoxymethoxy)pyridine (4.0 g), bis(pinacolato)diboron (5.6 g), potassium acetate (3.6 g), and Pd(dppf)Cl$_2$·CH$_2$Cl$_2$ (1.5 g), 1,4-dioxane (73 mL) was added. After degassing, the reaction mixture was stirred under argon atmosphere at 80° C. for 2.5 hours. Then, 2-bromopyrimidine (3.5 g), potassium carbonate (5.1 g), and water (0.5 mL) were added thereto, and the reaction mixture was stirred at 85° C. overnight. The reaction solution was diluted with ethyl acetate, and the organic layer was washed with water. The organic layer was dried over anhydrous sodium sulfate, and the solvent was then distilled off under reduced pressure. The obtained residue was purified by silica gel column chromatography to afford the title compound (3.6 g). MS (m/z): 218.4 [M+H]$^+$

[Step 2] Production of 5-(pyrimidin-2-yl)pyridin-3-ol

2-[5-(Methoxymethoxy)pyridin-3-yl]pyrimidine (4.11 g) obtained in Step 1 was dissolved in THF (38 mL), 35% hydrochloric acid (1.4 mL) was added thereto, and the reaction mixture was stirred at room temperature overnight. The reaction solution was concentrated under reduced pressure. Aqueous sodium bicarbonate solution was added to the obtained residue to neutralize it. The resulting deposits were collected by filtration to afford the title compound (2.51 g). MS (m/z): 174.4 [M+H]$^+$

[Step 3] Production of 5-(pyrimidin-2-yl)pyridin-3-yl trifluoromethanesulfonate

To a solution of 5-(pyrimidin-2-yl)pyridin-3-ol (2.00 g) obtained in Step 2 and TEA (2.10 mL) in dichloromethane (38 mL), trifluoromethanesulfonic anhydride (2.27 mL) was added dropwise under ice cooling, and the reaction mixture was stirred at the same temperature for 1 hour. The reaction solution was concentrated under reduced pressure, and the obtained residue was purified by silica gel column chromatography to afford the title compound (770 mg). MS (m/z): 306.4 [M+H]$^+$

[Step 4] Production of 2-{5-[(trimethylsilyl)ethynyl]pyridin-3-yl}pyrimidine

By using 5-(pyrimidin-2-yl)pyridin-3-yl trifluoromethanesulfonate (770 mg) obtained in Step 3 instead of methyl 4-chloro-3-iodobenzoate, the title compound (570 mg) was obtained by the method as described in Step 1 of Reference Example 8. MS (m/z): 254.5 [M+H]$^+$

[Step 5] Production of 2-(5-ethynylpyridin-3-yl)pyrimidine

By using 2-{5-[(trimethylsilyl)ethynyl]pyridin-3-yl}pyrimidine (570 mg) obtained in Step 4 instead of methyl 4-chloro-3-[(trimethylsilyl)ethynyl]benzoate, the title compound (350 mg) was obtained by the method as described in Step 2 of Reference Example 8. MS (m/z): 182.4 [M+H]$^+$ Reference Example 11: 3-Bromo-4-chloro-N-[(1S,2S)-2-hydroxycyclohexyl]benzamide By using 3-bromo-4-chlorobenzoic acid (250 mg) instead of 3-amino-4-methylbenzoic acid, the title compound (315 mg) was obtained by the method as described in Reference Example 7. MS (m/z): 332.4 [M+H]$^+$ Reference Example 12: 6-Bromo-N-(cyclopropylmethyl)pyrazin-2-amine To a solution of 2,6-dibromopyrazine (500 mg) in DMF (1 mL), 1-cyclopropylmethanamine (449 mg) and potassium carbonate (871 mg) were added, and the reaction mixture was sealed in a pressure resistant stainless steel container and stirred at 120° C. for 8 hours. The reaction solution was diluted with ethyl acetate. After washing it with water and saturated saline solution, the solvent was distilled off under reduced pressure. The obtained residue was purified by silica gel column chromatography to afford the title compound (400 mg).

Reference Example 13: 5-Ethynyl-N-[(1S,2S)-2-hydroxycyclohexyl]-6-methylpyridine-3-carboxamide

[Step 1] Production of 5-bromo-N-[(1S,2S)-2-hydroxycyclohexyl]-6-methylpyridine-3-carboxamide By using 5-bromo-6-methylpyridine-3-carboxylic acid (250 mg) instead of 3-amino-4-methylbenzoic acid, the title compound (380 mg) was obtained by the method as described in Reference Example 7. MS (m/z): 313.4 [M+H]$^+$

[Step 2] Production of N-[(1S,2S)-2-hydroxycyclohexyl]-6-methyl-5-[(trimethylsilyl)ethynyl]pyridine-3-carboxamide By using 5-bromo-N-[(1S,2S)-2-hydroxycyclohexyl]-6-methylpyridine-3-carboxamide (100 mg) obtained in Step 1 instead of methyl 4-chloro-3-iodobenzoate, the title compound (40 mg) was obtained by the method as described in Step 1 of Reference Example 8. MS (m/z): 331.5 [M+H]$^+$

[Step 3] Production of 5-ethynyl-N-[(1S,2S)-2-hydroxycyclohexyl]-6-methylpyridine-3-carboxamide By using N-[(1S,2S)-2-hydroxycyclohexyl]-6-methyl-5-[(trimethylsilyl)ethynyl]pyridine-3-carboxamide (40 mg) obtained in Step 2 instead of methyl 4-chloro-3-[(trimethylsilyl)ethynyl]benzoate, the title compound (23 mg) was obtained by the method as described in Step 2 of Reference Example 8. MS (m/z): 259.5 [M+H]$^+$ Reference Example 14: 2-(Isoquinolin-4-yl)pyrimidin-4-amine To 2-chloropyrimidin-4-amine (200 mg), isoquinolin-4-ylboronic acid (294 mg), 1M aqueous sodium carbonate solution (3.1 mL), and Pd(dppf)Cl$_2$·CH$_2$Cl$_2$ (126 mg), 1,4-dioxane (5 mL) was added. After degassing and replacing with argon, the reaction mixture was stirred under argon atmosphere at 90° C. for 2 hours. The reaction solution was concentrated under reduced pressure, and the obtained residue was purified by silica gel column chromatography to afford the title compound (300 mg).

Reference Example 15: (1S)-1-(5-Phenylpyridin-3-yl)ethan-1-amine

By using (1S)-1-(5-bromopyridin-3-yl)ethan-1-amine hydrochloride (300 mg) and phenylboronic acid (185 mg) instead of 2-chloropyrimidin-4-amine and isoquinolin-4-ylboronic acid, the title compound (280 mg) was obtained by the method as described in Reference Example 14. MS (m/z): 199.2 [M+H]$^+$ Reference Example 16: (1S)-1-([3,3'-Bipyridin]-5-yl)ethan-1-amine

[Step 1] Production of (SS)-N-[(1E)-1-(5-bromopyridin-3-yl)ethylidene]-2-methylpropane-2-sulfinamide 1-(5-Bromopyridin-3-yl)ethan-1-one (25 g) and (SS)-2-methylpropane-2-sulfinamide (18.2 g) were dissolved in THF (500 mL), tetraethyl orthotitanate (57 g) was added thereto, and the reaction mixture was stirred at 65° C. overnight. The reaction solution was diluted with ethyl acetate, and water was added thereto. The reaction solution was filtered through Celite®, and the solvent was distilled off under reduced pressure. The residue was purified by silica gel column chromatography to afford the title compound (34 g). MS (m/z): 303.0 [M+H]$^+$

[Step 2] Production of (SS)-N-[(1S)-1-(5-bromopyridin-3-yl)ethyl]-2-methylpropane-2-sulfinamide A suspension of dichloro(p-cymene)ruthenium(II) dimer (6.86 g), 2-amino-2-methyl-1-propanol (2.14 mL), and Molecular Sieve 4A (34 g) in 2-propanol (560 mL) was stirred under argon atmosphere at 80° C. for 30 minutes. Then, while stirring the reaction solution at 50° C., a solution of (SS)-N-[(1E)-1-(5-bromopyridin-3-yl)ethylidene]-2-methylpropane-2-sulfinamide (34 g) obtained in Step 1 in 2-propanol (9 mL) and potassium tert-butoxide (6.29 g) were added thereto, and the reaction mixture was stirred at the same temperature for 6 hours. The reaction solution was filtered through Celite®, and the solvent was distilled off under reduced pressure. The residue was purified by silica gel column chromatography to afford the title compound (24.2 g). MS (m/z): 305.1 [M+H]$^+$

[Step 3] Production of (SS)-N-[(1S)-1-([3,3'-bipyridin]-5-yl)ethyl]-2-methylpropane-2-sulfinamide By using (SS)-N-[(1S)-1-(5-bromopyridin-3-yl)ethyl]-2-methylpropane-2-sulfinamide (23.2 g) obtained in Step 2 and pyridin-3-ylboronic acid (11.2 g) instead of 2-chloropyrimidin-4-amine and isoquinolin-4-ylboronic acid, the title compound (22.7 g) was obtained by the method as described in Reference Example 14. MS (m/z): 304.2 [M+H]$^+$

[Step 4] Production of (1S)-1-([3,3'-bipyridin]-5-yl)ethan-1-amine

To a solution of (SS)-N-[(1S)-1-([3,3'-bipyridin]-5-yl)ethyl]-2-methylpropane-2-sulfinamide (22.7 g) obtained in Step 3 in methanol (150 mL), hydrogen chloride (2M methanol solution, 5.46 mL) was added under ice cooling, and the reaction mixture was stirred at room temperature for 3 hours. The reaction solution was concentrated under reduced pressure, and the obtained residue was purified by column chromatography using amino modified spherical silica gel to afford the title compound (12.9 g). MS (m/z): 200.2 [M+H]$^+$ Reference Example 17: (1S)-1-[5-(Phenylethynyl)pyridin-3-yl]ethan-1-amine dihydrochloride

[Step 1] Production of (SS)-2-methyl-N-{(1S)-1-[5-(phenylethynyl)pyridin-3-yl]ethyl}propane-2-sulfinamide By using (SS)-N-[(1S)-1-(5-bromopyridin-3-yl)ethyl]-2-methylpropane-2-sulfinamide (500 mg) obtained in Step 2 of Reference Example 16 and ethynylbenzene (335 mg) instead of methyl 4-chloro-3-iodobenzoate and ethynyl(trimethyl)silane, the title compound (530 mg) was obtained by the method as described in Step 1 of Reference Example 8. MS (m/z): 327.2 [M+H]$^+$

[Step 2]: Production of (1S)-1-[5-(phenylethynyl)pyridin-3-yl]ethan-1-amine dihydrochloride To a solution of (SS)-2-methyl-N-{(1S)-1-[5-(phenylethynyl)pyridin-3-yl]ethyl}propane-2-sulfinamide (530 mg) obtained in Step 1 in methanol (8.1 mL), hydrogen chloride (2M methanol solution, 0.18 mL) was added under ice cooling, and the reaction mixture was stirred at room temperature overnight. The reaction solution was concentrated under reduced pressure, and ethyl acetate was added to the obtained residue to suspend it. The deposits were collected by filtration to afford the title compound (500 mg). MS (m/z): 223.2 [M+H]$^+$ Reference Example 18: (1S)-1-[5-(Pyrimidin-2-yl)pyridin-3-yl]ethan-1-amine

[Step 1] Production of (SS)-2-methyl-N-{(1S)-1-[5-(pyrimidin-2-yl)pyridin-3-yl]ethyl}propane-2-sulfinamide By using (SS)-N-[(1S)-1-(5-bromopyridin-3-yl)ethyl]-2-methylpropane-2-sulfinamide (600 mg) obtained in Step 2 of Reference Example 16 instead of 3-bromo-5-(methoxymethoxy)pyridine, the title compound (420 mg) was obtained by the method as described in Step 1 of Reference Example 10. MS (m/z): 305.4 [M+H]$^+$

[Step 2]: Production of (1S)-1-[5-(pyrimidine-2-yl)pyridin-3-yl]ethan-1-amine

By using (SS)-2-methyl-N-{(1S)-1-[5-(pyrimidin-2-yl)pyridin-3-yl]ethyl}propane-2-sulfinamide (420 mg) obtained in Step 1 instead of (SS)-N-[(1S)-1-([3,3'-bipyridin]-5-yl)ethyl]-2-methylpropane-2-sulfinamide, the title compound (200 mg) was obtained by the method as described in Step 4 of Reference Example 16. MS (m/z): 201.3 [M+H]$^+$ Reference Example 19: Pyrazolo[5,1-b][1,3]thiazole-7-carbaldehyde

[Step 1] Production of (pyrazolo[5,1-b][1,3]thiazol-7-yl)methanol

To a solution of pyrazolo[5,1-b][1,3]thiazole-7-carboxylic acid (100 mg) in THF (2 mL), lithium aluminum hydride (1M hexane solution, 1.5 mL) was added, and the reaction mixture was stirred at 50° C. for 5 hours. To the reaction solution, methanol and potassium sodium L-(+)-tartrate tetrahydrate were added at 0° C., and the reaction mixture was stirred at room temperature overnight. The reaction solution was concentrated under reduced pressure, and the obtained residue was purified by silica gel column chromatography to afford the title compound (57 mg). MS (m/z): 155.3 [M+H]$^+$

[Step 2] Production of pyrazolo[5,1-b][1,3]thiazole-7-carbaldehyde

To a solution of (pyrazolo[5,1-b][1,3]thiazol-7-yl)methanol (57 mg) obtained in Step 1 in THF (1.2 mL), manganese dioxide (160 mg) was added, and the reaction mixture was stirred at room temperature overnight. After filtering the reaction solution to remove insolubles, the filtrate was concentrated under reduced pressure to afford to the title compound (42 mg).

Reference Example 20: 5-Amino-N-[(1S,2S)-2-hydroxycyclohexyl]-6-methylpyridine-3-carboxamide By using 5-amino-6-methylpyridine-3-carboxylic acid (915 mg) instead of 3-amino-4-methylbenzoic acid, the title compound (1.17 g) was obtained by the method as described in Reference Example 7. MS (m/z): 250.2 [M+H]$^+$ Reference Example 21: N-(5-Formylpyridin-2-yl)morpholine-4-carboxamide

[Step 1] Production of phenyl (5-formylpyridin-2-yl)carbamate

To a solution of 6-aminopyridine-3-carbaldehyde (250 mg) in THF (5.1 mL), TEA (0.57 mL) and phenyl chloroformate (304 mg) were added, and the reaction mixture was stirred at room temperature overnight. The reaction solution was concentrated under reduced pressure, and the obtained residue was purified by silica gel column chromatography to afford the title compound (246 mg). MS (m/z): 243.2 [M+H]$^+$

[Step 2] Production of N-(5-formylpyridin-2-yl)morpholine-4-carboxamide

To a solution of phenyl (5-formylpyridin-2-yl)carbamate (40 mg) obtained in Step 1 in NMP (0.34 mL), morpholine (43 mg) and TEA (0.072 mL) were added, and the reaction mixture was stirred at room temperature for 3 hours. The reaction solution was concentrated under reduced pressure, and the obtained residue was purified by silica gel column chromatography to afford the title compound (246 mg). MS (m/z): 236.1 [M+H]$^+$ Reference Example 22: N-Cyclopropyl-N'-(5-formylpyridin-2-yl)-N-methylurea By using N-methylcyclopropanamine (94 mg) instead of morpholine, the title compound (21 mg) was obtained by the method as described in Step 2 of Reference Example 21. MS (m/z): 220.1 [M+H]$^+$ Reference Example 23: tert-Butyl 7-formyl-2,3-dihydro-4H-pyrido[3,2-b][1,4]oxazine-4-carboxylate

[Step 1] Production of tert-butyl 7-bromo-2,3-dihydro-4H-pyrido[3,2-b][1,4]oxazine-4-carboxylate To a solution of 7-bromo-3,4-dihydro-2H-pyrido[3,2-b][1,4]oxazine (160 mg) in THF (2.5 mL), TEA (0.01 mL), Boc$_2$O (0.19 mL), and DMAP (4.5 mg) were added, and the reaction mixture was stirred at room temperature overnight. The reaction solution was concentrated under reduced pressure, and the obtained residue was purified by silica gel column chromatography to afford the title compound (177 mg). MS (m/z): 315.1 [M+H]$^+$

[Step 2] Production of tert-butyl 7-ethenyl-2,3-dihydro-4H-pyrido[3,2-b][1,4]oxazine-4-carboxylate By using tert-butyl 7-bromo-2,3-dihydro-4H-pyrido[3,2-b][1,4]oxazine-4-carboxylate (177 mg) obtained in Step 1 and 2-ethenyl-4,4,5,5-tetramethyl-1,3,2-dioxaborolane (172 mg) instead of 2-chloropyrimidin-4-amine and isoquinolin- 4-ylboronic acid, the title compound (118 mg) was obtained by the method as described in Reference Example 14. MS (m/z): 263.2 [M+H]$^+$

[Step 3] Production of tert-butyl 7-formyl-2,3-dihydro-4H-pyrido[3,2-b][1,4]oxazine-4-carboxylate In a solution of tert-butyl 7-ethenyl-2,3-dihydro-4H-pyrido[3,2-b][1,4]oxazine-4-carboxylate (118 mg) obtained in Step 2 in dichloromethane (2 mL), bubbling with $O_3$ was carried out at −78° C. over 30 minutes. Then, argon gas was bubbled into the solution until it became colorless. Triphenylphosphine (142 mg) was added thereto, and the reaction mixture was stirred at room temperature overnight. Water was added to the reaction solution, and the reaction mixture was extracted with dichloromethane. After drying the organic layer over anhydrous sodium sulfate, the solvent was removed under reduced pressure to afford the title compound as a crude product.

Reference Example 24:
6-(1H-1,2,3-Triazol-1-yl)pyridine-3-carbaldehyde

[Step 1] Production of 5-ethenyl-2-(1H-1,2,3-triazol-1-yl)pyridine

By using 5-bromo-2-(1H-1,2,3-triazol-1-yl)pyridine (142 mg) (for example, synthesized by the method as described in WO 2006/038100) and 2-ethenyl-4,4,5,5-tetramethyl-1,3,2-dioxaborolane (117 mg) instead of 2-chloropyrimidin-4-amine and isoquinolin-4-ylboronic acid, the title compound (90 mg) was obtained by the method as described in Reference Example 14. MS (m/z): 173.1 [M+H]$^+$

[Step 2] Production of 6-(1H-1,2,3-triazol-1-yl)pyridine-3-carbaldehyde

By using 5-ethenyl-2-(1H-1,2,3-triazol-1-yl)pyridine (90 mg) obtained in Step 1 instead of tert-butyl 7-ethenyl-2,3-dihydro-4H-pyrido[3,2-b][1,4]oxazine-4-carboxylate, the title compound (306 mg) was obtained as a crude product by the method as described in Step 3 of Reference Example 23. MS (m/z): 175.1 [M+H]$^+$ Reference Example 25:
5-(2H-1,2,3-Triazol-2-yl)pyridine-3-carbaldehyde

[Step 1] Production of [5-(2H-1,2,3-triazol-2-yl)pyridin-3-yl]methanol

To a solution of methyl 5-(2H-1,2,3-triazol-2-yl)pyridine-3-carboxylate (44 mg) (for example, synthesized by the method as described in Angew. Chem. Int. Ed. 2011, 50, 8944-8947.) in methanol (2.2 mL), sodium borohydride (41 mg) was added, and the reaction mixture was stirred at room temperature overnight. Water was added to the reaction solution, and the solvent was distilled off under reduced pressure. The residue was purified by silica gel column chromatography to afford the title compound.

[Step 2] Production of 5-(2H-1,2,3-triazol-2-yl)pyridine-3-carbaldehyde

By using [5-(2H-1,2,3-triazol-2-yl)pyridin-3-yl]methanol obtained in Step 1 instead of pyrazolo[5,1-b][1,3]thiazol-7-yl)methanol, the title compound (22 mg) was obtained by the method as described in Step 2 of Reference Example 19.

Reference Example 26: 3-Formyl-N-[(1S,2S)-2-hydroxycyclohexyl]-4-methylbenzamide By using 3-formyl-4-methylbenzoic acid (100 mg) instead of 3-amino-4-methylbenzoic acid, the title compound (134 mg) was obtained by the method as described in Reference Example 7. MS (m/z): 262.5 [M+H]$^+$ Reference Example 27:
5-(Pyrimidin-2-yl)pyridin-3-amine dihydrochloride

[Step 1] Production of di-tert-butyl (5-bromopyridin-3-yl)-2-imidodicarbonate

By using 5-bromopyridin-3-amine (25.0 g) instead of 7-bromo-3,4-dihydro-2H-pyrido[3,2-b][1,4]oxazine, the title compound (40.0 g) was obtained by the method as described in Step 1 of Reference Example 23. MS (m/z): 373.4 [M+H]$^+$

[Step 2] Production of di-tert-butyl [5-(pyrimidin-2-yl)pyridin-3-yl]-2-imidodicarbonate By using di-tert-butyl (5-bromopyridin-3-yl)-2-imidodicarbonate (30.0 g) obtained in Step 1 instead of 3-bromo-5-(methoxymethoxy)pyridine, the title compound (14.3 g) was obtained by the method as described in Step 1 of Reference Example 10. MS (m/z): 373.5 [M+H]$^+$

[Step 3] Production of 5-(pyrimidin-2-yl)pyridin-3-amine dihydrochloride

To a solution of di-tert-butyl [5-(pyrimidin-2-yl)pyridin-3-yl]-2-imidodicarbonate (14.3 g) obtained in Step 2 in ethanol (128 mL), hydrogen chloride (4M ethyl acetate solution, 14 mL) was added, and the reaction mixture was stirred at 60° C. for 3 hours. The reaction solution was concentrated under reduced pressure, and the residue was suspended in ethyl acetate to collect the deposits by filtration. The deposits were washed with ethyl acetate and then dried to afford the title compound (3.5 g). MS (m/z): 173.4 [M+H]$^+$ Reference Example 28: 3-Formyl-N-[(1S,2S)-2-hydroxycyclohexyl]benzamide By using 3-formylbenzoic acid (500 mg) instead of 3-amino-4-methylbenzoic acid, the title compound (590 mg) was obtained by the method as described in Reference Example 7. MS (m/z): 248.5 [M+H]$^+$ Reference Example 29: 4-Fluoro-3-formyl-N-[(1S,2S)-2-hydroxycyclohexyl]benzamide By using 4-fluoro-3-formylbenzoic acid (300 mg) instead of 3-amino-4-methylbenzoic acid, the title compound (300

Reference Example 30: 5-Formyl-N-[(1S,2S)-2-hydroxycyclohexyl]-6-methylpyridine-3-carboxamide

[Step 1] Production of 5-ethenyl-N-[(1S,2S)-2-hydroxycyclohexyl]-6-methylpyridine-3-carboxamide By using 5-bromo-N-[(1S,2S)-2-hydroxycyclohexyl]-6-methylpyridine-3-carboxamide (750 mg) obtained in Step 1 of Reference Example 13 and 2-ethenyl-4,4,5,5-tetramethyl-1,3,2-dioxaborolane (479 mg) instead of 2-chloropyrimidin-4-amine and isoquinolin-4-ylboronic acid, the title compound (614 mg) was obtained by the method as described in Reference Example 14. MS (m/z): 261.2 [M+H]$^+$

[Step 2] Production of 5-formyl-N-[(1S,2S)-2-hydroxycyclohexyl]-6-methylpyridine-3-carboxamide By using 5-ethenyl-N-[(1S,2S)-2-hydroxycyclohexyl]-6-methylpyridine-3-carboxamide (614 mg) obtained in Step 1 instead of tert-butyl 7-ethenyl-2,3-dihydro-4H-pyrido[3,2-b][1,4]oxazine-4-carboxylate, the title compound (360 mg) was obtained by the method as described in Step 3 of Reference Example 23. MS (m/z): 263.2 [M+H]$^+$

Reference Example 31: Methyl 4-chloro-3-(hydroxymethyl)benzoate

To a solution of methyl 4-chloro-3-formylbenzoate (200 mg) in methanol (3.4 mL) and THF (3.4 mL), sodium borohydride (38 mg) was added at 0° C., and the reaction mixture was stirred at room temperature overnight. Water was added to the reaction solution, and the solvent was distilled off under reduced pressure. The residue was purified by silica gel column chromatography to afford the title compound (130 mg).

Reference Example 32: Methyl 3-[(ethylamino)methyl]-4-methylbenzoate

To a solution of methyl 3-formyl-4-methylbenzoate (500 mg) in methanol (11 mL), ethylamine (2M methanol solution, 2.8 mL) was added, and the reaction mixture was stirred at room temperature for 30 minutes. Then, sodium borohydride (159 mg) was added thereto, and the reaction mixture was stirred at room temperature for 2 hours. Water was added to the reaction solution, and the solvent was distilled off under reduced pressure. The residue was purified by silica gel column chromatography to afford the title compound (423 mg). MS (m/z): 208.2 [M+H]$^+$

Reference Example 33: Ethyl 5-formyl-6-methylpyridine-3-carboxylate

[Step 1] Production of ethyl 5-ethenyl-6-methylpyridine-3-carboxylate

By using ethyl 5-bromo-6-methylpyridine-3-carboxylate (4.2 g) and 2-ethenyl-4,4,5,5-tetramethyl-1,3,2-dioxaborolane (3.7 g) instead of 2-chloropyrimidin-4-amine and isoquinolin-4-ylboronic acid, the title compound (3.0 g) was obtained by the method as described in Reference Example 14. MS (m/z): 192.1 [M+H]$^+$

[Step 2] Production of ethyl 5-formyl-6-methylpyridine-3-carboxylate

By using ethyl 5-ethenyl-6-methylpyridine-3-carboxylate (3.0 g) obtained in Step 1 instead of tert-butyl 7-ethenyl-2,3-dihydro-4H-pyrido[3,2-b][1,4]oxazine-4-carboxylate, the title compound (2.7 g) was obtained by the method as described in Step 3 of Reference Example 23. MS (m/z): 194.1 [M+H]$^+$

Reference Example 34: 1-[(5-Bromopyridin-3-yl)methyl]-4-methylpiperazine

To a solution of 5-bromopyridine-3-carbaldehyde (500 mg) in dichloromethane (11 mL), acetic acid (0.15 mL) and 1-methylpiperazine (808 mg) were added, and the reaction mixture was stirred at room temperature for 1 hour. Then, sodium triacetoxyborohydride (1.14 g) was added thereto, and the reaction mixture was stirred at room temperature for 2 hours. Water was added to the reaction solution, and the solvent was distilled off under reduced pressure. The residue was purified by silica gel column chromatography to afford the title compound (700 mg). MS (m/z): 270.1 [M+H]$^+$

Reference Example 35: 4-[(5-Bromopyridin-3-yl)methyl]morpholine

By using morpholine (703 mg) instead of 1-methylpiperazine, the title compound (570 mg) was obtained by the method as described in Reference Example 34. MS (m/z): 257.1 [M+H]$^+$

Reference Example 36: 5-Bromo-N-(oxan-4-yl)pyridin-3-amine

By using 3,5-dibromopyridine and oxan-4-amine (256 mg) instead of methyl 5-bromopyridine-3-carboxylate and 1-cyclopropylmethanamine, the title compound (230 mg) was obtained by the method as described in Step 1 of Reference Example 1. MS (m/z): 257.0 [M+H]$^+$

Reference Example 37: 5-Bromo-N-(1-methylpiperidin-4-yl)pyridin-3-amine

By using 3,5-dibromopyridine and 1-methylpiperidin-4-amine (304 mg) instead of methyl 5-bromopyridine-3-carboxylate and 1-cyclopropylmethanamine, the title compound (300 mg) was obtained by the method as described in Step 1 of Reference Example 1. MS (m/z): 270.1 [M+H]$^+$

Reference Example 38: 1-[(5-Bromopyridin-3-yl)methyl]-4-ethylpiperazine

By using 1-ethylpiperazine (921 mg) instead of 1-methylpiperazine, the title compound (680 mg) was obtained by the method as described in Reference Example 34. MS (m/z): 284.1 [M+H]$^+$

Reference Example 39: 5-Bromo-N-(oxetan-3-yl)pyridin-3-amine

By using 3,5-dibromopyridine (1.00 g) and oxetan-3-amine (309 mg) instead of methyl 5-bromopyridine-3-carboxylate and 1-cyclopropylmethanamine, the title compound (410 mg) was obtained by the method as described in Step 1 of Reference Example 1. MS (m/z): 229.3 [M+H]$^+$ Reference Example 40: Di-tert-butyl 5,6,7,8-tetra-hydropyrido[4,3-d]pyrimidin-2-yl-2-imidodicarbonate

[Step 1] Production of benzyl 2-[bis(tert-butoxycarbonyl)amino]-7,8-dihydropyrido[4,3-d]pyrimidine-6(5H)-carboxylate By using benzyl 2-amino-7,8-dihydropyrido[4,3-d]pyrimidine-6(5H)-carboxylate (600 mg) instead of 7-bromo-3,4-dihydro-2H-pyrido[3,2-b][1,4]oxazine, the title compound (960 mg) was obtained by the method as described in Step 1 of Reference Example 23.

[Step 2] Production of di-tert-butyl 5,6,7,8-tetrahydropyrido[4,3-d]pyrimidin-2-yl-2-imidodicarbonate To a solution of benzyl 2-[bis(tert-butoxycarbonyl)amino]-7,8-dihydropyrido[4,3-d]pyrimidine-6(5H)-carboxylate (960 mg) obtained in Step 1 in methanol (100 mL), after degassing, 5% Pd—C (400 mg) was added under argon atmosphere while stirring the solution at room temperature. The reaction mixture was stirred under hydrogen atmosphere at room temperature for 4 hours. The reaction solution was filtered through Celite®, and then the solvent was distilled off under reduced pressure to afford the title compound (700 mg).

Reference Example 41: 3-Amino-N-[(1S,2S)-2-{[tert-butyl(dimethyl)silyl]oxy}cyclohexyl]-4-methylbenzamide To a solution of 3-amino-N-[(1S,2S)-2-hydroxycyclohexyl]-4-methylbenzamide (800 mg) obtained in Reference Example 7 in dichloromethane (16 mL), tert-butyldimethylsilyl triflate (1.11 g) and 2,6-lutidine (690 mg) were added, and the reaction mixture was stirred at room temperature overnight. The reaction solution was diluted with ethyl acetate. After washing it with water and saturated saline solution, the solvent was distilled off under reduced pressure. The obtained residue was purified by silica gel column chromatography to afford the title compound (661 mg). MS (m/z): 363.3 [M+H]$^+$ Reference Example 42: Methyl 3-(aminomethyl)-4-methylbenzoate

[Step 1] Production of methyl 3-[(hydroxyimino)methyl]-4-methylbenzoate

To a solution of methyl 3-formyl-4-methylbenzoate (1.00 g) in methanol (20 mL), 50% aqueous hydroxylamine solution (1.32 mL) was added, and the reaction mixture was stirred at 50° C. for 2 hours. The reaction solution was concentrated under reduced pressure, and ethyl acetate was added to the obtained residue. The organic layer was washed with water and saturated saline solution. The organic layer was dried over anhydrous magnesium sulfate, and the solvent was then distilled off under reduced pressure to afford the title compound (1.02 g). MS (m/z): 194.4 [M+H]$^+$

[Step 2] Production of methyl 3-(aminomethyl)-4-methylbenzoate

To methyl 3-[(hydroxyimino)methyl]-4-methylbenzoate (1.02 g) obtained in Step 1, hydrogen chloride (2M methanol solution, 15 mL) was added. After degassing, 5% Pd—C (500 mg) was added under argon atmosphere while stirring the reaction mixture at room temperature. The reaction mixture was stirred under hydrogen atmosphere at room temperature for 3 hours. The reaction solution was filtered through Celite®, and then the solvent was distilled off under reduced pressure. To the obtained residue, aqueous sodium hydroxide solution was added to basify it, and then the mixture was extracted with ethyl acetate. The organic layer was washed with saturated saline solution and dried over anhydrous magnesium sulfate, and the solvent was then distilled off under reduced pressure to afford the title compound (820 mg). MS (m/z): 180.4 [M+H]$^+$ Reference Example 43: 3-Bromo-N-[(1S,2S)-2-hydroxycyclohexyl]-4-methylbenzamide By using 3-bromo-4-methylbenzoic acid (16.6 g) instead of 3-amino-4-methylbenzoic acid, the title compound (23.0 g) was obtained by the method as described in Reference Example 7. MS (m/z): 312.0 [M+H]$^+$ Example 1: 2-(Cyclopropylamino)-N-(5-{[(1S,2S)-2-hydroxycyclohexyl]carbamoyl}-2-methylphenyl)-1,3-thiazole-5-carboxamide

[Step 1] Production of methyl 3-[(2-bromo-1,3-thiazole-5-carbonyl)amino]-4-methylbenzoate To a solution of 2-bromo-1,3-thiazole-5-carboxylic acid (2.20 g) in DMF (20 mL), methyl 3-amino-4-methylbenzoate (1.75 g), HATU (4.83 g), and DIPEA (3.66 mL) were added sequentially, and the reaction mixture was stirred at room temperature for 6 hours. The reaction solution was diluted with ethyl acetate, and the organic layer was washed with saturated aqueous sodium bicarbonate solution and saturated saline solution. The organic layer was dried over anhydrous magnesium sulfate, and the solvent was then distilled off under reduced pressure. The residue was purified by silica gel column chromatography to afford the title compound (1.02 g).

[Step 2] Production of methyl 3-{[2-(cyclopropylamino)-1,3-thiazole-5-carbonyl]amino}-4-methylbenzoate To a solution of methyl 3-[(2-bromo-1,3-thiazole-5-carbonyl)amino]-4-methylbenzoate (150 mg) obtained in Step 1 in NMP (0.5 mL), cyclopropanamine (121 mg) was added, and the reaction mixture was stirred at 80° C. for 6 hours. After allowing the reaction solution to be cooled, it was purified by silica gel column chromatography to afford the title compound (105 mg).

[Step 3] Production of 3-{[2-(cyclopropylamino)-1,3-thiazole-5-carbonyl]amino}-4-methylbenzoic acid By using methyl 3-{[2-(cyclopropylamino)-1,3-thiazole-5-carbonyl]amino}-4-methylbenzoate (103 mg) obtained in Step 2 instead of methyl 5-[(cyclopropylmethyl)amino]pyridine-3-carboxylate, the title compound (90 mg) was obtained by the method as described in Step 2 of Reference Example 1.

[Step 4] Production of 2-(cyclopropylamino)-N-(5-{[(1S,2S)-2-hydroxycyclohexyl]carbamoyl}-2-methylphenyl)-1,3-thiazole-5-carboxamide To a solution of 3-{[2-(cyclopropylamino)-1,3-thiazole-5-carbonyl]amino}-4-methylbenzoic acid (30 mg) obtained in Step 3 in DMF (1 mL), HATU (54 mg) and DIPEA (0.065 mL) were added sequentially, and the reaction mixture was stirred at room temperature for 10 minutes. Then, (1S,2S)-2-aminocyclohexan-1-ol hydrochloride (22 mg) was added thereto, and the reaction mixture was stirred at room temperature for 1 hour. The reaction solution was diluted with ethyl acetate, and the organic layer was washed with saturated aqueous sodium bicarbonate solution and saturated saline solution. The organic layer was dried over anhydrous magnesium sulfate, and the solvent was then distilled off under reduced pressure. The residue was purified by silica gel column chromatography to afford the title compound (16 mg).

Example 2: N-(5-{[(1S,2S)-2-Hydroxycyclohexyl]carbamoyl}-2-methylphenyl)-5-phenylpyridine-3-carboxamide

[Step 1] Production of methyl 3-[(5-bromopyridine-3-carbonyl)amino]-4-methylbenzoate By using 5-bromopyridine-3-carboxylic acid (1.00 g) instead of 2-bromo-1,3-thiazole-5-carboxylic acid, the title compound (1.70 g) was obtained by the method as described in Step 1 of Example 1. MS (m/z): 349.0 [M+H]$^+$

[Step 2] Production of 3-[(5-bromopyridine-3-carbonyl)amino]-4-methylbenzoic acid By using methyl 3-[(5-bromopyridine-3-carbonyl)amino]-4-methylbenzoate (650 mg) obtained in Step 1 instead of methyl 5-[(cyclopropylmethyl)amino]pyridine-3-carboxylate, the title compound (505 mg) was obtained by the method as described in Step 2 of Reference Example 1. MS (m/z): 335.0 [M+H]$^+$

[Step 3] Production of 5-bromo-N-(5-{[(1S,2S)-2-hydroxycyclohexyl]carbamoyl}-2-methylphenyl)pyridine-3-carboxamide By using 3-[(5-bromopyridine-3-carbonyl)amino]-4-methylbenzoic acid (505 mg) obtained in Step 2 instead of 3-{[2-(cyclopropylamino)-1,3-thiazole-5-carbonyl]amino}-4-methylbenzoic acid, the title compound (650 mg) was obtained by the method as described in Step 4 of Example 1. MS (m/z): 432.1 [M+H]$^+$

[Step 4] Production of N-(5-{[(1S,2S)-2-hydroxycyclohexyl]carbamoyl}-2-methylphenyl)-5-phenylpyridine-3-carboxamide By using 5-bromo-N-(5-{[(1S,2S)-2-hydroxycyclohexyl]carbamoyl}-2-methylphenyl)pyridine-3-carboxamide (50 mg) obtained in Step 3 and phenylboronic acid (17 mg) instead of 2-chloropyrimidin-4-amine and isoquinolin-4-ylboronic acid, the title compound (40 mg) was obtained by the method as described in Reference Example 14.

Example 3: 2-(Cyclopropylmethyl)-N-(5-{[(1S,2S)-2-hydroxycyclohexyl]carbamoyl}-2-methylphenyl)-1,3-thiazole-5-carboxamide

[Step 1] Production of methyl 3-{[2-(cyclopropylmethyl)-1,3-thiazole-5-carbonyl]amino}-4-methylbenzoate By using 2-(cyclopropylmethyl)-1,3-thiazole-5-carboxylic acid (100 mg) instead of 2-bromo-1,3-thiazole-5-carboxylic acid, the title compound (160 mg) was obtained by the method as described in Step 1 of Example 1. MS (m/z): 331.5 [M+H]$^+$

[Step 2] Production of 3-{[2-(cyclopropylmethyl)-1,3-thiazole-5-carbonyl]amino}-4-methylbenzoic acid By using methyl 3-{[2-(cyclopropylmethyl)-1,3-thiazole-5-carbonyl]amino}-4-methylbenzoate (160 mg) obtained in Step 1 instead of methyl 5-[(cyclopropylmethyl)amino]pyridine-3-carboxylate, the title compound (145 mg) was obtained by the method as described in Step 2 of Reference Example 1. MS (m/z): 317.4 [M+H]$^+$

[Step 3] Production of 2-(cyclopropylmethyl)-N-(5-{[(1S,2S)-2-hydroxycyclohexyl]carbamoyl}-2-methylphenyl)-1,3-thiazole-5-carboxamide By using 3-{[2-(cyclopropylmethyl)-1,3-thiazole-5-carbonyl]amino}-4-methylbenzoic acid (40 mg) obtained in Step 2 instead of 3-{[2-(cyclopropylamino)-1,3-thiazole-5-carbonyl]amino}-4-methylbenzoic acid, the title compound (38 mg) was obtained by the method as described in Step 4 of Example 1.

Example 5: N-(5-{[(1S,2S)-2-Hydroxycyclohexyl]carbamoyl}-2-methylphenyl)-2-phenyl-1,3-oxazole-5-carboxamide By using 2-phenyl-1,3-oxazole-5-carboxylic acid (30 mg) and 3-amino-N-[(1S,2S)-2-hydroxycyclohexyl]-4-methylbenzamide (43 mg) obtained in Reference Example 7 instead of 2-bromo-1,3-thiazole-5-carboxylic acid and methyl 3-amino-4-methylbenzoate, the title compound (53 mg) was obtained by the method as described in Step 1 of Example 1.

Example 6: N-(5-{[(1S)-2-Hydroxy-1-phenylethyl]carbamoyl}-2-methylphenyl)-5-phenylpyridine-3-carboxamide

[Step 1] Production of methyl 4-methyl-3-[(5-phenylpyridine-3-carbonyl)amino]benzoate By using methyl 3-[(5-bromopyridine-3-carbonyl)amino]-4-methylbenzoate (1.00 g) obtained in Step 1 of Example 2 and phenylboronic acid (419 mg) instead of 2-chloropyrimidin-4-amine and isoquinolin-4-ylboronic acid, the title compound (1.00 g) was obtained by the method as described in Reference Example 14. MS (m/z): 347.2 [M+H]$^+$

[Step 2] Production of 4-methyl-3-[(5-phenylpyridine-3-carbonyl)amino]benzoic acid By using methyl 4-methyl-3-[(5-phenylpyridine-3-carbonyl)amino]benzoate (1.00 g) obtained in Step 1 instead of methyl 5-[(cyclopropylmethyl)amino]pyridine-3-carboxylate, the title compound (910 mg) was obtained by the method as described in Step 2 of Reference Example 1. MS (m/z): 333.2 [M+H]$^+$

[Step 3] Production of N-(5-{[(1S)-2-hydroxy-1-phenylethyl]carbamoyl}-2-methylphenyl)-5-phenylpyridine-3-carboxamide By using 4-methyl-3-[(5-phenylpyridine-3-carbonyl)amino]benzoic acid (40 mg) obtained in Step 2 and (2S)-2- amino-2-phenylethan-1-ol (25 mg) instead of 3-{[2-(cyclopropylamino)-1,3-thiazole-5-carbonyl]amino}-4-methylbenzoic acid and (1S,2S)-2-aminocyclohexan-1-ol hydrochloride, the title compound (38 mg) was obtained by the method as described in Step 4 of Example 1.

Example 17: 5-[Cyclopropyl(methyl)amino]-N-(5-{[(1S,2S)-2-hydroxycyclohexyl]carbamoyl}-2-methylphenyl)pyridine-3-carboxamide By using 5-[cyclopropyl(methyl)amino]pyridine-3-carboxylic acid (70 mg) obtained in Reference Example 2 and 3-amino-N-[(1S,2S)-2-hydroxycyclohexyl]-4-methylbenzamide (90 mg) obtained in Reference Example 7 instead of 2-bromo-1,3-thiazole-5-carboxylic acid and methyl 3-amino-4-methylbenzoate, the title compound (43 mg) was obtained by the method as described in Step 1 of Example 1.

Example 20: 5-(3-Fluorophenyl)-N-(5-{[(1S,2S)-2-hydroxycyclohexyl]carbamoyl}-2-methylphenyl)pyridine-3-carboxamide By using 5-bromo-N-(5-{[(1S,2S)-2-hydroxycyclohexyl]carbamoyl}-2-methylphenyl)pyridine-3-carboxamide (61 mg) obtained in Step 3 of Example 2 and (3-fluorophenyl)boronic acid (28 mg) instead of 2-chloropyrimidin-4-amine and isoquinolin-4-ylboronic acid, the title compound (43 mg) was obtained by the method as described in Reference Example 14.

Example 24: 5-(Cyclopropylmethoxy)-N-(5-{[(1S,2S)-2-hydroxycyclohexyl]carbamoyl}-2-methylphenyl)pyridine-3-carboxamide By using 5-(cyclopropylmethoxy)pyridine-3-carboxylic acid (40 mg) and 3-amino-N-[(1S,2S)-2-hydroxycyclohexyl]-4-methylbenzamide (57 mg) obtained in Reference Example 7 instead of 2-bromo-1,3-thiazole-5-carboxylic acid and methyl 3-amino-4-methylbenzoate, the title compound (58 mg) was obtained by the method as described in Step 1 of Example 1.

Example 26: 2-[(2-Cyclopropylethyl)amino]-N-(5-{[(1S,2S)-2-hydroxycyclohexyl]carbamoyl}-2-methylphenyl)-1,3-thiazole-5-carboxamide

[Step 1] Production of methyl 3-[(2-chloro-1,3-thiazole-5-carbonyl)amino]-4-methylbenzoate To a stirred solution of methyl 3-amino-4-methylbenzoate (6.89 g) in THF (80 mL), a solution of 2-chloro-1,3-thiazole-5-carbonyl chloride (8.31 g) in THF (80 mL) was added dropwise under ice cooling, and the reaction mixture was stirred at the same temperature for 30 minutes. The reaction solution was diluted with ethyl acetate, and the organic layer was washed with saturated aqueous sodium bicarbonate solution and saturated saline solution. The organic layer was dried over anhydrous sodium sulfate, and the solvent was then distilled off under reduced pressure. Water was added to the obtained residue to suspend it, and the deposits were collected by filtration to afford the title compound (12.5 g). MS (m/z): 311.4 [M+H]$^+$

[Step 2] Production of 3-[(2-chloro-1,3-thiazole-5-carbonyl)amino]-4-methylbenzoic acid By using methyl 3-[(2-chloro-1,3-thiazole-5-carbonyl)amino]-4-methylbenzoate (12.5 g) obtained in Step 1 instead of methyl 5-[(cyclopropylmethyl)amino]pyridine-3-carboxylate, the title compound (10.4 g) was obtained by the method as described in Step 2 of Reference Example 1. MS (m/z): 297.4 [M+H]$^+$

[Step 3] Production of 2-chloro-N-(5-{[(1S,2S)-2-hydroxycyclohexyl]carbamoyl}-2-methylphenyl)-1,3-thiazole-5-carboxamide By using 3-[(2-chloro-1,3-thiazole-5-carbonyl)amino]-4-methylbenzoic acid (7.5 g) obtained in Step 2 instead of 3-{[2-(cyclopropylamino)-1,3-thiazole-5-carbonyl]amino}-4-methylbenzoic acid, the title compound (9.8 g) was obtained by the method as described in Step 4 of Example 1. MS (m/z): 394.2 [M+H]$^+$

[Step 4] Production of N-(5-{[(1S,2S)-2-hydroxycyclohexyl]carbamoyl}-2-methylphenyl)-5-phenylpyridine-3-carboxamide By using 2-chloro-N-(5-{[(1S,2S)-2-hydroxycyclohexyl]carbamoyl}-2-methylphenyl)-1,3-thiazole-5-carboxamide (90 mg) obtained in Step 3 and 2-cyclopropylethan-1-amine (249 mg) instead of methyl 3-[(2-bromo-1,3-thiazole-5-carbonyl)amino]-4-methylbenzoate and cyclopropanamine, the title compound (72 mg) was obtained by the method as described in Step 2 of Example 1.

Example 57: 3-[(5-Bromopyridin-3-yl)ethynyl]-4-chloro-N-[(1S,2S)-2-hydroxycyclohexyl]benzamide

[Step 1] Production of methyl 3-[(5-bromopyridin-3-yl)ethynyl]-4-chlorobenzoate

By using methyl 4-chloro-3-ethynylbenzoate (1.01 g) obtained in Reference Example 8 and 3-bromo-5-iodopyridine (1.47 g) instead of ethynyl(trimethyl)silane and methyl 4-chloro-3-iodobenzoate, the title compound (1.60 g) was obtained by the method as described in Step 1 of Reference Example 8. MS (m/z): 350.0 [M+H]$^+$

[Step 2] Production of 3-[(5-bromopyridin-3-yl)ethynyl]-4-chlorobenzoic acid

By using methyl 3-[(5-bromopyridin-3-yl)ethynyl]-4-chlorobenzoate (600 mg) obtained in Step 1 instead of methyl 5-[(cyclopropylmethyl)amino]pyridine-3-carboxylate, the title compound (360 mg) was obtained by the method as described in Step 2 of Reference Example 1. MS (m/z): 335.9 [M+H]$^+$

[Step 3] Production of 3-[(5-bromopyridin-3-yl)ethynyl]-4-chloro-N-[(1S,2S)-2-hydroxycyclohexyl]benzamide By using 3-[(5-bromopyridin-3-yl)ethynyl]-4-chlorobenzoic acid (370 mg) obtained in Step 2 instead of 3-{[2-(cyclopropylamino)-1,3-thiazole-5-carbonyl]amino}-4-methylbenzoic acid, the title compound (170 mg) was obtained by the method as described in Step 4 of Example 1.

Example 58: 4-Chloro-N-[(1S,2S)-2-hydroxycyclohexyl]-3-[(5-phenylpyridin-3-yl)ethynyl]benzamide By using 3-[(5-bromopyridin-3-yl)ethynyl]-4-chloro-N-[(1S,2S)-2-hydroxycyclohexyl]benzamide (50 mg) obtained in Example 57 and phenylboronic acid (15 mg) instead of 2-chloropyrimidin-4-amine and isoquinolin-4-ylboronic acid, the title compound (5 mg) was obtained by the method as described in Reference Example 14.

Example 59: N-[(1S,2S)-2-Hydroxycyclohexyl]-4-methyl-3-[(5-methylpyridin-3-yl)ethynyl]benzamide By using 3-ethynyl-N-[(1S,2S)-2-hydroxycyclohexyl]-4-methylbenzamide (30 mg) obtained in Reference Example 9 and 3-bromo-5-methylpyridine (30 mg) instead of ethynyl (trimethyl)silane and methyl 4-chloro-3-iodobenzoate, the title compound (14 mg) was obtained by the method as described in Step 1 of Reference Example 8.

Example 61: 3-[(5-Bromopyridin-3-yl)ethynyl]-N-[(1S,2S)-2-hydroxycyclohexyl]-4-methylbenzamide By using 3-ethynyl-N-[(1S,2S)-2-hydroxycyclohexyl]-4-methylbenzamide (20.5 g) obtained in Reference Example 9 and 3-bromo-5-iodopyridine (24.8 g) instead of ethynyl (trimethyl)silane and methyl 4-chloro-3-iodobenzoate, the title compound (14.5 g) was obtained by the method as described in Step 1 of Reference Example 8.

Example 62: N-[(1S,2S)-2-Hydroxycyclohexyl]-4-methyl-3-{[5-(pyrimidin-2-yl)pyridin-3-yl]ethynyl}benzamide To 3-[(5-bromopyridin-3-yl)ethynyl]-N-[(1S,2S)-2-hydroxycyclohexyl]-4-methylbenzamide (30 mg) obtained in Example 61, 2-(tributylstannyl)pyrimidine (54 mg), Pd(PPh$_3$)$_4$ (17 mg), copper iodide (7 mg), and cesium fluoride (22 mg), DMF (0.5 mL) was added, and that mixture was allowed to react at 150° C. for 30 minutes, using a microwave reaction apparatus. After allowing the reaction solution to be cooled, it was purified by silica gel column chromatography to afford the title compound (15 mg).

Example 67: 3-[(5-Cyclopropylpyridin-3-yl)ethynyl]-N-[(1S,2S)-2-hydroxycyclohexyl]-4-methylbenzamide By using 3-[(5-bromopyridin-3-yl)ethynyl]-N-[(1S,2S)-2-hydroxycyclohexyl]-4-methylbenzamide (400 mg) obtained in Example 61 and cyclopropylboronic acid (249 mg) instead of 2-chloropyrimidin-4-amine and isoquinolin-4-ylboronic acid, the title compound (250 mg) was obtained by the method as described in Reference Example 14.

Example 76: 3-[(5-Bromopyridin-3-yl)ethynyl]-N-[(1S,2S)-1,3-dihydroxy-1-phenylpropan-2-yl]-4-methylbenzamide

[Step 1] Production of 3-[(5-bromopyridin-3-yl)ethynyl]-4-methylbenzoic acid

By using 3-ethynyl-4-methylbenzoic acid (40 mg) and 3-bromo-5-iodopyridine (71 mg) instead of ethynyl(trimethyl)silane and methyl 4-chloro-3-iodobenzoate, the title compound (47 mg) was obtained by the method as described in Step 1 of Reference Example 8. MS (m/z): 316.2 [M+H]$^+$

[Step 2] Production of 3-[(5-bromopyridin-3-yl)ethynyl]-N-[(1S,2S)-1,3-dihydroxy-1-phenylpropan-2-yl]-4-methylbenzamide By using 3-[(5-bromopyridin-3-yl)ethynyl]-4-methylbenzoic acid (25 mg) obtained in Step 1 and (1S,2S)-2-amino-1-phenylpropan-1,3-diol (16 mg) instead of 3-{[2-(cyclopropylamino)-1,3-thiazole-5-carbonyl]amino}-4-methylbenzoic acid and (1S,2S)-2-aminocyclohexan-1-ol hydrochloride, the title compound (28 mg) was obtained by the method as described in Step 4 of Example 1.

Example 77: N$^1$-[(1S,2S)-2-Hydroxycyclohexyl]-4-methyl-N3-(5-phenylpyridin-3-yl)benzene-1,3-dicarboxamide

[Step 1] Production of methyl 5-{[(1S,2S)-2-hydroxycyclohexyl]carbamoyl}-2-methylbenzoate By using 3-(methoxycarbonyl)-4-methylbenzoic acid (500 mg) instead of 3-{[2-(cyclopropylamino)-1,3-thiazole-5-carbonyl]amino}-4-methylbenzoic acid, the title compound (600 mg) was obtained by the method as described in Step 4 of Example 1. MS (m/z): 292.3 [M+H]$^+$

[Step 2] Production of 5-{[(1S,2S)-2-hydroxycyclohexyl]carbamoyl}-2-methylbenzoic acid By using methyl 5-{[(1S,2S)-2-hydroxycyclohexyl]carbamoyl}-2-methylbenzoate (600 mg) obtained in Step 1 instead of methyl 5-[(cyclopropylmethyl)amino]pyridine-3-carboxylate, the title compound (430 mg) was obtained by the method as described in Step 2 of Reference Example 1. MS (m/z): 278.3 [M+H]$^+$

[Step 3] Production of N$^3$-(5-bromopyridin-3-yl)-N1-[(1S,2S)-2-hydroxycyclohexyl]-4-methylbenzene-1,3-dicarboxamide By using 5-{[(1S,2S)-2-hydroxycyclohexyl]carbamoyl}-2-methylbenzoic acid (200 mg) obtained in Step 2 and 5-bromopyridin-3-amine (137 mg) instead of 2-bromo-1,3-thiazole-5-carboxylic acid and methyl 3-amino-4-methylbenzoate, the title compound (166 mg) was obtained by the method as described in Step 1 of Example 1. MS (m/z): 432.3 [M+H]$^+$

[Step 4] Production of N$^1$-[(1S,2S)-2-hydroxycyclohexyl]-4-methyl-N3-(5-phenylpyridin-3-yl)benzene-1,3-dicarboxamide By using N$^3$-(5-bromopyridin-3-yl)-N1-[(1S,2S)-2-hydroxycyclohexyl]-4-methylbenzene-1,3-dicarboxamide (50 mg) obtained in Step 3 and phenylboronic acid (17 mg) instead of 2-chloropyrimidin-4-amine and isoquinolin-4-ylboronic acid, the title compound (40 mg) was obtained by the method as described in Reference Example 14.

Example 78: N-[(1S,2S)-2-Hydroxycyclohexyl]-4-methyl-3-{[2-(pyridin-3-yl)pyrimidin-4-yl]amino}benzamide

[Step 1] Production of methyl 4-methyl-3-{[2-(pyridin-3-yl)pyrimidin-4-yl]amino}benzoate By using methyl 3-bromo-4-methylbenzoate (350 mg) and 2-(pyridin-3-yl)pyrimidin-4-amine (263 mg) instead of methyl 5-bromopyridine-3-carboxylate and 1-cyclopropylmethanamine, the title compound (280 mg) was obtained by the method as described in Step 1 of Reference Example 1.

[Step 2] Production of 4-methyl-3-{[2-(pyridin-3-yl)pyrimidin-4-yl]amino}benzoic acid By using methyl 4-methyl-3-{[2-(pyridin-3-yl)pyrimidin-4-yl]amino}benzoate (280 mg) obtained in Step 1 instead of methyl 5-[(cyclopropylmethyl)amino]pyridine-3-carboxylate, the title compound (180 mg) was obtained by the method as described in Step 2 of Reference Example 1.

[Step 3] Production of N-[(1S,2S)-2-hydroxycyclohexyl]-4-methyl-3-{[2-(pyridin-3-yl)pyrimidin-4-yl]amino}benzamide By using 4-methyl-3-{[2-(pyridin-3-yl)pyrimidin-4-yl]amino}benzoic acid (50 mg) instead of 3-{[2-(cyclopropylamino)-1,3-thiazole-5-carbonyl]amino}-4-methylbenzoic acid, the title compound (50 mg) was obtained by the method as described in Step 4 of Example 1.

Example 83: 3-(2-Amino-7,8-dihydropyrido[4,3-d]pyrimidin-6(5H)-yl)-N-[(1S,2S)-1,3-dihydroxy-1-phenylpropan-2-yl]-4-methylbenzamide

[Step 1] Production of methyl 3-{2-[bis(tert-butoxycarbonyl)amino]-7,8-dihydropyrido[4,3-d]pyrimidin-6(5H)-yl}-4-methylbenzoate By using methyl 3-bromo-4-methylbenzoate (84 mg) and di-tert-butyl 5,6,7,8-tetrahydropyrido[4,3-d]pyrimidin-2-yl-2-imidodicarbonate (86 mg) obtained in Reference Example 40 instead of methyl 5-bromopyridine-3-carboxylate and 1-cyclopropylmethanamine, the title compound (54 mg) was obtained by the method as described in Step 1 of Reference Example 1. MS (m/z): 499.6 [M+H]$^+$

[Step 2] Production of methyl 3-(2-amino-7,8-dihydropyrido[4,3-d]pyrimidin-6(5H)-yl)-4-methylbenzoate To methyl 3-{2-[bis(tert-butoxycarbonyl)amino]-7,8-dihydropyrido[4,3-d]pyrimidin-6(5H)-yl}-4-methylbenzoate (70 mg) obtained in Step 1, hydrogen chloride (2M methanol solution, 2.1 mL) was added, and the reaction mixture was stirred at 50° C. for 5 hours. After allowing the reaction solution to be cooled, it was purified by silica gel column chromatography to afford the title compound (10 mg). MS (m/z): 299.5 [M+H]$^+$

[Step 3] Production of 3-(2-amino-7,8-dihydropyrido[4,3-d]pyrimidin-6(5H)-yl)-4-methylbenzoic acid By using methyl 3-(2-amino-7,8-dihydropyrido[4,3-d]pyrimidin-6(5H)-yl)-4-methylbenzoate (10 mg) obtained in Step 2 instead of methyl 5-[(cyclopropylmethyl)amino]pyridine-3-carboxylate, the title compound was obtained by the method as described in Step 2 of Reference Example 1. MS (m/z): 285.3 [M+H]$^+$

[Step 4] Production of 3-(2-amino-7,8-dihydropyrido[4,3-d]pyrimidin-6(5H)-yl)-N-[(1S,2S)-1,3-dihydroxy-1-phenylpropan-2-yl]-4-methylbenzamide By using 3-(2-amino-7,8-dihydropyrido[4,3-d]pyrimidin-6(5H)-yl)-4-methylbenzoic acid obtained in Step 3 and (1S,2S)-2-amino-1-phenylpropan-1,3-diol (11 mg) instead of 3-{[2-(cyclopropylamino)-1,3-thiazole-5-carbonyl]amino}-4-methylbenzoic acid and (1S,2S)-2-aminocyclohexan-1-ol hydrochloride, the title compound (6 mg) was obtained by the method as described in Step 4 of Example 1.

Example 84: N-[(1S,2S)-2-Hydroxycyclohexyl]-4-methyl-3-{[(1S)-1-(5-phenylpyridin-3-yl)ethyl]amino}benzamide

[Step 1] Production of methyl 4-methyl-3-{[(1S)-1-(5-phenylpyridin-3-yl)ethyl]amino}benzoate By using methyl 3-bromo-4-methylbenzoate (324 mg) and (1S)-1-(5-phenylpyridin-3-yl)ethan-1-amine (280 mg) obtained in Reference Example 15 instead of methyl 5-bromopyridine-3-carboxylate and 1-cyclopropylmethanamine, the title compound (220 mg) was obtained by the method as described in Step 1 of Reference Example 1. MS (m/z): 347.3 [M+H]$^+$

[Step 2] Production of 4-methyl-3-{[(1S)-1-(5-phenylpyridin-3-yl)ethyl]amino}benzoic acid By using methyl 4-methyl-3-{[(1S)-1-(5-phenylpyridin-3-yl)ethyl]amino}benzoate (220 mg) obtained in Step 1 instead of methyl 5-[(cyclopropylmethyl)amino]pyridine-3-carboxylate, the title compound (180 mg) was obtained by the method as described in Step 2 of Reference Example 1. MS (m/z): 333.3 [M+H]$^+$

[Step 3] Production of N-[(1S,2S)-2-hydroxycyclohexyl]-4-methyl-3-{[(1S)-1-(5-phenylpyridin-3-yl)ethyl]amino}benzamide By using 4-methyl-3-{[(1S)-1-(5-phenylpyridin-3-yl)ethyl]amino}benzoic acid (50 mg) obtained in Step 2 instead of 3-{[2-(cyclopropylamino)-1,3-thiazole-5-carbonyl]amino}-4-methylbenzoic acid, the title compound (60 mg) was obtained by the method as described in Step 4 of Example 1.

Example 85: 3-{[(1S)-1-([3,3'-Bipyridin]-5-yl)ethyl]amino}-N-[(1S,2S)-2-hydroxycyclohexyl]-4-methylbenzamide

[Step 1] Production of methyl 3-{[(1S)-1-([3,3'-bipyridin]-5-yl)ethyl]amino}-4-methylbenzoate By using methyl 3-bromo-4-methylbenzoate (13.9 g) and (1S)-1-([3,3'-bipyridin]-5-yl)ethan-1-amine (11.0 g) obtained in Reference Example 16 instead of methyl 5-bromopyridine-3-carboxylate and 1-cyclopropylmethanamine, the title compound (10.3 g) was obtained by the method as described in Step 1 of Reference Example 1. MS (m/z): 348.3 [M+H]$^+$

[Step 2] Production of 3-{[(1S)-1-([3,3'-bipyridin]-5-yl)ethyl]amino}-4-methylbenzoic acid By using methyl 3-{[(1S)-1-([3,3'-bipyridin]-5-yl)ethyl]amino}-4-methylbenzoate (10.3 g) obtained in Step 1 instead of methyl 5-[(cyclopropylmethyl)amino]pyridine-3-carboxylate, the title compound (8.7 g) was obtained by the method as described in Step 2 of Reference Example 1. MS (m/z): 334.4 [M+H]$^+$

[Step 3] Production of 3-{[(1S)-1-([3,3'-bipyridin]-5-yl)ethyl]amino}-N-[(1S,2S)-2-hydroxycyclohexyl]-4-methylbenzamide By using 3-{[(1S)-1-([3,3'-bipyridin]-5-yl)ethyl]amino}-4-methylbenzoic acid (8.7 g) obtained in Step 2 instead of 3-{[2-(cyclopropylamino)-1,3-thiazole-5-carbonyl]amino}-4-methylbenzoic acid, the title compound (9.4 g) was obtained by the method as described in Step 4 of Example 1. Example 87: 3-{[(1S)-1-([3,4'-Bipyridin]-5-yl)ethyl]amino}-N-[(1S,2S)-2-hydroxycyclohexyl]-4-methylbenzamide

[Step 1] Production of methyl 3-{[(1R)-1-(5-bromopyridin-3-yl)ethyl]amino}-4-methylbenzoate By using methyl 3-iodo-4-methylbenzoate (6.49 g) and (1S)-1-(5-bromopyridin-3-yl)ethan-1-amine (3.78 g) instead of methyl 5-bromopyridine-3-carboxylate and 1-cyclopropylmethanamine, the title compound (1.80 g) was obtained by the method as described in Step 1 of Reference Example 1. MS (m/z): 349.0 [M+H]$^+$

[Step 2] Production of 3-{[(1R)-1-(5-bromopyridin-3-yl)ethyl]amino}-4-methylbenzoic acid By using methyl 3-{[(1R)-1-(5-bromopyridin-3-yl)ethyl]amino}-4-methylbenzoate (1.00 g) obtained in Step 1 instead of methyl 5-[(cyclopropylmethyl)amino]pyridine-3-carboxylate, the title compound (820 mg) was obtained by the method as described in Step 2 of Reference Example 1. MS (m/z): 335.1 [M+H]$^+$

[Step 3] Production of 3-{[(1S)-1-(5-bromopyridin-3-yl)ethyl]amino}-N-[(1S,2S)-2-hydroxycyclohexyl]-4-methylbenzamide By using 3-{[(1R)-1-(5-bromopyridin-3-yl)ethyl]amino}-4-methylbenzoic acid (820 mg) obtained in Step 2 instead of 3-{[2-(cyclopropylamino)-1,3-thiazole-5-carbonyl]amino}-4-methylbenzoic acid, the title compound (920 mg) was obtained by the method as described in Step 4 of Example 1. MS (m/z): 432.3 [M+H]$^+$

[Step 4] Production of 3-{[(1S)-1-([3,4'-bipyridin]-5-yl)ethyl]amino}-N-[(1S,2S)-2-hydroxycyclohexyl]-4-methylbenzamide By using 3-{[(1S)-1-(5-bromopyridin-3-yl)ethyl]amino}-N-[(1S,2S)-2-hydroxycyclohexyl]-4-methylbenzamide (30 mg) obtained in Step 3 and pyridin-4-ylboronic acid (10 mg) instead of 2-chloropyrimidin-4-amine and isoquinolin-4-ylboronic acid, the title compound (9 mg) was obtained by the method as described in Reference Example 14.

Example 89: 3-{[(1S)-1-([2,3'-Bipyridin]-5'-yl)ethyl]amino}-N-[(1S,2S)-2-hydroxycyclohexyl]-4-methylbenzamide

[Step 1] Production of methyl 3-{[(1S)-1-([2,3'-bipyridin]-5'-yl)ethyl]amino}-4-methylbenzoate By using methyl 3-{[(1R)-1-(5-bromopyridin-3-yl)ethyl]amino}-4-methylbenzoate (150 mg) obtained in Step 1 of Example 87 and 2-bromopyridine (170 mg) instead of 3-bromo-5-(methoxymethoxy)pyridine and 2-bromopyrimidine, the title compound (90 mg) was obtained by the method as described in Step 1 of Reference Example 10. MS (m/z): 348.2 [M+H]$^+$

[Step 2] Production of 3-{[(1S)-1-([2,3'-bipyridin]-5'-yl)ethyl]amino}-4-methylbenzoic acid By using methyl 3-{[(1S)-1-([2,3'-bipyridin]-5'-yl)ethyl]amino}-4-methylbenzoate (90 mg) obtained in Step 1 instead of methyl 5-[(cyclopropylmethyl)amino]pyridine-3-carboxylate, the title compound (86 mg) was obtained by the method as described in Step 2 of Reference Example 1. MS (m/z): 334.2 [M+H]$^+$

[Step 3] Production of 3-{[(1S)-1-([2,3'-bipyridin]-5'-yl)ethyl]amino}-N-[(1S,2S)-2-hydroxycyclohexyl]-4-methylbenzamide By using 3-{[(1S)-1-([2,3'-bipyridin]-5'-yl)ethyl]amino}-4-methylbenzoic acid (70 mg) obtained in Step 2 instead of 3-{[2-(cyclopropylamino)-1,3-thiazole-5-carbonyl]amino}-4-methylbenzoic acid, the title compound (10 mg) was obtained by the method as described in Step 4 of Example 1. Example 91: 3-{[(5-Bromopyridin-3-yl)methyl]amino}-N-[(1S,2S)-2-hydroxycyclohexyl]-4-methylbenzamide By using 3-amino-N-[(1S,2S)-2-hydroxycyclohexyl]-4-methylbenzamide (1.6 g) obtained in Reference Example 7 instead of 1-methylpiperazine, the title compound (2.0 g) was obtained by the method as described in Reference Example 34.

Example 92: N-[(1S,2S)-2-Hydroxycyclohexyl]-4-methyl-3-{[(5-phenylpyridin-3-yl)methyl]amino}benzamide By using 3-{[(5-bromopyridin-3-yl)methyl]amino}-N-[(1S,2S)-2-hydroxycyclohexyl]-4-methylbenzamide (30 mg) obtained in Example 91 and phenylboronic acid (10 mg) instead of 2-chloropyrimidin-4-amine and isoquinolin-4-ylboronic acid, the title compound (23 mg) was obtained by the method as described in Reference Example 14.

Example 94: 3-({[5-(Cyclopropylethynyl)pyridin-3-yl]methyl}amino)-N-[(1S,2S)-2-hydroxycyclohexyl]-4-methylbenzamide By using ethynylcyclopropane (63 mg) and 3-{[(5-bromopyridin-3-yl)methyl]amino}-N-[(1S,2S)-2-hydroxycyclohexyl]-4-methylbenzamide (100 mg) obtained in Example 91 instead of ethynyl(trimethyl)silane and methyl 4-chloro-3-iodobenzoate, the title compound (64 mg) was obtained by the method as described in Step 1 of Reference Example 8.

Example 95: N-[(1S,2S)-2-Hydroxycyclohexyl]-4-methyl-3-({[5-(pyrimidin-2-yl)pyridin-3-yl]methyl}amino)benzamide

[Step 1] Production of methyl 3-{[(5-bromopyridin-3-yl)methyl]amino}-4-methylbenzoate By using methyl 3-amino-4-methylbenzoate (9.0 g) instead of 1-methylpiperazine, the title compound (13.0 g) was obtained by the method as described in Reference Example 34. MS (m/z): 335.3 [M+H]$^+$

[Step 2] Production of methyl 4-methyl-3-({[5-(pyrimidin-2-yl)pyridin-3-yl]methyl}amino)benzoate By using methyl 3-{[(5-bromopyridin-3-yl)methyl]amino}-4-methylbenzoate (13.0 g) obtained in Step 1 instead of 3-bromo-5-(methoxymethoxy)pyridine, the title compound (9.0 g) was obtained by the method as described in Step 1 of Reference Example 10. MS (m/z): 335.5 [M+H]$^+$

[Step 3] Production of 4-methyl-3-({[5-(pyrimidin-2-yl)pyridin-3-yl]methyl}amino)benzoic acid By using methyl 4-methyl-3-({[5-(pyrimidin-2-yl)pyridin-3-yl]methyl}amino)benzoate (9.0 g) obtained in Step 2 instead of methyl 5-[(cyclopropylmethyl)amino]pyridine-3-carboxylate, the title compound (6.6 g) was obtained by the method as described in Step 2 of Reference Example 1. MS (m/z): 321.5 [M+H]$^+$

[Step 4] Production of N-[(1S,2S)-2-hydroxycyclohexyl]-4-methyl-3-({[5-(pyrimidin-2-yl)pyridin-3-yl]methyl}amino)benzamide By using 4-methyl-3-({[5-(pyrimidin-2-yl)pyridin-3-yl]methyl}amino)benzoic acid (6.0 g) obtained in Step 3 instead of 3-{[2-(cyclopropylamino)-1,3-thiazole-5-carbonyl]amino}-4-methylbenzoic acid, the title compound (5.5 g) was obtained by the method as described in Step 4 of Example 1.

Example 96: N-[(1S,2S)-2-Hydroxycyclohexyl]-4-methyl-3-{[(quinolin-3-yl)methyl]amino}benzamide

[Step 1] Production of methyl 4-methyl-3-{[(quinolin-3-yl)methyl]amino}benzoate

By using methyl 3-amino-4-methylbenzoate (210 mg) and quinolin-3-carbaldehyde (200 mg) instead of 1-methylpiperazine and 5-bromopyridine-3-carbaldehyde, the title compound (230 mg) was obtained by the method as described in Reference Example 34.

[Step 2] Production of 4-methyl-3-{[(quinolin-3-yl)methyl]amino}benzoic acid

By using methyl 4-methyl-3-{[(quinolin-3-yl)methyl]amino}benzoate (230 mg) obtained in Step 1 instead of methyl 5-[(cyclopropylmethyl)amino]pyridine-3-carboxylate, the title compound (200 mg) was obtained by the method as described in Step 2 of Reference Example 1.

[Step 3] Production of N-[(1S,2S)-2-hydroxycyclohexyl]-4-methyl-3-{[(quinolin-3-yl)methyl]amino}benzamide By using 4-methyl-3-{[(quinolin-3-yl)methyl]amino}benzoic acid (40 mg) obtained in Step 2 instead of 3-{[2-(cyclopropylamino)-1,3-thiazole-5-carbonyl]amino}-4-methylbenzoic acid, the title compound (43 mg) was obtained by the method as described in Step 4 of Example 1.

Example 98: 3-[({5-[4-(2-Aminopropan-2-yl)phenyl]pyridin-3-yl}methyl)amino]-N-[(1S,2S)-2-hydroxycyclohexyl]-4-methylbenzamide By using 3-{[(5-bromopyridin-3-yl)methyl]amino}-N-[(1S,2S)-2-hydroxycyclohexyl]-4-methylbenzamide (80 mg) obtained in Example 91 and 2-(4-bromophenyl)propan-2-amine (49 mg) instead of 3-bromo-5-(methoxymethoxy)pyridine and 2-bromopyrimidine, the title compound (41 mg) was obtained by the method as described in Step 1 of Reference Example 10.

Example 101: N-[(1S,2S)-2-Hydroxycyclohexyl]-4-methyl-3-{[(6-phenylpyrazin-2-yl)methyl]amino}benzamide

[Step 1] Production of methyl 3-{[(6-chloropyrazin-2-yl)methyl]amino}-4-methylbenzoate By using methyl 3-amino-4-methylbenzoate (449 mg) and 6-chloropyrazine-2-carbaldehyde (774 mg) instead of 1-methylpiperazine and 5-bromopyridine-3-carbaldehyde, the title compound (150 mg) was obtained by the method as described in Reference Example 34.

[Step 2] Production of methyl 4-methyl-3-{[(6-phenylpyrazin-2-yl)methyl]amino}benzoate By using methyl 3-{[(6-chloropyrazin-2-yl)methyl]amino}-4-methylbenzoate (70 mg) obtained in Step 1 and phenylboronic acid (35 mg) instead of 2-chloropyrimidin-4-amine and isoquinolin-4-ylboronic acid, the title compound (66 mg) was obtained by the method as described in Reference Example 14.

[Step 3] Production of 4-methyl-3-{[(6-phenylpyrazin-2-yl)methyl]amino}benzoic acid By using methyl 4-methyl-3-{[(6-phenylpyrazin-2-yl)methyl]amino}benzoate (66 mg) obtained in Step 2 instead of methyl 5-[(cyclopropylmethyl)amino]pyridine-3-carboxylate, the title compound (55 mg) was obtained by the method as described in Step 2 of Reference Example 1.

[Step 4] Production of N-[(1S,2S)-2-hydroxycyclohexyl]-4-methyl-3-{[(6-phenylpyrazin-2-yl)methyl]amino}benzamide By using 4-methyl-3-{[(6-phenylpyrazin-2-yl)methyl]amino}benzoic acid (25 mg) obtained in Step 3 instead of 3-{[2-(cyclopropylamino)-1,3-thiazole-5-carbonyl]amino}-4-methylbenzoic acid, the title compound (19 mg) was obtained by the method as described in Step 4 of Example 1.

Example 109: N-[(1S,2S)-2-Hydroxycyclohexyl]-4-methyl-3-{[(1H-pyrazolo[3,4-b]pyridin-5-yl)methyl]amino}benzamide By using 3-amino-N-[(1S,2S)-2-hydroxycyclohexyl]-4-methylbenzamide (73 mg) obtained in Reference Example 7 and 1H-pyrazolo[3,4-b]pyridine-5-carbaldehyde (43 mg) instead of 1-methylpiperazine and 5-bromopyridine-3-carbaldehyde, the title compound (84 mg) was obtained by the method as described in Reference Example 34.

Example 110: N-[(1S,2S)-2-Hydroxycyclohexyl]-3-{[(imidazo[1,2-b]pyridazin-3-yl)methyl]amino}-4-methylbenzamide By using 3-amino-N-[(1S,2S)-2-hydroxycyclohexyl]-4-methylbenzamide (24 mg) obtained in Reference Example 7 and imidazo[1,2-b]pyridazine-3-carbaldehyde (15 mg) instead of 1-methylpiperazine and 5-bromopyridine-3-carbaldehyde, the title compound (18 mg) was obtained by the method as described in Reference Example 34.

Example 113: 3-{[(2-Aminopyrimidin-5-yl)methyl]amino}-N-[(1S,2S)-2-hydroxycyclohexyl]-4-methylbenzamide

[Step 1] Production of 3-{[(2-chloropyrimidin-5-yl)methyl]amino}-N-[(1S,2S)-2-hydroxycyclohexyl]-4-methylbenzamide By using 3-amino-N-[(1S,2S)-2-hydroxycyclohexyl]-4-methylbenzamide (513 mg) obtained in Reference Example 7 and 2-chloropyrimidine-5-carbaldehyde (310 mg) instead of 1-methylpiperazine and 5-bromopyridine-3-carbaldehyde, the title compound (320 mg) was obtained by the method as described in Reference Example 34. MS (m/z): 375.5 [M+H]$^+$

[Step 2] Production of 3-{[(2-aminopyrimidin-5-yl)methyl]amino}-N-[(1S,2S)-2-hydroxycyclohexyl]-4-methylbenzamide To 3-{[(2-chloropyrimidin-5-yl)methyl]amino}-N-[(1S,2S)-2-hydroxycyclohexyl]-4-methylbenzamide (320 mg) obtained in Step 1, 1,4-dioxane (8 mL) and 28% aqueous ammonia solution (4 mL) were added, and the reaction mixture was sealed in a pressure resistant stainless steel container and stirred at 100° C. for 8 hours. After allowing the reaction solution to be cooled, it was purified by silica gel column chromatography to afford the title compound (173 mg).

Example 116: 3-{[(6-Acetamidopyridin-3-yl)methyl]amino}-N-[(1S,2S)-2-hydroxycyclohexyl]-4-methylbenzamide

[Step 1] Production of 3-{[(6-bromopyridin-3-yl)methyl]amino}-N-[(1S,2S)-2-hydroxycyclohexyl]-4-methylbenzamide By using 3-amino-N-[(1S,2S)-2-hydroxycyclohexyl]-4-methylbenzamide (380 mg) obtained in Reference Example 7 and 6-bromopyridine-3-carbaldehyde (300 mg) instead of 1-methylpiperazine and 5-bromopyridine-3-carbaldehyde, the title compound (370 mg) was obtained by the method as described in Reference Example 34. MS (m/z): 418.5 [M+H]$^+$

[Step 2] Production of 3-{[(6-acetamidopyridin-3-yl)methyl]amino}-N-[(1S,2S)-2-hydroxycyclohexyl]-4-methylbenzamide By using 3-{[(6-bromopyridin-3-yl)methyl]amino}-N-[(1S,2S)-2-hydroxycyclohexyl]-4-methylbenzamide (50 mg) obtained in Step 1 and acetamide (18 mg) instead of methyl 5-bromopyridine-3-carboxylate and 1-cyclopropylmethanamine, the title compound (22 mg) was obtained by the method as described in Step 1 of Reference Example 1.

Example 118: 3-{[([2,2'-Bipyridin]-5-yl)methyl]amino}-N-[(1S,2S)-2-hydroxycyclohexyl]-4-methylbenzamide By using 3-{[(6-bromopyridin-3-yl)methyl]amino}-N-[(1S,2S)-2-hydroxycyclohexyl]-4-methylbenzamide (60 mg) obtained in Step 1 of Example 116 and 2-(tributylstannyl)pyridine (79 mg) instead of 3-[(5-bromopyridin-3-yl)ethynyl]-N-[(1S,2S)-2-hydroxycyclohexyl]-4-methylbenzamide and 2-(tributylstannyl)pyrimidine, the title compound (23 mg) was obtained by the method as described in Example 62.

Example 122: N-[(1S,2S)-2-Hydroxycyclohexyl]-4-methyl-3-({[6-(1H-pyrazol-1-yl)pyridin-3-yl]methyl}amino)benzamide A mixture of 3-{[(6-bromopyridin-3-yl)methyl]amino}-N-[(1S,2S)-2-hydroxycyclohexyl]-4-methylbenzamide (60 mg) obtained in Step 1 of Example 116, 1H-pyrazole (20 mg), copper iodide (11 mg), potassium phosphate (91 mg), trans-N,N'-dimethylcyclohexane-1,2-diamine (0.014 mL), and DMF (0.36 mL) was allowed to react at 100° C. for 30 minutes, using a microwave reaction apparatus. To the reaction solution, 1H-pyrazole (20 mg), copper iodide (11 mg), and trans-N,N'-dimethylcyclohexane-1,2-diamine (0.014 mL) were added, and the reaction mixture was allowed to react at 100° C. for additional 30 minutes, using the microwave reaction apparatus. After allowing the reaction solution to be cooled, it was purified by silica gel column chromatography to afford the title compound (34 mg).

Example 129: N-[(1S,2S)-2-Hydroxycyclohexyl]-4-methyl-3-{[(6-{[(pyridin-3-yl)carbamoyl]amino}pyridin-3-yl)methyl]amino}benzamide

[Step 1] Production of 3-{[(6-aminopyridin-3-yl)methyl]amino}-N-[(1S,2S)-2-hydroxycyclohexyl]-4-methylbenzamide By using 3-amino-N-[(1S,2S)-2-hydroxycyclohexyl]-4-methylbenzamide (203 mg) obtained in Reference Example 7 and 6-aminopyridine-3-carbaldehyde (100 mg) instead of 1-methylpiperazine and 5-bromopyridine-3-carbaldehyde, the title compound (149 mg) was obtained by the method as described in Reference Example 34. MS (m/z): 355.6 [M+H]$^+$

[Step 2] Production of N-[(1S,2S)-2-hydroxycyclohexyl]-4-methyl-3-{[(6-{[(pyridin-3-yl)carbamoyl]amino}pyridin-3-yl)methyl]amino}benzamide A mixture of 3-{[(6-aminopyridin-3-yl)methyl]amino}-N-[(1S,2S)-2-hydroxycyclohexyl]-4-methylbenzamide (35 mg) obtained in Step 1, 3-isocyanatopyridine (14 mg), potassium carbonate (20 mg), and DMF (0.33 mL) was allowed to react at 80° C. for 30 minutes, using a microwave reaction apparatus. After allowing the reaction solution to be cooled, it was purified by silica gel column chromatography to afford the title compound (5.8 mg).

Example 131: 3-{[(5-Aminopyrazin-2-yl)methyl]amino}-N-[(1S,2S)-2-hydroxycyclohexyl]-4-methylbenzamide

[Step 1] Production of methyl 3-[({5-[(tert-butoxycarbonyl)amino]pyrazin-2-yl}methyl)amino]-4-methylbenzoate To a solution of tert-butyl [5-(bromomethyl)pyrazin-2-yl]carbamate (1.44 g) and methyl 3-amino-4-methylbenzoate (561 mg) in DMF (12 mL), potassium carbonate (1.76 g) was added, and the reaction mixture was stirred at room temperature overnight. The reaction solution was diluted with ethyl acetate. After washing it with water and saturated saline solution, the solvent was distilled off under reduced pressure. The obtained residue was purified by silica gel column chromatography to afford the title compound (360 mg). MS (m/z): 373.5 [M+H]$^+$

[Step 2] Production of 3-[({5-[(tert-butoxycarbonyl) amino]pyrazin-2-yl}methyl)amino]-4-methylbenzoic acid By using methyl 3-[({5-[(tert-butoxycarbonyl)amino] pyrazin-2-yl}methyl)amino]-4-methylbenzoate (160 mg) obtained in Step 1 instead of methyl 5-[(cyclopropylmethyl) amino]pyridine-3-carboxylate, the title compound (125 mg) was obtained by the method as described in Step 2 of Reference Example 1. MS (m/z): 359.3 [M+H]$^+$

[Step 3] Production of tert-butyl {5-[(5-{[(1S,2S)-2-hydroxycyclohexyl]carbamoyl}-2-methylanilino) methyl]pyrazin-2-yl}carbamate By using 3-[({5-[(tert-butoxycarbonyl)amino]pyrazin-2-yl}methyl)amino]-4-methylbenzoic acid (125 mg) obtained in Step 2 instead of 3-{[2-(cyclopropylamino)-1,3-thiazole-5-carbonyl]amino}-4-methylbenzoic acid, the title compound (105 mg) was obtained by the method as described in Step 4 of Example 1. MS (m/z): 456.6 [M+H]$^+$

[Step 4] Production of 3-{[(5-aminopyrazin-2-yl) methyl]amino}-N-[(1S,2S)-2-hydroxycyclohexyl]-4-methylbenzamide To a solution of tert-butyl {5-[(5-{[(1S,2S)-2-hydroxycyclohexyl]carbamoyl}-2-methylanilino)methyl]pyrazin-2-yl}carbamate (95 mg) obtained in step 3 in dichloromethane (2 mL), trifluoroacetic acid (0.16 mL) was added, and the reaction mixture was stirred at room temperature for 2 hours. To the residue obtained by concentrating the reaction solution under reduced pressure, methanol (2 mL) and 2M aqueous sodium hydroxide solution (2 mL) were added, and the reaction mixture was stirred at room temperature for 1 hour. The reaction solution was diluted with water, and the reaction mixture was extracted with chloroform. The organic layer was concentrated under reduced pressure, and the obtained residue was purified by silica gel column chromatography to afford the title compound (40 mg).

Example 138: N-[(1S,2S)-2-Hydroxycyclohexyl]-3-{[(6-{[(1r,3r)-3-methoxycyclobutane-1-carbonyl] amino}pyridin-3-yl)methyl]amino}-4-methylbenzamide

[Step 1] Production of 3-{[(6-aminopyridin-3-yl) methyl]amino}-N-[(1S,2S)-2-{[tert-butyl(dimethyl) silyl]oxy}cyclohexyl]-4-methylbenzamide By using 3-amino-N-[(1S,2S)-2-{[tert-butyl(dimethyl)silyl]oxy}cyclohexyl]-4-methylbenzamide (468 mg) obtained in Reference Example 41 and 6-aminopyridine-3-carbaldehyde (150 mg) instead of 1-methylpiperazine and 5-bromopyridine-3-carbaldehyde, the title compound (223 mg) was obtained by the method as described in Reference Example 34. MS (m/z): 469.4 [M+H]$^+$

[Step 2] Production of N-[(1S,2S)-2-{[tert-butyl (dimethyl)silyl]oxy}cyclohexyl]-3-{[(6-{[(1r,3r)-3-methoxycyclobutane-1-carbonyl]amino}pyridin-3-yl)methyl]amino}-4-methylbenzamide By using (1r,3r)-3-methoxycyclobutane-1-carboxylic acid (36 mg) and 3-{[(6-aminopyridin-3-yl)methyl]amino}-N-[(1S,2S)-2-{[tert-butyl(dimethyl)silyl]oxy}cyclohexyl]-4-methylbenzamide (30 mg) obtained in Step 1 instead of 2-bromo-1,3-thiazole-5-carboxylic acid and methyl 3-amino-4-methylbenzoate, the title compound (60 mg) was obtained by the method as described in Step 1 of Example 1.

[Step 3] Production of N-[(1S,2S)-2-hydroxycyclohexyl]-3-{[(6-{[(1r,3r)-3-methoxycyclobutane-1-carbonyl]amino}pyridin-3-yl)methyl]amino}-4-methylbenzamide By using N-[(1S,2S)-2-{[tert-butyl(dimethyl)silyl] oxy}cyclohexyl]-3-{[(6-{[(1r,3r)-3-methoxycyclobutane-1-carbonyl]amino}pyridin-3-yl)methyl]amino}-4-methylbenzamide (60 mg) obtained in Step 2 instead of methyl 4-chloro-3-[(trimethylsilyl)ethynyl]benzoate, the title compound (8 mg) was obtained by the method as described in Step 2 of Reference Example 8.

Example 140: N-[(1S,2S)-2-Hydroxycyclohexyl]-4-methyl-3-({[6-(1H-1,2,3-triazol-1-yl)pyridin-3-yl] methyl}amino)benzamide By using 3-amino-N-[(1S,2S)-2-hydroxycyclohexyl]-4-methylbenzamide (136 mg) obtained in Reference Example 7 and 6-(1H-1,2,3-triazol-1-yl)pyridine-3-carbaldehyde (306 mg) obtained in Reference Example 24 instead of 1-methylpiperazine and 5-bromopyridine-3-carbaldehyde, the title compound (74 mg) was obtained by the method as described in Reference Example 34.

Example 142: 3-{[(2-Aminopyrimidin-5-yl)methyl] amino}-4-chloro-N-[(1S,2S)-2-hydroxycyclohexyl] benzamide

[Step 1] Production of methyl 4-chloro-3-{[(2-chloropyrimidin-5-yl)methyl]amino}benzoate By using methyl 3-amino-4-chlorobenzoate (1.00 g) and 2-chloropyrimidine-5-carbaldehyde (806 mg) instead of 1-methylpiperazine and 5-bromopyridine-3-carbaldehyde, the title compound (376 mg) was obtained by the method as described in Reference Example 34. MS (m/z): 312.3 [M+H]$^+$

[Step 2] Production of 3-{[(2-aminopyrimidin-5-yl) methyl]amino}-4-chlorobenzoic acid To methyl 4-chloro-3-{[(2-chloropyrimidin-5-yl)methyl] amino}benzoate (199 mg) obtained in Step 1, 1,4-dioxane (0.86 mL) and 28% aqueous ammonia solution (0.86 mL) were added, and the reaction mixture was sealed in a pressure resistant stainless steel container and stirred at 100° C. for 2 days. To the residue obtained by concentrating the reaction solution under reduced pressure, ethanol (3.2 mL) and 2M aqueous sodium hydroxide solution (3.2 mL) were added, and the reaction mixture was stirred at 90° C. overnight. The solvent was distilled off under reduced pressure. The reaction mixture was diluted with water and then neutralized by adding hydrochloric acid. The precipitated deposits were collected by filtration to afford the title compound (102 mg). MS (m/z): 279.4 [M+H]$^+$

[Step 3] Production of 3-{[(2-aminopyrimidin-5-yl) methyl]amino}-4-chloro-N-[(1S,2S)-2-hydroxycyclohexyl]benzamide By using 3-{[(2-aminopyrimidin-5-yl)methyl]amino}-4-chlorobenzoic acid (50 mg) obtained in Step 2 instead of 3-{[2-(cyclopropylamino)-1,3-thiazole-5-carbonyl]amino}-4-methylbenzoic acid, the title compound (36 mg) was obtained by the method as described in Step 4 of Example 1.

Example 144: 3-{[(3,4-Dihydro-2H-pyrido[3,2-b][1,4]oxazin-7-yl)methyl]amino}-N-[(1S,2S)-2-hydroxycyclohexyl]-4-methylbenzamide

[Step 1] Production of tert-butyl 7-[(5-{[(1S,2S)-2-hydroxycyclohexyl]carbamoyl}-2-methylanilino)methyl]-2,3-dihydro-4H-pyrido[3,2-b][1,4]oxazine-4-carboxylate By using 3-amino-N-[(1S,2S)-2-hydroxycyclohexyl]-4-methylbenzamide (134 mg) obtained in Reference Example 7 and tert-butyl 7-formyl-2,3-dihydro-4H-pyrido[3,2-b][1,4]oxazine-4-carboxylate obtained in Reference Example 23 instead of 1-methylpiperazine and 5-bromopyridine-3-carbaldehyde, the title compound (124 mg) was obtained by the method as described in Reference Example 34. MS (m/z): 497.3 [M+H]$^+$

[Step 2] Production of 3-{[(3,4-dihydro-2H-pyrido[3,2-b][1,4]oxazin-7-yl)methyl]amino}-N-[(1S,2S)-2-hydroxycyclohexyl]-4-methylbenzamide To a solution of tert-butyl 7-[(5-{[(1S,2S)-2-hydroxycyclohexyl]carbamoyl}-2-methylanilino)methyl]-2,3-dihydro-4H-pyrido[3,2-b][1,4]oxazine-4-carboxylate (59 mg) obtained in step 1 in dichloromethane (1.4 mL), trifluoroacetic acid (0.7 mL) was added, and the reaction mixture was stirred at room temperature overnight. The reaction solution was concentrated under reduced pressure, and the obtained residue was purified by silica gel column chromatography to afford the title compound (37 mg).

Example 147: N-[(1S,2S)-2-Hydroxycyclohexyl]-4-methyl-3-({[5-(pyrimidin-2-yl)pyridin-3-yl]amino}methyl)benzamide

[Step 1] Production of methyl 3-{[(5-bromopyridin-3-yl)amino]methyl}-4-methylbenzoate By using 5-bromopyridin-3-amine (1.5 g) and methyl 3-formyl-4-methylbenzoate (1.5 g) instead of 1-methylpiperazine and 5-bromopyridine-3-carbaldehyde, the title compound (2.3 g) was obtained by the method as described in Reference Example 34. MS (m/z): 335.4 [M+H]$^+$

[Step 2] Production of methyl 4-methyl-3-({[5-(pyrimidin-2-yl)pyridin-3-yl]amino}methyl)benzoate By using methyl 3-{[(5-bromopyridin-3-yl)amino]methyl}-4-methylbenzoate (170 mg) obtained in Step 1 instead of 3-bromo-5-(methoxymethoxy)pyridine, the title compound (35 mg) was obtained by the method as described in Step 1 of Reference Example 10. MS (m/z): 335.5 [M+H]$^+$

[Step 3] Production of 4-methyl-3-({[5-(pyrimidin-2-yl)pyridin-3-yl]amino}methyl)benzoic acid By using methyl 4-methyl-3-({[5-(pyrimidin-2-yl)pyridin-3-yl]amino}methyl)benzoate (35 mg) obtained in Step 2 instead of methyl 5-[(cyclopropylmethyl)amino]pyridine-3-carboxylate, the title compound (33 mg) was obtained by the method as described in Step 2 of Reference Example 1. MS (m/z): 321.5 [M+H]$^+$

[Step 4] Production of N-[(1S,2S)-2-hydroxycyclohexyl]-4-methyl-3-({[5-(pyrimidin-2-yl)pyridin-3-yl]amino}methyl)benzamide By using 4-methyl-3-({[5-(pyrimidin-2-yl)pyridin-3-yl]amino}methyl)benzoic acid (33 mg) obtained in Step 3 instead of 3-{[2-(cyclopropylamino)-1,3-thiazole-5-carbonyl]amino}-4-methylbenzoic acid, the title compound (6 mg) was obtained by the method as described in Step 4 of Example 1.

Example 148: 3-{[([2,3'-Bipyridin]-5'-yl)amino]methyl}-N-[(1S,2S)-2-hydroxycyclohexyl]-4-methylbenzamide

[Step 1] Production of 3-{[(5-bromopyridin-3-yl)amino]methyl}-N-[(1S,2S)-2-hydroxycyclohexyl]-4-methylbenzamide By using 5-bromopyridin-3-amine (437 mg) and 3-formyl-N-[(1S,2S)-2-hydroxycyclohexyl]-4-methylbenzamide (600 mg) obtained in Reference Example 26 instead of 1-methylpiperazine and 5-bromopyridine-3-carbaldehyde, the title compound (560 mg) was obtained by the method as described in Reference Example 34. MS (m/z): 418.6 [M+H]$^+$

[Step 2] Production of 3-{[([2,3'-bipyridin]-5'-yl)amino]methyl}-N-[(1S,2S)-2-hydroxycyclohexyl]-4-methylbenzamide By using 3-{[(5-bromopyridin-3-yl)amino]methyl}-N-[(1S,2S)-2-hydroxycyclohexyl]-4-methylbenzamide (80 mg) obtained in Step 1 and 2-bromopyridine (36 mg) instead of 3-bromo-5-(methoxymethoxy)pyridine and 2-bromopyrimidine, the title compound (10 mg) was obtained by the method as described in Step 1 of Reference Example 10.

Example 152: 3-{[(5-Bromopyridin-3-yl)amino]methyl}-N-[(1S,2S)-1,3-dihydroxy-1-phenylpropan-2-yl]-4-methylbenzamide

[Step 1] Production of 3-{[(5-bromopyridin-3-yl)amino]methyl}-4-methylbenzoic acid By using methyl 3-{[(5-bromopyridin-3-yl)amino]methyl}-4-methylbenzoate (1.0 g) obtained in Step 1 of Example 147 instead of methyl 5-[(cyclopropylmethyl)amino]pyridine-3-carboxylate, the title compound (950 mg) was obtained by the method as described in Step 2 of Reference Example 1. MS (m/z): 321.4 [M+H]$^+$

[Step 2] Production of 3-{[(5-bromopyridin-3-yl)amino]methyl}-N-[(1S,2S)-1,3-dihydroxy-1-phenylpropan-2-yl]-4-methylbenzamide By using 3-{[(5-bromopyridin-3-yl)amino]methyl}-4-methylbenzoic acid (350 mg) obtained in Step 1 and (1S,2S)-2-amino-1-phenylpropan-1,3-diol (219 mg) instead of 3-{[2-(cyclopropylamino)-1,3-thiazole-5-carbonyl]amino}-4-methylbenzoic acid and (1S,2S)-2-aminocyclohexan-1-ol hydrochloride, the title compound (500 mg) was obtained by the method as described in Step 4 of Example 1.

Example 153: N-[(1S,2S)-1,3-Dihydroxy-1-phenyl-propan-2-yl]-4-methyl-3-{[(5-phenylpyridin-3-yl)amino]methyl}benzamide By using 3-{[(5-bromopyridin-3-yl)amino]methyl}-N-[(1S,2S)-1,3-dihydroxy-1-phenylpropan-2-yl]-4-methyl-benzamide (50 mg) obtained in Example 152 and phenyl-boronic acid (16 mg) instead of 2-chloropyrimidin-4-amine and isoquinolin-4-ylboronic acid, the title compound (29 mg) was obtained by the method as described in Reference Example 14.

Example 155: 3-{[([2,3'-Bipyridin]-5'-yl)amino]methyl}-N-[(1S,2S)-1,3-dihydroxy-1-phenylpropan-2-yl]-4-methylbenzamide By using 3-{[(5-bromopyridin-3-yl)amino]methyl}-N-[(1S,2S)-1,3-dihydroxy-1-phenylpropan-2-yl]-4-methyl-benzamide (50 mg) obtained in Example 152 and 2-(tributylstannyl)pyridine (51 mg) instead of 3-[(5-bromopyridin-3-yl)ethynyl]-N-[(1S,2S)-2-hydroxycyclohexyl]-4-methylbenzamide and 2-(tributylstannyl)pyrimidine, the title compound (20 mg) was obtained by the method as described in Example 62.

Example 156: N-[(1S,2S)-1,3-Dihydroxy-1-phenyl-propan-2-yl]-4-methyl-3-{[(6-phenylpyrazin-2-yl)amino]methyl}benzamide

[Step 1] Production of methyl 3-{[(6-chloropyrazin-2-yl)amino]methyl}-4-methylbenzoate A mixture of 2,6-dichloropyrazine (300 mg), methyl 3-(aminomethyl)-4-methylbenzoate (397 mg) obtained in Reference Example 42, NMP (4 mL), and DIPEA (1.05 mL) was stirred at 100° C. for 4 hours. The reaction solution was diluted with ethyl acetate, and the organic layer was washed with water and saturated saline solution. The solvent was distilled off under reduced pressure, and the obtained residue was purified by silica gel column chromatography to afford the title compound (423 mg). MS (m/z): 292.5 [M+H]$^+$

[Step 2] Production of 3-{[(6-chloropyrazin-2-yl)amino]methyl}-4-methylbenzoic acid By using methyl 3-{[(6-chloropyrazin-2-yl)amino]methyl}-4-methylbenzoate (580 mg) obtained in Step 1 instead of methyl 5-[(cyclopropylmethyl)amino]pyridine-3-carboxylate, the title compound (520 mg) was obtained by the method as described in Step 2 of Reference Example 1. MS (m/z): 278.4 [M+H]$^+$

[Step 3] Production of 3-{[(6-chloropyrazin-2-yl)amino]methyl}-N-[(1S,2S)-1,3-dihydroxy-1-phenyl-propan-2-yl]-4-methylbenzamide By using 3-{[(6-chloropyrazin-2-yl)amino]methyl}-4-methylbenzoic acid (300 mg) obtained in Step 2 and (1S,2S)-2-amino-1-phenylpropan-1,3-diol (217 mg) instead of 3-{[2-(cyclopropylamino)-1,3-thiazole-5-carbonyl]amino}-4-methylbenzoic acid and (1S,2S)-2-aminocyclohexan-1-ol hydrochloride, the title compound (420 mg) was obtained by the method as described in Step 4 of Example 1. MS (m/z): 427.6 [M+H]$^+$

[Step 4] Production of N-[(1S,2S)-1,3-dihydroxy-1-phenylpropan-2-yl]-4-methyl-3-{[(6-phenylpyrazin-2-yl)amino]methyl}benzamide By using 3-{[(6-chloropyrazin-2-yl)amino]methyl}-N-[(1S,2S)-1,3-dihydroxy-1-phenylpropan-2-yl]-4-methyl-benzamide (50 mg) obtained in Step 3 and phenylboronic acid (17 mg) instead of 2-chloropyrimidin-4-amine and isoquinolin-4-ylboronic acid, the title compound (36 mg) was obtained by the method as described in Reference Example 14.

Example 158: N-[3-({[6-(3,4-Dimethoxyphenyl)pyrazin-2-yl]amino}methyl)phenyl]-N'-[(1R,2S)-2-hydroxycyclohexyl]urea

[Step 1] Production of N-[(3-aminophenyl)methyl]-6-chloropyrazin-2-amine

By using 3-(aminomethyl)aniline (1.23 g) instead of methyl 3-(aminomethyl)-4-methylbenzoate, the title compound (1.22 g) was obtained by the method as described in Step 3 of Example 156.

[Step 2] Production of N-[(3-aminophenyl)methyl]-6-(3,4-dimethoxyphenyl)pyrazin-2-amine By using N-[(3-aminophenyl)methyl]-6-chloropyrazin-2-amine (160 mg) obtained in Step 1 and (3,4-dimethoxyphenyl)boronic acid (149 mg) instead of 2-chloropyrimidin-4-amine and isoquinolin-4-ylboronic acid, the title compound (190 mg) was obtained by the method as described in Reference Example 14.

[Step 3] Production of N-[3-({[6-(3,4-dimethoxy-phenyl)pyrazin-2-yl]amino}methyl)phenyl]-N'-[(1R,2S)-2-hydroxycyclohexyl]urea To N-[(3-aminophenyl)methyl]-6-(3,4-dimethoxyphenyl)pyrazin-2-amine (40 mg) obtained in Step 2, THF (1 mL), TEA (0.20 mL), and triphosgene (18 mg) were added, and the reaction mixture was stirred at room temperature for 10 minutes. Then, (1S,2R)-2-aminocyclohexan-1-ol hydrochloride (180 mg) was added thereto, and the reaction mixture was stirred at the same temperature for 2 hours. The reaction solution was purified by silica gel column chromatography to afford the title compound (37 mg).

Example 159: N-[(1R,2S)-2-Hydroxycyclohexyl]-N'-[3-({[5-(pyrimidin-2-yl)pyridin-3-yl]amino}methyl)phenyl]urea

[Step 1] Production of N-[(3-nitrophenyl)methyl]-5-(pyrimidin-2-yl)pyridin-3-amine By using 5-(pyrimidin-2-yl)pyridin-3-amine (100 mg) obtained in Reference Example 27 and 3-nitrobenzaldehyde (88 mg) instead of 1-methylpiperazine and 5-bromopyridine-3-carbaldehyde, the title compound (40 mg) was obtained by the method as described in Reference Example 34.

[Step 2] Production of N-[(3-aminophenyl)methyl]-5-(pyrimidin-2-yl)pyridin-3-amine To a solution of N-[(3-nitrophenyl)methyl]-5-(pyrimidin-2-yl)pyridin-3-amine (40 mg) obtained in Step 1 in methanol (5 mL) and THF (5 mL), after degassing, 10% Pd—C (50 mg) was added under argon atmosphere while stirring the solution at room temperature. The reaction mixture was stirred under hydrogen atmosphere at room temperature for 4 hours. The reaction solution was filtered through Celite®, and the solvent was distilled off under reduced pressure. The residue was purified by silica gel column chromatography to afford the title compound (20 mg).

[Step 3] Production of N-[(1R,2S)-2-hydroxycyclohexyl]-N'-[3-({[5-(pyrimidin-2-yl)pyridin-3-yl]amino}methyl)phenyl]urea By using N-[(3-aminophenyl)methyl]-5-(pyrimidin-2-yl)pyridin-3-amine (20 mg) obtained in Step 2 instead of N-[(3-aminophenyl)methyl]-6-(3,4-dimethoxyphenyl)pyrazin-2-amine, the title compound (13 mg) was obtained by the method as described in Step 3 of Example 158.

Example 161: N-[4-Fluoro-3-({[5-(pyrimidin-2-yl)pyridin-3-yl]amino}methyl)phenyl]-N'-[(1R,2S)-2-hydroxycyclohexyl]urea

[Step 1] Production of N-[(2-fluoro-5-nitrophenyl)methyl]-5-(pyrimidin-2-yl)pyridin-3-amine By using 5-(pyrimidin-2-yl)pyridin-3-amine (133 mg) obtained in Reference Example 27 and 2-fluoro-5-nitrobenzaldehyde (196 mg) instead of 1-methylpiperazine and 5-bromopyridine-3-carbaldehyde, the title compound (150 mg) was obtained by the method as described in Reference Example 34.

[Step 2] Production of tert-butyl [(2-fluoro-5-nitrophenyl)methyl][5-(pyrimidin-2-yl)pyridin-3-yl]carbamate By using N-[(2-fluoro-5-nitrophenyl)methyl]-5-(pyrimidin-2-yl)pyridin-3-amine (150 mg) obtained in Step 1 instead of 7-bromo-3,4-dihydro-2H-pyrido[3,2-b][1,4]oxazine, the title compound (105 mg) was obtained by the method as described in Step 1 of Reference Example 23.

[Step 3] Production of tert-butyl [(5-amino-2-fluorophenyl)methyl][5-(pyrimidin-2-yl)pyridin-3-yl]carbamate To a solution of tert-butyl [(2-fluoro-5-nitrophenyl)methyl][5-(pyrimidin-2-yl)pyridin-3-yl]carbamate (104 mg) obtained in Step 2 in ethanol (2 mL) and water (0.2 mL), tin(II) chloride dihydrate (221 mg) was added, and the reaction mixture was stirred at 65° C. for 2 hours. To the reaction solution, aqueous sodium hydroxide solution was added, and the mixture was extracted with ethyl acetate. The organic layer was washed with saturated saline solution, and the solvent was distilled off under reduced pressure. The residue was purified by silica gel column chromatography to afford the title compound (72 mg).

[Step 4] Production of tert-butyl {2-fluoro-5-({[(1R,2S)-2-hydroxycyclohexyl]carbamoyl}amino)phenyl]methyl}[5-(pyrimidin-2-yl)pyridin-3-yl]carbamate By using tert-butyl [(5-amino-2-fluorophenyl)methyl][5-(pyrimidin-2-yl)pyridin-3-yl]carbamate (70 mg) obtained in Step 3 instead of N-[(3-aminophenyl)methyl]-6-(3,4-dimethoxyphenyl)pyrazin-2-amine, the title compound (82 mg) was obtained by the method as described in Step 3 of Example 158.

[Step 5] Production of N-[4-fluoro-3-({[5-(pyrimidin-2-yl)pyridin-3-yl]amino}methyl)phenyl]-N'-[(1R,2S)-2-hydroxycyclohexyl]urea To a solution of tert-butyl {2-fluoro-5-({[[(1R,2S)-2-hydroxycyclohexyl]carbamoyl}amino)phenyl]methyl}[5-(pyrimidin-2-yl)pyridin-3-yl]carbamate (80 mg) obtained in Step 4 in methanol (0.3 mL), hydrogen chloride (4M 1,4-dioxane solution, 1 mL) was added, and the reaction mixture was stirred at room temperature for 2 hours. The reaction solution was purified by silica gel column chromatography to afford the title compound (50 mg).

Example 164: N-[(1S,2S)-2-Hydroxycyclohexyl]-4-methyl-3-{1-[(6-phenylpyrazin-2-yl)amino]ethyl}benzamide

[Step 1] Production of methyl 3-{1-[(6-chloropyrazin-2-yl)amino]ethyl}-4-methylbenzoate By using methyl 3-(1-aminoethyl)-4-methylbenzoate (218 mg) instead of methyl 3-(aminomethyl)-4-methylbenzoate, the title compound (75 mg) was obtained by the method as described in Step 3 of Example 156.

[Step 2] Production of methyl 4-methyl-3-{1-[(6-phenylpyrazin-2-yl)amino]ethyl}benzoate By using methyl 3-{1-[(6-chloropyrazin-2-yl)amino]ethyl}-4-methylbenzoate (75 mg) obtained in Step 1 and phenylboronic acid (36 mg) instead of 2-chloropyrimidin-4-amine and isoquinolin-4-ylboronic acid, the title compound (80 mg) was obtained by the method as described in Reference Example 14.

[Step 3] Production of 4-methyl-3-{1-[(6-phenylpyrazin-2-yl)amino]ethyl}benzoic acid By using methyl 4-methyl-3-{1-[(6-phenylpyrazin-2-yl)amino]ethyl}benzoate (77 mg) obtained in Step 2 instead of methyl 5-[(cyclopropylmethyl)amino]pyridine-3-carboxylate, the title compound (67 mg) was obtained by the method as described in Step 2 of Reference Example 1.

[Step 4] Production of N-[(1S,2S)-2-hydroxycyclohexyl]-4-methyl-3-{1-[(6-phenylpyrazin-2-yl)amino]ethyl}benzamide By using 4-methyl-3-{1-[(6-phenylpyrazin-2-yl)amino]ethyl}benzoic acid (30 mg) obtained in Step 3 instead of 3-{[2-(cyclopropylamino)-1,3-thiazole-5-carbonyl]amino}-4-methylbenzoic acid, the title compound (17 mg) was obtained by the method as described in Step 4 of Example 1.

Example 165: 3-[([3,3'-Bipyridin]-5-yl)methoxy]-N-[(1S,2S)-2-hydroxycyclohexyl]-4-methylbenzamide

[Step 1] Production of methyl 3-[(5-bromopyridin-3-yl)methoxy]-4-methylbenzoate

By using methyl 3-hydroxy-4-methylbenzoate (750 mg) and (5-bromopyridin-3-yl)methanol (933 mg) instead of methyl 5-hydroxypyridine-3-carboxylate and 3,3-difluorocyclobutan-1-ol, the title compound (1.16 g) was obtained by the method as described in Step 1 of Reference Example 3. MS (m/z): 336.4 [M+H]+

[Step 2] Production of methyl 3-[([3,3'-bipyridin]-5-yl)methoxy]-4-methylbenzoate By using methyl 3-[(5-bromopyridin-3-yl)methoxy]-4-methylbenzoate (150 mg) obtained in Step 1 and pyridin-3-ylboronic acid (66 mg) instead of 2-chloropyrimidin-4-amine and isoquinolin-4-ylboronic acid, the title compound (103 mg) was obtained by the method as described in Reference Example 14. MS (m/z): 335.5 [M+H]+

[Step 3] Production of 3-[([3,3'-bipyridin]-5-yl)methoxy]-4-methylbenzoic acid

By using methyl 3-[([3,3'-bipyridin]-5-yl)methoxy]-4-methylbenzoate (103 mg) obtained in Step 2 instead of methyl 5-[(cyclopropylmethyl)amino]pyridine-3-carboxylate, the title compound (100 mg) was obtained by the method as described in Step 2 of Reference Example 1. MS (m/z): 321.6 [M+H]+

[Step 4] Production of 3-[([3,3'-bipyridin]-5-yl)methoxy]-N-[(1S,2S)-2-hydroxycyclohexyl]-4-methylbenzamide By using 3-[([3,3'-bipyridin]-5-yl)methoxy]-4-methylbenzoic acid (50 mg) obtained in Step 3 instead of 3-{[2-(cyclopropylamino)-1,3-thiazole-5-carbonyl]amino}-4-methylbenzoic acid, the title compound (47 mg) was obtained by the method as described in Step 4 of Example 1.

Example 166: N-[(1S,2S)-2-Hydroxycyclohexyl]-4-methyl-3-{[5-(pyrimidin-2-yl)pyridin-3-yl]methoxy}benzamide

[Step 1] Production of methyl 4-methyl-3-{[5-(pyrimidin-2-yl)pyridin-3-yl]methoxy}benzoate By using methyl 3-[(5-bromopyridin-3-yl)methoxy]-4-methylbenzoate (250 mg) obtained in Step 1 of Example 165 instead of 3-bromo-5-(methoxymethoxy)pyridine, the title compound (127 mg) was obtained by the method as described in Step 1 of Reference Example 10. MS (m/z): 336.4 [M+H]+

[Step 2] Production of 4-methyl-3-{[5-(pyrimidin-2-yl)pyridin-3-yl]methoxy}benzoic acid By using methyl 4-methyl-3-{[5-(pyrimidin-2-yl)pyridin-3-yl]methoxy}benzoate (127 mg) obtained in Step 1 instead of methyl 5-[(cyclopropylmethyl)amino]pyridine-3-carboxylate, the title compound (101 mg) was obtained by the method as described in Step 2 of Reference Example 1.

[Step 3] Production of N-[(1S,2S)-2-hydroxycyclohexyl]-4-methyl-3-{[5-(pyrimidin-2-yl)pyridin-3-yl]methoxy}benzamide By using 4-methyl-3-{[5-(pyrimidin-2-yl)pyridin-3-yl]methoxy}benzoic acid (60 mg) obtained in Step 2 instead of 3-{[2-(cyclopropylamino)-1,3-thiazole-5-carbonyl]amino}-4-methylbenzoic acid, the title compound (76 mg) was obtained by the method as described in Step 4 of Example 1.

Example 170: 4-Chloro-N-[(1S,2S)-2-hydroxycyclohexyl]-3-({[5-(pyrimidin-2-yl)pyridin-3-yl]oxy}methyl)benzamide

[Step 1] Production of methyl 4-chloro-3-({[5-(pyrimidin-2-yl)pyridin-3-yl]oxy}methyl)benzoate By using 5-(pyrimidin-2-yl)pyridin-3-ol (123 mg) obtained in Step 2 of Reference Example 10 and methyl 4-chloro-3-(hydroxymethyl)benzoate (130 mg) obtained in Reference Example 31 instead of methyl 5-hydroxypyridine-3-carboxylate and 3,3-difluorocyclobutan-1-ol, the title compound (50 mg) was obtained by the method as described in Step 1 of Reference Example 3. MS (m/z): 356.4 [M+H]+

[Step 2] Production of 4-chloro-3-({[5-(pyrimidin-2-yl)pyridin-3-yl]oxy}methyl)benzoic acid By using methyl 4-chloro-3-({[5-(pyrimidin-2-yl)pyridin-3-yl]oxy}methyl)benzoate (50 mg) obtained in Step 1 instead of methyl 5-[(cyclopropylmethyl)amino]pyridine-3-carboxylate, the title compound (43 mg) was obtained by the method as described in Step 2 of Reference Example 1. MS (m/z): 342.4 [M+H]+

[Step 3] Production of 4-chloro-N-[(1S,2S)-2-hydroxycyclohexyl]-3-({[5-(pyrimidin-2-yl)pyridin-3-yl]oxy}methyl)benzamide By using 4-chloro-3-({[5-(pyrimidin-2-yl)pyridin-3-yl]oxy}methyl)benzoic acid (43 mg) obtained in Step 2 instead of 3-{[2-(cyclopropylamino)-1,3-thiazole-5-carbonyl]amino}-4-methylbenzoic acid, the title compound (39 mg) was obtained by the method as described in Step 4 of Example 1.

Example 172: N-[(1S,2S)-2-Hydroxycyclohexyl]-4-methyl-3-[1-(5-phenylpyridin-3-yl)ethoxy]benzamide

[Step 1] Production of methyl 3-[1-(5-bromopyridin-3-yl)ethoxy]-4-methylbenzoate By using methyl 3-hydroxy-4-methylbenzoate (432 mg) and 1-(5-bromopyridin-3-yl)ethan-1-ol (500 mg) instead of methyl 5-hydroxypyridine-3-carboxylate and 3,3-difluorocyclobutan-1-ol, the title compound (650 mg) was obtained by the method as described in Step 1 of Reference Example 3. MS (m/z): 350.3 [M+H]+

[Step 2] Production of 3-[1-(5-bromopyridin-3-yl)ethoxy]-4-methylbenzoic acid

By using methyl 3-[1-(5-bromopyridin-3-yl)ethoxy]-4-methylbenzoate (450 mg) obtained in Step 1 instead of methyl 5-[(cyclopropylmethyl)amino]pyridine-3-carboxylate, the title compound (350 mg) was obtained by the method as described in Step 2 of Reference Example 1. MS (m/z): 336.3 [M+H]+

[Step 3] Production of 3-[1-(5-bromopyridin-3-yl)ethoxy]-N-[(1S,2S)-2-hydroxycyclohexyl]-4-methylbenzamide By using 3-[1-(5-bromopyridin-3-yl)ethoxy]-4-methylbenzoic acid (350 mg) obtained in Step 2 instead of 3-{[2-

(cyclopropylamino)-1,3-thiazole-5-carbonyl]amino}-4-methylbenzoic acid, the title compound (350 mg) was obtained by the method as described in Step 4 of Example 1. MS (m/z): 433.5 [M+H]+

[Step 4] Production of N-[(1S,2S)-2-hydroxycyclohexyl]-4-methyl-3-[1-(5-phenylpyridin-3-yl)ethoxy]benzamide By using 3-[1-(5-bromopyridin-3-yl)ethoxy]-N-[(1S,2S)-2-hydroxycyclohexyl]-4-methylbenzamide (50 mg) obtained in Step 3 and phenylboronic acid (17 mg) instead of 2-chloropyrimidin-4-amine and isoquinolin-4-ylboronic acid, the title compound (30 mg) was obtained by the method as described in Reference Example 14.

Example 173: N-[(1S,2S)-2-Hydroxycyclohexyl]-4-methyl-3-[(E)-2-(5-phenylpyridin-3-yl)ethenyl]benzamide

[Step 1] Production of 3-ethenyl-N-[(1R,2R)-2-hydroxycyclohexyl]-4-methylbenzamide By using 3-bromo-N-[(1S,2S)-2-hydroxycyclohexyl]-4-methylbenzamide (20.0 g) obtained in Reference Example 43 and 2-ethenyl-4,4,5,5-tetramethyl-1,3,2-dioxaborolane (11.8 g) instead of 2-chloropyrimidin-4-amine and isoquinolin-4-ylboronic acid, the title compound (13.0 g) was obtained by the method as described in Reference Example 14. MS (m/z): 260.2 [M+H]+

[Step 2] Production of N-[(1S,2S)-2-hydroxycyclohexyl]-4-methyl-3-[(E)-2-(5-phenylpyridin-3-yl)ethenyl]benzamide A mixture of 3-ethenyl-N-[(1R,2R)-2-hydroxycyclohexyl]-4-methylbenzamide (30 mg) obtained in Step 1, 3-bromo-5-phenylpyridine (27 mg), TEA (0.024 mL), tris(2-methylphenyl)phosphine (11 mg), Pd(OAc)$_2$ (3.9 mg), and acetonitrile (0.58 mL) was allowed to react at 100° C. for 80 minutes, using a microwave reaction apparatus. The reaction solution was concentrated under reduced pressure, and the obtained residue was purified by silica gel column chromatography to afford the title compound (24 mg).

Example 174: N-[(1S,2S)-2-Hydroxycyclohexyl]-4-methyl-3-[2-(5-phenylpyridin-3-yl)ethyl]benzamide To a solution of N-[(1S,2S)-2-hydroxycyclohexyl]-4-methyl-3-[(E)-2-(5-phenylpyridin-3-yl)ethenyl]benzamide (15 mg) obtained in Example 173 in ethanol (5 mL), after degassing, 10% Pd—C (7.7 mg) was added under argon atmosphere while stirring the solution at room temperature. The reaction mixture was stirred under hydrogen atmosphere at room temperature overnight. The reaction solution was filtered through Celite®, and the solvent was distilled off under reduced pressure. The residue was purified by silica gel column chromatography to afford the title compound (7 mg).

Example 175: N-[(1S,2S)-2-Hydroxycyclohexyl]-4-methyl-3-{[methyl(5-phenylpyridin-3-yl)amino]methyl}benzamide

[Step 1] Production of methyl 3-{[(5-bromopyridin-3-yl)(methyl)amino]methyl}-4-methylbenzoate To a solution of methyl 3-{[(5-bromopyridin-3-yl)amino]methyl}-4-methylbenzoate (850 mg) obtained in Step 1 of Example 147 in THF (10 mL), 60% sodium hydride (79 mg) was added under ice cooling, and the reaction mixture was stirred at room temperature for 20 minutes. Then, iodomethane (720 mg) was added thereto, and the reaction mixture was stirred at the same temperature overnight. To the reaction solution, water was added under ice cooling, and the mixture was extracted with ethyl acetate. The organic layer was washed with saturated saline solution and dried over anhydrous sodium sulfate, and the solvent was then distilled off under reduced pressure. The residue was purified by silica gel column chromatography to afford the title compound (200 mg). MS (m/z): 349.4 [M+H]+

[Step 2] Production of 3-{[(5-bromopyridin-3-yl)(methyl)amino]methyl}-4-methylbenzoic acid By using methyl 3-{[(5-bromopyridin-3-yl)(methyl)amino]methyl}-4-methylbenzoate (200 mg) obtained in Step 1 instead of methyl 5-[(cyclopropylmethyl)amino]pyridine-3-carboxylate, the title compound (170 mg) was obtained by the method as described in Step 2 of Reference Example 1. MS (m/z): 335.4 [M+H]+

[Step 3] Production of 3-{[(5-bromopyridin-3-yl)(methyl)amino]methyl}-N-[(1S,2S)-2-hydroxycyclohexyl]-4-methylbenzamide By using 3-{[(5-bromopyridin-3-yl)(methyl)amino]methyl}-4-methylbenzoic acid (170 mg) obtained in Step 2 instead of 3-{[2-(cyclopropylamino)-1,3-thiazole-5-carbonyl]amino}-4-methylbenzoic acid, the title compound (147 mg) was obtained by the method as described in Step 4 of Example 1. MS (m/z): 432.6 [M+H]+

[Step 4] Production of N-[(1S,2S)-2-hydroxycyclohexyl]-4-methyl-3-{[methyl(5-phenylpyridin-3-yl)amino]methyl}benzamide By using 3-{[(5-bromopyridin-3-yl)(methyl)amino]methyl}-N-[(1S,2S)-2-hydroxycyclohexyl]-4-methylbenzamide (30 mg) obtained in Step 3 and phenylboronic acid (9.3 mg) instead of 2-chloropyrimidin-4-amine and isoquinolin-4-ylboronic acid, the title compound (24 mg) was obtained by the method as described in Reference Example 14.

Example 177: 3-[(Z)-2-([2,3'-Bipyridin]-5'-yl)-2-fluoroethenyl]-4-fluoro-N-[(1S,2S)-2-hydroxycyclohexyl]benzamide

[Step 1] Production of 3-(2,2-difluoroethenyl)-4-fluoro-N-[(1S,2S)-2-hydroxycyclohexyl]benzamide To a solution of 4-fluoro-3-formyl-N-[(1S,2S)-2-hydroxycyclohexyl]benzamide (500 mg) obtained in Reference Example 29 and triphenylphosphine (593 mg) in DMF (3.8 mL), a solution of sodium chlorodifluoroacetate (431 mg) in DMF (0.94 mL) was added dropwise at 100° C. over 30 minutes, and the reaction mixture was stirred at the same temperature for 30 minutes. To the reaction solution, water was added under ice cooling, and the mixture was extracted with ethyl acetate. The organic layer was washed with saturated saline solution and dried over anhydrous sodium sulfate, and the solvent was then distilled off under reduced pressure. The residue was purified by silica gel column chromatography to afford the title compound (200 mg). MS (m/z): 300.1 [M+H]+

[Step 2] Production of 4-fluoro-3-[(Z)-2-fluoro-2-(4,4,5,5-tetramethyl-1,3,2-dioxaborolan-2-yl)ethenyl]-N-[(1S,2S)-2-hydroxycyclohexyl]benzamide To 3-(2,2-difluoroethenyl)-4-fluoro-N-[(1S,2S)-2-hydroxycyclohexyl]benzamide (100 mg) obtained in Step 1, bis(pinacolato)diboron (170 mg), potassium acetate (39 mg), tricyclohexylphosphine (19 mg), and copper(I) chloride (3.3 mg), THF (2.2 mL) was added, and after degassing, the reaction mixture was stirred under argon atmosphere at 40° C. overnight. To the reaction solution, saturated aqueous ammonium chloride solution was added, and the mixture was extracted with ethyl acetate. The organic layer was washed with saturated saline solution and dried over anhydrous sodium sulfate, and the solvent was then distilled off under reduced pressure to afford the title compound (130 mg).

[Step 3] Production of 3-[(Z)-2-([2,3'-bipyridin]-5'-yl)-2-fluoroethenyl]-4-fluoro-N-[(1S,2S)-2-hydroxycyclohexyl]benzamide By using 5'-bromo-2,3'-bipyridine (45 mg) and 4-fluoro-3-[(Z)-2-fluoro-2-(4,4,5,5-tetramethyl-1,3,2-dioxaborolan-2-yl)ethenyl]-N-[(1S,2S)-2-hydroxycyclohexyl]benzamide (65 mg) obtained in Step 2 instead of 2-chloropyrimidin-4-amine and isoquinolin-4-ylboronic acid, the title compound (10 mg) was obtained by the method as described in Reference Example 14.

Example 180: 5-[(Z)-2-([2,3'-Bipyridin]-5'-yl)-2-fluoroethenyl]-N-[(1S,2S)-2-hydroxycyclohexyl]-6-methylpyridine-3-carboxamide

[Step 1] Production of ethyl 5-(2,2-difluoroethenyl)-6-methylpyridine-3-carboxylate By using ethyl 5-formyl-6-methylpyridine-3-carboxylate (2.65 g) obtained in Reference Example 33 instead of 4-fluoro-3-formyl-N-[(1S,2S)-2-hydroxycyclohexyl]benzamide, the title compound (2.80 g) was obtained by the method as described in Step 1 of Example 177. MS (m/z): 228.1 [M+H]$^+$

[Step 2] Production of ethyl 5-[(Z)-2-fluoro-2-(4,4,5,5-tetramethyl-1,3,2-dioxaborolan-2-yl)ethenyl]-6-methylpyridine-3-carboxylate By using ethyl 5-(2,2-difluoroethenyl)-6-methylpyridine-3-carboxylate (200 mg) obtained in Step 1 instead of 3-(2,2-difluoroethenyl)-4-fluoro-N-[(1S,2S)-2-hydroxycyclohexyl]benzamide, the title compound (280 mg) was obtained by the method as described in Step 2 of Example 177.

[Step 3] Production of ethyl 5-[(Z)-2-([2,3'-bipyridin]-5'-yl)-2-fluoroethenyl]-6-methylpyridine-3-carboxylate By using 5'-bromo-2,3'-bipyridine (196 mg) and ethyl 5-[(Z)-2-fluoro-2-(4,4,5,5-tetramethyl-1,3,2-dioxaborolan-2-yl)ethenyl]-6-methylpyridine-3-carboxylate (280 mg) obtained in Step 2 instead of 2-chloropyrimidin-4-amine and isoquinolin-4-ylboronic acid, the title compound (230 mg) was obtained by the method as described in Reference Example 14. MS (m/z): 364.2 [M+H]$^+$

[Step 4] Production of 5-[(Z)-2-([2,3'-bipyridin]-5'-yl)-2-fluoroethenyl]-6-methylpyridine-3-carboxylic acid By using ethyl 5-[(Z)-2-([2,3'-bipyridin]-5'-yl)-2-fluoroethenyl]-6-methylpyridine-3-carboxylate (230 mg) obtained in Step 3 instead of methyl 5-[(cyclopropylmethyl)amino]pyridine-3-carboxylate, the title compound (165 mg) was obtained by the method as described in Step 2 of Reference Example 1. MS (m/z): 336.1 [M+H]$^+$

[Step 5] Production of 5-[(Z)-2-([2,3'-bipyridin]-5'-yl)-2-fluoroethenyl]-N-[(1S,2S)-2-hydroxycyclohexyl]-6-methylpyridine-3-carboxamide By using 5-[(Z)-2-([2,3'-bipyridin]-5'-yl)-2-fluoroethenyl]-6-methylpyridine-3-carboxylic acid (120 mg) obtained in Step 4 instead of 3-{[2-(cyclopropylamino)-1,3-thiazole-5-carbonyl]amino}-4-methylbenzoic acid, the title compound (77 mg) was obtained by the method as described in Step 4 of Example 1.

Example 192: 3-[(Z)-2-(2-Aminopyrimidin-5-yl)-2-fluoroethenyl]-4-fluoro-N-[(1S,2S)-2-hydroxycyclohexyl]benzamide

[Step 1] Production of methyl 3-(2,2-difluoroethenyl)-4-fluorobenzoate

By using methyl 4-fluoro-3-formylbenzoate (1.27 g) instead of 4-fluoro-3-formyl-N-[(1S,2S)-2-hydroxycyclohexyl]benzamide, the title compound (1.30 g) was obtained by the method as described in Step 1 of Example 177.

[Step 2] Production of methyl 3-[(Z)-2-(2-aminopyrimidin-5-yl)-2-fluoroethenyl]-4-fluorobenzoate To methyl 3-(2,2-difluoroethenyl)-4-fluorobenzoate (130 mg) obtained in Step 1, bis(pinacolato)diboron (305 mg), potassium acetate (118 mg), tricyclohexylphosphine (34 mg), and copper(I) chloride (22 mg), THF (4 mL) was added, and after degassing, the reaction mixture was stirred under argon atmosphere at 40° C. for 8 hours. To the reaction solution, saturated aqueous ammonium chloride solution was added, and the mixture was extracted with ethyl acetate. The organic layer was washed with saturated saline solution and dried over anhydrous sodium sulfate, and the solvent was then distilled off under reduced pressure. To the obtained residue, 5-bromopyrimidin-2-amine (105 mg), potassium carbonate (166 mg), Pd(dppf)Cl$_2$·CH$_2$Cl$_2$ (49 mg), 1,4-dioxane (2 mL), and water (0.2 mL) were added, and after degassing, the reaction mixture was stirred under argon atmosphere at 85° C. overnight. The reaction solution was concentrated under reduced pressure, and the obtained residue was purified by silica gel column chromatography to afford the title compound (200 mg). MS (m/z): 292.1 [M+H]$^+$

[Step 3] Production of 3-[(Z)-2-(2-aminopyrimidin-5-yl)-2-fluoroethenyl]-4-fluorobenzoic acid By using methyl 3-[(Z)-2-(2-aminopyrimidin-5-yl)-2-fluoroethenyl]-4-fluorobenzoate (200 mg) obtained in Step 2 instead of methyl 5-[(cyclopropylmethyl)amino]pyridine-3-carboxylate, the title compound (36 mg) was obtained by the method as described in Step 2 of Reference Example 1. MS (m/z): 278.1 [M+H]$^+$

[Step 4] Production of 3-[(Z)-2-(2-aminopyrimidin-5-yl)-2-fluoroethenyl]-4-fluoro-N-[(1S,2S)-2-hydroxycyclohexyl]benzamide By using 3-[(Z)-2-(2-aminopyrimidin-5-yl)-2-fluoroethenyl]-4-fluorobenzoic acid (36 mg) obtained in Step 3 instead of 3-{[2-(cyclopropylamino)-1,3-thiazole-5-carbonyl]amino}-4-methylbenzoic acid, the title compound (4 mg) was obtained by the method as described in Step 4 of Example 1.

Example 194: 3-[(Z)-2-{5-[(4-Ethylpiperazin-1-yl)methyl]pyridin-3-yl}-2-fluoroethenyl]-N-[(1S,2S)-2-hydroxycyclohexyl]-4-methylbenzamide

[Step 1] Production of methyl 3-(2,2-difluoroethenyl)-4-methylbenzoate

By using methyl 3-formyl-4-methylbenzoate (13.4 g) instead of 4-fluoro-3-formyl-N-[(1S,2S)-2-hydroxycyclohexyl]benzamide, the title compound (15.0 g) was obtained by the method as described in Step 1 of Example 177. MS (m/z): 213.1 [M+H]+

[Step 2] Production of methyl 3-[(Z)-2-fluoro-2-(4,4,5,5-tetramethyl-1,3,2-dioxaborolan-2-yl)ethenyl]-4-methylbenzoate By using methyl 3-(2,2-difluoroethenyl)-4-methylbenzoate (6.0 g) obtained in Step 1 instead of 3-(2,2-difluoroethenyl)-4-fluoro-N-[(1S,2S)-2-hydroxycyclohexyl]benzamide, the title compound (8.6 g) was obtained by the method as described in Step 2 of Example 177.

[Step 3] Production of methyl 3-[(Z)-2-fluoro-2-{5-[(4-ethylpiperazin-1-yl)methyl]pyridin-3-yl}ethenyl]-4-methylbenzoate By using 1-[(5-bromopyridin-3-yl)methyl]-4-ethylpiperazine (6.3 g) obtained in Reference Example 38 and methyl 3-[(Z)-2-fluoro-2-(4,4,5,5-tetramethyl-1,3,2-dioxaborolan-2-yl)ethenyl]-4-methylbenzoate (8.5 g) obtained in Step 2 instead of 2-chloropyrimidin-4-amine and isoquinolin-4-ylboronic acid, the title compound (7.5 g) was obtained by the method as described in Reference Example 14. MS (m/z): 398.3 [M+H]+

[Step 4] Production of 3-[(Z)-2-fluoro-2-{5-[(4-ethylpiperazin-1-yl)methyl]pyridin-3-yl}ethenyl]-4-methylbenzoic acid By using methyl 3-[(Z)-2-fluoro-2-{5-[(4-ethylpiperazin-1-yl)methyl]pyridin-3-yl}ethenyl]-4-methylbenzoate (7.5 g) obtained in Step 3 instead of methyl 5-[(cyclopropylmethyl)amino]pyridine-3-carboxylate, the title compound (4.7 g) was obtained by the method as described in Step 2 of Reference Example 1. MS (m/z): 384.5 [M+H]+

[Step 5] Production of 3-[(Z)-2-{5-[(4-Ethylpiperazin-1-yl)methyl]pyridin-3-yl}-2-fluoroethenyl]-N-[(1S,2S)-2-hydroxycyclohexyl]-4-methylbenzamide By using 3-[(Z)-2-fluoro-2-{5-[(4-ethylpiperazin-1-yl)methyl]pyridin-3-yl}ethenyl]-4-methylbenzoic acid (4.7 g) obtained in Step 4 instead of 3-{[2-(cyclopropylamino)-1,3-thiazole-5-carbonyl]amino}-4-methylbenzoic acid, the title compound (3.4 g) was obtained by the method as described in Step 4 of Example 1.

Example 199: 5-[(Z)-2-{6-[(Cyclopropylmethyl)amino]pyridin-3-yl}-2-fluoroethenyl]-N-[(1S,2S)-2-hydroxycyclohexyl]-6-methylpyridine-3-carboxamide

[Step 1] Production of ethyl 5-[(Z)-2-(6-aminopyridin-3-yl)-2-fluoroethenyl]-6-methylpyridine-3-carboxylate By using 5-bromopyridin-2-amine (114 mg) and ethyl 5-[(Z)-2-fluoro-2-(4,4,5,5-tetramethyl-1,3,2-dioxaborolan-2-yl)ethenyl]-6-methylpyridine-3-carboxylate obtained in Step 2 of Example 180 instead of 2-chloropyrimidin-4-amine and isoquinolin-4-ylboronic acid, the title compound (40 mg) was obtained by the method as described in Reference Example 14. MS (m/z): 302.1 [M+H]+

[Step 2] Production of ethyl 5-[(Z)-2-{6-[(cyclopropylmethyl)amino]pyridin-3-yl}-2-fluoroethenyl]-6-methylpyridine-3-carboxylate By using ethyl 5-[(Z)-2-(6-aminopyridin-3-yl)-2-fluoroethenyl]-6-methylpyridine-3-carboxylate (60 mg) obtained in Step 1 and cyclopropanecarbaldehyde (19 mg) instead of 1-methylpiperazine and 5-bromopyridine-3-carbaldehyde, the title compound (12 mg) was obtained by the method as described in Reference Example 34. MS (m/z): 356.5 [M+H]+

[Step 3] Production of 5-[(Z)-2-{6-[(cyclopropylmethyl)amino]pyridin-3-yl}-2-fluoroethenyl]-6-methylpyridine-3-carboxylic acid By using ethyl 5-[(Z)-2-{6-[(cyclopropylmethyl)amino]pyridin-3-yl}-2-fluoroethenyl]-6-methylpyridine-3-carboxylate (12 mg) obtained in Step 2 instead of methyl 5-[(cyclopropylmethyl)amino]pyridine-3-carboxylate, the title compound (11 mg) was obtained by the method as described in Step 2 of Reference Example 1.

[Step 4] Production of 5-[(Z)-2-{6-[(cyclopropylmethyl)amino]pyridin-3-yl}-2-fluoroethenyl]-N-[(1S,2S)-2-hydroxycyclohexyl]-6-methylpyridine-3-carboxamide By using 5-[(Z)-2-{6-[(cyclopropylmethyl)amino]pyridin-3-yl}-2-fluoroethenyl]-6-methylpyridine-3-carboxylic acid (11 mg) obtained in Step 3 instead of 3-{[2-(cyclopropylamino)-1,3-thiazole-5-carbonyl]amino}-4-methylbenzoic acid, the title compound (10 mg) was obtained by the method as described in Step 4 of Example 1.

The compounds of Reference Examples and Examples are shown in Table 3 to Table 29 described below.

In the tables, Referenced Reference Example means that the compound in question was produced using the corresponding raw materials by the method as described in the method for producing the compound with the Reference Example number corresponding to that number, and for example, a Reference Example compound with a Referenced Reference Example number of 1 means that it was produced by the method as described in Reference Example 1.

In the tables, Referenced Example means that the compound in question was produced using the corresponding raw materials by the method as described in the method for producing the compound with the Example number corresponding to that number, and for example, an Example compound with a Referenced Example number of 1 means that it was produced by the method as described in Example 1.

In the tables, Chemical Name refers to the name of the compound corresponding to the Reference Example number and the Example number. In addition, Data means the instrumental analytical data, such as mass spectrometric data (m/z values), 1H NMR data (δ (ppm) of peaks), and elemental analytical data (composition (%) of C, H and N).

TABLE 3

| Example | Referenced Example | Chemical Name |
|---|---|---|
| 1 | 1 | 2-(cyclopropylamino)-N-(5-{[(1S,2S)-2-hydroxycyclohexyl]carbamoyl}-2-methylphenyl)-1,3-thiazole-5-carboxamide |
| 2 | 2 | N-(5-{[(1S,2S)-2-hydroxycyclohexyl]carbamoyl}-2-methylphenyl)-5-phenylpyridine-3-carboxamide |
| 3 | 3 | 2-(cyclopropylmethyl)-N-(5-{[(1S,2S)-2-hydroxycyclohexyl]carbamoyl}-2-methylphenyl)-1,3-thiazole-5-carboxamide |
| 4 | 3 | 5-(cyclopropylamino)-N-(5-{[(1S,2S)-2-hydroxycyclohexyl]carbamoyl}-2-methylphenyl)pyridine-3-carboxamide |
| 5 | 5 | N-(5-{[(1S,2S)-2-hydroxycyclohexyl]carbamoyl}-2-methylphenyl)-2-phenyl-1,3-oxazole-5-carboxamide |
| 6 | 6 | N-(5-{[(1S)-2-hydroxy-1-phenylethyl]carbamoyl}-2-methylphenyl)-5-phenylpyridine-3-carboxamide |
| 7 | 5 | N-(5-{[(1S,2S)-2-hydroxycyclohexyl]carbamoyl}-2-methylphenyl)-5-[(propan-2-yl)oxy]pyridine-3-carboxamide |
| 8 | 1 | 2-[(cyclopropylmethyl)amino]-N-(5-{[(1S,2S)-2-hydroxycyclohexyl]carbamoyl}-2-methylphenyl)-1,3-thiazole-5-carboxamide |
| 9 | 2 | 5-(4-chlorophenyl)-N-(5-{[(1S,2S)-2-hydroxycyclohexyl]carbamoyl}-2-methylphenyl)pyridine-3-carboxamide |
| 10 | 5 | N-(5-{[(1 S,2S)-2-hydroxycyclohexyl]carbamoyl}-2-methylphenyl)-2-propyl-1,3-thiazole-5-carboxamide |
| 11 | 2 | 5-(3-chlorophenyl)-N-(5-{[(1S,2S)-2-hydroxycyclohexyl]carbamoyl}-2-methylphenyl)pyridine-3-carboxamide |
| 12 | 2 | N-(5-{[(1S,2S)-2-hydroxycyclohexyl]carbamoyl}-2-methylphenyl)-5-(2-methylphenyl)pyridine-3-carboxamide |
| 13 | 2 | 5-(2-chlorophenyl)-N-(5-{[(1S,2S)-2-hydroxycyclohexyl]carbamoyl}-2-methylphenyl)pyridine-3-carboxamide |

TABLE 4

| Example | Referenced Example | Chemical Name |
|---|---|---|
| 14 | 6 | N-(5-{[(2S)-1-hydroxypentan-2-yl]carbamoyl}-2-methylphenyl)-5-phenylpyridine-3-carboxamide |
| 15 | 2 | 5-[(E)-2-cyclopropylethenyl]-N-(5-{[(1S,2S)-2-hydroxycyclohexyl]carbamoyl}-2-methylphenyl)pyridine-3-carboxamide |
| 16 | 3 | 5-[(cyclopropylmethyl)amino]-N-(5-{[(1S,2S)-2-hydroxycyclohexyl]carbamoyl}-2-methylphenyl)pyridine-3-carboxamide |
| 17 | 17 | 5-[cyclopropyl(methyl)amino]-N-(5-{[(1S,2S)-2-hydroxycyclohexyl]carbamoyl}-2-methylphenyl)pyridine-3-carboxamide |
| 18 | 2 | N-(5-{[(1S,2S)-2-hydroxycyclohexyl]carbamoyl}-2-methylphenyl)-5-(4-methoxyphenyl)pyridine-3-carboxamide |
| 19 | 2 | 5-(4-fluorophenyl)-N-(5-{[(1S,2S)-2-hydroxycyclohexyl]carbamoyl}-2-methylphenyl)pyridine-3-carboxamide |
| 20 | 20 | 5-(3-fluorophenyl)-N-(5-{[(1S,2S)-2-hydroxycyclohexyl]carbamoyl}-2-methylphenyl)pyridine-3-carboxamide |
| 21 | 2 | N-(5-{[(1S,2S)-2-hydroxycyclohexyl]carbamoyl}-2-methylphenyl)-5-[4-(trifluoromethyl)phenyl]pyridine-3-carboxamide |
| 22 | 2 | N-(5-{[(1S,2S)-2-hydroxycyclohexyl]carbamoyl}-2-methylphenyl)-5-[3-(trifluoromethyl)phenyl]pyridine-3-carboxamide |
| 23 | 2 | N-(5-{[(1S,2S)-2-hydroxycyclohexyl]carbamoyl}-2-methylphenyl)-5-(2-methylprop-1-en-1-yl)pyridine-3-carboxamide |
| 24 | 24 | 5-(cyclopropylmethoxy)-N-(5-{[(1S,2S)-2-hydroxycyclohexyl]carbamoyl}-2-methylphenyl)pyridine-3-carboxamide |
| 25 | 1 | 2-[(3,3-difluorocyclobutyl)amino]-N-(5-{[(1S,2S)-2-hydroxycyclohexyl]carbamoyl}-2-methylphenyl)-1,3-thiazole-5-carboxamide |

TABLE 5

| Example | Referenced Example | Chemical Name |
|---|---|---|
| 26 | 26 | 2-[(2-cyclopropylethyl)amino]-N-(5-{[(1S,2S)-2-hydroxycyclohexyl]carbamoyl}-2-methylphenyl)-1,3-thiazole-5-carboxamide |
| 27 | 26 | N-(5-{[(1S,2S)-2-hydroxycyclohexyl]carbamoyl}-2-methylphenyl)-2-[(propan-2-yl)amino]-1,3-thiazole-5-carboxamide |
| 28 | 3 | 5-[(4,4-difluorocyclohexyl)oxy]-N-(5-{[(1S,2S)-2-hydroxycyclohexyl]carbamoyl}-2-methylphenyl)pyridine-3-carboxamide |
| 29 | 2 | 5-(2-fluorophenyl)-N-(5-{[(1S,2S)-2-hydroxycyclohexyl]carbamoyl}-2-methylphenyl)pyridine-3-carboxamide |
| 30 | 2 | 5-(2,3-difluorophenyl)-N-(5-{[(1S,2S)-2-hydroxycyclohexyl]carbamoyl}-2-methylphenyl)pyridine-3-carboxamide |
| 31 | 2 | 5-(2,4-difluorophenyl)-N-(5-{[(1S,2S)-2-hydroxycyclohexyl]carbamoyl}-2-methylphenyl)pyridine-3-carboxamide |
| 32 | 2 | 5-(3,5-difluorophenyl)-N-(5-{[(1S,2S)-2-hydroxycyclohexyl]carbamoyl}-2-methylphenyl)pyridine-3-carboxamide |
| 33 | 2 | 5-(2-fluoro-4-methoxyphenyl)-N-(5-{[(1S,2S)-2-hydroxycyclohexyl]carbamoyl}-2-methylphenyl)pyridine-3-carboxamide |
| 34 | 2 | N-(5-{[(1S,2S)-2-hydroxycyclohexyl]carbamoyl}-2-methylphenyl)-5-[3-(trifluoromethoxy)phenyl]pyridine-3-carboxamide |
| 35 | 2 | N-(5-{[(1S,2S)-2-hydroxycyclohexyl]carbamoyl}-2-methylphenyl)-5-[2-(trifluoromethoxy)phenyl]pyridine-3-carboxamide |
| 36 | 2 | 5-[2-fluoro-4-(trifluoromethyl)phenyl]-N-(5-{[(1S,2S)-2-hydroxycyclohexyl]carbamoyl}-2-methylphenyl)pyridine-3-carboxamide |

TABLE 6

| Example | Referenced Example | Chemical Name |
|---|---|---|
| 37 | 2 | 5-(2,6-difluorophenyl)-N-(5-{[(1S,2S)-2-hydroxycyclohexyl]carbamoyl}-2-methylphenyl)pyridine-3-carboxamide |
| 38 | 26 | 2-(tert-butylamino)-N-(5-{[(1S,2S)-2-hydroxycyclohexyl]carbamoyl}-2-methylphenyl)-1,3-thiazole-5-carboxamide |
| 39 | 26 | N-(5-{[(1S,2S)-2-hydroxycyclohexylCcarbamoyl}-2-methylphenyl)-2-[(1-methylcyclopropyl)amino]-1,3-thiazole-5-carboxamide |
| 40 | 26 | N-(5-{[(1S,2S)-2-hydroxycyclohexyl]carbamoyl}-2-methylphenyl)-2-[(1-methylcyclobutyl)amino]-1,3-thiazole-5-carboxamide |
| 41 | 26 | 2-[(2,2-dimethylpropyl)amino]-N-(5-{[(1S,2S)-2-hydroxycyclohexyl]carbamoyl}-2-methylphenyl)-1,3-thiazole-5-carboxamide |
| 42 | 2 | N-(5-{[(1S,2S)-2-hydroxycyclohexyl]carbamoyl}-2-methylphenyl)-5-(3,4,5-trifluorophenyl)pyridine-3-carboxamide |
| 43 | 2 | 5-(4-cyclopropylphenyl)-N-(5-{[(1S,2S)-2-hydroxycyclohexyl]carbamoyl}-2-methylphenyl)pyridine-3-carboxamide |
| 44 | 3 | N-(2-chloro-5-{[(1S,2S)-2-hydroxycyclohexyl]carbamoyl}phenyl)-5-(cyclopropylmethoxy)pyridine-3-carboxamide |
| 45 | 5 | N-(5-{[(1S,2S)-2-hydroxycyclohexyl]carbamoyl}-2-methylphenyl)imidazo[2,1-b][1,3]thiazole-5-carboxamide |
| 46 | 3 | 5-(cyclopropylmethoxy)-N-(3-fluoro-5-{[(1S,2S)-2-hydroxycyclohexyl]carbamoyl}-2-methylphenyl)pyridine-3-carboxamide |
| 47 | 5 | 5-[(3,3-difluorocyclobutyl)oxy]-N-(5-{[(1S,2S)-2-hydroxycyclohexyl]carbamoyl}-2-methylphenyl)pyridine-3-carboxamide |

TABLE 7

| Example | Referenced Example | Chemical Name |
|---|---|---|
| 48 | 3 | 2-(cyclopropylmethyl)-N-(3-fluoro-5-{[(1S,2S)-2-hydroxycyclohexyl]carbamoyl}-2-methylphenyl)-1,3-thiazole-5-carboxamide |
| 49 | 5 | N-(5-{[(1S,2S)-2-hydroxycyclohexyl]carbamoyl}-2-methylphenyl)-5-methoxypyridine-3-carboxamide |
| 50 | 5 | 5-ethoxy-N-(5-{[(1S,2S)-2-hydroxycyclohexyl]carbamoyl}-2-methylphenyl)pyridine-3-carboxamide |
| 51 | 5 | N-(5-{[(1S,2S)-2-hydroxycyclohexyl]carbamoyl}-2-methylphenyl)-5-[(pyridin-2-yl)oxy]pyridine-3-carboxamide |
| 52 | 5 | N-(5-{[(1S,2S)-2-hydroxycyclohexyl]carbamoyl}-2-methylphenyl)-5-[(pyrimidin-2-yl)oxy]pyridine-3-carboxamide |
| 53 | 5 | N-(5-{[(1S,2S)-2-hydroxycyclohexyl]carbamoyl}-2-methylphenyl)-5-[(1-methylcyclopropyl)methoxy]pyridine-3-carboxamide |

TABLE 7-continued

| Example | Referenced Example | Chemical Name |
|---|---|---|
| 54 | 5 | 5-[(3,3-difluoroyclobutyl)methoxy]-N-(5-{[(1S,2S)-2-hydroxycyclohexyl]carbamoyl}-2-methylphenyl)pyridine-3-carboxamide |
| 55 | 3 | N-(2-chloro-5-{[(1S,2S)-2-hydroxycyclohexyl]carbamoyl}phenyl)-2-(cyclopropylmethyl)-1,3-thiazole-5-carboxamide |
| 56 | 3 | 5-(cyclopropylmethoxy)-N-(2-fluoro-5-{[(1S,2S)-2-hydroxycyclohexyl]carbamoyl}phenyl)pyridine-3-carboxamide |
| 57 | 57 | 3-[(5-bromopyridin-3-yl)ethynyl]-4-chloro-N-[(1S,2S)-2-hydroxycyclohexyl]benzamide |
| 58 | 58 | 4-chloro-N-[(1S,2S)-2-hydroxycyclohexyl]-3-[(5-phenylpyridin-3-yl)ethynyl]benzamide |
| 59 | 59 | N-[(1S,2S)-2-hydroxycyclohexyl]-4-methyl-3-[(5-methylpyridin-3-yl)ethynyl]benzamide |

TABLE 8

| Example | Referenced Example | Chemical Name |
|---|---|---|
| 60 | 59 | N-[(1S,2S)-2-hydroxycyclohexyl]-4-methyl-3-[(5-phenylpyridin-3-yl)ethynyl]benzamide |
| 61 | 61 | 3-[(5-bromopyridin-3-yl)ethynyl]-N-[(1S,2S)-2-hydroxycyclohexyl]-4-methylbenzamide |
| 62 | 62 | N-[(1S,2S)-2-hydroxycyclohexyl]-4-methyl-3-{[5-(pyrimidin-2-yl)pyridin-3-yl]ethynyl}benzamide |
| 63 | 62 | N-[(1S,2S)-2-hydroxycyclohexyl]-4-methyl-3-{[5-(pyrazin-2-yl)pyridin-3-yl]ethynyl}benzamide |
| 64 | 59 | 4-chloro-N-[(1S,2S)-2-hydroxycyclohexyl]-3-{[5-(pyrimidin-2-yl)pyridin-3-yl]ethynyl}benzamide |
| 65 | 59 | 3-[(6-aminopyridin-3-yl)ethynyl]-N-[(1S,2S)-2-hydroxycyclohexyl]-4-methylbenzamide |
| 66 | 62 | 3-[([2,3'-bipyridin]-5'-yl)ethynyl]-N-[(1S,2S)-2-hydroxycyclohexyl]-4-methylbenzamide |
| 67 | 67 | 3-[(5-cyclopropylpyridin-3-yl)ethynyl]-N-[(1S,2S)-2-hydroxycyclohexyl]-4-methylbenzamide |
| 68 | 67 | 3-[(6-cyclopropylpyrazin-2-yl)ethynyl]-N-[(1S,2S)-2-hydroxycyclohexyl]-4-methylbenzamide |
| 69 | 67 | 3-{[6-(2-fluorophenyl)pyrazin-2-yl]ethynyl}-N-[(1S,2S)-2-hydroxycyclohexyl]-4-methylbenzamide |
| 70 | 67 | 3-{[6-(3-fluorophenyl)pyrazin-2-yl]ethynyl}-N-[(1S,2S)-2-hydroxycyclohexyl]-4-methylbenzamide |
| 71 | 67 | 3-{[6-(4-fluorophenyl)pyrazin-2-yl]ethynyl}-N-[(1S,2S)-2-hydroxycyclohexyl]-4-methylbenzamide |
| 72 | 59 | 3-({6-[(cyclopropylmethyl)amino]pyrazin-2-yl}ethynyl)-N-[(1S,2S)-2-hydroxycyclohexyl]-4-methylbenzamide |

TABLE 9

| Example | Referenced Example | Chemical Name |
|---|---|---|
| 73 | 59 | 5-[(5-cyclopropylpyridin-3-yl)ethynyl]-N-[(1S,2S)-2-hydroxycyclohexyl]-6-methylpyridine-3-carboxamide |
| 74 | 59 | 3-[(6-bromopyrazin-2-yl)ethynyl]-N-[(1S,2S)-2-hydroxycyclohexyl]-4-methylbenzamide |
| 75 | 67 | N-[(1S,2S)-2-hydroxycyclohexyl]-4-methyl-3-[(6-phenylpyrazin-2-yl)ethynyl]benzamide |
| 76 | 76 | 3-[(5-bromopyridin-3-yl)ethynyl]-N-[(1S,2S)-1,3-dihydroxy-1-phenylpropan-2-yl]-4-methylbenzamide |
| 77 | 77 | N1-[(1S,2S)-2-hydroxycyclohexyl]-4-methyl-N3-(5-phenylpyridin-3-yl)benzene-1,3-dicarboxamide |
| 78 | 78 | N-[(1S,2S)-2-hydroxycyclohexyl]-4-methyl-3-{[2-(pyridin-3-yl)pyrimidin-4-yl]amino}benzamide |
| 79 | 78 | N-[(1S,2S)-2-hydroxycyclohexyl]-3-{[2-(isoquinolin-4-yl)pyrimidin-4-yl]amino}-4-methylbenzamide |
| 80 | 78 | N-[(1S,2S)-1,3-dihydroxy-1-phenylpropan-2-yl]-3-{[2-(isoquinolin-4-yl)pyrimidin-4-yl]amino}-4-methylbenzamide |
| 81 | 78 | 3-[([2,3'-bipyridin]-6-yl)amino]-5-fluoro-N-[(1S,2S)-2-hydroxycyclohexyl]-4-methylbenzamide |
| 82 | 78 | N-[(1S,2S)-2-hydroxycyclohexyl]-4-methyl-3-{[2-(methylamino)quinazolin-5-yl]amino}benzamide |

TABLE 9-continued

| Example | Referenced Example | Chemical Name |
|---|---|---|
| 83 | 83 | 3-(2-amino-7,8-dihydropyrido[4,3-d]pyrimidin-6(5H)-yl)-N-[(1S,2S)-1,3-dihydroxy-1-phenylpropan-2-yl]-4-methylbenzamide |
| 84 | 84 | N-[(1S,2S)-2-hydroxycyclohexyl]-4-methyl-3-{[(1S)-1-(5-phenylpyridin-3-yl)ethyl]amino}benzamide |

TABLE 10

| Example | Referenced Example | Chemical Name |
|---|---|---|
| 85 | 85 | 3-{[(1S)-1-([3,3'-bipyridin]-5-yl)ethyl]amino}-N-[(1S,2S)-2-hydroxycyclohexyl]-4-methylbenzamide |
| 86 | 84 | N-[(1S,2S)-2-hydroxycyclohexyl]-4-methyl-3-({(1S)-1-[5-(phenylethynyl)pyridin-3-yl]ethyl}amino)benzamide |
| 87 | 87 | 3-{[(1S)-1-([3,4'-bipyridin]-5-yl)ethyl]amino}-N-[(1S,2S)-2-hydroxycyclohexyl]-4-methylbenzamide |
| 88 | 84 | N-[(1S,2S)-2-hydroxycyclohexyl]-4-methyl-3-({(1S)-1-[5-(pyrimidin-2-yl)pyridin-3-yl]ethyl}amino)benzamide |
| 89 | 89 | 3-{[(1S)-1-([2,3'-bipyridin]-5'-yl)ethyl]amino}-N-[(1S,2S)-2-hydroxycyclohexyl]-4-methylbenzamide |
| 90 | 84 | 3-{[(1S)-1-([3,3'-bipyridin]-5-yl)ethyl]amino}-4-chloro-N-[(1S,2S)-2-hydroxycyclohexyl]benzamide |
| 91 | 91 | 3-{[(5-bromopyridin-3-yl)methyl]amino}-N-[(1S,2S)-2-hydroxycyclohexyl]-4-methylbenzamide |
| 92 | 92 | N-[(1S,2S)-2-hydroxycyclohexyl]-4-methyl-3-{[(5-phenylpyridin-3-yl)methyl]amino}benzamide |
| 93 | 92 | 3-{[([2,2'-bipyridin]-5-yl)methyl]amino}-N-[(1S,2S)-2-hydroxycyclohexyl]-4-methylbenzamide |
| 94 | 94 | 3-({[5-(cyclopropylethynyl)pyridin-3-yl]methyl}amino)-N-[(1S,2S)-2-hydroxycyclohexyl]-4-methylbenzamide |
| 95 | 95 | N-[(1S,2S)-2-hydroxycyclohexyl]-4-methyl-3-({[5-(pyrimidin-2-yl)pyridin-3-yl]methyl}amino)benzamide |
| 96 | 96 | N-[(1S,2S)-2-hydroxycyclohexyl]-4-methyl-3-{[(quinolin-3-yl)methyl]amino}benzamide |

TABLE 11

| Example | Referenced Example | Chemical Name |
|---|---|---|
| 97 | 94 | N-[(1S,2S)-2-hydroxycyclohexyl]-3-[({5-[(1-hydroxycyclopropyl)ethynyl]pyridin-3-yl}methyl)amino]-4-methylbenzamide |
| 98 | 98 | 3-[({5-[4-(2-aminopropan-2-yl)phenyl]pyridin-3-yl}methyl)amino]-N-[(1S,2S)-2-hydroxycyclohexyl]-4-methylbenzamide |
| 99 | 92 | 3-({[5-(4-aminophenyl)pyridin-3-yl]methyl}amino)-N-[(1S,2S)-2-hydroxycyclohexyl]-4-methylbenzamide |
| 100 | 92 | 3-({[5-(3,5-difluorophenyl)pyridin-3-yl]methyl}amino)-N-[(1S,2S)-2-hydroxycyclohexyl]-4-methylbenzamide |
| 101 | 101 | N-[(1S,2S)-2-hydroxycyclohexyl]-4-methyl-3-{[(6-phenylpyrazin-2-yl)methyl]amino}benzamide |
| 102 | 92 | N-[(1S,2S)-2-hydroxycyclohexyl]-4-methyl-3-({[5-(thiophen-2-yl)pyridin-3-yl]methyl}amino)benzamide |
| 103 | 92 | N-[(1S,2S)-2-hydroxycyclohexyl]-4-methyl-3-({[5-(thiophen-3-yl)pyridin-3-yl]methyl}amino)benzamide |
| 104 | 95 | 4-chloro-N-[(1S,2S)-2-hydroxycyclohexyl]-3-({[5-(pyrimidin-2-yl)pyridin-3-yl]methyl}amino)benzamide |
| 105 | 91 | N-[(1S,2S)-2-hydroxycyclohexyl]-4-methyl-3-{[(pyrazolo[5,1-b][1,3]thiazol-7-yl)methyl]amino}benzamide |
| 106 | 95 | 3-fluoro-N-[(1S,2S)-2-hydroxycyclohexyl]-4-methyl-5-({[5-(pyrimidin-2-yl)pyridin-3-yl]methyl}amino)benzamide |
| 107 | 98 | 3-({[5-(5-fluoropyrimidin-2-yl)pyridin-3-yl]methyl}amino)-N-[(1S,2S)-2-hydroxycyclohexyl]-4-methylbenzamide |

TABLE 12

| Example | Referenced Example | Chemical Name |
|---|---|---|
| 108 | 91 | N-[(1S,2S)-2-hydroxycyclohexyl]-4-methyl-3-{[(thieno[3,2-b]pyridin-6-yl)methyl]amino}benzamide |
| 109 | 109 | N-[(1S,2S)-2-hydroxycyclohexyl]-4-methyl-3-{[(1H-pyrazolo[3,4-b]pyridin-5-yl)methyl]amino}benzamide |
| 110 | 110 | N-[(1S,2S)-2-hydroxycyclohexyl]-3-{[(imidazo[1,2-b]pyridazin-3-yl)methyl]amino}-4-methylbenzamide |
| 111 | 98 | N-[(1S,2S)-2-hydroxycyclohexyl]-3-({[5-(imidazo[1,2-a]pyrazin-6-yl)pyridin-3-yl]methyl}amino)-4-methylbenzamide |
| 112 | 91 | N-[(1S,2S)-2-hydroxycyclohexyl]-4-methyl-3-({[1-(pyridin-2-yl)-1H-pyrazol-4-yl]methyl}amino)benzamide |
| 113 | 113 | 3-{[(2-aminopyrimidin-5-yl)methyl]amino}-N-[(1S,2S)-2-hydroxycyclohexyl]-4-methylbenzamide |
| 114 | 113 | 3-({[2-(cyclopropylamino)pyrimidin-5-yl]methyl}amino)-N-[(1S,2S)-2-hydroxycyclohexyl]-4-methylbenzamide |
| 115 | 98 | N-[(1S,2S)-2-hydroxycyclohexyl]-4-methyl-3-({[5-(pyrazin-2-yl)pyridin-3-yl]methyl}amino)benzamide |
| 116 | 116 | 3-{[(6-acetamidopyridin-3-yl)methyl]amino}-N-[(1S,2S)-2-hydroxycyclohexyl]-4-methylbenzamide |
| 117 | 113 | 3-[({6-[(cyclopropylmethyl)amino]pyridin-3-yl}methyl)amino]-N-[(1S,2S)-2-hydroxycyclohexyl]-4-methylbenzamide |
| 118 | 118 | 3-{[([2,2'-bipyridin]-5-yl)methyl]amino}-N-[(1S,2S)-2-hydroxycyclohexyl]-4-methylbenzamide |
| 119 | 91 | N-[(1S,2S)-2-hydroxycyclohexyl]-4-methyl-3-{[(pyrazolo[1,5-a]pyrimidin-3-yl)methyl]amino}benzamide |

TABLE 13

| Example | Referenced Example | Chemical Name |
|---|---|---|
| 120 | 116 | 3-[({6-[(cyclopropanecarbonyl)amino]pyridin-3-yl}methyl)amino]-N-[(1S,2S)-2-hydroxycyclohexyl]-4-methylbenzamide |
| 121 | 92 | N-[(1S,2S)-2-hydroxycyclohexyl]-4-methyl-3-{[(2-phenylpyrimidin-5-yl)methyl]amino}benzamide |
| 122 | 122 | N-[(1S,2S)-2-hydroxycyclohexyl]-4-methyl-3-({[6-(1H-pyrazol-1-yl)pyridin-3-yl]methyl}amino)benzamide |
| 123 | 91 | N-[(1S,2S)-2-hydroxycyclohexyl]-6-methyl-5-{[(pyrazolo[1,5-a]pyridin-3-yl)methyl]amino}pyridine-3-carboxamide |
| 124 | 116 | methyl{5-[(5-{[(1S,2S)-2-hydroxycyclohexyl]carbamoyl}-2-methylanilino)methyl]pyridin-2-yl}carbamate |
| 125 | 116 | N-[(1S,2S)-2-hydroxycyclohexyl]-4-methyl-3-[({6-[(oxan-4-yl)amino]pyridin-3-yl}methyl)amino]benzamide |
| 126 | 116 | N-[(1S,2S)-2-hydroxycyclohexyl]-4-methyl-3-[({2-[(pyridin-2-yl)amino]pyrimidin-5-yl}methyl)amino]benzamide |
| 127 | 91 | N-{5-[(5-{[(1S,2S)-2-hydroxycyclohexyl]carbamoyl}-2-methylanilino)methyl]pyridin-2-yl}morpholine-4-carboxamide |
| 128 | 92 | N-[(1S,2S)-2-hydroxycyclohexyl]-3-({[2-(4-methoxyphenyl)pyrimidin-5-yl]methyl}amino)-4-methylbenzamide |
| 129 | 129 | N-[(1S,2S)-2-hydroxycyclohexyl]-4-methyl-3-{[(6-{[(pyridin-3-yl)carbamoyl]amino}pyridin-3-yl)methyl]amino}benzamide |
| 130 | 116 | 3-({[6-(cyclobutylamino)pyridin-3-yl]methyl}amino)-N-[(1S,2S)-2-hydroxycyclohexyl]-4-methylbenzamide |
| 131 | 131 | 3-{[(5-aminopyrazin-2-yl)methyl]amino}-N-[(1S,2S)-2-hydroxycyclohexyl]-4-methylbenzamide |

TABLE 14

| Example | Referenced Example | Chemical Name |
|---|---|---|
| 132 | 113 | N-[(1S,2S)-2-hydroxycyclohexyl]-4-methyl-3-[({2-[(oxan-4-yl)amino]pyrimidin-5-yl}methyl)amino]benzamide |
| 133 | 91 | 3-{[(6-{[cyclopropyl(methyl)carbamoyl]amino}pyridin-3-yl)methyl]amino}-N-[(1S,2S)-2-hydroxycyclohexyl]-4-methylbenzamide |
| 134 | 116 | N-[(1S,2S)-2-hydroxycyclohexyl]-4-methyl-3-[({6-[(propan-2-yl)amino]pyridin-3-yl}methyl)amino]benzamide |
| 135 | 113 | N-[(1S,2S)-2-hydroxycyclohexyl]-4-methyl-3-{[(2-{[(3R)-oxolan-3-yl]amino}pyrimidin-5-yl)methyl]amino}benzamide |
| 136 | 113 | N-[(1S,2S)-2-hydroxycyclohexyl]-4-methyl-3-{[(2-{[(3S)-oxolan-3-yl]amino}pyrimidin-5-yl)methyl]amino}benzamide |

TABLE 14-continued

| Example | Referenced Example | Chemical Name |
|---|---|---|
| 137 | 116 | N-{5-[(5-{[(1S,2S)-2-hydroxycyclohexyl]carbamoyl}-2-methylanilino)methyl]pyridin-2-yl}oxane-4-carboxamide |
| 138 | 138 | N-[(1S,2S)-2-hydroxycyclohexyl]-3-{[(6-{[(1r,3r)-3-methoxycyclobutane-1-carbonyl]amino}pyridin-3-yl)methyl]amino}-4-methylbenzamide |
| 139 | 138 | N-{5-[(5-{[(1S,2S)-2-hydroxycyclohexyl]carbamoyl}-2-methylanilino)methyl]pyridin-2-yl}oxolane-3-carboxamide |
| 140 | 140 | N-[(1S,2S)-2-hydroxycyclohexyl]-4-methyl-3-({[6-(1H-1,2,3-triazol-1-yl)pyridin-3-yl]methyl}amino)benzamide |
| 141 | 116 | N-[(1S,2S)-2-hydroxycyclohexyl]-4-methyl-3-[({6-[(oxetan-3-yl)amino]pyridin-3-yl}methyl)amino]benzamide |
| 142 | 142 | 3-{[(2-aminopyrimidin-5-yl)methyl]amino}-4-chloro-N-[(1S,2S)-2-hydroxycyclohexyl]benzamide |

TABLE 15

| Example | Referenced Example | Chemical Name |
|---|---|---|
| 143 | 142 | 3-{[(2-aminopyrirnidin-5-yl)methyl]amino}-5-fluoro-N-[(1S,2S)-2-hydroxycyclohexyl]-4-methylbenzamide |
| 144 | 144 | 3-{[(3,4-dihydro-2H-pyrido[3,2-b][1,4]oxazin-7-yl)methyl]amino}-N-[(1S,2S)-2-hydroxycyclohexyl]-4-methylbenzamide |
| 145 | 91 | N-[(1S,2S)-2-hydroxycyclohexyl]-4-methyl-3-({[5-(2H-1,2,3-triazol-2-yl)pyridin-3-yl]methyl}amino)benzamide |
| 146 | 101 | 3-{[([3,3'-bipyridin]-5-yl)amino]methyl}-N-[(1S,2S)-2-hydroxycyclohexyl]-4-methylbenzamide |
| 147 | 147 | N-[(1S,2S)-2-hydroxycyclohexyl]-4-methyl-3-({[5-(pyrimidin-2-yl)pyridin-3-yl]amino}methyl)benzamide |
| 148 | 148 | 3-{[([2,3'-bipyridin]-5'-yl)amino]methyl}-N-[(1S,2S)-2-hydroxycyclohexyl]-4-methylbenzamide |
| 149 | 95 | N-[(1R,2R)-2-hydroxycyclohexyl]-4-methyl-3-({[5-(pyrimidin-2-yl)pyridin-3-yl]amino}methyl)benzamide |
| 150 | 91 | N-[(1S,2S)-2-hydroxycyclohexyl]-3-({[5-(pyrimidin-2-yl)pyridin-3-yl]amino}methyl)benzamide |
| 151 | 91 | 4-fluoro-N-[(1S,2S)-2-hydroxycyclohexyl]-3-({[5-(pyrimidin-2-yl)pyridin-3-yl]amino}methyl)benzamide |
| 152 | 152 | 3-{[(5-bromopyridin-3-yl)amino]methyl}-N-[(1S,2S)-1,3-dihydroxy-1-phenylpropan-2-yl]-4-methylbenzamide |
| 153 | 153 | N-[(1S,2S)-1,3-dihydroxy-1-phenylpropan-2-yl]-4-methyl-3-{[(5-phenylpyridin-3-yl)amino]methyl[benzamide |
| 154 | 153 | 3-{[(5-cyclopropylpyridin-3-yl)amino]methyl}-N-[(1S,2S)-1,3-dihydroxy-1-phenylpropan-2-yl]-4-methylbenzamide |

TABLE 16

| Example | Referenced Example | Chemical Name |
|---|---|---|
| 155 | 155 | 3-{[([2,3'-bipyridin]-5'-yl)amino]methyl}-N-[(1S,2S)-1,3-dihydroxy-1-phenylpropan-2-yl]-4-methylbenzamide |
| 156 | 156 | N-[(1S,2S)-1,3-dihydroxy-1-phenylpropan-2-yl]-4-methyl-3-{[(6-phenylpyrazin-2-yl)amino]methyl}benzamide |
| 157 | 94 | 5-({[5-(cyclopropylethynyl)pyridin-3-yl]amino}methyl)-N-[(1S,2S)-2-hydroxycyclohexyl]-6-methylpyridine-3-carboxamide |
| 158 | 158 | N-[3-({[6-(3,4-dimethoxyphenyl)pyrazin-2-yl]amino}methyl)phenyl]-N'-[(1R,2S)-2-hydroxycyclohexyl]urea |
| 159 | 159 | N-[(1R,2S)-2-hydroxycyclohexyl]-N'-[3-({[5-(pyrimidin-2-yl)pyridin-3-yl]amino}methyl)phenyl]urea |
| 160 | 159 | N-[2-fluoro-5-({[5-(pyrimidin-2-yl)pyridin-3-yl]amino}methyl)phenyl]-N'-[(1R,2S)-2-hydroxycyclohexyl]urea |
| 161 | 161 | N-[4-fluoro-3-({[5-(pyrimidin-2-yl)pyridin-3-yl]amino}methyl)phenyl]-N'-[(1R,2S)-2-hydroxycyclohexyl]urea |
| 162 | 161 | N-[(1R,2S)-2-hydroxycyclohexyl]-N'-[4-methyl-3-({[5-(pyrimidin-2-yl)pyridin-3-yl]amino}methyl)phenyl]urea |
| 163 | 161 | N-[(1R,2S)-2-hydroxycyclohexyl]-N'-[2-methyl-5-({[5-(pyrimidin-2-yl)pyridin-3-yl]amino}methyl)phenyl]urea |
| 164 | 164 | N-[(1S,2S)-2-hydroxycyclohexyl]-4-methyl-3-{1-[(6-phenylpyrazin-2-yl)amino]ethyl}benzamide |

TABLE 16-continued

| Example | Referenced Example | Chemical Name |
|---|---|---|
| 165 | 165 | 3-[([3,3'-bipyridin]-5-yl)methoxy]-N-[(1S,2S)-2-hydroxycyclohexyl]-4-methylbenzamide |
| 166 | 166 | N-[(1S,2S)-2-hydroxycyclohexyl]-4-methyl-3-{[5-(pyrimidin-2-yl)pyridin-3-yl]methoxy}benzamide |

TABLE 17

| Example | Referenced Example | Chemical Name |
|---|---|---|
| 167 | 166 | 4-chloro-N-[(1S,2S)-2-hydroxycyclohexyl]-3-{[5-(pyrimidin-2-yl)pyridin-3-yl]methoxy}benzamide |
| 168 | 165 | 3-{[([3,3'-bipyridin]-5-yl)oxy]methyl}-N-[(1S,2S)-2-hydroxycyclohexyl]-4-methylbenzamide |
| 169 | 166 | N-[(1S,2S)-2-hydroxycyclohexyl]-4-methyl-3-({[5-(pyrimidin-2-yl)pyridin-3-yl]oxy}methyl)benzamide |
| 170 | 170 | 4-chloro-N-[(1S,2S)-2-hydroxycyclohexyl]-3-({[5-(pyrimidin-2-yl)pyridin-3-yl]oxy}methyl)benzamide |
| 171 | 166 | N-[(1S,2S)-2-hydroxycyclohexyl]-4-methyl-3-{1-[5-(pyrimidin-2-yl)pyridin-3-yl]ethoxy}benzamide |
| 172 | 172 | N-[(1S,2S)-2-hydroxycyclohexyl]-4-methyl-3-[1-(5-phenylpyridin-3-yl)ethoxy]benzamide |
| 173 | 173 | N-[(1S,2S)-2-hydroxycyclohexyl]-4-methyl-3-[(E)-2-(5-phenylpyridin-3-yl)ethenyl]benzamide |
| 174 | 174 | N-[(1S,2S)-2-hydroxycyclohexyl]-4-methyl-3-[2-(5-phenylpyridin-3-yl)ethyl]benzamide |
| 175 | 175 | N-[(1S,2S)-2-hydroxycyclohexyl]-4-methyl-3-{[methyl(5-phenylpyridin-3-yl)amino]methyl}benzamide |
| 176 | 84 | 3-{[ethyl(5-phenylpyridin-3-yl)amino]methyl}-N-[(1S,2S)-2-hydroxycyclohexyl]-4-methylbenzamide |
| 177 | 177 | 3-[(Z)-2-([2,3'-bipyridin]-5'-yl)-2-fluoroethenyl]-4-fluoro-N-[(1S,2S)-2-hydroxycyclohexyl]benzamide |
| 178 | 177 | 4-fluoro-3-{(Z)-2-fluoro-2-[5-(pyrimidin-2-yl)pyridin-3-yl]ethenyl}-N-[(1S,2S)-2-hydroxycyclohexyl]benzamide |

TABLE 18

| Example | Referenced Example | Chemical Name |
|---|---|---|
| 179 | 177 | 3-[(Z)-2-fluoro-2-(imidazo[1,2-b]pyridazin-3-yl)ethenyl]-N-[(1S,2S)-2-hydroxycyclohexyl]-4-methylbenzamide |
| 180 | 180 | 5-[(Z)-2-([2,3'-bipyridin]-5'-yl)-2-fluoroethenyl]-N-[(1S,2S)-2-hydroxycyclohexyl]-6-methylpyridine-3-carboxamide |
| 181 | 177 | 3-[(Z)-2-fluoro-2-{5-[(4-methylpiperazin-1-yl)methyl]pyridin-3-yl}ethenyl]-N-[(1S,2S)-2-hydroxycyclohexyl]-4-methylbenzamide |
| 182 | 177 | 3-[(Z)-2-fluoro-2-{5-[(morpholin-4-yl)methyl]pyridin-3-yl}ethenyl]-N-[(1S,2S)-2-hydroxycyclohexyl]-4-methylbenzamide |
| 183 | 177 | 3-[(Z)-2-{6-[(cyclopropylmethyl)amino]pyridin-3-yl}-2-fluoroethenyl]-N-[(1S,2S)-2-hydroxycyclohexyl]-4-methylbenzamide |
| 184 | 180 | 4-fluoro-3-{(Z)-2-fluoro-2-[5-(morpholin-4-yl)pyridin-3-yl]ethenyl}-N-[(1S,2S)-2-hydroxycyclohexyl]benzamide |
| 185 | 180 | 4-fluoro-3-[(Z)-2-fluoro-2-{5-[(oxan-4-yl)amino]pyridin-3-yl}ethenyl]-N-[(1S,2S)-2-hydroxycyclohexyl]benzamide |
| 186 | 180 | 4-fluoro-3-[(Z)-2-fluoro-2-{5-[(4-methylpiperazin4-yl)methyl]pyridin-3-yl}ethenyl]-N-[(1S,2S)-2-hydroxycyclohexyl]benzamide |
| 187 | 180 | 5-{(Z)-2-[5-(cyclopropylmethoxy)pyridin-3-yl]-2-fluoroethenyl}-N-[(1S,2S)-2-hydroxycyclohexyl]-6-methylpyridine-3-carboxamide |
| 188 | 180 | 5-{(Z)-2-fluoro-2-[5-(morpholin-4-yl)pyridin-3-yl]ethenyl}-N-[(1S,2S)-2-hydroxycyclohexyl]-6-methylpyridine-3-carboxamide |

TABLE 19

| Example | Referenced Example | Chemical Name |
|---|---|---|
| 189 | 180 | 5-[(Z)-2-(6-aminopyridin-3-yl)-2-fluoroethenyl]-N-[(1S,2S)-2-hydroxycyclohexyl]-6-methylpyridine-3-carboxamide |

TABLE 19-continued

| Example | Referenced Example | Chemical Name |
|---|---|---|
| 190 | 180 | 5-[(Z)-2-(2-aminopyrimidin-5-yl)-2-fluoroethenyl]-N-[(1S,2S)-2-hydroxycyclohexyl]-6-methylpyridine-3-carboxamide |
| 191 | 180 | 3-[(Z)-2-(6-aminopyridin-3-yl)-2-fluoroethenyl]-4-fluoro-N-[(1S,2S)-2-hydroxycyclohexyl]benzamide |
| 192 | 192 | 3-[(Z)-2-(2-aminopyrimidin-5-yl)-2-fluoroethenyl]-4-fluoro-N-[(1S,2S)-2-hydroxycyclohexyl]benzamide |
| 193 | 177 | 3-[(Z)-2-fluoro-2-{5-[(1-methylpiperidin-4-yl)amino]pyridin-3-yl}ethenyl]-N-[(1S,2S)-2-hydroxycyclohexyl]-4-methylbenzamide |
| 194 | 194 | 3-[(Z)-2-{5-[(4-ethylpiperazin-1-yl)methyl]pyridin-3-yl}-2-fluoroethenyl]-N-[(1S,2S)-2-hydroxycyclohexyl]-4-methylbenzamide |
| 195 | 180 | 5-[(Z)-2-fluoro-2-{5-[(oxetan-3-yl)amino]pyridin-3-yl}ethenyl]-N-[(1S,2S)-2-hydroxycyclohexyl]-6-methylpyridine-3-carboxamide |
| 196 | 180 | 4-fluoro-3-[(Z)-2-fluoro-2-{5-[(oxetan-3-yl)amino]pyridin-3-yl}ethenyl]-N-[(1S,2S)-2-hydroxycyclohexyl]benzamide |
| 197 | 177 | 3-[(Z)-2-(6-{[2-(dimethylamino)ethyl]amino}pyridin-3-yl)-2-fluoroethenyl]-N-[(1S,2S)-2-hydroxycyclohexyl]-4-methylbenzamide |
| 198 | 177 | 3-[(Z)-2-(5-{[2-(dimethylamino)ethyl]amino}pyridin-3-yl)-2-fluoroethenyl]-N-[(1S,2S)-2-hydroxycyclohexyl]-4-methylbenzamide |

TABLE 20

| Example | Referenced Example | Chemical Name |
|---|---|---|
| 199 | 199 | 5-[(Z)-2-{6-[(cyclopropylmethyl)amino]pyridin-3-yl}-2-fluoroethenyl]-N-[(1S,2S)-2-hydroxycyclohexyl]-6-methylpyridine-3-carboxamide |
| 200 | 180 | 3-[(Z)-2-fluoro-2-{5-[(4-methylpiperazin-1-yl)methyl]pyridin-3-yl}ethenyl]-N-[(1S,2S)-2-hydroxy-2,3-dihydro-1H-inden-1-yl]-4-methylbenzamide |
| 201 | 180 | 3-[(Z)-2-fluoro-2-{5-[(4-methylpiperazin-1-yl)methyl]pyridin-3-yl}ethenyl]-N-(2-hydroxy-3,3-dimethylbutyl)-4-methylbenzamide |
| 202 | 180 | 3-[(Z)-2-{2-[(cyclopropylmethyl)amino]pyrimidin-5-yl}-2-fluoroethenyl]-4-fluoro-N-[(1S,2S)-2-hydroxycyclohexyl]benzamide |
| 203 | 180 | 3-{(Z)-2-[2-(cyclopropylamino)pyrimidin-5-yl]-2-fluoroethenyl}-4-fluoro-N-[(1S,2S)-2-hydroxycyclohexyl]benzamide |
| 204 | 180 | 3-[(Z)-2-(2-amino-4-methylpyrimidin-5-yl)-2-fluoroethenyl]-4-fluoro-N-[(1S,2S)-2-hydroxycyclohexyl]benzamide |
| 205 | 180 | 4-fluoro-3-{(Z)-2-fluoro-2-[2-(methylamino)pyrimidin-5-yl]ethenyl}-N-[(1S,2S)-2-hydroxycyclohexyl]benzamide |
| 206 | 177 | 3-[(Z)-2-(5-aminopyrazin-2-yl)-2-fluoroethenyl]-N-[(1S,2S)-2-hydroxycyclohexyl]-4-methylbenzamide |
| 207 | 177 | 4-fluoro-3-[(Z)-2-fluoro-2-(5-fluoropyridin-3-yl)ethenyl]-N-[(1S,2S)-2-hydroxycyclohexyl]benzamide |

TABLE 21

| Example | Data |
|---|---|
| 1 | MS(ESI+)m/z 415.5(M + H)$^+$ |
| 2 | MS(ESI+)m/z 430.3(M + H)$^+$ |
| 3 | MS(ESI+)m/z 414.3(M + H)$^+$ <br> $^1$H-NMR(400 MHz, DMSO-d6) δ: 10.18(s, 1H), 8.45(s, 1H), 8.09(d, 1H), 7.82-7.80(m, 1H), 7.72(dd, 1H), 7.36(d, 1H), 4.61(d, 1H), 3.67-3.55(m, 1H), 3.46-3.36(m, 1H), 2.92(d, 2H), 2.26(s, 3H), 1.94-1.78(m, 2H), 1.70-1.55(m, 2H), 1.30-1.08(m, 5H), 0.63-0.56(m, 2H), 0.36-0.30(m, 2H) |
| 4 | MS(ESI+)m/z 409.3(M + H)$^+$ |
| 5 | MS(ESI+)m/z 420.4(M + H)$^+$ |
| 6 | MS(ESI+)m/z 452.4(M + H)$^+$ |
| 7 | MS(ESI+)m/z 412.3(M + H)$^+$ |
| 8 | MS(ESI+)m/z 429.5(M + H)$^+$ |
| 9 | MS(ESI+)m/z 464.3(M + H)$^+$ |
| 10 | MS(ESI+)m/z 402.4(M + H)$^+$ |
| 11 | MS(ESI+)m/z 464.3(M + H)$^+$ |
| 12 | MS(ESI+)m/z 444.4(M + H)$^+$ |
| 13 | MS(ESI+)m/z 464.3(M + H)$^+$ |
| 14 | MS(ESI+)m/z 418.5(M + H)$^+$ |
| 15 | MS(ESI+)m/z 420.4(M + H)$^+$ |

TABLE 21-continued

| Example | Data |
| --- | --- |
| 16 | MS(ESI+)m/z 423.4(M + H)+ |
| 17 | MS(ESI+)m/z 423.4(M + H)+<br>¹H-NMR(400 MHz, DMSO-d6)δ: 10.09(s, 1H), 8.52(d, 1H), 8.49(d, 1H), 8.08(d, 1H), 7.85(d, 1H), 7.74-7.70(m, 2H), 7.36(d, 1H), 4.58(d, 1H), 3.64-3.60(m, 1H), 3.43-3.39(m, 1H), 3.02(s, 1H), 2.28(s, 3H), 1.89-1.83(m, 2H), 1.66-1.62(m, 2H), 1.26-1.17(m, 4H), 0.93-0.88(m, 2H), 0.63-0.59(m, 2H) |
| 18 | MS(ESI+)m/z 460.4(M + H)+ |
| 19 | MS(ESI+)m/z 448.3(M + H)+ |
| 20 | MS(ESI+)m/z 448.3(M + H)+<br>¹H-NMR(400 MHz, DMSO-d6) δ: 10.31(s, 1H), 9.15(d, 1H), 9.13(d, 1H), 8.66(dd, 1H), 8.09(d, 1H), 7.88(d, 1H), 7.80-7.70(m, 3H), 7.65-7.57(m, 1H), 7.38(d, 1H), 7.36-7.28(m, 1H), 4.59(d, 1H), 3.69-3.57(m, 1H), 3.46-3.37(m, 1H), 2.31(s, 3H), 1.94-1.80(m, 2H), 1.69-1.57(m, 2H), 1.31-1.15(m, 4H) |
| 21 | MS(ESI+)m/z 498.3(M + H)+ |

TABLE 22

| Example | Data |
| --- | --- |
| 22 | MS(ESI+)m/z 498.3(M + H)+ |
| 23 | MS(ESI+)m/z 408.3(M + H)+ |
| 24 | MS(ESI+)m/z 424.3(M + H)+<br>¹H-NMR(400 MHz, DMSO-d6) δ: 10.16(s, 1H), 8.74(d, 1H), 8.48(d, 1H), 8.07(d, 1H), 7.86-7.85(m, 2H), 7.72(dd, 1H), 7.37(d, 1H), 4.57(d, 1H), 4.00(d, 2H), 3.64-3.60(m, 1H), 3.44-3.38(m, 1H), 2.28(s, 3H), 1.91-1.83(m, 2H), 1.66-1.61(m, 2H), 1.28-1.18(m, 5H), 0.63-0.59(m, 2H), 0.39-0.35(m, 2H) |
| 25 | MS(ESI+)m/z 465.3(M + H)+ |
| 26 | MS(ESI+)m/z 443.6(M + H)+ |
| 27 | MS(ESI+)m/z 417.6(M + H)+ |
| 28 | MS(ESI+)m/z 488.5(M + H)+ |
| 29 | MS(ESI+)m/z 448.5(M + H)+ |
| 30 | MS(ESI+)m/z 466.5(M + H)+ |
| 31 | MS(ESI+)m/z 466.5(M + H)+ |
| 32 | MS(ESI+)m/z 466.5(M + H)+ |
| 33 | MS(ESI+)m/z 478.4(M + H)+ |
| 34 | MS(ESI+)m/z 514.6(M + H)+ |
| 35 | MS(ESI+)m/z 514.5(M + H)+ |
| 36 | MS(ESI+)m/z 516.6(M + H)+ |
| 37 | MS(ESI+)m/z 466.4(M + H)+ |
| 38 | MS(ESI+)m/z 431.6(M + H)+ |
| 39 | MS(ESI+)m/z 429.8(M + H)+ |
| 40 | MS(ESI+)m/z 443.8(M + H)+ |
| 41 | MS(ESI+)m/z 445.7(M + H)+ |
| 42 | MS(ESI+)m/z 484.6(M + H)+ |
| 43 | MS(ESI+)m/z 470.7(M + H)+ |
| 44 | MS(ESI+)m/z 444.6(M + H)+ |
| 45 | MS(ESI+)m/z 399.6(M + H)+ |
| 46 | MS(ESI+)m/z 442.6(M + H)+ |
| 47 | MS(ESI+)m/z 460.8(M + H)+ |
| 48 | MS(ESI+)m/z 432.5(M + H)+ |
| 49 | MS(ESI+)m/z 384.3(M + H)+ |

TABLE 23

| Example | Data |
| --- | --- |
| 50 | MS(ESI+)m/z 398.3(M + H)+<br>¹H-NMR(400 MHz, DMSO-d6) δ: 10.19(s, 1H), 8.75(d, 1H), 8.48(d, 1H), 8.09(d, 1H), 7.86-7.84(m, 2H), 7.72(dd, 1H), 7.37(d, 1H), 4.59(d, 1H), 4.2(q, 2H), 3.64-3.61(m, 1H), 3.43-3.37(m, 1H), 2.28(s, 3H), 1.91-1.82(m, 2H), 1.66-1.61(m, 2H), 1.38(t, 3H), 1.28-1.21(m, 4H) |
| 51 | MS(ESI+)m/z 447.3(M + H)+ |
| 52 | MS(ESI+)m/z 448.3(M + H)+ |
| 53 | MS(ESI+)m/z 438.4(M + H)+ |
| 54 | MS(ESI+)m/z 474.4(M + H)+ |
| 55 | MS(ESI+)m/z 434.2(M + H)+ |
| 56 | MS(ESI+)m/z 428.3(M + H)+ |
| 57 | MS(ESI+)m/z 433.1(M + H)+ |
| 58 | MS(ESI+)m/z 431.3(M + H)+ |

TABLE 23-continued

| Example | Data |
| --- | --- |
| 59 | MS(ESI+)m/z 349.5(M + H)+ |
| 60 | MS(ESI+)m/z 411.6(M + H)+ |
| 61 | MS(ESI+)m/z 413.4(M + H)+ |
| 62 | MS(ESI+)m/z 413.5(M + H)+ |
| 63 | MS(ESI+)m/z 413.5(M + H)+ |
| 64 | MS(ESI+)m/z 433.5(M + H)+ |
| 65 | MS(ESI+)m/z 350.6(M + H)+ |
| 66 | MS(ESI+)m/z 412.5(M + H)+ |
| 67 | MS(ESI+)m/z 375.7(M + H)+ |
| 68 | MS(ESI+)m/z 376.5(M + H)+ |
| 69 | MS(ESI+)m/z 430.5(M + H)+ |
| 70 | MS(ESI+)m/z 430.5(M + H)+ |
| 71 | MS(ESI+)m/z 430.5(M + H)+ |
| 72 | MS(ESI+)m/z 405.5(M + H)+ |
| 73 | MS(ESI+)m/z 376.6(M + H)+ |
| 74 | MS(ESI+)m/z 414.4(M + H)+ |
| 75 | MS(ESI+)m/z 412.6(M + H)+ |
| 76 | MS(ESI+)m/z 465.4(M + H)+ |
| 77 | MS(ESI+)m/z 430.5(M + H)+ |
| 78 | MS(ESI+)m/z 404.6(M + H)+ |
| 79 | MS(ESI+)m/z 454.6(M + H)+ |

TABLE 24

| Example | Data |
| --- | --- |
| 80 | MS(ESI+)m/z 506.6(M + H)+ |
| 81 | MS(ESI+)m/z 421.7(M + H)+ |
| 82 | MS(ESI+)m/z 406.3(M + H)+ |
| 83 | MS(ESI+)m/z 434.6(M + H)+ |
| 84 | MS(ESI+)m/z 430.5(M + H)+ |
| 85 | MS(ESI+)m/z 431, 4(M + H)+<br>$^1$H-NMR(400 MHz, DMSO-d6) δ: 8.93(d, 1H), 8.78(d, 1H), 8.68(d, 1H), 8.62(d, 1H), 8.24(dd, 1H), 8.14-8.11(m, 1H), 7.68(d, 1H), 7.54-7.50(m, 1H), 7.03-6.99(m, 2H), 6.95(s, 1H), 5.33(d, 1H), 4.85-4.81(m, 1H), 4.47(d, 1H), 3.53-3.48(m, 1H), 3.39-3.33(m, 1H), 2.25(s, 3H), 1.86-1.76(m, 2H), 1.61(d, 3H), 1.78-1.74(m, 2H), 1.24-1.16(m, 4H) |
| 86 | MS(ESI+)m/z 454.4(M + H)+ |
| 87 | MS(ESI+)m/z 431.4(M + H)+ |
| 88 | MS(ESI+)m/z 432.4(M + H)+ |
| 89 | MS(ESI+)m/z 431.4(M + H)+ |
| 90 | MS(ESI+)m/z 451.3(M + H)+ |
| 91 | MS(ESI+)m/z 418.6(M + H)+ |
| 92 | MS(ESI+)m/z 416.7(M + H)+ |
| 93 | MS(ESI+)m/z 417.4(M + H)+ |
| 94 | MS(ESI+)m/z 404.4(M + H)+ |
| 95 | MS(ESI+)m/z 418.7(M + H)+<br>$^1$H-NMR(400 MHz, DMSO-d6) δ: 9.37(d, 1H), 8.94(d, 2H), 8.73(d, 1H), 8.68(dd, 1H), 7.75(d, 1H), 7.51(dd, 1H), 7.06-7.01(m, 2H), 6.95(s, 1H), 5.91(dd, 1H), 4.55(d, 2H), 4.49(d, 1H), 3.52-3.48(m, 1H), 3.39-3.36(m, 1H), 2.21(s, 3H), 1.86-1.74(m, 2H), 1.62-1.56(m, 2H), 1.17-1.16(m, 4H) |
| 96 | MS(ESI+)m/z 390.4(M + H)+ |
| 97 | MS(ESI+)m/z 420.7(M + H)+ |
| 98 | MS(ESI+)m/z 473.5(M + H)+ |
| 99 | MS(ESI+)m/z 431.7(M + H)+ |
| 100 | MS(ESI+)m/z 452.7(M + H)+ |
| 101 | MS(ESI+)m/z 417.4(M + H)+ |
| 102 | MS(ESI+)m/z 422.6(M + H)+ |
| 103 | MS(ESI+)m/z 422.6(M + H)+ |
| 104 | MS(ESI+)m/z 438.6(M + H)+ |

TABLE 25

| Example | Data |
| --- | --- |
| 105 | MS(ESI+)m/z 385.5(M + H)+ |
| 106 | MS(ESI+)m/z 436.6(M + H)+ |
| 107 | MS(ESI+)m/z 436.6(M + H)+ |
| 108 | MS(ESI+)m/z 396.6(M + H)+ |

TABLE 25-continued

| Example | Data |
|---|---|
| 109 | MS(ESI+)m/z 380.6(M + H)⁺<br>¹H-NMR(400 MHz, DMSO-d6) δ: 13.56(brs, 1H), 8.58(s, 1H), 8.15(s, 1H), 8.09(s, 1H), 7.78(d, 1H), 7.05-7.01(m, 2H), 7.00(s, 1H), 5.74(t, 1H), 4.59-4.46(m, 3H), 3.59-3.35(m, 2H), 2.19(s, 3H), 1.93-1.72(m, 2H), 1.67-1.50(m, 2H), 1.27-1.09(m, 4H) |
| 110 | MS(ESI+)m/z 380.6(M + H)⁺<br>¹H-NMR(400 MHz, DMSO-d6) δ: 8.59(dd, 1H), 8.12(dd, 1H), 7.81(d, 1H), 7.67(s, 1H), 7.23(dd, 1H), 7.14(d, 1H), 7.09-7.01(m, 2H), 5.50(t, 1H), 4.78(d, 2H), 4.55(d, 1H), 3.62-3.48(m, 1H), 3.47-3.31(m, 1H), 2.15(s, 3H), 1.93-1.75(m, 2H), 1.70-1.55(m, 2H), 1.29-1.12(m, 4H) |
| 111 | MS(ESI+)m/z 457.7(M + H)⁺ |
| 112 | MS(ESI+)m/z 406.6(M + H)⁺ |
| 113 | MS(ESI+)m/z 356.6(M + H)⁺<br>¹H-NMR(400 MHz, DMSO-d6) δ: 8.23(s, 2H), 7.82(d, 1H), 7.07-7.00(m, 3H), 6.49(s, 2H), 5.42(t, 1H), 4.56(d, 1H), 4.17(d, 2H), 3.63-3.51(m, 1H), 3.45-3.35(m, 1H), 2.14(s, 3H), 1.93-1.78(m, 2H), 1.69-1.55(m, 2H), 1.28-1.14(m, 4H) |
| 114 | MS(ESI+)m/z 396.6(M + H)⁺ |
| 115 | MS(ESI+)m/z 418.8(M + H)⁺ |
| 116 | MS(ESI+)m/z 397.8(M + H)⁺ |
| 117 | MS(ESI+)m/z 409.6(M + H)⁺ |
| 118 | MS(ESI+)m/z 417.7(M + H)⁺ |
| 119 | MS(ESI+)m/z 380.5(M + H)⁺<br>¹H-NMR(400 MHz, DMSO-d6) δ: 9.06(dd, 1H), 8.56(dd, 1H), 8.20(s, 1H), 7.78(d, 1H), 7.16(s, 1H), 7.06-7.01(m, 3H), 5.37(t, 1H), 4.61-4.54(m, 3H), 3.61-3.52(m, 2H), 2.14(s, 3H), 1.92-1.78(m, 2H), 1.67-1.57(m, 2H), 1.27-1.16(m, 4H) |
| 120 | MS(ESI+)m/z 423.7(M + H)⁺ |
| 121 | MS(ESI+)m/z 417.5(M + H)⁺ |
| 122 | MS(ESI+)m/z 406.3(M + H)⁺ |
| 123 | MS(ESI+)m/z 380.2(M + H)⁺ |
| 124 | MS(ESI+)m/z 413.3(M + H)⁺ |
| 125 | MS(ESI+)m/z 439.4(M + H)⁺ |

TABLE 26

| Example | Data |
|---|---|
| 126 | MS(ESI+)m/z 433.5(M + H)⁺ |
| 127 | MS(ESI+)m/z 468.5(M + H)⁺ |
| 128 | MS(ESI+)m/z 447.5(M + H)⁺ |
| 129 | MS(ESI+)m/z 475.4(M + H)⁺ |
| 130 | MS(ESI+)m/z 409.4(M + H)⁺ |
| 131 | MS(ESI+)m/z 356.6(M + H)⁺ |
| 132 | MS(ESI+)m/z 440.2(M + H)⁺<br>¹H-NMR(400 MHz, DMSO-d6) δ: 8.28(s, 2H), 7.81(d, 1H), 7.06-7.00(m, 4H), 5.42(t, 1H), 4.56(d, 1H), 4.17(d, 2H), 3.93-3.81(m, 3H), 3.62-3.52(m, 1H), 2.13(s, 3H), 1.92-1.75(m, 4H), 1.68-1.54(m, 2H), 1.54-1.41(m, 2H), 1.29-1.14(m, 4H) |
| 133 | MS(ESI+)m/z 452.4(M + H)⁺ |
| 134 | MS(ESI+)m/z 397.3(M + H)⁺ |
| 135 | MS(ESI+)m/z 426.3(M + H)⁺ |
| 136 | MS(ESI+)m/z 426.3(M + H)⁺ |
| 137 | MS(ESI+)m/z 467.4(M + H)⁺ |
| 138 | MS(ESI+)m/z 467.4(M + H)⁺ |
| 139 | MS(ESI+)m/z 453.4(M + H)⁺ |
| 140 | MS(ESI+)m/z 407.3(M + H)⁺<br>¹H-NMR(400 MHz, DMSO-d6) δ: 8.83(d, 1H), 8.59(s, 1H), 8.10-8.06(m, 2H), 7.98(d, 1H), 7.80(d, 1H), 7.07-7.03(m, 2H), 6.96(s, 1H), 5.86(t, 1H), 4.53(m, 3H), 3.58-3.30(m, 2H), 2.21(s, 3H), 1.91-1.72(m, 2H), 1.68-1.52(m, 2H), 1.27-1.09(m, 4H) |
| 141 | MS(ESI+)m/z 411, 3(M + H)⁺ |
| 142 | MS(ESI+)m/z 376.1(M + H)⁺ |
| 143 | MS(ESI+)m/z 374.4(M + H)⁺ |
| 144 | MS(ESI+)m/z 397.3(M + H)⁺<br>¹H-NMR(400 MHz, DMSO-d6) δ: 7.78(d, 1H), 7.58(d, 1H), 7.05-6.97(m, 3H), 6.94(d, 1H), 6.54(s, 1H), 5.42(t, 1H), 4.54(d, 1H), 4.19(d, 2H), 4.07(d, 2H), 3.61-3.30(m, 4H), 2.14(s, 3H), 1.94-1.74(m, 2H), 1.70-1.52(m, 2H), 1.32-1.10(m, 4H) |
| 145 | MS(ESI+)m/z 407.3(M + H)⁺ |
| 146 | MS(ESI+)m/z 417.6(M + H)⁺ |

TABLE 27

| Example | Data |
|---|---|
| 147 | MS(ESI+)m/z 418.6(M + H)+<br>¹H-NMR(400 MHz, DMSO-d6) δ: 8.90(d, 2H), 8.75(d, 1H), 8.13(d, 1H), 7.97(d, 1H), 7.88(dd, 1H), 7.85(d, 1H), 7.71(dd, 1H), 7.47(dd, 1H), 7.29(d, 1H), 6.57(dd, 1H), 4.54(d, 1H), 4.35(d, 2H), 3.60-3.55(m, 1H), 3.42-3.36(m, 1H), 2.41(s, 3H), 1.87-1.79(m, 2H), 1.63-1.59(m, 2H), 1.25-1.44(m, 4H) |
| 148 | MS(ESI+)m/z 417.8(M + H)+<br>¹H-NMR(400 MHz, CD3OD) δ: 8.63-8.62(m, 1H), 8.33(s, 1H), 8.02(dd, 1H), 7.93-7.83(m, 3H), 7.70-7.67(m, 1H), 7.58-7.57(m-1H), 7.41-7.38(m, 1H), 7.31(dd, 1H), 4.45(d, 1H), 3.78-3.71(m, 1H), 3.51-3.44(m, 1H), 2.47(d, 1H), 2.04-1.97(m, 2H), 1.76-1.70(m, 2H), 1.37-1.29(m, 4H) |
| 149 | MS(ESI+)m/z 418.5(M + H)+ |
| 150 | MS(ESI+)m/z 404.6(M + H)+ |
| 151 | MS(ESI+)m/z 422.6(M + H)+ |
| 152 | MS(ESI+)m/z 470.6(M + H)+ |
| 153 | MS(ESI+)m/z 468.7(M + H)+ |
| 154 | MS(ESI+)m/z 432.7(M + H)+ |
| 155 | MS(ESI+)m/z 469.7(M + H)+ |
| 156 | MS(ESI+)m/z 469.7(M + H)+ |
| 157 | MS(ESI+)m/z 405.7(M + H)+ |
| 158 | MS(ESI+)m/z 478.5(M + H)+ |
| 159 | MS(ESI+)m/z 419.7(M + H)+ |
| 160 | MS(ESI+)m/z 437.5(M + H)+ |
| 161 | MS(ESI+)m/z 437.5(M + H)+ |
| 162 | MS(ESI+)m/z 433.5(M + H)+ |
| 163 | MS(ESI+)m/z 433.5(M + H)+ |
| 164 | MS(ESI+)m/z 431.6(M + H)+ |
| 165 | MS(ESI+)m/z 418.8(M + H)+ |
| 166 | MS(ESI+)m/z 419.8(M + H)+ |
| 167 | MS(ESI+)m/z 439.6(M + H)+ |
| 168 | MS(ESI+)m/z 418.7(M + H)+ |
| 169 | MS(ESI+)m/z 419.8(M + H)+ |
| 170 | MS(ESI+)m/z 439.6(M + H)+ |
| 171 | MS(ESI+)m/z 433.6(M + H)+ |
| 172 | MS(ESI+)m/z 431.7(M + H)+ |

TABLE 28

| Example | Data |
|---|---|
| 173 | MS(ESI+)m/z 413.6(M + H)+ |
| 174 | MS(ESI+)m/z 415.6(M + H)+ |
| 175 | MS(ESI+)m/z 430.7(M + H)+ |
| 176 | MS(ESI+)m/z 444.4(M + H)+ |
| 177 | MS(ESI+)m/z 436.3(M + H)+<br>¹H-NMR(400 MHz, DMSO-d6) δ: 9.35(d, 1H), 9.08(d, 1H), 8.78-8.76(m, 2H), 8.38(dd, 1H), 8.25-8.22(m, 2H), 7.97-7.92(m, 1H), 7.90-7.85(m, 1H), 7.48(ddd, 1H), 7.41(dd, 1H), 7.11(d, 1H), 4.64(d, 1H), 3.61-3.59(m, 1H), 3.40-3.36(m, 1H), 1.92-1.84(m, 2H), 1.67-1.65(m, 2H), 1.26-1.15(m, 4H) |
| 178 | MS(ESI+)m/z 437.2(M + H)+ |
| 179 | MS(ESI+)m/z 395.3(M + H)+ |
| 180 | MS(ESI+)m/z 433.3(M + H)+ |
| 181 | MS(ESI+)m/z 467.5(M + H)+ |
| 182 | MS(ESI+)m/z 454.4(M + H)+ |
| 183 | MS(ESI+)m/z 424.4(M + H)+ |
| 184 | MS(ESI+)m/z 444.3(M + H)+ |
| 185 | MS(ESI+)m/z 458.3(M + H)+ |
| 186 | MS(ESI+)m/z 471.4(M + H)+ |
| 187 | MS(ESI+)m/z 426.3(M + H)+ |
| 188 | MS(ESI+)m/z 441.3(M + H)+ |
| 189 | MS(ESI+)m/z 371.2(M + H)+<br>¹H-NMR(400 MHz, DMSO-d6) δ: 8.76(d, 1H), 8.36-8.29(m, 3H), 7.78(dd, 1H), 6.53-6.43(m, 4H), 4.66(d, 1H), 3.64-3.62(m, 1H), 3.43-3.37(m, 1H), 2.59(s, 3H), 1.91-1.82(m, 2H), 1.66-1.62(m, 2H), 1.27-1.21(m, 4H) |
| 190 | MS(ESI+)m/z 372.2(M + H)+ |
| 191 | MS(ESI+)m/z 374.2(M + H)+ |
| 192 | MS(ESI+)m/z 375.2(M + H)+<br>¹H-NMR(400 MHz, DMSO-d6) δ: 8.64(s, 2H), 8.27(dd, 1H), 8.21(d, 1H), 7.84-7.80(m, 1H), 7.33(dd, 1H), 7.23(s, 2H), 6.57(d, 1H), 4.67(brs, 1H), 3.62-3.60(m, 1H), 3.48-3.40(m, 1H), 1.91-1.82(m, 2H), 1.66-1.63(m, 2H), 1.26-1.14(m, 4H) |
| 193 | MS(ESI+)m/z 467.4(M + H)+ |

TABLE 29

| Example | Data |
|---|---|
| 194 | MS(ESI+)m/z 481, 4(M + H)+<br>¹H-NMR(400 MHz, DMSO-d6) δ: 8.93(d, 1H), 8.54(d, 1H), 8.16(d, 1H), 8.08(d, 1H), 8.03(dd, 1H), 7.73(dd, 1H), 7.34(d, 1H), 6.96(d, 1H), 4.60(d, 1H), 3.63-3.61(m, 1H), 3.57(s, 2H), 3.44-3.40(m, 1H), 2.49-2.33(m, 8H), 2.43(s, 3H), 2.30(q, 2H), 1.91-1.84(m, 2H), 1.66-1.63(m, 2H), 1.26-1.19(m, 4H), 0.97(t, 3H) |
| 195 | MS(ESI+)m/z 427.5(M + H)+ |
| 196 | MS(ESI+)m/z 430.5(M + H)+ |
| 197 | MS(ESI+)m/z 441.6(M + H)+ |
| 198 | MS(ESI+)m/z 441.6(M + H)+ |
| 199 | MS(ESI+)m/z 425.5(M + H)+ |
| 200 | MS(ESI+)m/z 501.3(M + H)+ |
| 201 | MS(ESI+)m/z 469.4(M + H)+ |
| 202 | MS(ESI+)m/z 429.6(M + H)+ |
| 203 | MS(ESI+)m/z 415.3(M + H)+ |
| 204 | MS(ESI+)m/z 389.2(M + H)+ |
| 205 | MS(ESI+) m/z 389.2(M + H)+<br>¹H-NMR(400 MHz, DMSO-d6) δ: 8.69(s, 2H), 8.28(dd, 1H), 8.18(d, 1H), 7.84-7.80(m, 1H), 7.69(dd, 1H), 7.33(dd, 1H), 6.57(d, 1H), 4.62(d, 1H), 3.65-3.59(m, 1H), 3.45-3.38(m, 1H), 2.86(d, 3H), 1.89-1.83(m, 2H), 1.66-1.61(m, 2H), 1.27-1.18(m, 4H) |
| 206 | MS(ESI+) m/z 371, 2(M + H)+<br>¹H-NMR(400 MHz, DMSO-d6) δ: 8.16(d, 2H), 8.03(d, 1H), 7.93(s, 1H), 7.64(dd, 1H), 7.28(d, 1H), 6.94(s, 2H), 6.73(d, 1H), 4.56(d, 1H), 3.61-3.54(m, 1H), 3.42-3.33(m, 1H), 2.34(s, 3H), 1.87-1.78(m, 2H), 1.62-1.57(m, 2H), 1.25-1.13(m, 4H) |
| 207 | MS(ESI+) m/z 377.0 (M + H)+<br>¹H-NMR(400 MHz, DMSO-d6) δ: 8.87(s, 1H), 8.64(d, 1H), 8.30(dd, 1H), 8.19-8.17(m, 2H), 7.90-7.86(m, 1H), 7.36(dd, 1H), 7.03(d, 1H), 4.57(d, 1H), 3.60-3.55(m, 1H), 3.40-3.32(m, 1H), 1.89-1.79(m, 2H), 1.63-1.56(m, 2H), 1.25-1.14(m, 4H) |

Hereinafter, biological test examples for the compounds used in the present invention will be shown.

Test Example 1: PDGFR-β Tyrosine Kinase Inhibitory Action

1. Preparation of Test Substance

The test substance was prepared with dimethyl sulfoxide (DMSO) to 10 mM and diluted with DMSO so as to reach a concentration of 0.001 to 1000 μM. This DMSO solution was diluted by 8 times with an assay buffer 1 (50 mM HEPES (pH 7.0), 0.02% NaN3, 0.01% Bovine Serum Albumin, 0.1 mM orthovanadate, 1 mM Dithiothreitol, 5 mM $MgCl_2$, and 1 mM $MnCl_2$) and further diluted by 5 times with an assay buffer 2 (50 mM HEPES (pH 7.0), 0.02% NaN3, 0.01% Bovine Serum Albumin, 0.1 mM orthovanadate, 1 mM Dithiothreitol, 5 mM $MgCl_2$, 1 mM $MnCl_2$, and 40 nM Supplemented Enzymatic Buffer (cisbio)).

2. Measurement of PDGFR-β Tyrosine Kinase Inhibitory Action

For the measurement, the HTRF KinEASE-TK kit from Cisbio Bioassays SAS was used. To a 384 well plate, the test substance solution was added at 4 μL each, then 2 μL of a PDGFR-β enzyme solution (final concentration of 1 ng/μL, Carna Biosciences, Inc.) and 4 μL of a substrate solution obtained by adding 0.6 μM ATP to TK substrate-3-biotin (cisbio) were added, and the solution was allowed to react at 30° C. for 30 minutes at a final concentration of the test substance being 0.01 to 10,000 nM.

Thereafter, 10 μL of a detection solution (cisbio) was added to each well and allowed to react at 30° C. for 1 hour. The fluorescence intensity was measured with a microplate reader (Spectra Max M5, Molecular device).

3. Analysis of Measurement Results

Using the ratio of fluorescence intensity for each condition, the inhibition rate was calculated when the values for the positive control (1% DMSO solution) and the negative control (enzyme (-)) were defined as 0% and 100%, respectively. Subsequently, a nonlinear regression analysis with a two parameter logistic model for the log concentration and inhibition rate was carried out using the SAS system (SAS Institute Inc.) to estimate the concentration of the test substance that inhibits the PDGFR-β tyrosine kinase activity by 50% ($IC_{50}$ value).

The results are shown in the following Table 30 to Table 33.

TABLE 30

| Test Compound (Compound of Example) | PDGF-β $IC_{50}$ (nM) |
|---|---|
| 1 | 5.9 |
| 2 | 22 |
| 3 | 82 |
| 4 | 4.9 |
| 5 | 6.1 |
| 6 | 12 |
| 7 | 170 |
| 8 | 6.0 |
| 9 | 26 |
| 10 | 220 |
| 11 | 17 |
| 12 | 170 |
| 13 | 140 |
| 14 | 40 |
| 15 | 11 |
| 16 | 22 |
| 17 | 42 |
| 18 | 39 |
| 19 | 13 |
| 20 | 13 |
| 21 | 73 |
| 22 | 14 |
| 23 | 26 |
| 24 | 64 |
| 25 | 39 |
| 26 | 4.6 |
| 27 | 8.3 |
| 28 | 170 |
| 29 | 35 |
| 30 | 44 |
| 31 | 73 |
| 32 | 47 |
| 33 | 19 |

TABLE 30-continued

| Test Compound (Compound of Example) | PDGF-β IC$_{50}$ (nM) |
|---|---|
| 34 | 19 |
| 35 | 160 |
| 36 | 130 |
| 37 | 33 |
| 38 | 79 |
| 39 | 100 |
| 40 | 43 |
| 41 | 130 |
| 42 | 230 |
| 43 | 23 |
| 44 | 190 |
| 45 | 15 |
| 46 | 77 |
| 47 | 390 |
| 48 | 120 |
| 49 | 120 |
| 50 | 61 |
| 51 | 61 |
| 52 | 77 |
| 53 | 12 |
| 54 | 40 |
| 55 | 83 |
| 56 | 120 |
| 57 | 51 |
| 58 | 12 |
| 59 | 210 |
| 60 | 46 |

TABLE 31

| Test Compound (Compound of Example) | PDGF-β IC$_{50}$ (nM) |
|---|---|
| 61 | 41 |
| 62 | 6.5 |
| 63 | 15 |
| 64 | 260 |
| 65 | 94 |
| 66 | 5.4 |
| 67 | 43 |
| 68 | 80 |
| 69 | 25 |
| 70 | 20 |
| 71 | 42 |
| 72 | 10 |
| 73 | 220 |
| 74 | 180 |
| 75 | 15 |
| 76 | 49 |
| 77 | 38 |
| 78 | 51 |
| 79 | 120 |
| 80 | 120 |
| 81 | 190 |
| 82 | 27 |
| 83 | 5.0 |
| 84 | 19 |
| 85 | 180 |
| 86 | 230 |
| 87 | 250 |
| 88 | 230 |
| 89 | 78 |
| 90 | 310 |
| 91 | 150 |
| 92 | 46 |
| 93 | 360 |
| 94 | 49 |
| 95 | 120 |
| 96 | 200 |
| 97 | 100 |
| 98 | 140 |
| 99 | 13 |
| 100 | 32 |
| 101 | 170 |

TABLE 31-continued

| Test Compound (Compound of Example) | PDGF-β IC$_{50}$ (nM) |
|---|---|
| 102 | 23 |
| 103 | 50 |
| 104 | 260 |
| 105 | 230 |
| 106 | 67 |
| 107 | 190 |
| 108 | 51 |
| 109 | 46 |
| 110 | 350 |
| 111 | 150 |
| 112 | 39 |
| 113 | 83 |
| 114 | 270 |
| 115 | 260 |
| 116 | 66 |
| 117 | 79 |
| 118 | 390 |
| 119 | 330 |
| 120 | 20 |

TABLE 32

| Test Compound (Compound of Example) | PDGF-β IC$_{50}$ (nM) |
|---|---|
| 121 | 160 |
| 122 | 150 |
| 123 | 210 |
| 124 | 22 |
| 125 | 130 |
| 126 | 45 |
| 127 | 63 |
| 128 | 180 |
| 129 | 17 |
| 130 | 80 |
| 131 | 490 |
| 132 | 72 |
| 133 | 170 |
| 134 | 170 |
| 135 | 120 |
| 136 | 32 |
| 137 | 41 |
| 138 | 16 |
| 139 | 30 |
| 140 | 330 |
| 141 | 69 |
| 142 | 210 |
| 143 | 97 |
| 144 | 65 |
| 145 | 100 |
| 146 | 210 |
| 147 | 24 |
| 148 | 16 |
| 149 | 220 |
| 150 | 360 |
| 151 | 170 |
| 152 | 50 |
| 153 | 88 |
| 154 | 340 |
| 155 | 36 |
| 156 | 25 |
| 157 | 180 |
| 158 | 26 |
| 159 | 26 |
| 160 | 46 |
| 161 | 16 |
| 162 | 2.6 |
| 163 | 260 |
| 164 | 110 |
| 165 | 390 |
| 166 | 49 |
| 167 | 210 |
| 168 | 350 |
| 169 | 52 |

TABLE 32-continued

| Test Compound (Compound of Example) | PDGF-β IC$_{50}$ (nM) |
|---|---|
| 170 | 200 |
| 171 | 260 |
| 172 | 190 |
| 173 | 54 |
| 174 | 27 |
| 175 | 24 |
| 176 | 50 |
| 177 | 15 |
| 178 | 26 |
| 179 | 5.9 |
| 180 | 16 |

TABLE 33

| Test Compound (Compound of Example) | PDGF-β IC$_{50}$ (nM) |
|---|---|
| 181 | 100 |
| 182 | 33 |
| 183 | 30 |
| 184 | 51 |
| 185 | 5.1 |
| 186 | 150 |
| 187 | 14 |
| 188 | 68 |
| 189 | 200 |
| 190 | 110 |
| 191 | 35 |
| 192 | 29 |
| 193 | 1.0 |
| 194 | 35 |
| 195 | 19 |
| 196 | 26 |
| 197 | 120 |
| 198 | 7.2 |
| 199 | 52 |
| 200 | 16 |
| 201 | 38 |
| 202 | 77 |
| 203 | 61 |
| 204 | 21 |
| 205 | 130 |
| 206 | 31 |
| 207 | 100 |

Test Example 2: Suppression Action Against Proliferation of TEL-PDGFRβ and TEL-KIT Fusion Gene Transfected Cells 1. Fabrication of TEL-PDGFRβ and TEL-KIT Fusion Gene Transfected Cells A human TEL-PDGFRβ fusion gene (see, for example, CELL, 1994, 77, 307-316) or a human TEL-KIT fusion gene was inserted into the multicloning site of the retroviral expression vector pMYs-IRES-GFP to fabricate a vector for gene transfection. As for the human TEL-KIT fusion gene, an amino sequence that is important for the enzymatic activity of the KIT gene (Accession No. NP_000213.1, 521 to 928th amino acids) was identified and properly combined with the amino acid sequence of the TEL gene, thereby creating a sequence that exhibits activation in the absence of a ligand factor. Subsequently, the vectors for gene transfection were introduced using a transfection reagent (Fu-GENE6, Promega Corporation) into packaging cells derived from a human fetal kidney cell line, PLAT-E, in the logarithmic growth phase. Since the culture supernatant of PLAT-E after the gene transfection contained virus particles for gene transfection, it was collected and used as a medium for gene transfection. The medium for gene transfection was added to a plate coated with RetroNectin and incubated, and the virus particles were allowed to adhere to the plate. Thereafter, the mouse pro-B cell line Ba/F3 in the logarithmic growth phase was seeded onto the plate and infected with the virus to fabricate cells that proliferate in a PDGFRβ or KIT dependent manner.

2. Preparation of Test Substance

The test substance was prepared with dimethyl sulfoxide (DMSO) to 10 mM and diluted with DMSO so as to reach a concentration of 0.0001 to 3 mM. Furthermore, it was diluted by 100 times with distilled water.

3. Measurement of Suppression Action Against Proliferation of TEL-PDGFRβ or TEL-KIT Expressing Cells The day after TEL-PDGFRβ and TEL-KIT expressing cells were seeded onto 96 well plates, the prepared test substance solution was added thereto with a final concentration being 0.1 to 10,000 nM. After 72 hours, the viable cell count was measured using the amount of formazan generated from the reduction of a tetrazolium salt compound by the mitochondrial dehydrogenase of viable cells as an indicator.

4. Analysis of Measurement Results

Based on the amount of formazan in each condition, the suppression rate against cell proliferation was calculated when the amounts of formazan in the negative control (0.1% DMSO solution) and Blank (medium only) were defined as 0% and 100%, respectively. Subsequently, a nonlinear regression analysis with a two parameter logistic model for the log dose and suppression rate against cell proliferation was carried out using the SAS system (SAS Institute Inc.) to estimate the IC$_{50}$ value.

The results are shown in the following Table 34 to Table 38.

TABLE 34

| Test Compound (Compound of Example) | PDGFR β/BaF3 proliferation inhibition (IC$_{50}$) | KIT/BaF3 proliferation inhibition (IC$_{50}$) |
|---|---|---|
| 1 | 17 | 480 |
| 2 | 3.6 | 200 |
| 3 | 1.4 | 620 |
| 4 | 26 | 1500 |
| 5 | 5.8 | 170 |
| 6 | 14 | 170 |
| 7 | 43 | 1900 |
| 8 | 9.7 | 650 |
| 9 | 22 | 530 |
| 10 | 25 | 660 |
| 11 | 13 | 310 |
| 12 | 35 | 800 |
| 13 | 17 | 790 |
| 14 | 11 | 330 |
| 15 | 3.9 | 330 |
| 16 | 130 | 1300 |
| 17 | 10 | 800 |
| 18 | 20 | 530 |
| 19 | 30 | 1000 |
| 20 | 24 | 900 |
| 21 | 60 | 2000 |
| 22 | 59 | 900 |
| 23 | 4.9 | 620 |
| 24 | 11 | 1200 |
| 25 | 50 | >10000 |
| 26 | 9.3 | 460 |
| 27 | 8.7 | 1000 |
| 28 | 50 | 5800 |
| 29 | 7.5 | 290 |

TABLE 35

| Test Compound (Compound of Example) | PDGFR β/BaF3 proliferation inhibition (IC$_{50}$) | KIT/BaF3 proliferation inhibition (IC$_{50}$) |
|---|---|---|
| 30 | 22 | 1300 |
| 31 | 8.0 | 1000 |
| 32 | 17 | 920 |
| 33 | 80 | 880 |
| 34 | 8.0 | 540 |
| 35 | 17 | 2200 |
| 36 | 25 | 3500 |
| 37 | 5.1 | 470 |
| 38 | 7.3 | 1200 |
| 39 | 13 | 1000 |
| 40 | 4.6 | 1200 |
| 41 | 35 | 2100 |
| 42 | 41 | 7900 |
| 43 | 17 | 640 |
| 44 | 21 | 940 |
| 45 | 0.8 | 92 |
| 46 | 17 | 410 |
| 47 | 75 | 7000 |
| 48 | 16 | 650 |
| 57 | 440 | 6900 |
| 58 | 110 | 1800 |
| 59 | 27 | 500 |
| 60 | 5.9 | 410 |
| 61 | 18 | 840 |
| 62 | 1.7 | 87 |
| 63 | 0.8 | 240 |
| 64 | 5.9 | 230 |
| 65 | 14 | 270 |

TABLE 36

| Test Compound (Compound of Example) | PDGFR β/BaF3 proliferation inhibition (IC$_{50}$) | KIT/BaF3 proliferation inhibition (IC$_{50}$) |
|---|---|---|
| 66 | 2.5 | 100 |
| 67 | 5.2 | 300 |
| 68 | 16 | 2000 |
| 69 | 5.8 | 330 |
| 70 | 1.8 | 300 |
| 71 | 6.0 | 570 |
| 75 | 4.5 | 300 |
| 77 | 79 | 600 |
| 78 | 27 | 570 |
| 79 | 46 | 2000 |
| 80 | 80 | >10000 |
| 81 | 140 | 3300 |
| 84 | 50 | 500 |
| 85 | 19 | 4600 |
| 86 | 42 | 1700 |
| 87 | 27 | 9900 |
| 88 | 43 | 6000 |
| 89 | 20 | 610 |
| 90 | 35 | 8300 |
| 91 | 26 | 2700 |
| 92 | 20 | 1400 |
| 93 | 45 | 6200 |
| 94 | 10 | 260 |
| 95 | 5.7 | 1000 |
| 96 | 12 | 310 |
| 97 | 20 | 1900 |
| 98 | 40 | >10000 |
| 99 | 0.5 | 480 |

TABLE 37

| Test Compound (Compound of Example) | PDGFR β/BaF3 proliferation inhibition (IC$_{50}$) | KIT/BaF3 proliferation inhibition (IC$_{50}$) |
|---|---|---|
| 100 | 17 | 8900 |
| 101 | 56 | 9000 |
| 102 | 2.0 | 620 |
| 103 | 4.1 | 2500 |
| 104 | 3.4 | 3400 |
| 105 | 4.7 | 920 |
| 106 | 2.1 | 1300 |
| 107 | 19 | 1200 |
| 108 | 2.3 | 300 |
| 112 | 1.3 | 250 |
| 113 | 0.2 | 700 |
| 114 | 2.7 | 960 |
| 115 | 1.4 | 1700 |
| 146 | 22 | 730 |
| 147 | 5.6 | 100 |
| 148 | 2.4 | 170 |
| 149 | 58 | 670 |
| 152 | 100 | >10000 |
| 153 | 27 | 7000 |
| 154 | 230 | >10000 |
| 155 | 69 | 10000 |
| 156 | 22 | >10000 |
| 158 | 41 | 3000 |
| 159 | 1.7 | 380 |
| 160 | 5.9 | 1200 |
| 161 | 4.8 | >10000 |
| 162 | 1.1 | 270 |
| 163 | 200 | 2600 |
| 164 | 180 | 1400 |

TABLE 38

| Test Compound (Compound of Example) | PDGFR β/BaF3 proliferation inhibition (IC$_{50}$) | KIT/BaF3 proliferation inhibition (IC$_{50}$) |
|---|---|---|
| 165 | 9.0 | 2900 |
| 166 | 2.5 | 1200 |
| 168 | 18 | 4100 |
| 169 | 4.0 | 400 |
| 171 | 12 | 2400 |
| 173 | 4.6 | 700 |
| 174 | 50 | 870 |

Test Example 3: Suppression Action Against Proliferation of Pulmonary Arterial Smooth Muscle Cells 1. Preparation of Test Substance The test substance was prepared with dimethyl sulfoxide (DMSO) to 10 mM and diluted with DMSO so as to reach a concentration of 0.003 to 3 mM. Furthermore, it was diluted by 50 times with distilled water.

2. Measurement of Suppression Action Against Proliferation of Pulmonary Arterial Smooth Muscle Cells The day after healthy human derived pulmonary arterial smooth muscle cells were seeded onto a 96 well plate using a smooth muscle cell proliferation medium, the proliferation medium was replaced with a 0.1% FBS medium, and the cells were cultured for an additional day. A test substance solution was diluted by 10 times with a medium containing BrdU and human PDGF-BB (final concentration of 10 ng/mL, Sigma-Aldrich) and added to cells in equal amounts so as to reach a final concentration of 3 to 10,000 nM. Also, to the human PDGF-BB negative control, BrdU and 0.1% DMSO solution were added. After culturing for 1 day, the amount of BrdU taken up by the proliferating cells was measured using an anti-BrdU antibody.

3. Analysis of Measurement Results

Based on the amount of BrdU in each condition, the suppression rate against cell proliferation was calculated when the amounts of BrdU in the positive control (human PDGF-BB (+)) and the negative control (human PDGF-BB (−)) were defined as 0% and 100%, respectively. Subsequently, a nonlinear regression analysis with a two parameter logistic model for the log dose and suppression rate against cell proliferation was carried out using the SAS system (SAS Institute Inc.) to estimate the $IC_{50}$ value.

The results are shown in the following Table 39 to Table 46.

TABLE 39

| Test Compound (Compound of Example) | Human normal PASMC proliferation suppression (PDGF stimulation_$IC_{50}$) |
| --- | --- |
| 1 | 110 |
| 2 | 23 |
| 3 | 30 |
| 4 | 220 |
| 5 | 48 |
| 6 | 23 |
| 7 | 150 |
| 8 | 110 |
| 9 | 46 |
| 10 | 140 |
| 11 | 49 |
| 12 | 65 |
| 13 | 100 |
| 14 | 48 |
| 15 | 18 |
| 16 | 81 |
| 17 | 130 |
| 18 | 47 |
| 19 | 81 |
| 20 | 77 |
| 21 | 140 |
| 22 | 100 |
| 23 | 64 |
| 24 | 110 |
| 25 | 230 |
| 26 | 25 |
| 27 | 70 |
| 28 | 280 |

TABLE 40

| Test Compound (Compound of Example) | Human normal PASMC proliferation suppression (PDGF stimulation_$IC_{50}$) |
| --- | --- |
| 29 | 130 |
| 30 | 52 |
| 31 | 100 |
| 32 | 190 |
| 33 | 67 |
| 34 | 130 |
| 35 | 320 |
| 36 | 92 |
| 37 | 46 |
| 38 | 210 |
| 39 | 150 |
| 40 | 75 |
| 41 | 210 |
| 42 | 95 |
| 43 | 72 |
| 44 | 140 |
| 45 | 56 |
| 46 | 370 |
| 47 | 350 |
| 48 | 310 |
| 49 | 250 |
| 50 | 270 |
| 51 | 180 |
| 52 | 420 |
| 53 | 71 |
| 54 | 340 |
| 55 | 69 |
| 56 | 240 |

TABLE 41

| Test Compound (Compound of Example) | Human normal PASMC proliferation suppression (PDGF stimulation_$IC_{50}$) |
| --- | --- |
| 57 | 420 |
| 58 | 57 |
| 59 | 93 |
| 60 | 26 |
| 61 | 18 |
| 62 | 34 |
| 63 | 10 |
| 64 | 92 |
| 65 | 60 |
| 66 | 30 |
| 67 | 120 |
| 68 | 72 |
| 69 | 61 |
| 70 | 50 |
| 71 | 43 |
| 72 | 70 |
| 73 | 80 |
| 74 | 18 |
| 75 | 13 |
| 76 | 27 |
| 78 | 150 |
| 79 | 170 |
| 80 | 280 |
| 81 | 110 |
| 82 | 72 |
| 83 | 48 |
| 84 | 160 |
| 85 | 130 |
| 86 | 280 |

TABLE 42

| Test Compound (Compound of Example) | Human normal PASMC proliferation suppression (PDGF stimulation_$IC_{50}$) |
| --- | --- |
| 87 | 350 |
| 88 | 210 |
| 89 | 190 |
| 90 | 360 |
| 91 | 150 |
| 92 | 66 |
| 93 | 260 |
| 94 | 90 |
| 95 | 96 |
| 96 | 72 |
| 97 | 160 |
| 98 | 160 |
| 99 | 27 |
| 100 | 71 |
| 101 | 71 |
| 102 | 30 |
| 103 | 40 |
| 104 | 38 |
| 105 | 28 |
| 106 | 140 |
| 107 | 110 |
| 108 | 85 |
| 109 | 170 |

TABLE 42-continued

| Test Compound (Compound of Example) | Human normal PASMC proliferation suppression (PDGF stimulation_IC$_{50}$) |
|---|---|
| 110 | 240 |
| 111 | 380 |
| 112 | 26 |
| 113 | 51 |
| 114 | 190 |

TABLE 43

| Test Compound (Compound of Example) | Human normal PASMC proliferation suppression (PDGF stimulation_IC$_{50}$) |
|---|---|
| 115 | 290 |
| 116 | 120 |
| 117 | 230 |
| 118 | 140 |
| 119 | 93 |
| 120 | 34 |
| 121 | 300 |
| 122 | 300 |
| 123 | 290 |
| 124 | 25 |
| 125 | 30 |
| 126 | 64 |
| 127 | 45 |
| 128 | 79 |
| 129 | 20 |
| 130 | 53 |
| 131 | 340 |
| 132 | 73 |
| 133 | 110 |
| 134 | 60 |
| 135 | 390 |
| 136 | 150 |
| 137 | 60 |
| 138 | 51 |
| 139 | 100 |
| 140 | 43 |
| 141 | 190 |
| 142 | 130 |

TABLE 44

| Test Compound (Compound of Example) | Human normal PASMC proliferation suppression (PDGF stimulation_IC$_{50}$) |
|---|---|
| 143 | 90 |
| 144 | 39 |
| 145 | 47 |
| 146 | 44 |
| 147 | 52 |
| 148 | 110 |
| 149 | 150 |
| 150 | 300 |
| 151 | 250 |
| 152 | 82 |
| 153 | 62 |
| 154 | 98 |
| 155 | 160 |
| 156 | 79 |
| 157 | 52 |
| 158 | 22 |
| 159 | 21 |
| 160 | 44 |
| 161 | 110 |
| 162 | 36 |
| 163 | 150 |
| 164 | 110 |
| 165 | 46 |
| 166 | 65 |

TABLE 44-continued

| Test Compound (Compound of Example) | Human normal PASMC proliferation suppression (PDGF stimulation_IC$_{50}$) |
|---|---|
| 167 | 210 |
| 168 | 110 |
| 169 | 43 |
| 170 | 130 |

TABLE 45

| Test Compound (Compound of Example) | Human normal PASMC proliferation suppression (PDGF stimulation_IC$_{50}$) |
|---|---|
| 177 | 11 |
| 178 | 44 |
| 179 | 20 |
| 180 | 32 |
| 181 | 500 |
| 182 | 190 |
| 183 | 24 |
| 184 | 82 |
| 185 | 28 |
| 186 | 220 |
| 187 | 20 |
| 188 | 60 |
| 189 | 90 |
| 190 | 110 |
| 191 | 29 |
| 192 | 24 |
| 193 | 18 |
| 194 | 74 |
| 195 | 26 |
| 196 | 31 |
| 197 | 110 |
| 198 | 39 |
| 199 | 70 |
| 200 | 120 |
| 201 | 120 |
| 202 | 33 |
| 203 | 200 |
| 204 | 52 |
| 205 | 160 |

TABLE 46

| Test Compound (Compound of Example) | Human normal PASMC proliferation suppression (PDGF stimulation_IC$_{50}$) |
|---|---|
| 206 | 92 |
| 207 | 99 |

Test Example 4: Suppression Action Against Formation of Erythroid Colonies

1. Preparation of Test Substance

The test substance was prepared with dimethyl sulfoxide (DMSO) to 10 mM and diluted with DMSO so as to reach a concentration of 0.1 to 3 mM, thereby preparing a test substance solution with a concentration 1000 times the final concentration.

2. Measurement of Suppression Action Against Formation of Erythroid Colonies

Human bone marrow CD34 positive hematopoietic stem cells were thawed and the cells were suspended in the MethoCult medium. Then, the test substance solution was added thereto so as to reach a final concentration of 0.1 to 10 μM. The cells were seeded onto a 35 mm dish and cultured for 14 days. The number of erythroid progenitor cell derived cell colonies was measured under microscope.

3. Analysis of Measurement Results

Based on the number of colonies in each condition, the suppression rate against colony formation was calculated when the negative control (0.1% DMSO solution) was defined as 100%, and a nonlinear regression analysis with a two parameter logistic model for the log dose and suppression rate against colony formation was carried out using the SAS system (SAS Institute Inc.) to estimate the $IC_{50}$ value. The results are shown in the following Table 47.

TABLE 47

| Test Compound (Compound of Example) | Suppression rate against erythroid colony formation ($IC_{50}$) |
|---|---|
| 1 | 3000 |
| 2 | 890 |
| 3 | >3000 |
| 5 | 470 |
| 6 | 250 |
| 7 | 5500 |
| 8 | 2800 |
| 14 | 360 |
| 16 | 6700 |
| 17 | 1800 |
| 20 | 3200 |
| 24 | 3000 |
| 29 | >3000 |
| 61 | >3000 |
| 62 | 180 |
| 65 | 2000 |
| 68 | 5000 |
| 71 | 2000 |
| 75 | 600 |
| 85 | >10000 |
| 95 | 1900 |
| 105 | 1400 |
| 109 | 2000 |
| 110 | 3200 |
| 112 | 1200 |
| 113 | 4500 |
| 114 | 7500 |
| 147 | 320 |
| 148 | 1000 |
| 159 | >10000 |
| 169 | 530 |

FORMULATION EXAMPLE

The following Formulation Example is only illustrative and is not intended to limit the scope of the present invention in any way.

Formulation Example 1: Tablet (Oral)

In 80 mg of one formulated tablet
Example 1 compound of the present invention 5.0 mg
Corn starch 46.6 mg
Crystalline cellulose 24.0 mg
Methylcellulose 4.0 mg
Magnesium stearate 0.4 mg Mixed powder of the components in the above percentage is compressed to form an oral tablet by a conventional method.

INDUSTRIAL APPLICABILITY

Since the compound of the present invention has an inhibitory activity against the PDGF receptor kinase, it is useful as a therapeutic agent for respiratory diseases, cancers, smooth muscle proliferative diseases, vasoproliferative diseases, autoimmune/inflammatory diseases, metabolic diseases, vasoocclusive diseases, and the like.

The invention claimed is:

1. A compound selected from the group consisting of the following (1) to (207):
   (1) 2-(cyclopropylamino)-N-(5-{[(1S,2S)-2-hydroxycyclohexyl]carbamoyl}-2-methylphenyl)-1,3-thiazole-5-carboxamide,
   (2) N-(5-{[(1S,2S)-2-hydroxycyclohexyl]carbamoyl}-2-methylphenyl)-5-phenylpyridine-3-carboxamide,
   (3) 2-(cyclopropylmethyl)-N-(5-{[(1S,2S)-2-hydroxycyclohexyl]carbamoyl}-2-methylphenyl)-1,3-thiazole-5-carboxamide,
   (4) 5-(cyclopropylamino)-N-(5-{[(1S,2S)-2-hydroxycyclohexyl]carbamoyl}-2-methylphenyl)pyridine-3-carboxamide,
   (5) N-(5-{[(1S,2S)-2-hydroxycyclohexyl]carbamoyl}-2-methylphenyl)-2-phenyl-1,3-oxazole-5-carboxamide,
   (6) N-(5-{[(1S)-2-hydroxy-1-phenylethyl]carbamoyl}-2-methylphenyl)-5-phenylpyridine-3-carboxamide,
   (7) N-(5-{[(1S,2S)-2-hydroxycyclohexyl]carbamoyl}-2-methylphenyl)-5-[(propan-2-yl)oxy]pyridine-3-carboxamide,
   (8) 2-[(cyclopropylmethyl)amino]-N-(5-{[(1S,2S)-2-hydroxycyclohexyl]carbamoyl}-2-methylphenyl)-1,3-thiazole-5-carboxamide,
   (9) 5-(4-chlorophenyl)-N-(5-{[(1S,2S)-2-hydroxycyclohexyl]carbamoyl}-2-methylphenyl)pyridine-3-carboxamide,
   (10) N-(5-{[(1S,2S)-2-hydroxycyclohexyl]carbamoyl}-2-methylphenyl)-2-propyl-1,3-thiazole-5-carboxamide,
   (11) 5-(3-chlorophenyl)-N-(5-{[(1S,2S)-2-hydroxycyclohexyl]carbamoyl}-2-methylphenyl)pyridine-3-carboxamide,
   (12) N-(5-{[(1S,2S)-2-hydroxycyclohexyl]carbamoyl}-2-methylphenyl)-5-(2-methylphenyl)pyridine-3-carboxamide,
   (13) 5-(2-chlorophenyl)-N-(5-{[(1S,2S)-2-hydroxycyclohexyl]carbamoyl}-2-methylphenyl)pyridine-3-carboxamide,
   (14) N-(5-{[(2S)-1-hydroxypentan-2-yl]carbamoyl}-2-methylphenyl)-5-phenylpyridine-3-carboxamide,
   (15) 5-[(E)-2-cyclopropylethenyl]-N-(5-{[(1S,2S)-2-hydroxycyclohexyl]carbamoyl}-2-methylphenyl)pyridine-3-carboxamide,
   (16) 5-[(cyclopropylmethyl)amino]-N-(5-{[(1S,2S)-2-hydroxycyclohexyl]carbamoyl}-2-methylphenyl)pyridine-3-carboxamide,
   (17) 5-[cyclopropyl(methyl)amino]-N-(5-{[(1S,2S)-2-hydroxycyclohexyl]carbamoyl}-2-methylphenyl)pyridine-3-carboxamide,
   (18) N-(5-{[(1S,2S)-2-hydroxycyclohexyl]carbamoyl}-2-methylphenyl)-5-(4-methoxyphenyl)pyridine-3-carboxamide,
   (19) 5-(4-fluorophenyl)-N-(5-{[(1S,2S)-2-hydroxycyclohexyl]carbamoyl}-2-methylphenyl)pyridine-3-carboxamide,
   (20) 5-(3-fluorophenyl)-N-(5-{[(1S,2S)-2-hydroxycyclohexyl]carbamoyl}-2-methylphenyl)pyridine-3-carboxamide,
   (21) N-(5-{[(1S,2S)-2-hydroxycyclohexyl]carbamoyl}-2-methylphenyl)-5-[4-(trifluoromethyl)phenyl]pyridine-3-carboxamide,

(22) N-(5-{[(1S,2S)-2-hydroxycyclohexyl]carbamoyl}-2-methylphenyl)-5-[3-(trifluoromethyl)phenyl]pyridine-3-carboxamide,
(23) N-(5-{[(1S,2S)-2-hydroxycyclohexyl]carbamoyl}-2-methylphenyl)-5-(2-methylprop-1-en-1-yl)pyridine-3-carboxamide,
(24) 5-(cyclopropylmethoxy)-N-(5-{[(1S,2S)-2-hydroxycyclohexyl]carbamoyl}-2-methylphenyl)pyridine-3-carboxamide,
(25) 2-[(3,3-difluorocyclobutyl)amino]-N-(5-{[(1S,2S)-2-hydroxycyclohexyl]carbamoyl}-2-methylphenyl)-1,3-thiazole-5-carboxamide,
(26) 2-[(2-cyclopropylethyl)amino]-N-(5-{[(1S,2S)-2-hydroxycyclohexyl]carbamoyl}-2-methylphenyl)-1,3-thiazole-5-carboxamide,
(27) N-(5-{[(1S,2S)-2-hydroxycyclohexyl]carbamoyl}-2-methylphenyl)-2-[(propan-2-yl)amino]-1,3-thiazole-5-carboxamide,
(28) 5-[(4,4-difluorocyclohexyl)oxy]-N-(5-{[(1S,2S)-2-hydroxycyclohexyl]carbamoyl}-2-methylphenyl)pyridine-3-carboxamide,
(29) 5-(2-fluorophenyl)-N-(5-{[(1S,2S)-2-hydroxycyclohexyl]carbamoyl}-2-methylphenyl)pyridine-3-carboxamide,
(30) 5-(2,3-difluorophenyl)-N-(5-{[(1S,2S)-2-hydroxycyclohexyl]carbamoyl}-2-methylphenyl)pyridine-3-carboxamide,
(31) 5-(2,4-difluorophenyl)-N-(5-{[(1S,2S)-2-hydroxycyclohexyl]carbamoyl}-2-methylphenyl)pyridine-3-carboxamide,
(32) 5-(3,5-difluorophenyl)-N-(5-{[(1S,2S)-2-hydroxycyclohexyl]carbamoyl}-2-methylphenyl)pyridine-3-carboxamide,
(33) 5-(2-fluoro-4-methoxyphenyl)-N-(5-{[(1S,2S)-2-hydroxycyclohexyl]carbamoyl}-2-methylphenyl)pyridine-3-carboxamide,
(34) N-(5-{[(1S,2S)-2-hydroxycyclohexyl]carbamoyl}-2-methylphenyl)-5-[3-(trifluoromethoxy)phenyl]pyridine-3-carboxamide,
(35) N-(5-{[(1S,2S)-2-hydroxycyclohexyl]carbamoyl}-2-methylphenyl)-5-[2-(trifluoromethoxy)phenyl]pyridine-3-carboxamide,
(36) 5-[2-fluoro-4-(trifluoromethyl)phenyl]-N-(5-{[(1S,2S)-2-hydroxycyclohexyl]carbamoyl}-2-methylphenyl)pyridine-3-carboxamide,
(37) 5-(2,6-difluorophenyl)-N-(5-{[(1S,2S)-2-hydroxycyclohexyl]carbamoyl}-2-methylphenyl)pyridine-3-carboxamide,
(38) 2-(tert-butylamino)-N-(5-{[(1S,2S)-2-hydroxycyclohexyl]carbamoyl}-2-methylphenyl)-1,3-thiazole-5-carboxamide,
(39) N-(5-{[(1S,2S)-2-hydroxycyclohexyl]carbamoyl}-2-methylphenyl)-2-[(1-methylcyclopropyl)amino]-1,3-thiazole-5-carboxamide,
(40) N-(5-{[(1S,2S)-2-hydroxycyclohexyl]carbamoyl}-2-methylphenyl)-2-[(1-methylcyclobutyl)amino]-1,3-thiazole-5-carboxamide,
(41) 2-[(2,2-dimethylpropyl)amino]-N-(5-{[(1S,2S)-2-hydroxycyclohexyl]carbamoyl}-2-methylphenyl)-1,3-thiazole-5-carboxamide,
(42) N-(5-{[(1S,2S)-2-hydroxycyclohexyl]carbamoyl}-2-methylphenyl)-5-(3,4,5-trifluorophenyl)pyridine-3-carboxamide,
(43) 5-(4-cyclopropylphenyl)-N-(5-{[(1S,2S)-2-hydroxycyclohexyl]carbamoyl}-2-methylphenyl)pyridine-3-carboxamide,
(44) N-(2-chloro-5-{[(1S,2S)-2-hydroxycyclohexyl]carbamoyl}phenyl)-5-(cyclopropylmethoxy)pyridine-3-carboxamide,
(45) N-(5-{[(1S,2S)-2-hydroxycyclohexyl]carbamoyl}-2-methylphenyl) imidazo[2,1-b][1,3]thiazole-5-carboxamide,
(46) 5-(cyclopropylmethoxy)-N-(3-fluoro-5-{[(1S,2S)-2-hydroxycyclohexyl]carbamoyl}-2-methylphenyl)pyridine-3-carboxamide,
(47) 5-[(3,3-difluorocyclobutyl)oxy]-N-(5-{[(1S,2S)-2-hydroxycyclohexyl]carbamoyl}-2-methylphenyl)pyridine-3-carboxamide,
(48) 2-(cyclopropylmethyl)-N-(3-fluoro-5-{[(1S,2S)-2-hydroxycyclohexyl]carbamoyl}-2-methylphenyl)-1,3-thiazole-5-carboxamide,
(49) N-(5-{[(1S,2S)-2-hydroxycyclohexyl]carbamoyl}-2-methylphenyl)-5-methoxypyridine-3-carboxamide,
(50) 5-ethoxy-N-(5-{[(1S,2S)-2-hydroxycyclohexyl]carbamoyl}-2-methylphenyl)pyridine-3-carboxamide,
(51) N-(5-{[(1S,2S)-2-hydroxycyclohexyl]carbamoyl}-2-methylphenyl)-5-[(pyridin-2-yl)oxy]pyridine-3-carboxamide,
(52) N-(5-{[(1S,2S)-2-hydroxycyclohexyl]carbamoyl}-2-methylphenyl)-5-[(pyrimidin-2-yl)oxy]pyridine-3-carboxamide,
(53) N-(5-{[(1S,2S)-2-hydroxycyclohexyl]carbamoyl}-2-methylphenyl)-5-[(1-methylcyclopropyl)methoxy]pyridine-3-carboxamide,
(54) 5-[(3,3-difluorocyclobutyl) methoxy]-N-(5-{[(1S,2S)-2-hydroxycyclohexyl]carbamoyl}-2-methylphenyl)pyridine-3-carboxamide,
(55) N-(2-chloro-5-{[(1S,2S)-2-hydroxycyclohexyl]carbamoyl}phenyl)-2-(cyclopropylmethyl)-1,3-thiazole-5-carboxamide,
(56) 5-(cyclopropylmethoxy)-N-(2-fluoro-5-{[(1S,2S)-2-hydroxycyclohexyl]carbamoyl}phenyl)pyridine-3-carboxamide,
(57) 3-[(5-bromopyridin-3-yl) ethynyl]-4-chloro-N-[(1S,2S)-2-hydroxycyclohexyl]benzamide,
(58) 4-chloro-N-[(1S,2S)-2-hydroxycyclohexyl]-3-[(5-phenylpyridin-3-yl) ethynyl]benzamide,
(59) N-[(1S,2S)-2-hydroxycyclohexyl]-4-methyl-3-[(5-methylpyridin-3-yl) ethynyl]benzamide,
(60) N-[(1S,2S)-2-hydroxycyclohexyl]-4-methyl-3-[(5-phenylpyridin-3-yl) ethynyl]benzamide,
(61) 3-[(5-bromopyridin-3-yl) ethynyl]-N-[(1S,2S)-2-hydroxycyclohexyl]-4-methylbenzamide,
(62) N-[(1S,2S)-2-hydroxycyclohexyl]-4-methyl-3-{[5-(pyrimidin-2-yl)pyridin-3-yl]ethynyl}benzamide,
(63) N-[(1S,2S)-2-hydroxycyclohexyl]-4-methyl-3-{[5-(pyrazin-2-yl)pyridin-3-yl]ethynyl}benzamide,
(64) 4-chloro-N-[(1S,2S)-2-hydroxycyclohexyl]-3-{[5-(pyrimidin-2-yl)pyridin-3-yl]ethynyl}benzamide,
(65) 3-[(6-aminopyridin-3-yl) ethynyl]-N-[(1S,2S)-2-hydroxycyclohexyl]-4-methylbenzamide,
(66) 3-[([2,3'-bipyridin]-5'-yl) ethynyl]-N-[(1S,2S)-2-hydroxycyclohexyl]-4-methylbenzamide,
(67) 3-[(5-cyclopropylpyridin-3-yl) ethynyl]-N-[(1S,2S)-2-hydroxycyclohexyl]-4-methylbenzamide,
(68) 3-[(6-cyclopropylpyrazin-2-yl) ethynyl]-N-[(1S,2S)-2-hydroxycyclohexyl]-4-methylbenzamide,
(69) 3-{[6-(2-fluorophenyl) pyrazin-2-yl]ethynyl}-N-[(1S,2S)-2-hydroxycyclohexyl]-4-methylbenzamide,
(70) 3-{[6-(3-fluorophenyl) pyrazin-2-yl]ethynyl}-N-[(1S,2S)-2-hydroxycyclohexyl]-4-methylbenzamide,
(71) 3-{[6-(4-fluorophenyl) pyrazin-2-yl]ethynyl}-N-[(1S,2S)-2-hydroxycyclohexyl]-4-methylbenzamide,

(72) 3-({6-[(cyclopropylmethyl)amino]pyrazin-2-yl}ethynyl)-N-[(1S,2S)-2-hydroxycyclohexyl]-4-methylbenzamide,
(73) 5-[(5-cyclopropylpyridin-3-yl) ethynyl]-N-[(1S,2S)-2-hydroxycyclohexyl]-6-methylpyridine-3-carboxamide,
(74) 3-[(6-bromopyrazin-2-yl) ethynyl]-N-[(1S,2S)-2-hydroxycyclohexyl]-4-methylbenzamide,
(75) N-[(1S,2S)-2-hydroxycyclohexyl]-4-methyl-3-[(6-phenylpyrazin-2-yl) ethynyl]benzamide,
(76) 3-[(5-bromopyridin-3-yl) ethynyl]-N-[(1S,2S)-1,3-dihydroxy-1-phenylpropan-2-yl]-4-methylbenzamide,
(77) N$^1$-[(1S,2S)-2-hydroxycyclohexyl]-4-methyl-N$^3$-(5-phenylpyridin-3-yl)benzene-1,3-dicarboxamide,
(78) N-[(1S,2S)-2-hydroxycyclohexyl]-4-methyl-3-{[2-(pyridin-3-yl)pyrimidin-4-yl]amino}benzamide,
(79) N-[(1S,2S)-2-hydroxycyclohexyl]-3-{[2-(isoquinolin-4-yl)pyrimidin-4-yl]amino}-4-methylbenzamide,
(80) N-[(1S,2S)-1,3-dihydroxy-1-phenylpropan-2-yl]-3-{[2-(isoquinolin-4-yl)pyrimidin-4-yl]amino}-4-methylbenzamide,
(81) 3-[([2,3'-bipyridin]-6-yl)amino]-5-fluoro-N-[(1S,2S)-2-hydroxycyclohexyl]-4-methylbenzamide,
(82) N-[(1S,2S)-2-hydroxycyclohexyl]-4-methyl-3-{[2-(methylamino) quinazolin-5-yl]amino}benzamide,
(83) 3-(2-amino-7,8-dihydropyrido[4,3-d]pyrimidin-6(5H)-yl)-N-[(1S,2S)-1,3-dihydroxy-1-phenylpropan-2-yl]-4-methylbenzamide,
(84) N-[(1S,2S)-2-hydroxycyclohexyl]-4-methyl-3-{[(1S)-1-(5-phenylpyridin-3-yl)ethyl]amino}benzamide,
(85) 3-{[(1S)-1-([3,3'-bipyridin]-5-yl)ethyl]amino}-N-[(1S,2S)-2-hydroxycyclohexyl]-4-methylbenzamide,
(86) N-[(1S,2S)-2-hydroxycyclohexyl]-4-methyl-3-({(1S)-1-[5-(phenylethynyl)pyridin-3-yl]ethyl}amino)benzamide,
(87) 3-{[(1S)-1-([3,4'-bipyridin]-5-yl)ethyl]amino}-N-[(1S,2S)-2-hydroxycyclohexyl]-4-methylbenzamide,
(88) N-[(1S,2S)-2-hydroxycyclohexyl]-4-methyl-3-({(1S)-1-[5-(pyrimidin-2-yl)pyridin-3-yl]ethyl}amino)benzamide,
(89) 3-{[(1S)-1-([2,3'-bipyridin]-5'-yl)ethyl]amino}-N-[(1S,2S)-2-hydroxycyclohexyl]-4-methylbenzamide,
(90) 3-{[(1S)-1-([3,3'-bipyridin]-5-yl)ethyl]amino}-4-chloro-N-[(1S,2S)-2-hydroxycyclohexyl]benzamide,
(91) 3-{[(5-bromopyridin-3-yl)methyl]amino}-N-[(1S,2S)-2-hydroxycyclohexyl]-4-methylbenzamide,
(92) N-[(1S,2S)-2-hydroxycyclohexyl]-4-methyl-3-{[(5-phenylpyridin-3-yl)methyl]amino}benzamide,
(93) 3-{[([3,3'-bipyridin]-5-yl)methyl]amino}-N-[(1S,2S)-2-hydroxycyclohexyl]-4-methylbenzamide,
(94) 3-({[5-(cyclopropylethynyl)pyridin-3-yl]methyl}amino)-N-[(1S,2S)-2-hydroxycyclohexyl]-4-methylbenzamide,
(95) N-[(1S,2S)-2-hydroxycyclohexyl]-4-methyl-3-({[5-(pyrimidin-2-yl)pyridin-3-yl]methyl}amino)benzamide,
(96) N-[(1S,2S)-2-hydroxycyclohexyl]-4-methyl-3-{[(quinolin-3-yl)methyl]amino}benzamide,
(97) N-[(1S,2S)-2-hydroxycyclohexyl]-3-[({5-[(1-hydroxycyclopropyl)ethynyl]pyridin-3-yl}methyl)amino]-4-methylbenzamide,
(98) 3-[({5-[4-(2-aminopropan-2-yl)phenyl]pyridin-3-yl}methyl)amino]-N-[(1S,2S)-2-hydroxycyclohexyl]-4-methylbenzamide,
(99) 3-({[5-(4-aminophenyl)pyridin-3-yl]methyl}amino)-N-[(1S,2S)-2-hydroxycyclohexyl]-4-methylbenzamide,
(100) 3-({[5-(3,5-difluorophenyl)pyridin-3-yl]methyl}amino)-N-[(1S,2S)-2-hydroxycyclohexyl]-4-methylbenzamide,
(101) N-[(1S,2S)-2-hydroxycyclohexyl]-4-methyl-3-{[(6-phenylpyrazin-2-yl)methyl]amino}benzamide,
(102) N-[(1S,2S)-2-hydroxycyclohexyl]-4-methyl-3-({[5-(thiophen-2-yl)pyridin-3-yl]methyl}amino)benzamide,
(103) N-[(1S,2S)-2-hydroxycyclohexyl]-4-methyl-3-({[5-(thiophen-3-yl)pyridin-3-yl]methyl}amino)benzamide,
(104) 4-chloro-N-[(1S,2S)-2-hydroxycyclohexyl]-3-({[5-(pyrimidin-2-yl)pyridin-3-yl]methyl}amino)benzamide,
(105) N-[(1S,2S)-2-hydroxycyclohexyl]-4-methyl-3-{[(pyrazolo[5,1-b][1,3]thiazol-7-yl)methyl]amino}benzamide,
(106) 3-fluoro-N-[(1S,2S)-2-hydroxycyclohexyl]-4-methyl-5-({[5-(pyrimidin-2-yl)pyridin-3-yl]methyl}amino)benzamide,
(107) 3-({[5-(5-fluoropyrimidin-2-yl)pyridin-3-yl]methyl}amino)-N-[(1S,2S)-2-hydroxycyclohexyl]-4-methylbenzamide,
(108) N-[(1S,2S)-2-hydroxycyclohexyl]-4-methyl-3-{[(thieno[3,2-b]pyridin-6-yl)methyl]amino}benzamide,
(109) N-[(1S,2S)-2-hydroxycyclohexyl]-4-methyl-3-{[(1H-pyrazolo[3,4-b]pyridin-5-yl)methyl]amino}benzamide,
(110) N-[(1S,2S)-2-hydroxycyclohexyl]-3-{[(imidazo[1,2-b]pyridazin-3-yl)methyl]amino}-4-methylbenzamide,
(111) N-[(1S,2S)-2-hydroxycyclohexyl]-3-({[5-(imidazo[1,2-a]pyrazin-6-yl)pyridin-3-yl]methyl}amino)-4-methylbenzamide,
(112) N-[(1S,2S)-2-hydroxycyclohexyl]-4-methyl-3-({[1-(pyridin-2-yl)-1H-pyrazol-4-yl]methyl}amino)benzamide,
(113) 3-{[(2-aminopyrimidin-5-yl)methyl]amino}-N-[(1S,2S)-2-hydroxycyclohexyl]-4-methylbenzamide,
(114) 3-({[2-(cyclopropylamino)pyrimidin-5-yl]methyl}amino)-N-[(1S,2S)-2-hydroxycyclohexyl]-4-methylbenzamide,
(115) N-[(1S,2S)-2-hydroxycyclohexyl]-4-methyl-3-({[5-(pyrazin-2-yl)pyridin-3-yl]methyl}amino)benzamide,
(116) 3-{[(6-acetamidopyridin-3-yl)methyl]amino}-N-[(1S,2S)-2-hydroxycyclohexyl]-4-methylbenzamide,
(117) 3-[({6-[(cyclopropylmethyl)amino]pyridin-3-yl}methyl)amino]-N-[(1S,2S)-2-hydroxycyclohexyl]-4-methylbenzamide,
(118) 3-{[([2,2'-bipyridin]-5-yl)methyl]amino}-N-[(1S,2S)-2-hydroxycyclohexyl]-4-methylbenzamide,
(119) N-[(1S,2S)-2-hydroxycyclohexyl]-4-methyl-3-{[(pyrazolo[1,5-a]pyrimidin-3-yl)methyl]amino}benzamide,
(120) 3-[({6-[(cyclopropanecarbonyl)amino]pyridin-3-yl}methyl)amino]-N-[(1S,2S)-2-hydroxycyclohexyl]-4-methylbenzamide,
(121) N-[(1S,2S)-2-hydroxycyclohexyl]-4-methyl-3-{[(2-phenylpyrimidin-5-yl)methyl]amino}benzamide,
(122) N-[(1S,2S)-2-hydroxycyclohexyl]-4-methyl-3-({[6-(1H-pyrazol-1-yl)pyridin-3-yl]methyl}amino)benzamide, (123) N-[(1S,2S)-2-hydroxycyclohexyl]-6-methyl-5-{[(pyrazolo[1,5-a]pyridin-3-yl)methyl]amino}pyridine-3-carboxamide,
(124) methyl {5-[(5-{[(1S,2S)-2-hydroxycyclohexyl]carbamoyl}-2-methylanilino)methyl]pyridin-2-yl}carbamate,
(125) N-[(1S,2S)-2-hydroxycyclohexyl]-4-methyl-3-[({6-[(oxan-4-yl)amino]pyridin-3-yl}methyl)amino]benzamide,
(126) N-[(1S,2S)-2-hydroxycyclohexyl]-4-methyl-3-[({2-[(pyridin-2-yl)amino]pyrimidin-5-yl}methyl)amino]benzamide,
(127) N-{5-[(5-{[(1S,2S)-2-hydroxycyclohexyl]carbamoyl}-2-methylanilino)methyl]pyridin-2-yl}morpholine-4-carboxamide,
(128) N-[(1S,2S)-2-hydroxycyclohexyl]-3-({[2-(4-methoxyphenyl)pyrimidin-5-yl]methyl}amino)-4-methylbenzamide,
(129) N-[(1S,2S)-2-hydroxycyclohexyl]-4-methyl-3-{[(6-{[(pyridin-3-yl) carbamoyl]amino}pyridin-3-yl)methyl]amino}benzamide,
(130) 3-({[6-(cyclobutylamino)pyridin-3-yl]methyl}amino)-N-[(1S,2S)-2-hydroxycyclohexyl]-4-methylbenzamide
(131) 3-{[(5-aminopyrazin-2-yl)methyl]amino}-N-[(1S,2S)-2-hydroxycyclohexyl]-4-methylbenzamide,
(132) N-[(1S,2S)-2-hydroxycyclohexyl]-4-methyl-3-[({2-[(oxan-4-yl)amino]pyrimidin-5-yl}methyl)amino]benzamide,
(133) 3-{[(6-{[cyclopropyl(methyl) carbamoyl]amino}pyridin-3-yl)methyl]amino}-N-[(1S,2S)-2-hydroxycyclohexyl]-4-methylbenzamide,
(134) N-[(1S,2S)-2-hydroxycyclohexyl]-4-methyl-3-[({6-[(propan-2-yl)amino]pyridin-3-yl}methyl)amino]benzamide,
(135) N-[(1S,2S)-2-hydroxycyclohexyl]-4-methyl-3-{[(2-{[(3R)-oxolan-3-yl]amino}pyrimidin-5-yl)methyl]amino}benzamide,
(136) N-[(1S,2S)-2-hydroxycyclohexyl]-4-methyl-3-{[(2-{[(3S)-oxolan-3-yl]amino}pyrimidin-5-yl)methyl]amino}benzamide
(137) N-{5-[(5-{[(1S,2S)-2-hydroxycyclohexyl]carbamoyl}-2-methylanilino)methyl]pyridin-2-yl}oxane-4-carboxamide,
(138) N-[(1S,2S)-2-hydroxycyclohexyl]-3-{[(6-{[(1r,3r)-3-methoxycyclobutane-1-carbonyl]amino}pyridin-3-yl)methyl]amino}-4-methylbenzamide,
(139) N-{5-[(5-{[(1S,2S)-2-hydroxycyclohexyl]carbamoyl}-2-methylanilino)methyl]pyridin-2-yl}oxolane-3-carboxamide,
(140) N-[(1S,2S)-2-hydroxycyclohexyl]-4-methyl-3-({[6-(1H-1,2,3-triazol-1-yl)pyridin-3-yl]methyl}amino)benzamide,
(141) N-[(1S,2S)-2-hydroxycyclohexyl]-4-methyl-3-[({6-[(oxetan-3-yl)amino]pyridin-3-yl}methyl)amino]benzamide,
(142) 3-{[(2-aminopyrimidin-5-yl)methyl]amino}-4-chloro-N-[(1S,2S)-2-hydroxycyclohexyl]benzamide,
(143) 3-{[(2-aminopyrimidin-5-yl)methyl]amino}-5-fluoro-N-[(1S,2S)-2-hydroxycyclohexyl]-4-methylbenzamide,
(144) 3-{[(3,4-dihydro-2H-pyrido[3,2-b][1,4]oxazin-7-yl)methyl]amino}-N-[(1S,2S)-2-hydroxycyclohexyl]-4-methylbenzamide,
(145) N-[(1S,2S)-2-hydroxycyclohexyl]-4-methyl-3-({[5-(2H-1,2,3-triazol-2-yl)pyridin-3-yl]methyl}amino)benzamide,
(146) 3-{[([3,3'-bipyridin]-5-yl)amino]methyl}-N-[(1S,2S)-2-hydroxycyclohexyl]-4-methylbenzamide,
(147) N-[(1S,2S)-2-hydroxycyclohexyl]-4-methyl-3-({[5-(pyrimidin-2-yl)pyridin-3-yl]amino}methyl)benzamide,
(148) 3-{[([2,3'-bipyridin]-5'-yl)amino]methyl}-N-[(1S,2S)-2-hydroxycyclohexyl]-4-methylbenzamide,
(149) N-[(1R,2R)-2-hydroxycyclohexyl]-4-methyl-3-({[5-(pyrimidin-2-yl)pyridin-3-yl]amino}methyl)benzamide,
(150) N-[(1S,2S)-2-hydroxycyclohexyl]-3-({[5-(pyrimidin-2-yl)pyridin-3-yl]amino}methyl)benzamide,
(151) 4-fluoro-N-[(1S,2S)-2-hydroxycyclohexyl]-3-({[5-(pyrimidin-2-yl)pyridin-3-yl]amino}methyl)benzamide,
(152) 3-{[(5-bromopyridin-3-yl)amino]methyl}-N-[(1S,2S)-1,3-dihydroxy-1-phenylpropan-2-yl]-4-methylbenzamide,
(153) N-[(1S,2S)-1,3-dihydroxy-1-phenylpropan-2-yl]-4-methyl-3-{[(5-phenylpyridin-3-yl)amino]methyl}benzamide,
(154) 3-{[(5-cyclopropylpyridin-3-yl)amino]methyl}-N-[(1S,2S)-1,3-dihydroxy-1-phenylpropan-2-yl]-4-methylbenzamide,
(155) 3-{[([2,3'-bipyridin]-5'-yl)amino]methyl}-N-[(1S,2S)-1,3-dihydroxy-1-phenylpropan-2-yl]-4-methylbenzamide,
(156) N-[(1S,2S)-1,3-dihydroxy-1-phenylpropan-2-yl]-4-methyl-3-{[(6-phenylpyrazin-2-yl)amino]methyl}benzamide,
(157) 5-({[5-(cyclopropylethynyl)pyridin-3-yl]amino}methyl)-N-[(1S,2S)-2-hydroxycyclohexyl]-6-methylpyridine-3-carboxamide,
(158) N-[3-({[6-(3,4-dimethoxyphenyl) pyrazin-2-yl]amino}methyl)phenyl]-N'-[(1R,2S)-2-hydroxycyclohexyl]urea,
(159) N-[(1R,2S)-2-hydroxycyclohexyl]-N'-[3-({[5-(pyrimidin-2-yl)pyridin-3-yl]amino}methyl)phenyl]urea,
(160) N-[2-fluoro-5-({[5-(pyrimidin-2-yl)pyridin-3-yl]amino}methyl)phenyl]-N'-[(1R,2S)-2-hydroxycyclohexyl]urea,
(161) N-[4-fluoro-3-({[5-(pyrimidin-2-yl)pyridin-3-yl]amino}methyl)phenyl]-N'-[(1R,2S)-2-hydroxycyclohexyl]urea,
(162) N-[(1R,2S)-2-hydroxycyclohexyl]-N'-[4-methyl-3-({[5-(pyrimidin-2-yl)pyridin-3-yl]amino}methyl)phenyl]urea,
(163) N-[(1R,2S)-2-hydroxycyclohexyl]-N'-[2-methyl-5-({[5-(pyrimidin-2-yl)pyridin-3-yl]amino}methyl)phenyl]urea,
(164) N-[(1S,2S)-2-hydroxycyclohexyl]-4-methyl-3-{1-[(6-phenylpyrazin-2-yl)amino]ethyl}benzamide,
(165) 3-[([3,3'-bipyridin]-5-yl) methoxy]-N-[(1S,2S)-2-hydroxycyclohexyl]-4-methylbenzamide,
(166) N-[(1S,2S)-2-hydroxycyclohexyl]-4-methyl-3-{[5-(pyrimidin-2-yl)pyridin-3-yl]methoxy}benzamide,
(167) 4-chloro-N-[(1S,2S)-2-hydroxycyclohexyl]-3-{[5-(pyrimidin-2-yl)pyridin-3-yl]methoxy}benzamide,
(168) 3-{[([3,3'-bipyridin]-5-yl)oxy]methyl}-N-[(1S,2S)-2-hydroxycyclohexyl]-4-methylbenzamide,
(169) N-[(1S,2S)-2-hydroxycyclohexyl]-4-methyl-3-({[5-(pyrimidin-2-yl)pyridin-3-yl]oxy}methyl)benzamide,
(170) 4-chloro-N-[(1S,2S)-2-hydroxycyclohexyl]-3-({[5-(pyrimidin-2-yl)pyridin-3-yl]oxy}methyl)benzamide,
(171) N-[(1S,2S)-2-hydroxycyclohexyl]-4-methyl-3-{1-[5-(pyrimidin-2-yl)pyridin-3-yl]ethoxy}benzamide, (172) N-[(1S,2S)-2-hydroxycyclohexyl]-4-methyl-3-[1-(5-phenylpyridin-3-yl)ethoxy]benzamide,
(173) N-[(1S,2S)-2-hydroxycyclohexyl]-4-methyl-3-[(E)-2-(5-phenylpyridin-3-yl)ethenyl]benzamide,
(174) N-[(1S,2S)-2-hydroxycyclohexyl]-4-methyl-3-[2-(5-phenylpyridin-3-yl)ethyl]benzamide,
(175) N-[(1S,2S)-2-hydroxycyclohexyl]-4-methyl-3-{[methyl(5-phenylpyridin-3-yl)amino]methyl}benzamide,
(176) 3-{[ethyl(5-phenylpyridin-3-yl)amino]methyl}-N-[(1S,2S)-2-hydroxycyclohexyl]-4-methylbenzamide,
(177) 3-[(Z)-2-([2,3'-bipyridin]-5'-yl)-2-fluoroethenyl]-4-fluoro-N-[(1S,2S)-2-hydroxycyclohexyl]benzamide,
(178) 4-fluoro-3-{(Z)-2-fluoro-2-[5-(pyrimidin-2-yl)pyridin-3-yl]ethenyl}-N-[(1S,2S)-2-hydroxycyclohexyl]benzamide,
(179) 3-[(Z)-2-fluoro-2-(imidazo[1,2-b]pyridazin-3-yl)ethenyl]-N-[(1S,2S)-2-hydroxycyclohexyl]-4-methylbenzamide,
(180) 5-[(Z)-2-([2,3'-bipyridin]-5'-yl)-2-fluoroethenyl]-N-[(1S,2S)-2-hydroxycyclohexyl]-6-methylpyridine-3-carboxamide,
(181) 3-[(Z)-2-fluoro-2-{5-[(4-methylpiperazin-1-yl)methyl]pyridin-3-yl}ethenyl]-N-[(1S,2S)-2-hydroxycyclohexyl]-4-methylbenzamide,
(182) 3-[(Z)-2-fluoro-2-{5-[(morpholin-4-yl)methyl]pyridin-3-yl}ethenyl]-N-[(1S,2S)-2-hydroxycyclohexyl]-4-methylbenzamide,
(183) 3-[(Z)-2-{6-[(cyclopropylmethyl)amino]pyridin-3-yl}-2-fluoroethenyl]-N-[(1S,2S)-2-hydroxycyclohexyl]-4-methylbenzamide,
(184) 4-fluoro-3-{(Z)-2-fluoro-2-[5-(morpholin-4-yl)pyridin-3-yl]ethenyl}-N-[(1S,2S)-2-hydroxycyclohexyl]benzamide,
(185) 4-fluoro-3-[(Z)-2-fluoro-2-{5-[(oxan-4-yl)amino]pyridin-3-yl}ethenyl]-N-[(1S,2S)-2-hydroxycyclohexyl]benzamide,
(186) 4-fluoro-3-[(Z)-2-fluoro-2-{5-[(4-methylpiperazin-1-yl)methyl]pyridin-3-yl}ethenyl]-N-[(1S,2S)-2-hydroxycyclohexyl]benzamide,
(187) 5-{(Z)-2-[5-(cyclopropylmethoxy)pyridin-3-yl]-2-fluoroethenyl}-N-[(1S,2S)-2-hydroxycyclohexyl]-6-methylpyridine-3-carboxamide,
(188) 5-{(Z)-2-fluoro-2-[5-(morpholin-4-yl)pyridin-3-yl]ethenyl}-N-[(1S,2S)-2-hydroxycyclohexyl]-6-methylpyridine-3-carboxamide,
(189) 5-[(Z)-2-(6-aminopyridin-3-yl)-2-fluoroethenyl]-N-[(1S,2S)-2-hydroxycyclohexyl]-6-methylpyridine-3-carboxamide,
(190) 5-[(Z)-2-(2-aminopyrimidin-5-yl)-2-fluoroethenyl]-N-[(1S,2S)-2-hydroxycyclohexyl]-6-methylpyridine-3-carboxamide,
(191) 3-[(Z)-2-(6-aminopyridin-3-yl)-2-fluoroethenyl]-4-fluoro-N-[(1S,2S)-2-hydroxycyclohexyl]benzamide,
(192) 3-[(Z)-2-(2-aminopyrimidin-5-yl)-2-fluoroethenyl]-4-fluoro-N-[(1S,2S)-2-hydroxycyclohexyl]benzamide,
(193) 3-[(Z)-2-fluoro-2-{5-[(1-methylpiperidin-4-yl)amino]pyridin-3-yl}ethenyl]-N-[(1S,2S)-2-hydroxycyclohexyl]-4-methylbenzamide,
(194) 3-[(Z)-2-{5-[(4-ethylpiperazin-1-yl)methyl]pyridin-3-yl}-2-fluoroethenyl]-N-[(1S,2S)-2-hydroxycyclohexyl]-4-methylbenzamide,
(195) 5-[(Z)-2-fluoro-2-{5-[(oxetan-3-yl)amino]pyridin-3-yl}ethenyl]-N-[(1S,2S)-2-hydroxycyclohexyl]-6-methylpyridine-3-carboxamide,
(196) 4-fluoro-3-[(Z)-2-fluoro-2-{5-[(oxetan-3-yl)amino]pyridin-3-yl}ethenyl]-N-[(1S,2S)-2-hydroxycyclohexyl]benzamide,
(197) 3-[(Z)-2-(6-{[2-(dimethylamino)ethyl]amino}pyridin-3-yl)-2-fluoroethenyl]-N-[(1S,2S)-2-hydroxycyclohexyl]-4-methylbenzamide,
(198) 3-[(Z)-2-(5-{[2-(dimethylamino)ethyl]amino}pyridin-3-yl)-2-fluoroethenyl]-N-[(1S,2S)-2-hydroxycyclohexyl]-4-methylbenzamide,
(199) 5-[(Z)-2-{6-[(cyclopropylmethyl)amino]pyridin-3-yl}-2-fluoroethenyl]-N-[(1S,2S)-2-hydroxycyclohexyl]-6-methylpyridine-3-carboxamide,
(200) 3-[(Z)-2-fluoro-2-{5-[(4-methylpiperazin-1-yl)methyl]pyridin-3-yl}ethenyl]-N-[(1S,2S)-2-hydroxy-2,3-dihydro-1H-inden-1-yl]-4-methylbenzamide,
(201) 3-[(Z)-2-fluoro-2-{5-[(4-methylpiperazin-1-yl)methyl]pyridin-3-yl}ethenyl]-N-(2-hydroxy-3,3-dimethylbutyl)-4-methylbenzamide,
(202) 3-[(Z)-2-{2-[(cyclopropylmethyl)amino]pyrimidin-5-yl}-2-fluoroethenyl]-4-fluoro-N-[(1S,2S)-2-hydroxycyclohexyl]benzamide,
(203) 3-{(Z)-2-[2-(cyclopropylamino)pyrimidin-5-yl]-2-fluoroethenyl}-4-fluoro-N-[(1S,2S)-2-hydroxycyclohexyl]benzamide,
(204) 3-[(Z)-2-(2-amino-4-methylpyrimidin-5-yl)-2-fluoroethenyl]-4-fluoro-N-[(1S,2S)-2-hydroxycyclohexyl]benzamide,
(205) 4-fluoro-3-{(Z)-2-fluoro-2-[2-(methylamino)pyrimidin-5-yl]ethenyl}-N-[(1S,2S)-2-hydroxycyclohexyl]benzamide,
(206) 3-[(Z)-2-(5-aminopyrazin-2-yl)-2-fluoroethenyl]-N-[(1S,2S)-2-hydroxycyclohexyl]-4-methylbenzamide, and
(207) 4-fluoro-3-[(Z)-2-fluoro-2-(5-fluoropyridin-3-yl)ethenyl]-N-[(1S,2S)-2-hydroxycyclohexyl]benzamide
or a pharmaceutically acceptable salt thereof, or a solvate thereof.

2. A compound selected from the group consisting of the following (1) to (15):
(1) 2-(cyclopropylmethyl)-N-(5-{[(1S,2S)-2-hydroxycyclohexyl]carbamoyl}-2-methylphenyl)-1,3-thiazole-5-carboxamide,
(2) 5-[cyclopropyl(methyl)amino]-N-(5-{[(1S,2S)-2-hydroxycyclohexyl]carbamoyl}-2-methylphenyl)pyridine-3-carboxamide,
(3) 5-(3-fluorophenyl)-N-(5-{[(1S,2S)-2-hydroxycyclohexyl]carbamoyl}-2-methylphenyl)pyridine-3-carboxamide,
(4) 5-(cyclopropylmethoxy)-N-(5-{[(1S,2S)-2-hydroxycyclohexyl]carbamoyl}-2-methylphenyl)pyridine-3-carboxamide,
(5) 5-ethoxy-N-(5-{[(1S,2S)-2-hydroxycyclohexyl]carbamoyl}-2-methylphenyl)pyridine-3-carboxamide,
(6) 3-{[(2-aminopyrimidin-5-yl)methyl]amino}-N-[(1S,2S)-2-hydroxycyclohexyl]-4-methylbenzamide,
(7) N-[(1S,2S)-2-hydroxycyclohexyl]-4-methyl-3-{[(pyrazolo[1,5-a]pyrimidin-3-yl)methyl]amino}benzamide,
(8) N-[(1S,2S)-2-hydroxycyclohexyl]-4-methyl-3-[({2-[(oxan-4-yl)amino]pyrimidin-5-yl}methyl)amino]benzamide,
(9) N-[(1S,2S)-2-hydroxycyclohexyl]-4-methyl-3-({[6-(1H-1,2,3-triazol-1-yl)pyridin-3-yl]methyl}amino)benzamide,
(10) 3-{[([2,3'-bipyridin]-5'-yl)amino]methyl}-N-[(1S,2S)-2-hydroxycyclohexyl]-4-methylbenzamide,

(11) 5-[(Z)-2-(6-aminopyridin-3-yl)-2-fluoroethenyl]-N-[(1S,2S)-2-hydroxycyclohexyl]-6-methylpyridine-3-carboxamide,

(12) 3-[(Z)-2-{5-[(4-ethylpiperazin-1-yl)methyl]pyridin-3-yl}-2-fluoroethenyl]-N-[(1S,2S)-2-hydroxycyclohexyl]-4-methylbenzamide,

(13) 4-fluoro-3-{(Z)-2-fluoro-2-[2-(methylamino)pyrimidin-5-yl]ethenyl}-N-[(1S,2S)-2-hydroxycyclohexyl]benzamide,

(14) 3-[(Z)-2-(5-aminopyrazin-2-yl)-2-fluoroethenyl]-N-[(1S,2S)-2-hydroxycyclohexyl]-4-methylbenzamide, and

(15) 4-fluoro-3-[(Z)-2-fluoro-2-(5-fluoropyridin-3-yl)ethenyl]-N-[(1S,2S)-2-hydroxycyclohexyl]benzamide or a pharmaceutically acceptable salt thereof, or a solvate thereof.

3. A pharmaceutical composition comprising
the compound according to claim 1 or a pharmaceutically acceptable salt thereof, or a solvate thereof, and
a pharmaceutically acceptable carrier.

4. A therapeutic agent for pulmonary hypertension, scleroderma, asthma, bronchiolitis obliterans, pulmonary fibrosis, acute myelogenous leukemia (AML), hypereosinophilic syndrome, T-lymphoblastic leukemia, chronic myelomonocytic leukemia (CMML), chronic myelogenous leukemia (CML), chronic eosinophilic leukemia, dermatofibrosarcoma protuberans, glioma, ovarian cancer, vascular restenosis, atherosclerosis/arteriosclerosis obliterans, moyamoya disease, idiopathic occlusion of the circle of Willis, leiomyoma, lymphangioleiomyomatosis, or age-related macular degeneration (AMD), in which a PDGF receptor kinase is involved, the therapeutic agent comprising
the compound according to claim 1 or a pharmaceutically acceptable salt thereof, or a solvate thereof, and
a pharmaceutically acceptable carrier.

5. A pharmaceutical composition comprising
the compound according to claim 2 or a pharmaceutically acceptable salt thereof, or a solvate thereof, and
a pharmaceutically acceptable carrier.

6. A therapeutic agent for pulmonary hypertension, scleroderma, asthma, bronchiolitis obliterans, pulmonary fibrosis, acute myelogenous leukemia (AML), hypereosinophilic syndrome, T-lymphoblastic leukemia, chronic myelomonocytic leukemia (CMML), chronic myelogenous leukemia (CML), chronic eosinophilic leukemia, dermatofibrosarcoma protuberans, glioma, ovarian cancer, vascular restenosis, atherosclerosis/arteriosclerosis obliterans, moyamoya disease, idiopathic occlusion of the circle of Willis, leiomyoma, lymphangioleiomyomatosis, or age-related macular degeneration (AMD), in which a PDGF receptor kinase is involved, the therapeutic agent comprising
the compound according to claim 2 or a pharmaceutically acceptable salt thereof, or a solvate thereof, and
a pharmaceutically acceptable carrier.

\* \* \* \* \*